US006460018B1

United States Patent
Kasai et al.

(10) Patent No.: US 6,460,018 B1
(45) Date of Patent: Oct. 1, 2002

(54) PROGRAM PRODUCTION AND TRANSMISSION APPARATUS

(75) Inventors: Kazuhiko Kasai; Yoshie Tadano, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/200,566

(22) Filed: Nov. 27, 1998

Related U.S. Application Data

(63) Continuation of application No. PCT/JP98/01493, filed on Mar. 31, 1998.

(30) Foreign Application Priority Data

Mar. 31, 1997 (JP) .............................................. 9-079690

(51) Int. Cl.[7] .............................................. G06F 17/60
(52) U.S. Cl. .............................. 705/8; 725/32; 725/50; 725/115; 725/116; 725/117; 370/377; 348/155; 348/722; 380/210
(58) Field of Search ............................ 705/1, 8; 717/1; 725/116–117, 138, 144, 145–147, 43, 50; 348/722, 565, 155; 380/210

(56) References Cited

U.S. PATENT DOCUMENTS

| | | | | |
|---|---|---|---|---|
| 4,775,975 A | * | 10/1988 | Cromwell et al. | |
| 5,083,205 A | * | 1/1992 | Arai | 348/155 |
| 5,559,549 A | * | 9/1996 | Hendricks et al. | 725/50 |
| 5,659,350 A | * | 8/1997 | Hendricks et al. | 725/116 |
| 5,686,954 A | * | 11/1997 | Yushinobu et al. | 725/43 |
| 6,198,906 B1 | * | 3/2001 | Boetje et al. | 348/722 |
| 6,239,794 B1 | * | 5/2001 | Yuen et al. | 348/565 |
| 6,240,240 B1 | * | 5/2001 | Nagano et al. | 386/83 |
| 6,243,465 B1 | * | 6/2001 | Ullrich et al. | 380/210 |

FOREIGN PATENT DOCUMENTS

| | | | | |
|---|---|---|---|---|
| GB | 0933893 A1 | * | 8/1999 | H04H/7/00 |
| JP | 01-265677 | * | 10/1989 | H04N/5/22 |
| JP | 07-141427 | * | 6/1995 | G06F/17/60 |
| JP | 09-034912 | * | 2/1997 | G06F/17/30 |
| WO | WO98/44664 | * | 10/1998 | H04H/7/00 |
| WO | WO 00/58833 | * | 10/2000 | G06F/11/14 |

OTHER PUBLICATIONS

Multimedia, Sharing Elements In A Multimedia Design Group. Magel, Mark, AV Video, v16 n8 ps–6 (2) Aug. 1994.*

The Fully integrated multichannel broadcast system: hareder than it looks. Lude, P.J., Sony, Electron. Inc. USA, IBC–International Broadcasting Convention (Conf. Publ. No. 447), IEE, London, Sep. 1997.*

Passport Design announces Passport Product 2.0 and lowers price of Passport Producer 1.0. Business Wire (San Francisco, CA, US) 930517.*

* cited by examiner

*Primary Examiner*—Kyle J. Choi
*Assistant Examiner*—M. Irshadullah
(74) *Attorney, Agent, or Firm*—Frommer Lawrence & Haug LLP; William S. Frommer

(57) ABSTRACT

Program production supporting component, transmission equipment controlling component, material creation managing component, and storing component are interconnected through a network, and managing component and exterior supporting component are connected to the network, thereby making it possible to realize a program production and transmission apparatus capable of efficiently execution creation of program component information with production information produced based on production schedule information, creation of a program progress table formed based on the program component information, and processing for editing and transmission based on the program progress table at timing as required.

7 Claims, 85 Drawing Sheets

| ID | program name | start time | end time | local | net |
|----|--------------|------------|----------|-------|-----|
| 1 | XXXXXXXXXXXXXXX | U 08:00:00 | 08:25:00 | ○ | |

(A)

| No. | item name | start time/ duration | | component duration | component |
|-----|-----------|---------------------|---|--------------------|-----------|
| 1 | time-adjustable CM1 | 08:00:00 01:30 | 1 | -3Q 01:30 | time-adjustable CM |
| 2 | time-adjustable CM2 | 08:10:00 01:00 | 1 | -3Q 01:00 | time-adjustable CM |
| 3 | fixed CM1 | 08:15:00 01:00 | 1 | 01:00 | fixed CM |

| program component table | | | | | | | | | | | | |
|---|---|---|---|---|---|---|---|---|---|---|---|---|
| register | print | Wrap Up Today | collected news item | April 16th (Tuesday) 08:00:00~08:25:00 | | NV material | TAKE process | item group | | LOCAL/NET | fixed DUR | fixed start | CM-Q | remaining time 05:00 cushion | preliminary rejection item — general-purpose pattern

| No. | item name | start time/ duration | contents | component duration | material list | video image | Key effect | audio | MIX | superimpose | K |
|---|---|---|---|---|---|---|---|---|---|---|---|
| 3 | spring topic: Mother Farm | LOCK Oginoya 18:00:20 01:40 | | 1 | 00:10 | 1CYoshida | | | | 0 | |
| | | | | 2 | 01:30 | NV spring topic: Mother Farm | | NV | | | |
| 4 | CM cue cut | LOCK 18:02:00 00:05 | | 1 | -30 00:05 | TW | CG | | AF CM Cue Cut | 1 after CM | |

112C — 112B — spring topic: 95 Mother Farm

| No. | item name | start time/ duration | contents | component duration | video image | Key | effect | audio | MIX | superimpose |
|---|---|---|---|---|---|---|---|---|---|---|
| 1 | headline1 earthquake countermeasures committee [LOCK Oginoya] | 18:00:00:00 | 00:10 | 1 | 00:10 | | CG | | 2 | |
| 2 | headline housing problem in Kanagawa Prefecture [LOCK Oginoya] | 18:00:10 | 00:10 | 1 | 00:10 | NV housing supply public corporation | CG | NV housing supply public corporation | 2 | |
| 3a | water saving countermeasures in Kanagawa Prefecture/little water remaining in dam [LOCK Mori] | 18:00:20 | 01:10 | 1 | 00:10 | 1CYoshida | VF | | | |
| | | | | 2 | 01:00 | NV water in Sagami Lake | | NV water in Sagami Lake | 5 | |

Labels:
- earthquake countermeasures committee Morinosato in Atsugi city, Kanagawa Prefecture
- NV earthquake countermeasure committee
- NV earthquake countermeasures committee
- housing supply public corporation in Kanagawa Prefecture
- ground in Kanagawa Prefecture
- city water board in kanagawa Prefecture
- looks of dam
- 30 percents compared with full-state
- Mr.Takahashi in city water board
- Mr.Miura in city water board

Fig. 22

| No. | item | name | start time/duration | contents | component duration | video image | Key | effect | audio | MIX | superimpose |
|---|---|---|---|---|---|---|---|---|---|---|---|
| 1 | headline1 earthquake countermeasures committee | ▨▨ Oginoya | 18:00:00 00:10 | | 1 | 00:10 | | | | | |
| | | | | | 1 | 00:10 | CG | | | 2 | |
| 2 | headline 2 housing problem in Kanagawa Prefecture | LOCK Oginoya | 18:00:10 00:10 | | 1 | 00:10 | CG | | NV housing supply public corporation | 2 | |
| 3a | water saving countermeasures in Kanagawa Prefecture/little water remaining in dam | LOCK Mori | 18:00:20 01:10 | | 1 | 00:10 | VF | | 1CYoshida | | |
| | | | | | 2 | 01:00 | | | NV water in Sagami Lake | 5 | | earthquake countermeasures committee
Morinosato in Atsugi city, Kanagawa Prefecture NV earthquake countermeasures committee NV earthquake countermeasures committee housing supply public corporation in Kanagawa Prefecture
ground in Kanagawa Prefecture city water board
in kanagawa Prefecture
looks of dam
30 percents compared with full-state
Mr.Takahashi in city water board
Mr.Miura in city water board

| No. | program name | status | start time | end time | broadcasting duration | process mode | desk | C G | local | net | packet completion |
|---|---|---|---|---|---|---|---|---|---|---|---|
| 1 | Wrap Up Time Today | on air completed | U08:00:00 | 08:25:00 | 25:00 | TAKE | Yoshimoto | 01 23H | ○ | | |
| 2 | afternoon news | on air completed | 12:30:00 | 12:35:00 | 05:00 | TAKE | Mitsuhira | 04 23H | ○ | | |
| 3 | evening news | | 18:30:00 | 18:57:00 | 27:00 | TAKE | Yada | 05 23H | ○ | | |
| 4 | midnight news | | U23:30:00 | 23:45:00 | 15:00 | TAKE | Okawada | 03 23H | ○ | | |
| 5 | | | | | | | | | | | |

Fig. 29 press terminal menu  file  edit  item/material  special  specify  rehearsal  preview work table | | manuscript | | program creation | search | | | | | program register | preset

301

300 register 292 input stage program | | | broadcast day | April 16th (Tuesday), 1996
program table | | | | broadcast | program start | program end | rehearsal

| No. | program name | status | start time | end time | broadcasting duration | process mode | desk | CG | local | net | packet completion |
|---|---|---|---|---|---|---|---|---|---|---|---|
| 1 | Wrap Up Time Today | on air completed | U08:00:00 | 08:25:00 | 25:00 | TAKE | Yoshimoto | 01 23H | ○ | | |
| 2 | afternoon news | on air completed | 12:30:00 | 12:35:00 | 05:00 | TAKE | Mitsuhira | 04 23H | ○ | | |
| 3 | evening news(rehearsal) | | 18:30:00 | 18:57:00 | 27:00 | TAKE | Yada | 05 23H | ○ | | |
| 4 | midnight news | | U23:30:00 | 23:45:00 | 15:00 | TAKE | Okawada | 03 23H | ○ | | |
| 5 | | | | | | | | | | | |

| 353 | 354 | 355 | 356 |
|---|---|---|---|
| start time for each component | component duration for each component | component | need/no need for TAKE operation to execute component |
| 18:00:00 | 00:05 | component 1 | manual take operation needed |
| 18:00:05 | 00:05 | component 2 | manual take operation not needed |
| 18:00:10 | 01:00 | component 3 | manual take operation not needed |
| 18:01:10 | 00:20 | component 4 | manual take operation needed |

FIG. 35

| 361 | 362 | 363 | |
|---|---|---|---|
| start time for each component | component duration for each component | component | |
| 18:00:00 | 00:05 | component 1 | ← manual take operation needed |
| 18:00:05 | 00:05 | component 2 | ← manual take operation not needed |
| 18:00:10 | 01:00 | component 3 | ← manual take operation not needed |
| 18:01:10 | 00:20 | component 4 | ← manual take operation needed |

| program component table | | Wrap Up Today | | April 16th/(Tuesday) 18:00:00~18:25:00 | | TAKE process | LOCAL | | remaining time | 05:00 |
|---|---|---|---|---|---|---|---|---|---|---|
| register | print | collected news item | | | | item group | fixed DUR | fixed start | CM-Q | cushion |

| No. | item name | | start time/duration | con-tents | component duration | video image | Key | effect | audio | MIX | superimpose | K |
|---|---|---|---|---|---|---|---|---|---|---|---|---|
| 1 | headline 1 earthquake countermeasures committee | LOCK Oginoya | 18:00:00 00:10 | | 1 00:10 | | CG | | NV | | 2 | |
| 2 | headline 2 housing problem in Kanagawa Prefecture | LOCK Oginoya | 18:00:10 00:10 | | 1 00:10 | NV housing supply public corporation | CG | | NV | | 3 | |
| 3 | CM cue cut | LOCK | 18:00:20 00:05 | | 1 -3Q 00:05 | TW | CG | | AF CM cue | | 1 | |

371 preliminary rejection item general-purpose pattern

NV earthquake countermeasures committee earthquake countermeasure committee housing supply public corporation

| program component table | | | | | | | | | | | | |
|---|---|---|---|---|---|---|---|---|---|---|---|---|
| register | print | Wrap Up Today | | April 16th (Tuesday) 18:00:00~18:25:00 | | TAKE process | LOCAL/NET | | | remaining time | 05:00 | |
| | | preliminary rejection item | general-purpose pattern | | | | | | | | | |
| | | collected news item | | | | | | | | | | |
| | | | | NV material | material list | item group | | fixed DUR | fixed start | CM-Q | cushion | |
| No. | item name | start time/ duration | | contents | component duration | video image | Key | effect | audio | MIX | superimpose | K |
| 14 | speech | 18:24:20 LOCK | 00:20 | | 1 | 00:20 | | | | | 0 | |
| 15 | ending | 18:24:40 LOCK | 00:20 | | 1 | 00:20 | TW | | | | 0 | |

| preliminary rejection item | general-purpose pattern | | | | | | | | | |
|---|---|---|---|---|---|---|---|---|---|---|
| program component table | | Wrap Up Today | April 16th (Tuesday) 18:00:00~18:25:00 | | | | | | remaining time | 05:00 |
| register | print | collected news item | | NV material | material list | TAKE process | LOCAL/NET | CM-Q | cushion |
| No. | item name | start time/duration | con-tents | component duration | video image | Key | effect | fixed DUR | fixed start | |
| 14 | speech | 18:24:20 / 00:20 | | 1 / 00:20 | (figure) | | | | | |
| 15 | ending | 18:24:40 / 00:20 | LOCK | 1 / 00:20 | TW | | | | | |

174 175 177

155

430 — audio MIX superimpose K 431 432 433 434 435 close button 436

| No. | start time/duration | K setting | video image | audio false start |
|---|---|---|---|---|
| 1 | 18:24:45 / 00:15 | | | AF ON |
| 2 | | | | |
| 3 | | | | |
| 4 | | | | |
| 5 | | | | |

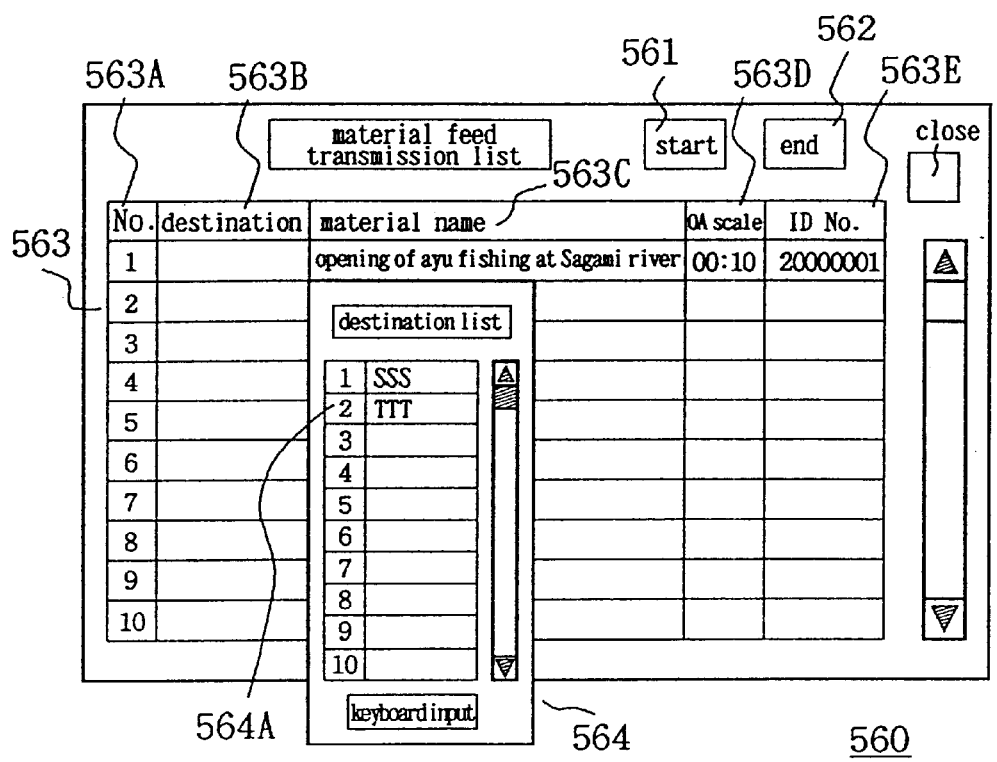
(A)
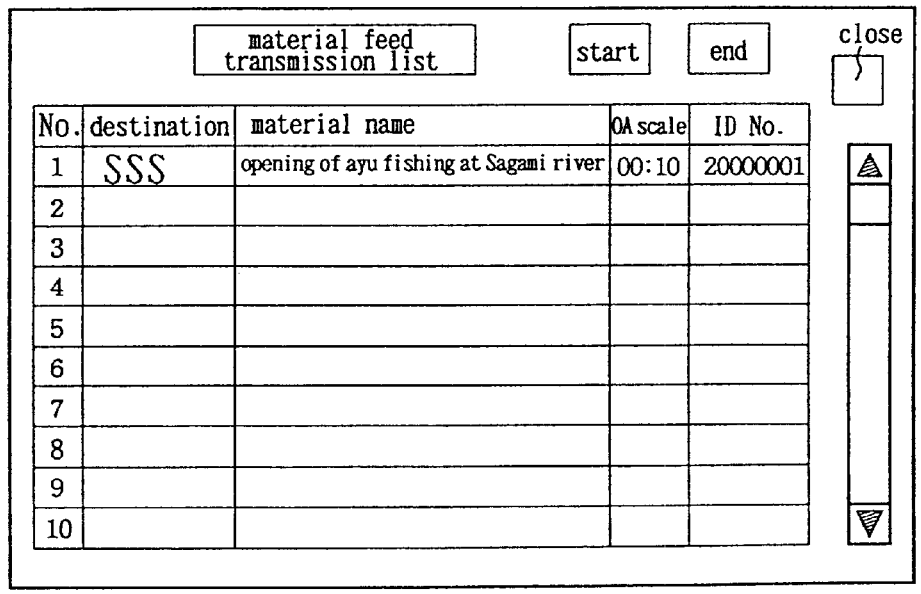
(B)
FIG. 56

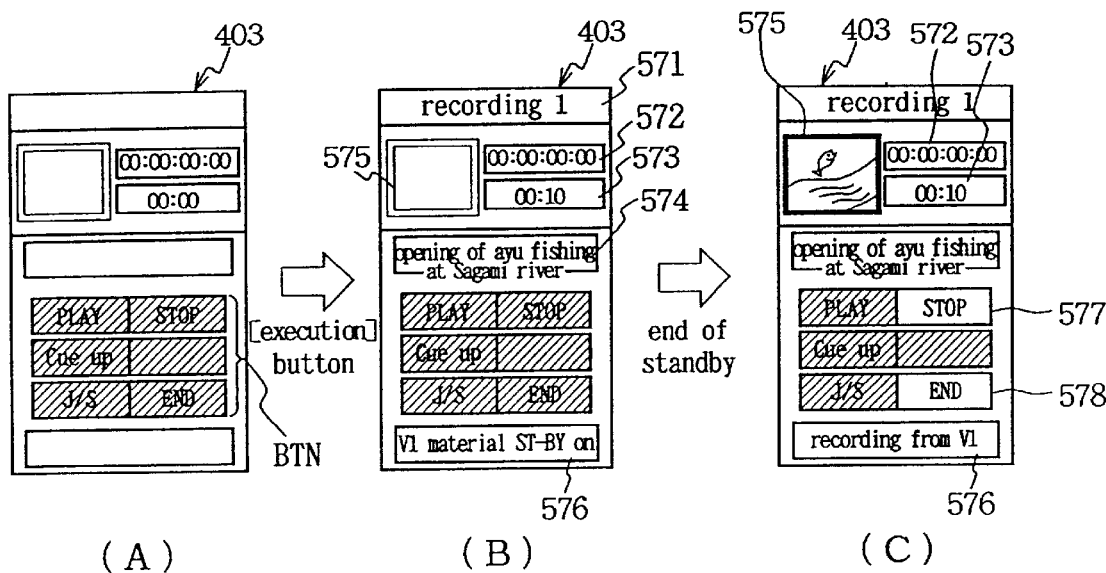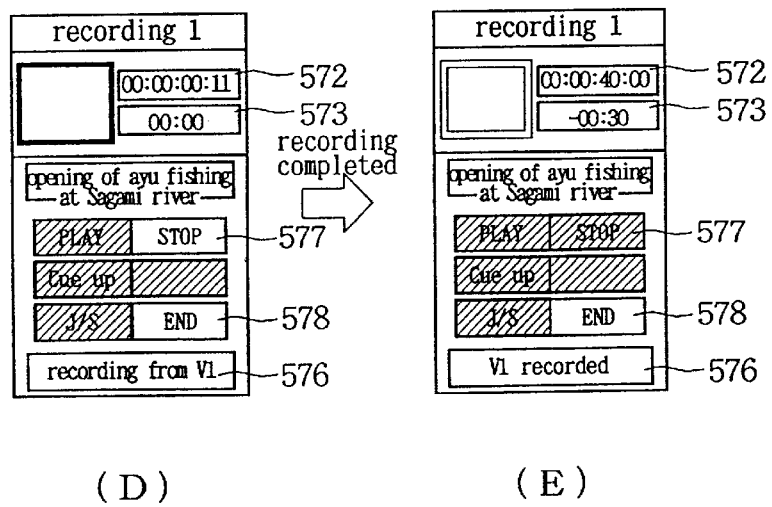
Fig. 57

(A)

material name : ××××××××

(B)

broadcast date: ××××××××
program name: ×××××××× item No. : ××××××××
item name : ××××××××
transmission order : ×××××××× material name : ××××××××

(C)

transmission date : ×××××××× source : ××××××××
destination: ×××××××× material name : ××××××××

| check issue 771B | | | NV material list 771D | | | | 771E | |
|---|---|---|---|---|---|---|---|---|
| No. | item No./item name | | component No./material name | OA scale | recording scale | progress | check | ID No. | LIB |
| 1 | 1 | head line 1 | 1 earthquake countermeasure committee | 00:10 | 00:40 | recorded | issued | 20000001 | ○ |
| 2 | 2 | head line 2 | 2 housing problem in Kanagawa Prefecture | 00:10 | 00:40 | recorded | issued | 20000002 | |
| 3 | | | | | | | | | |
| 4 | | | | | | | | | |
| 5 | | | | | | | | | |
| 6 | | | | | | | | | |
| 7 | | | | | | | | | |
| 8 | | | | | | | | | |
| 9 | | | | | | | | | |
| 10 | | | | | | | | | |
| 11 | | | | | | | | | |
| 12 | | | | | | | | | |
| 13 | | | | | | | | | |
| 14 | | | | | | | | | |
| 15 | | | | | | | | | |

Fig. 77

PROGRAM PRODUCTION AND TRANSMISSION APPARATUS

This is a continuation of copending International Application PCT/JP98/01493 having an international filing date of Mar. 31, 1998.

TECHNICAL FIELD

The present invention relates to a program production and transmission apparatus which is suitable for application in a news program production and transmission apparatus for producing and transmitting a news program, for example, in a press department of a television broadcasting station.

BACKGROUND ART

A news program in television broadcasting is required to rapidly and correctly communicate to the audience miscellaneous news sources which may have been collected at respective branch offices of a broadcasting station, branch sections, clubs, and so on.

For the production of an actual news program, news sources must be efficiently collected in respective branch offices, branch sections, clubs or the like, after a news collection therefor is scheduled in a press department, in order to smoothly edit the collected news sources and broadcast the edited news program within a limited time frame of broadcasting time allocated therefor.

The press department, when producing a news program, involves an editing operation for news sources which includes the creation of a telop and a caption to be superimposed on a screen on which a video image recorded by the news collection is displayed. A news program produced in this way is transmitted on the air in accordance with a cue sheet which indicates the contents of the program, times at which respective items composing the program are to be broadcast, and so on. The cue sheet on which the broadcasting information for the program is written is also created in the press department based on a broadcasting schedule determined in the broadcasting station.

The press department also preserves and manages materials used in broadcast programs thus produced, using a VTR (Video Tape Recorder) or the like, in order to record such materials as program documents or source materials.

PROBLEMS TO BE SOLVED BY THE INVENTION

News sources collected at branch offices, branch sections, and clubs are sent to the press department through telephone conversations and facsimile transmissions using telephone lines for producing a news program. Similarly, schedules for news reporters, situations of required equipment, and so on for collecting news sources are also communicated through telephone lines.

In this event, the information communications through telephone lines have a problem that they are likely to fail to correctly transmit information necessary to production and transmission to a party requiring the information, thus causing a reduction in efficiency of program production.

Also, in a broadcasting station, a section in which a cue sheet is created, a section in which program components are edited in accordance with the cue sheet, and a section in which a produced program is transmitted are in almost all cases located away from each other in a press department. In this situation, communications of information between these sections for creation of a cue sheet, editing of program components based on the cue sheet, or transmission of an actually produced program in accordance with the cue sheet are made through verbal messages, telephone communications, delivery by hand of memorandum, and so on.

In this event, for example, if a program component must be changed due to a collected urgent news while a news program is on the air in the press department, it is necessary to immediately switch the broadcast program. However, the information communications through verbal messages, delivery by hand of memorandum, and so on may fail to rapidly communication required information or fail to correctly communicate information to a party who requires it, as is the case of the above-mentioned program production, thus causing a problem that the working efficiency is reduced during the production of the program and the transmission of the program.

DISCLOSURE OF THE INVENTION

The present invention has been made in view of the foregoing problems, and is intended to propose a program production and transmission apparatus which is capable of reliably and rapidly communicating and processing information required for production and transmission of programs.

To solve the problems mentioned above, the present invention provides a program production and transmission apparatus for creating a plurality of materials constituting a program and sequentially transmitting the materials based on a program progress table for indicating the progress of the program, which comprises program production supporting means for creating production information including a schedule for creating the materials and program component information indicative of respective components in the program, transmission equipment controlling means for creating the program progress table from the program component information created by the program production supporting means, and for transmitting the materials based on the program progress table, material creation managing means for recording the materials transmitted from the transmission equipment controlling means, and for editing the respective recorded materials, storing means for storing data other than the materials, and network means for connecting the program production supporting means, the transmission equipment controlling means, the material creation managing means, and the storing means, wherein means for managing the transmission of all programs, and exterior supporting means for transmitting production schedule information for creating the production information to the program production supporting means are connected to the network means.

The program production supporting means, the transmission equipment controlling means, the material creation managing means, and the storing means are interconnected through the network means, and the managing means and the exterior supporting means are connected to the network means, thereby making it possible to realize a program production and transmission apparatus capable of efficiently executing creation of program component information with production information produced based on production schedule information, creation of a program progress table formed based on the program component information, and processing for editing and transmission based on the program progress table at timing as required.

BRIEF DESCRIPTION OF THE DRAWINGS

The foregoing object and features of the present invention will become more apparent from the following description made in connection with the accompanying drawings.

FIG. 15(A) is a diagram illustrating the structure of a program table;

FIG. 15(B) is a diagram illustrating the structure of a program component table;

FIG. 19 is a diagram illustrating an example of a program component table in which a video icon has been inserted in a video column;

FIG. 22 is a diagram illustrating an example for setting prohibition of input access from another terminal to an item on a program component table;

FIG. 23 is a diagram illustrating an example of a program component table on which prohibition of input access from another terminal has been set for a predetermined item;

FIG. 26 is a diagram illustrating an example of a program component table on which time fixation frames are displayed and over which a popup is displayed for indicating remaining time periods within respective time fixation frames;

FIG. 29 is a diagram illustrating an example of a program table in which a program has been specified for a partial rehearsal;

FIG. 30 is a diagram illustrating an example of a program table in which a program subjected to a partial rehearsal is displayed in a program name;

FIG. 35 is a diagram illustrating an example of a program component table on which manual TAKE or automatic TAKE is displayed in a component duration column of each component;

FIG. 36 is a diagram illustrating an example of a cue sheet on which manual TAKE or automatic TAKE is displayed in a component duration column of each component;

FIG. 37 illustrates an example of a program component table displayed on a screen;

FIG. 39 is a diagram illustrating an example of the program component table with the time specified in FIG. 38;

FIG. 42 is a diagram illustrating an example of a program component table displayed on a screen;

FIG. 43 is a diagram illustrating an example of a screen on which displayed is a popup for selecting a material to be automatically started irrespective of a program progress situation, together with a program component table;

FIG. 48 is a diagram illustrating an example of a cue sheet for changing the order of items specified for NEXT items using an item list;

Figure 49:
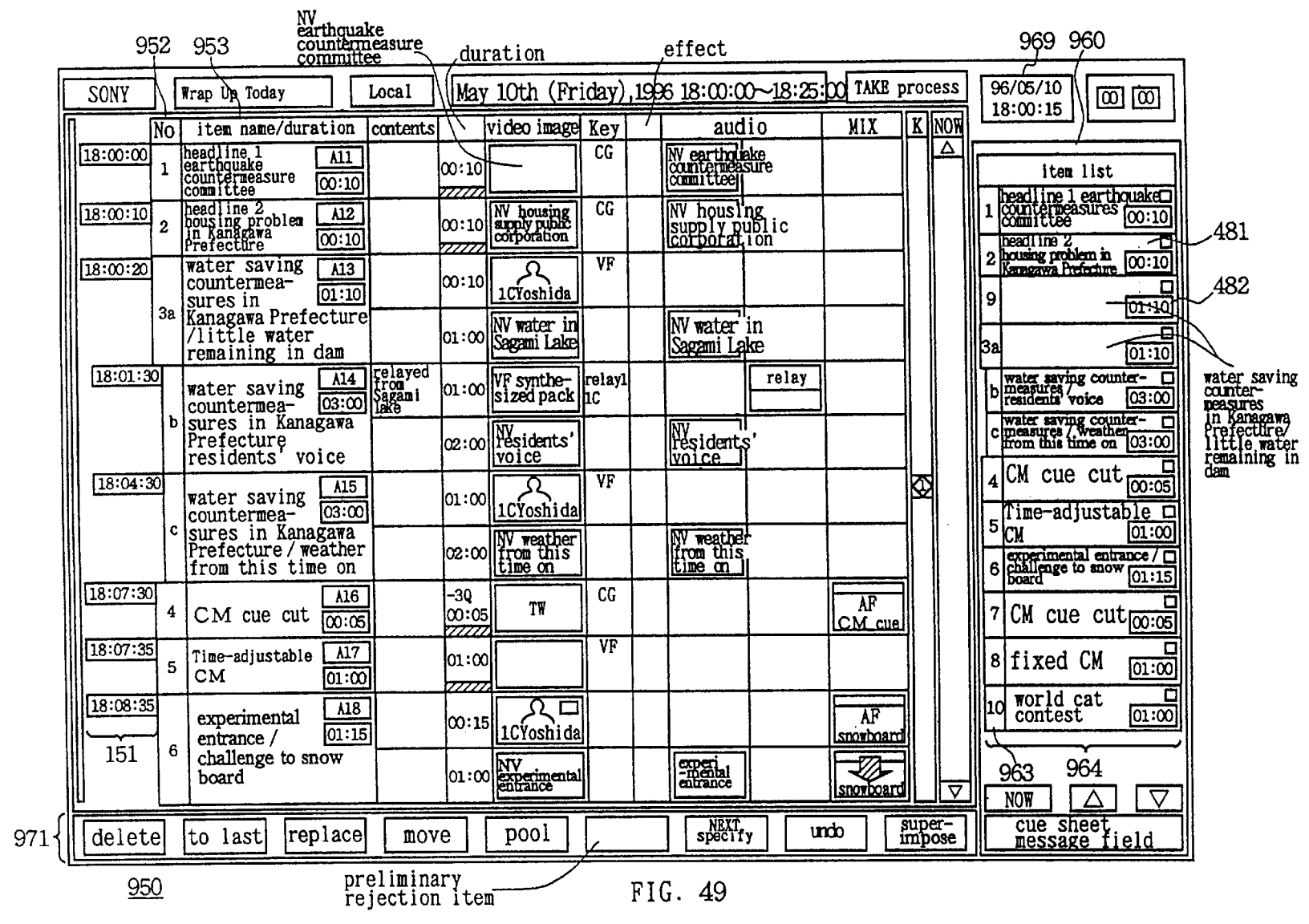

FIG. 49 is a diagram illustrating an example of a cue sheet on which the order of items specified for NEXT items have been changed using an item list;

FIG. 56 is a diagram illustrating details of a popup on which a destination of a material is displayed.

FIG. 57 is a diagram illustrating examples of status displays given on a screen of a recording screen;

FIG. 62 illustrates examples of credit information displayed on a screen;

FIG. 69 is a diagram illustrating an example of a program component table in which a pool material is inserted;

FIG. 70 is a diagram illustrating an example of a screen on which a list of pool materials recorded in a pool material region in the on-air server is displayed on a cue sheet;

FIG. 77 is a diagram illustrating an example of a material list displayed on a screen;

BEST MODE FOR CARRYING OUT THE INVENTION

Embodiments of the present invention will hereinafter be described with reference to the drawings.

(1) News Program Production and Transmission Apparatus (1-1) Description on General Configuration of News Program Production and Transmission Apparatus 1 and Outline of Operations Thereof Here, a news program production and transmission apparatus 1 will be described in connection with a general configuration and an outline of its operations.

First, a general configuration of the new program production and transmission apparatus will be described.

Figure 1:
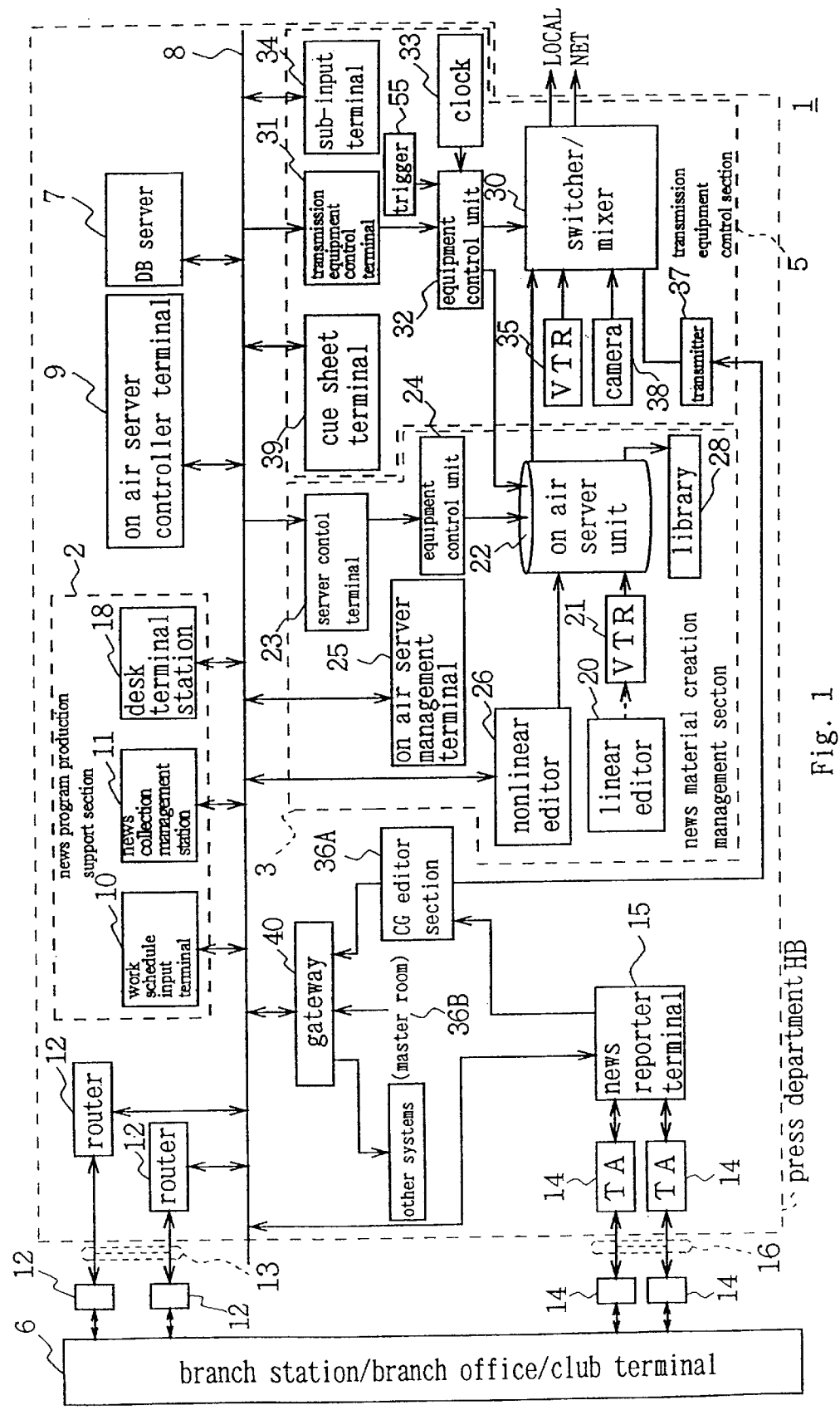
FIG. 1 is a block diagram illustrating a general configuration of a news program production and transmission apparatus according to the present invention.

FIG. 1 generally illustrates the news program production and transmission apparatus 1. The news program production and transmission apparatus 1 mainly comprises a news program production support section 2; a news material creation management section 3; and a transmission control section 5. The news program production support section 2, the news material creation management section 3 and the transmission control section 5 are interconnected through a network, respectively.

The news program production and transmission apparatus 1 is further connected to a database server (DB server) 7 for preserving data required for production of news programs and transmission of news programs, and branch office/branch station/club terminals 6 located external to the station through the network 8. Also, the news program production and transmission apparatus 1 is interconnected to other systems such as a master room for managing the broadcasting of the overall broadcasting station, a CG (Computer Graphics) editor section 36A and so on through an interface (a gateway 40 in FIG. 1).

Describing briefly the operation of the news program production and transmission apparatus 1 in the foregoing configuration, in the news program production support section 2, a work schedule is inputted for employees dedicated to the production of news programs; a news collection schedule is inputted; and press staff members who actually go out for collecting news sources are assigned. They are charged with actually photographing of materials (data including video and audio data), and so on at news collecting locations. Inputted data and so on are stored in the DB server 7. Photographed materials are once stored in the news program material creation management section 3 and edited to be materials actually usable in news programs. In addition, the news program production support section 2 creates a table for indicating components of a program, referred to as a program component table. Materials edited in the news material creation management section 3 are transferred to the transmission control equipment section 5 which creates a table for indicating program components, on-air times of respective items, and so on, referred to as a cue sheet, based on the program component table created in the program production support section 2. Based on the cue sheet, a material is actually transmitted from the transmission control section 5 to the outside when a predetermined time is reached.

Now, the respective sections in the news program production and transmission apparatus 1 described above will be described in detail with reference to FIG. 1.

Description is first made on the news program production support section 2.

The news program production support section 2 comprises a work schedule input terminal 10, a news collection management terminal 11 and a desk terminal 18.

Figure 47:
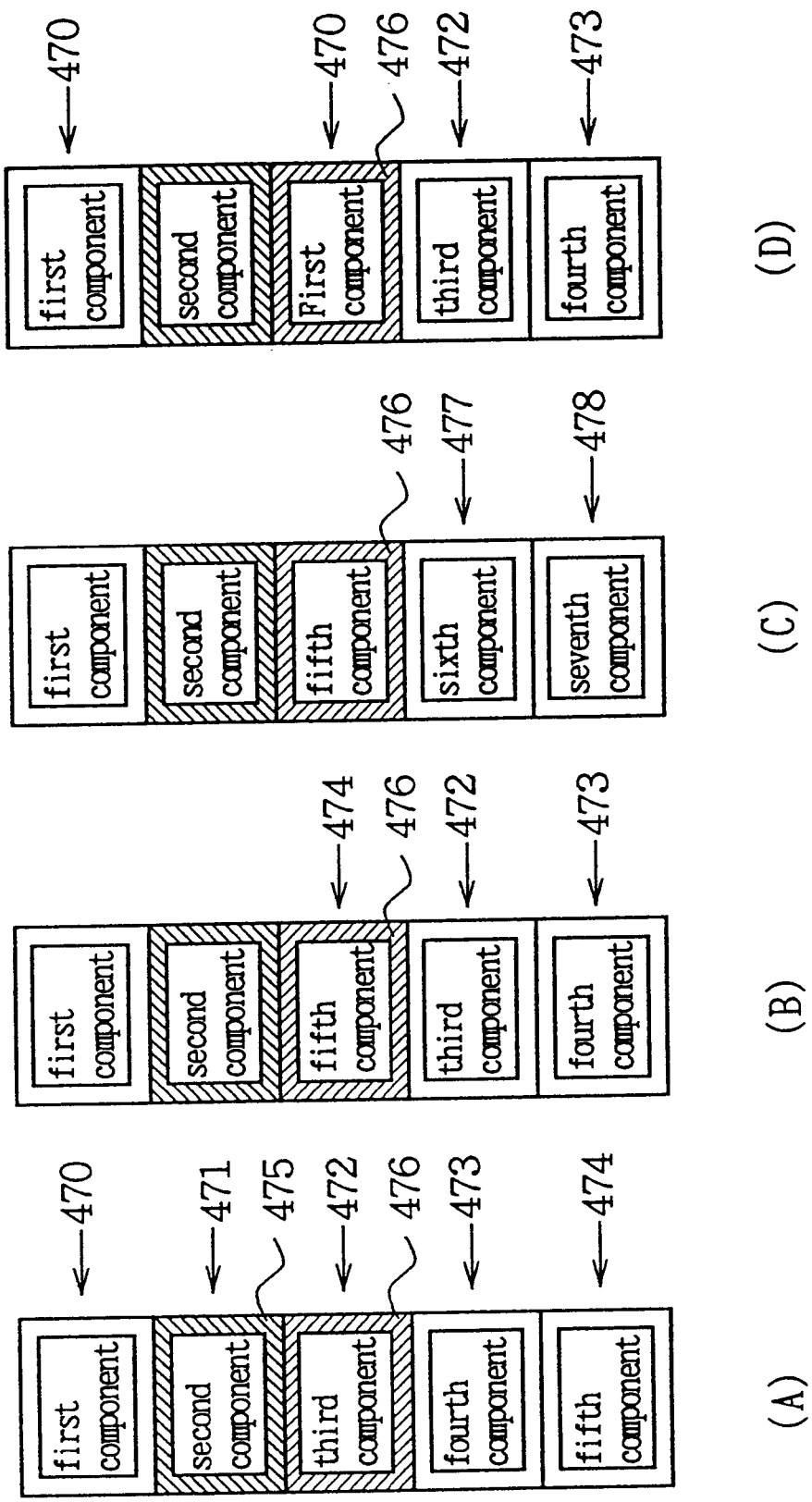
FIG. 47 is a diagram illustrating an example of how the order of items specified for NEXT items is changed on a cue sheet.

The work schedule input terminal 10 inputs in a work schedule table a work schedule for news collection staff who actually goes out for news collection. For example, the work schedule table is created by inputting working days, working hours and so on for each member, and stored in the DB server 7. Since the work schedule table for the news collection staff is stored in the DB server 7, the work schedule table can be seen from every section connected thereto through the network 8, thereby making it possible to verify working situations of the news collection staff. An example of the work schedule table is illustrated in FIG. 47. In FIG. 47, task distributions in a news collection activity and a working situation on a working day are displayed for each employee in charge (each news collection member). Details will be described later.

Figure 2:
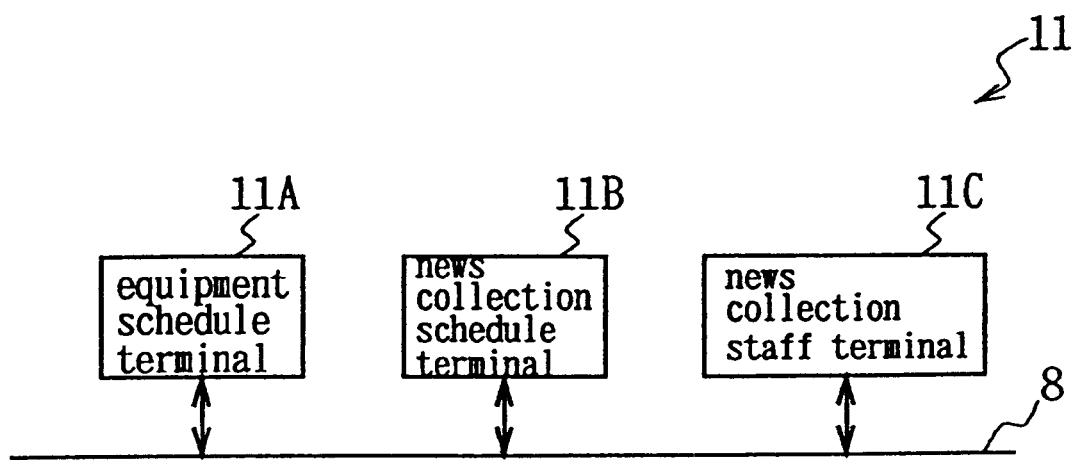
FIG. 2 is a diagram illustrating the configuration of news collection managing terminals in a news program production support section in the news program production and transmission apparatus illustrated in FIG. 1.
Figure 3A:
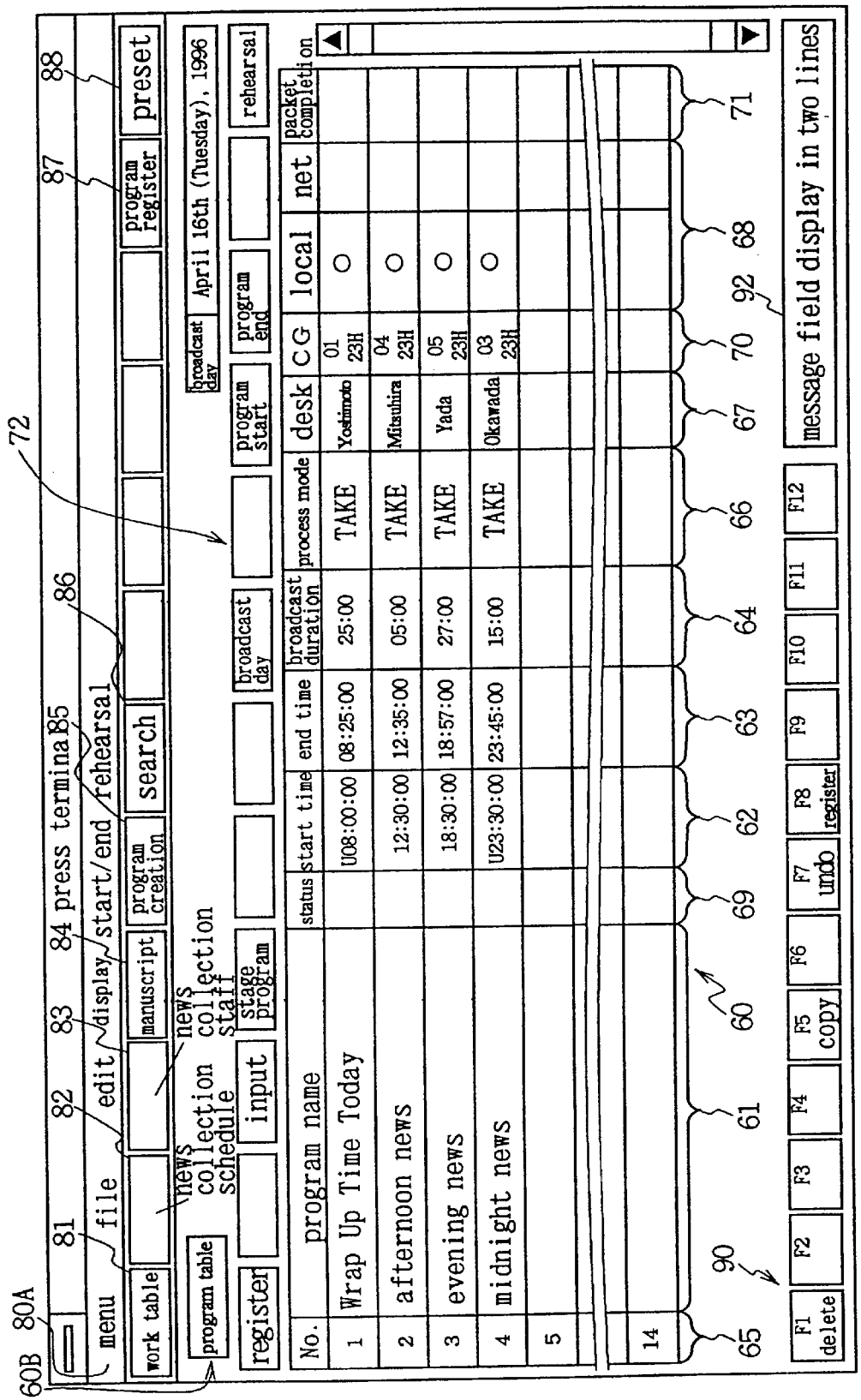
FIG. 3(A) is an example of a program table screen displayed on respective terminals constituting the news program production support section.

The news collection management terminal 11 is a terminal for creating information related to news collection management such as news collection planning and assignment of news collection staff. As illustrated in FIG. 2, the news collection management terminal 11 comprises a device schedule terminal 11A, a news collection schedule terminal 11B and a news collection staff terminal 11C. The device schedule terminal 11A is a terminal for inputting broadcasting devices required when news sources are collected. The news collection schedule terminal 11B is a terminal for inputting news collection items, contents of news collection and so on for planning news collection. The news collection staff terminal 11C is a terminal for assigning members to each news collection item as news collection staff. Specifically, in a table referred to as a news collection decision table stored in the DB server 7, broadcasting devices required during news collection activities are inputted from the device schedule terminal 11A; news collection items, contents of news collection and so on are inputted from the news collection schedule terminal 11B, and who is assigned to news collection staff is inputted from the news collection staff terminal 11C. An example is illustrated in FIG. 3(A). In FIG. 3(A), a news collection decision table comprises, for each news collection item, the contents of the news collection, a news collecting location, time at which the staff leave the press department HB for the news collection and time at which the staff returns to the press department HB (departure time at a news program broadcasting station and return time at the news program broadcasting station), and news collection time at news collecting location, as well as various items including an assigned reporter, an assigned cameraman, VE, illumination, part-time worker and broadcasting devices used for the news collection, for assigning staff for each news collection. These items are inputted to the news collection decision table from the device schedule terminal 11A, the news collection schedule terminal 11B, and the news staff terminal 11C. The news collection decision table with inputted items is stored again in the DB server 7, so that inputs can be made from the respective terminals as required. The news collection decision table will be described later in detail.

Figure 3B:
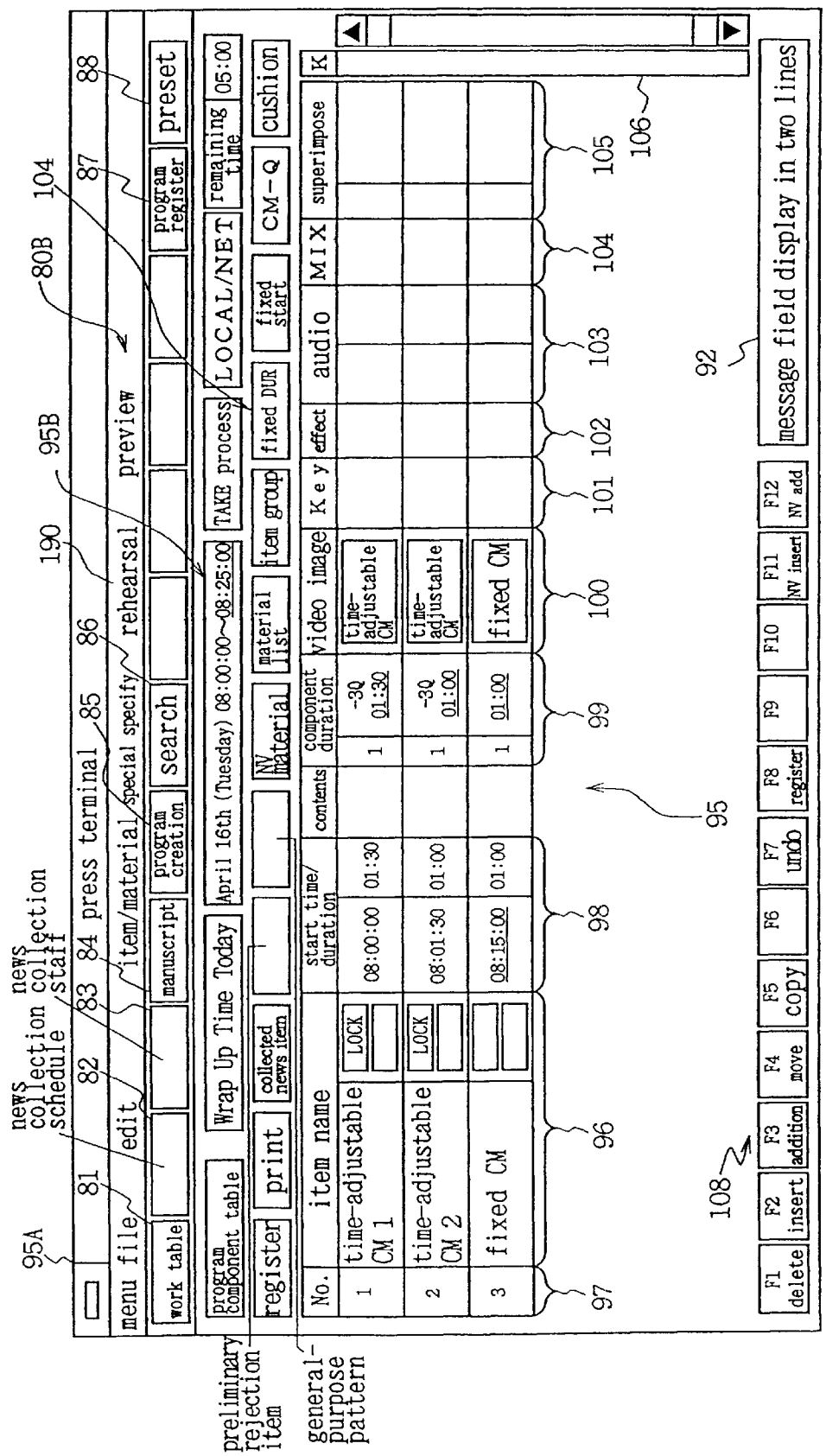
FIG. 3(B) is an example of a program component table screen displayed on respective terminals constituting the news program production support section.

The desk terminal 18 is a terminal for creating a program component table for indicating components of a news program which is actually broadcast. The program component table refers to a table listing components of each program for indicating at which time which material is broadcast, with respect to each program. An example is illustrated in FIG. 3(B). As illustrated in FIG. 3(B), the program component table is composed of Broadcasting Start Time 98, Broadcasting Duration 99, and so on of each item corresponding to each Item Name 96 of an item to be broadcast, and the program component table is created by inputting necessary information to the respective items from the desk terminal 18. Incidentally, while the program component table may be automatically created based on a program table inputted from the master room 36B or the like through the gateway 40 and the network 8, details on the automatic creation of a program component table and the program component table will be described later.

As described above, work schedules are inputted from the work schedule input terminal 10 in the news program production support section 2 to create a work schedule table for each staff member. News collection schedules and news collection staff members are inputted from the news collection management terminal 11 to create a news collection decision table which is based on to actually perform news collection. Then, actually collected materials (data including video data and audio data) are once recorded by the news material creation management section 3 in the news program production and transmission apparatus 1, and then edited to create materials for transmission.

The news material creation management section 3 comprises, as illustrated in FIG. 1, a linear editor 20, a VTR 21, an on-air server unit 22, a server control terminal 23, an equipment control unit 24, an on-air server management terminal 25, a non-linear editor 26 and a library 28.

The linear editor 20, VTR 21, and non-linear editor 26 constitute editing apparatus for editing recorded materials. In the linear editor 20, materials recorded on a tape medium such as a video tape or the like is edited. Edited materials are outputted to the VTR 21. The non-linear editor 26 edits recorded materials using a randomly accessible recording medium without taking into account the order of the recorded materials, and outputs the edited data.

The data edited by the VTR 21 and the non-linear editor 26 is stored in the on-air server unit 22.

The on-air server unit 22 comprises randomly accessible recording media, and comprises, for example, a plurality of hard disk drives. The on-air server unit 22 has a plurality of input/output ports, though not shown, so that a plurality of inputs, for example, data outputted from the non-linear editor 26 and data outputted from the VTR 21, can be simultaneously inputted. It is further possible to output data from a plurality of output ports while data are being inputted thereto.

The control for the foregoing data input/output in the on-air server unit 22 is performed by an on-air server controller terminal 9 which is connected through the equipment control unit 24 and the server control unit 23 as well as through a network B.

The equipment control unit 24 controls the plurality of input/output ports to switch which input or output port is used in response to an instruction from the server control terminal. The server control terminal 23 controls which of the input/output ports of the on-air server unit 22 is used for an inputted or outputted material, and so on based on control data from the higher ranked on-air server controller terminal 9.

The on-air server management terminal 25, for managing the on-air server unit 22, instructs to input or output materials to the on-air server unit 22, and instructs to output stored data from the on-air server unit 22 in a transmission time order. These instruction data are outputted to the on-air server controller terminal 9 to control the on-air server unit 22 through the server control terminal 23 and the equipment control unit 24. The on-air server management terminal 25 also issues an instruction for deleting a material stored in the on-air server unit 22. The on-air server unit 22 is controlled similarly in this case to delete a specified material therefrom. Materials integrated in the transmission time order and outputted from the on-air server unit 22 are delivered to the library 28. The library 28 comprises a plurality of tape cassettes, not shown, and a plurality of VTRs such that materials outputted from the on-air server unit 22 are recorded on a tape cassette by the VTR to deposit the materials. Materials for broadcasting transmission sent from the on-air server in response to an instruction of the on-air server management terminal 25 or the like are outputted to the transmission equipment control unit 5.

The transmission equipment control unit 5 comprises a switcher/mixer 30; a transmission equipment control terminal 31; an equipment control unit 32; a clock 33; a sub-input terminal 34; a VTR 35; a transmitter 37; a camera 38; a cue sheet terminal 39; and a trigger 55.

The switcher/mixer 30 receives materials for broadcasting transmission sent from the news material creation management unit 3; materials sent from the VTR 35; materials sent from the camera 38; and CG (computer graphics) sent from the transmitter 37 to select which of inputted materials is outputted. The output is controlled by the equipment control unit 32 and the transmission equipment control terminal 31. The equipment control unit 32 and the transmission equipment control terminal 31 will be described later.

A program component table, in turn, is created on the desk terminal 18 in the news program production support section 2, and a program progress table referred to as a cue sheet is automatically created on the transmission equipment control terminal 31 in the transmission equipment control section 5 based on the created program component table. Then, the equipment control unit 32 transmits on the air materials stored in the on-air server 22 and so on based on this cue sheet as a transmission time is reached.

Figure 3C:
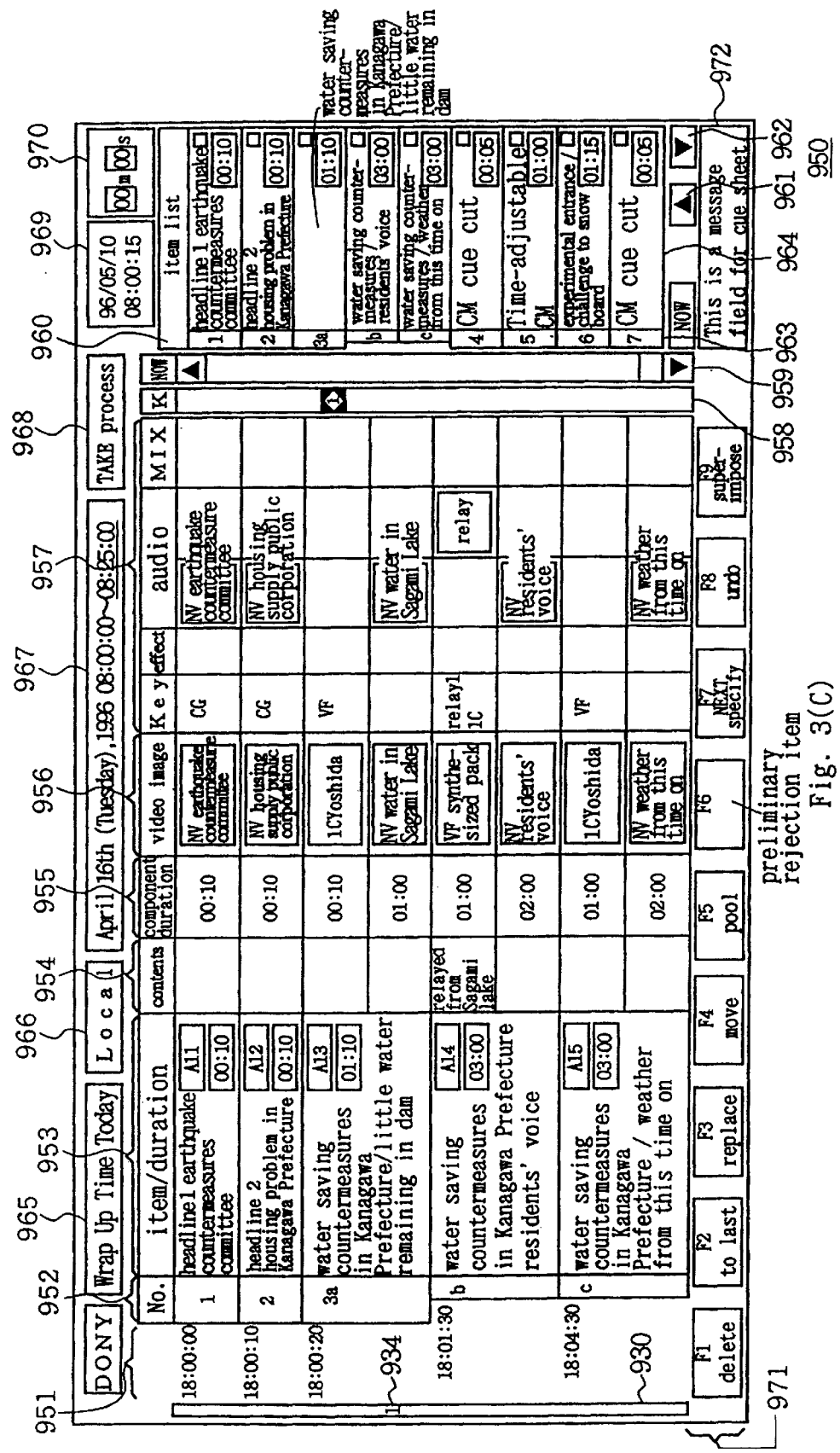
FIG. 3(C) is an example of a cue sheet screen displayed on a terminal constituting a transmission equipment control section.

This cue sheet refers to a program progress table for indicating which is broadcast when with which program components within a duration allocated to the broadcasting. An example is illustrated in FIG. 3(C). Although details are described later, a broadcasting duration, video, audio, and so on are comprised in each item name, as illustrated in the drawing. Thus, in an actual news program, broadcasting materials are sequentially transmitted in accordance with this cue sheet. For reference, this cue sheet is displayed on the cue sheet terminal 39.

The VTR 35 is a VTR for urgent measures. A news collection tape brought by urgent news collection is loaded in this VTR 35 such that materials, which are desired to be transmitted urgently, are outputted from the VTR 35 and inputted to the switcher/mixer 30.

The transmitter 37 is provided for transferring CG outputted from the computer graphics (CG) editing section 36 to the switcher/mixer 30.

The camera 38 is provided for photographing an announcer in a studio installed, for example, in the press department HB. A video image photographed by the camera 38 is outputted to the switcher/mixer 30.

The switcher/mixer 30, under the control of the equipment control unit 32, sequentially transfer those materials inputted thereto within the station in synchronism with the clock 33 as materials of a news program which is to be actually transmitted.

The foregoing is descriptions on the news program production support section 2, the news material creation management section 3, and the transmission equipment control unit 5 in the news program production and transmission apparatus. The news program production and transmission apparatus 1 has the aforementioned DB (database) server 7 and the on-air controller terminal 9, and also a news reporter terminal 15. The news program production and transmission apparatus 1 is also connected to other systems, the master room, the aforementioned CG center 36 through the gateway 40, and also connected to the branch office/branch station/club terminals 6 through the network.

The news reporter terminal 15 is connected to a public line 16 through a TA (Terminal Adapter) 14, and this public line 16 is further connected to the branch office/branch station/club terminals 6 through a TA. The news reporter terminal 15 is also connected to the network 8. To the news reporter terminal 15, data such as manuscripts, news collection schedules, and so on are transmitted from the branch office/branch station/club terminals 6 through the public line 16 to help create a news collection schedule table on the news collection management terminal 2 described above, and create news manuscripts on the news collection management terminal 2, later described. For reference, transmitted data such as manuscripts and news collection schedules are stored in the DB server 7 through the network 8. On the news reporter terminal 15, in turn, works such as creation of detailed manuscripts, creation and order of telops, creation of audio on/off data, and so on are performed based on manuscripts transferred thereto and stored in the DB server 7 through the network 8. Further, on the news reporter terminal 15, ordered telops and program component tables are read from the DB server 7 through the network 8 for confirmation, and detailed data are inputted to predetermined items in the program component table which is again transferred to the DB server 7 through the network 8.

Other systems connected to the news program production and transmission apparatus through the gateway 40 refer to a variety of departments other than the press department HB within the broadcasting station, and such departments are connected to the press department HB through the gateway 40.

The master room 36B is a department for managing the broadcasting of the entire broadcasting station in other departments. Program data including a start time and an end time of a news program to be transmitted, information on CM inserted in the news program, and so on are transmitted to the news program production and transmission apparatus 1 through the gateway 8. In the news program production and transmission apparatus 1, a news program is created based on the program data transmitted from the master room.

The CG center 36 is connected to the news program production and transmission apparatus 1 through the gateway 40 for creating computer graphics for making special effects on materials used in broadcasting. Created CG is transferred to the transmitter 37 in the transmission equipment control section 5.

The branch office/branch station/club terminals 6 are connected to the press department HB through the public line 16, and mutually connected by dedicated lines 13 through routers 12. The branch office/branch station/club terminals 6 create rough news collection schedules and manuscripts which are transmitted to the press department HB through the dedicated lines 13 or the public line 16. In addition, from the press department HB, program component tables and news collection schedule tables stored in the DB server 7 are referenced through the public line 16.

Thus, descriptions have been made on a general configuration of the news program production and transmission apparatus 1 and an outline of its operations. In the following, the configuration of this embodiment will be described in connection with news collection schedules, work schedules, and on-air manuscripts created in the news program production support section 2; a program component table created in the news program production support section 2; a cue sheet created in the transmission equipment control unit 5; recording of materials in the on-air server 22; transmission of materials from the on-air server and management therefor; and finally integration of materials which have been transmitted on the air in this order.

Figure 3D:
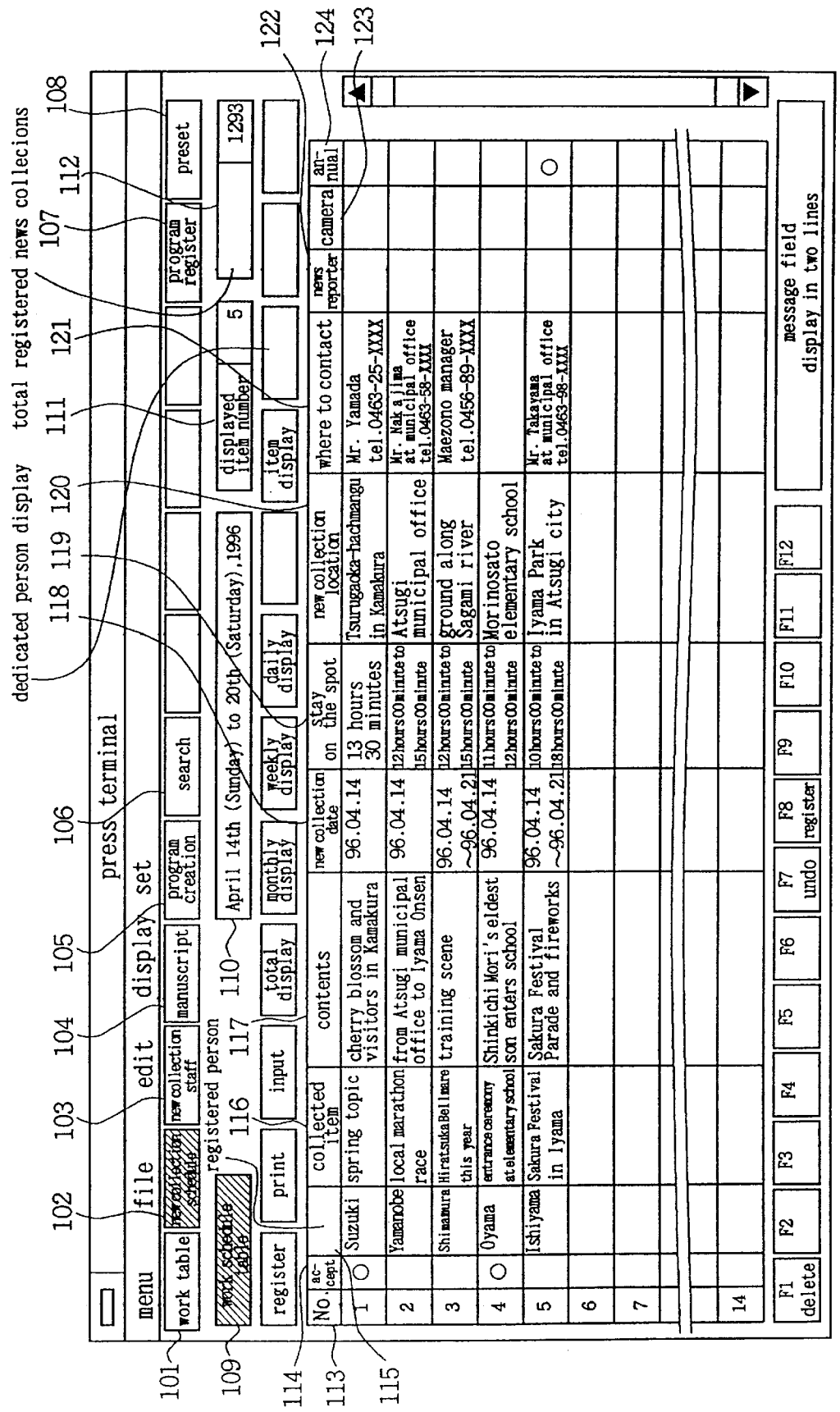
FIG. 3(D) is an example of a news collection schedule table screen displayed on respective terminals constituting the news program production support section.
Figure 4:
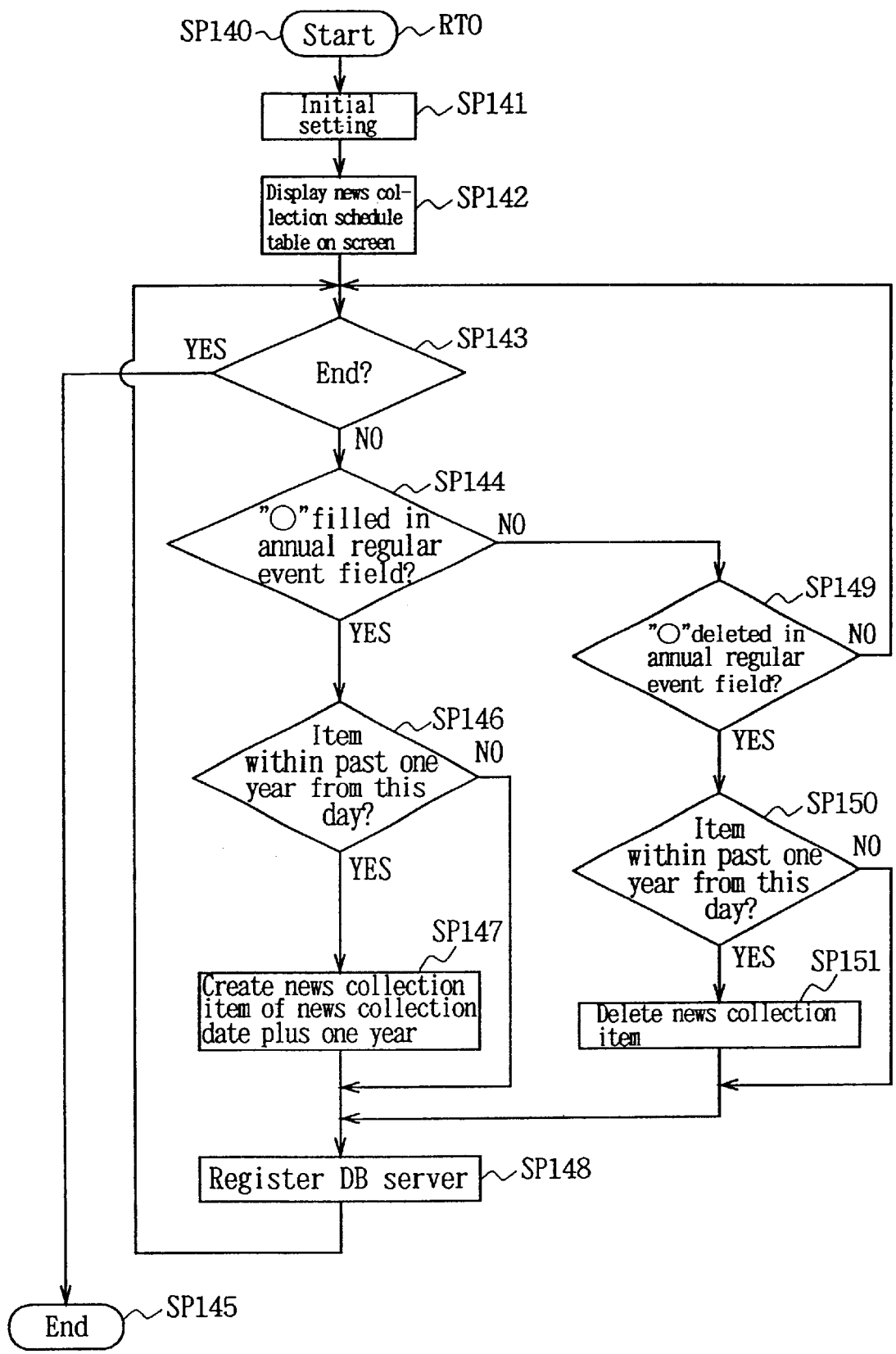
FIG. 4 is a flow chart representing a processing procedure for automatically creating a news collection item in an annual regular event column of a news collection schedule table.
Figure 5:
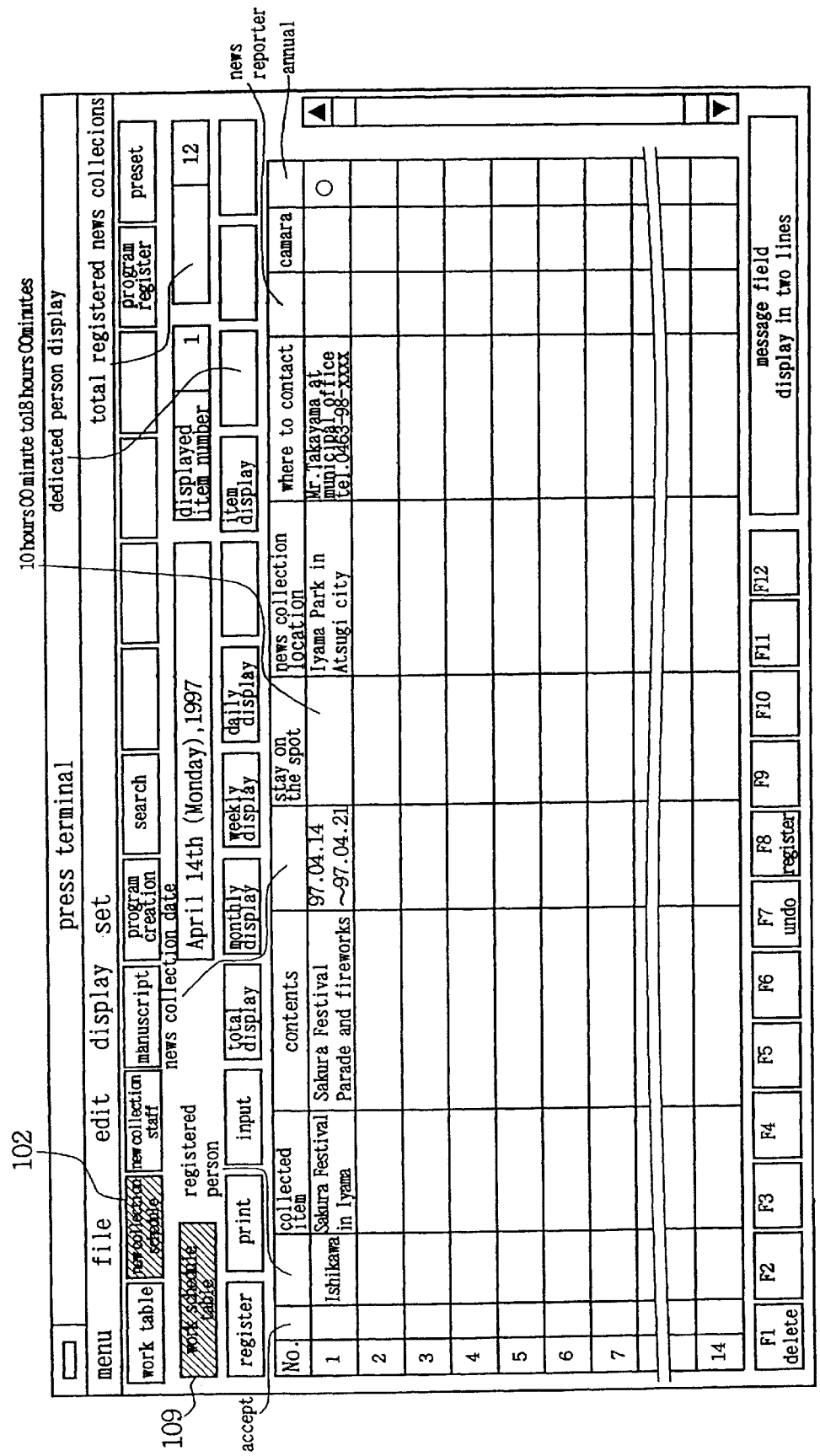
FIG. 5 is an example of a screen in which a news collection item has been registered as an annual regular event in an annual regular event column of the news collection schedule table.

(2) News Collection Schedule Table (FIGS. 3–5)

Here, a news collection schedule table created in the news program production support section 2 and its operation will be described in detail with reference to FIGS. 3(D), 4, and 5.

(2-1) News Collection Schedule Table Displayed on Screen

Here, detailed description will be made on the structure of a news collection schedule table screen displayed on a display means such as a monitor or the like, not shown, of the news collection schedule terminal 11B within the news collection management terminals 11 in the news program production support section 2. FIG. 3(D) illustrates a news collection schedule table screen displayed on each of terminals in the news program production support section 2, particularly, a news collection schedule table displayed on the screen of the news collection schedule terminal 11B. Information on events, annual regular events, and so on is supplied from branch office/branch station/club terminals 6 as news materials called news collection schedule information, and each item in the news collection schedule table is inputted through an input means such as a keyboard or the like, not shown, of the news collection schedule terminal 11B for deciding a news collection schedule.

The news collection schedule table of FIG. 3(D) will be described.

For display items, i.e., Working Table 101, News Collection Schedule 102, News Collection Staff 103, Manuscript 104, Program Production 105, Search 106, Program Registration 107, and Previous Setting 108 positioned in an upper portion of the screen illustrated in FIG. 3(D), a table corresponding to a display item is displayed in a portion below them by performing a selection manipulation, such as clicking a mouse on the display item on the screen. For reference, in the example of FIG. 3(D), a manipulation is performed to select News Collection Schedule 102 to display a news collection schedule table below. In addition, for indicating a selected item, the fields of News Collection Schedule 102 and News Collection Schedule Table 109 are displayed with shading.

Working Table 101 is a button for displaying a working table. As Working Table 101 is selected on the work schedule input terminal 10, a working table is displayed thereon. The working table will be described later.

News Collection Staff 103 is a table for displaying a display screen required when news collection staff is assigned on a news collection decision table comprising respective news collection items decided on the basis of a news collection schedule table. Actually, by selecting a news collection staff item on a news collection decision table, a staff list is displayed, and News Collection Staff 103 is displayed with shading to indicate that news collection staff is being inputted. This news collection decision table and the screen display for assigning news collection staff will be described later.

Manuscript 104 is a button for displaying a screen for inputting a news manuscript which will be actually pronounced by an announcer in a news program for each collected news collection item. A manuscript display screen is displayed to input required manuscripts from the desk terminal 18. The manuscript display screen will also be described later.

Program Creation 105 is a button for displaying a table referred to as a program table which comprises items such as, for example, news program names of news programs broadcasted in a day; a broadcasting start time and a broadcasting end time of each program, and so on. Input of the program table and so on are performed on the desk terminal 18. The program table, and a program component table displayed by selecting each program on the program table will be described later.

Search 106 is a button for searching for a news collection item or the like using a key word. For example, Search 106 is selected from each terminal in the news program production support section 2 to display an input screen on which required information is inputted, and a search is made to display a searched item.

Program Registration 107 is a button for previously registering a program which may be repeatedly transmitted.

Previous Setting 108 is a button for displaying a screen for previously setting the structure of each display screen mentioned above. This button may be selected to change the structure of each displayed table, for example, when the order of Local Time 119 and News Collecting Location 120 is replaced in the news collection schedule table of FIG. 3(D), when a new item is provided to be added in the news collection schedule table of FIG. 3(D), and so FIG. 3(D) is an example in which News Collection Schedule 102 has been selected from the above-mentioned buttons to display a news collection schedule table.

The news collection schedule table is composed of the following items: "News Collection Schedule Date" 110; "Number of Displayed Items" 111; "Total Number of Registered Items" 112; and respective buttons 125 in an upper portion of the display screen; and "No." 113 for indicating a news collection item number for each news collection scheduled item; "Employed" information 114 for indicating whether or not each news collection item is employed; "Registered Person" 115 who has registered each news collection item; "News Collection Item" 116; "Contents" 117 of the associated news collection item; "News Collection Date" 118 on which each news collection item was actually collected; "Local Time" 119 at which news sources are collected at a news collecting location; "News Collecting Location" 120; "Where to Communicate" 121; "News Reporter" 122 in charge of each news collection item; "Camera" 123 in charge of a camera for each news collection item; and "Annual" 124 for indicating whether each news collection item is an annual regular event in a central portion of the display screen.

Actually, this news collection schedule table is displayed on the screen of a display means, not shown, of the news collection schedule terminal 11B in the news collection management terminals 11. FIG. 3(D) illustrates a news collection schedule table for news collection schedules from Apr. 14 (Sunday) to Apr. 20 (Saturday), 1996, wherein Total Number of Registered Items indicates 1293 news collection items, five of which is displayed on the screen as indicated in the number of Displayed Items 111.

News Collection Item 116 with the news collection item number 113 set at "1" is "Spring Topic"; its News Collection Contents 117 indicate that "Cherry Blossoms in Kamakura and How Tourists Enjoy" is collected; News Collection Date 118 is on Apr. 14, 1996; News Collecting Location 120 is at "Tsurugaoka Hachiman Shinto Shrine in Kamakura city"; News Collection Time 119 is "13:30"; Where to Communicate 121 for collecting this news material is "Mr. Yamada, telephone number 0463-25-xxxx"; the news reporter in charge 122 and the cameraman 123 have not been inputted; and this item is not specified as an annual regular event in the column 124. This news collection item is not specified as an annual regular event, whereas News Collection Item Number "5," which has been specified as an annual regular event, is automatically displayed on a news collection schedule table next year, more specifically, from Apr. 14 to Apr. 21, 1997. Specifically explaining, events, annual regular events and so on, which take place at the same period every year, have in most cases the same information except for the year portion of the associated news collection date. Therefore, such news collection items are automatically displayed in a news collection schedule table every year by specifying them as annual regular events in their annual regular event column 124, thereby omitting the effort of inputting the same information every year. In addition, since News Collection Item Number 113 set at "1" has "○" inputted in the "Employed" information 109, it is readily determined whether a scheduled plan has been actually employed or not.

(2-2) Operation

On the news collection schedule terminal 11B, data indicative of a news collection schedule table stored in the DB server 7 is read through the network 8, the data indicated by the read news collection schedule table is stored in the news collection schedule terminal 11B, and the contents of the news collection schedule table is modified and added. Specifically, manipulations such as selection, input and so on are performed with an input means such as a mouse, not shown, of the news collection schedule terminal 11B for each item in the news collection schedule table. Then, "Register" in the buttons 125 is selected with the input means to again store the news collection schedule table in the DB server 7 through the network 8.

Now, FIG. 4 illustrates a flow chart representing a procedure of processing for specifying each news collection scheduled item as an annual regular event by means of the annual regular event column 124 in the news collection schedule table of FIG. 3(D), and processing until the news collection schedule table is registered in the DB server 7.

When the processing for specifying a news collection scheduled item as an annual regular event is started (step SP140), initial settings are applied to the news collection schedule terminal 11B for displaying a news collection schedule table on the screen (step SP141).

Next, at step SP142, a program component table as illustrated in FIG. 3 is displayed on the screen of a display means such as a monitor, not shown, of the news collection schedule terminal 11B.

Subsequently, it is determined at step SP143 whether or not the display of the news collection schedule table on the screen of the news collection schedule terminal 11B is terminated. If terminated (YES), the procedure proceeds to step SP145, thus terminating the processing for inputting an annual regular event.

If not terminated (NO), the procedure proceeds to step SP144, where it is determined whether or not "○" is found in the annual regular event column 124 in the news collection schedule table. In this event, any mark or the like other than "○" may be displayed in the annual regular event column as long as it indicates that the associated news collection item is an annual regular event. Alternatively, the entirety or part of each item line of the news collection item, or the event field only may be displayed with shading to provide a different display from other news collection items. It is assumed in this embodiment that "○" is inputted in the annual regular event column to specify the associated news collection item as an annual regular event for simplicity.

If "○" is found in the annual regular event column (YES), the procedure proceeds to step SP146, where it is determined whether or not the news collection schedule information with the mark "○" in the "annual" has a date in "News Collection Date" 118 within the past one year from this day.

At step SP146, if the news collection item specified as an annual regular event has the news collection date within the past one year from this day (when YES), the procedure proceeds to step SP147 where a news collection item is created by adding one year to the date in "News Collection Date," and proceeds to step SP148 to register the news collection item in the DB server 7. In the example of FIG. 3, after a news collection item is created by adding one year to information on the news collection date for the news collection item number "5" ("96.04.14–96.04.21" is changed to "97.04.14–97.04.21"), this news collection item is automatically displayed in the news collection schedule table for Apr. 14, 1997 illustrated in FIG. 5.

On the other hand, if the news collection item specified as an annual regular event does not have the news collection date within the past one year from this day at step SP146 (when NO), the procedure proceeds to step SP148 where the news collection schedule terminal 11B registers the news collection schedule table in the DB server 7 since the annual regular event has not ended.

At step SP144, if "○" is not found in the annual regular event column (NO), the procedure proceeds to step SP149 where it is again determined whether or not "○" in the annual regular event column has been deleted. If it is determined that "○" has been deleted from the annual regular event column (when YES), the procedure proceeds to step SP150 where it is determined whether the news collection item is dated within the past one year from this day. If it is an item within the past one year (when YES), the procedure proceeds to step SP151 where news collection items with the news collection data plus one year are automatically deleted from the news collection schedule table. A process proceeding from step SP149 to SPI50 and to SP151 is provided for deleting a news collection item from the news collection table after "○" has been deleted from the annual regular event column. Afterward, the procedure proceeds to step SP148 where the news collection schedule table, from which the news collection item has been deleted, is registered in the DB server 7.

On the other hand, if it is determined at step SP149 that "○" has not been deleted from the annual regular event (when NO), the processing returns to again repeat the foregoing processing procedure.

In addition, if it is determined at step SP150 that the news collection item is dated within the past one year from this day (when NO), the processing proceeds to step SP148 where the information is registered in the DB server 7 through the network 8. Then, the processing again proceeds to step SP143.

As described above, within a plurality of news collection scheduled items in the news collection schedule table, events and annual regular events which take place in the same period every year and are objects of news collections in the next and subsequent years, may be specified as annual regular events in the annual regular event specifying column provided in the news collection schedule table, so that news collection schedule information can be automatically registered in the news collection schedule table every year with the year portion of the news collection date incremented by one. In addition, information on news collection scheduled items, which are not specified as annual regular events, can be automatically deleted from the news collection schedule table in the next and subsequent years. It is therefore possible to save the effort of repetitively inputting the same information in the news collection schedule table from the beginning every year, to avoid forgetting to input the information, to eliminate the need for paying attention to news collection items specified as annular regular events, and to improve the working efficiency in information input manipulations.

In addition, in this embodiment, the annual regular event has been given as an example. Alternatively, when there is a news collection scheduled item which takes place at the same time every day or the like, a specified news collection item can be created automatically in the news collection schedule table by providing a particular input column in place of the above-mentioned annual regular event column and performing similar processing to the processing procedure illustrated in FIG. 4. Furthermore, the news collection items can also be created automatically for activities and events which may take place for a particular period, weekly, monthly, or quarterly.

Also, in the example of FIG. 3, News Collection Schedule Date 110 in the news collection schedule table is in a range of one week from Apr. 14 (Sunday) to Apr. 20 (Saturday), 1996, the present invention is not limited to this particular period. Any period such as one day, one month and so on may be displayed, in which case a news collection schedule table is created based on the scheduled date.

Figure 6:
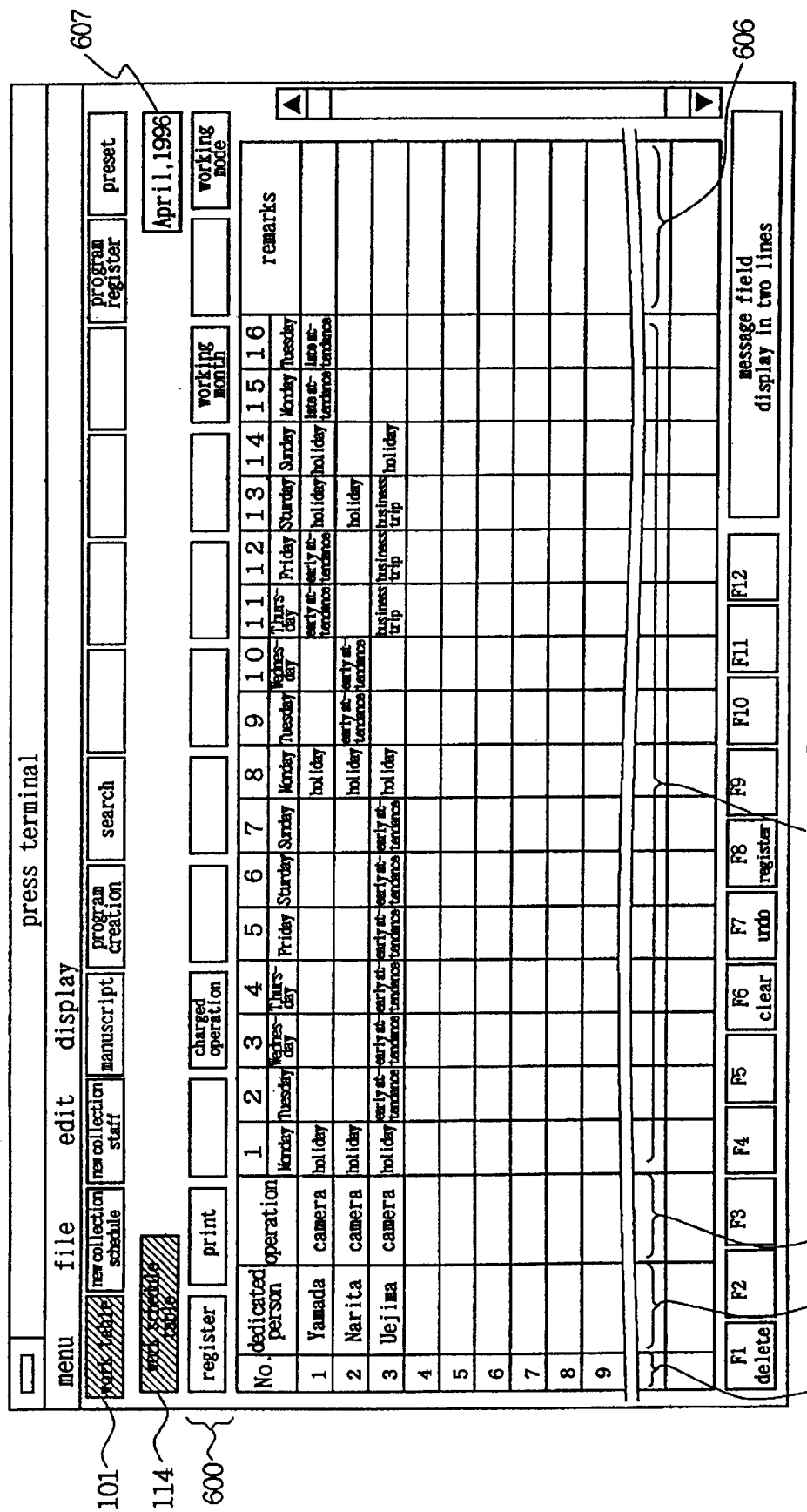
FIG. 6 is an example of a work schedule table screen displayed on a work schedule input terminal in the news production support section.

(3) News Collection Decision Table and so on (3-1) Display of Work Schedule Table, Device Schedule Table, and News Collection Decision Table on Screen FIG. 6 illustrates a work schedule table displayed mainly on the screen of a display means such as a monitor, not shown, of the work schedule input terminal 10 in the news program production support section 2. On the work schedule input terminal 10, information related to work schedules for news reporters and staff members who are dedicated to collect news materials is input to this work schedule table which is stored in the DB server 7 through the network 8.

The screen illustrated in FIG. 6 is displayed when Work Schedule 101 is selected with an input means such as a mouse, not shown, of the work schedule input terminal 10. Also, "Work Schedule Table" is displayed in a display field 114, and Work Schedule 101 and the display field 114 are shaded to indicate that the work schedule table is being currently selected.

In a central portion of the work schedule table screen, there are items including "No." 601 for indicating the number of each person in charge; "Person in Charge" 602 for indicating the name of a person in charge; "Task" 603 for indicating a task assigned to each person in charge; a work schedule column 605 for indicating work schedule information for each person in charge each day; Remark 606 for indicating any other information on each person in charge; and a year and month display field 607 for displaying a year and a month.

In FIG. 6, a work schedule for each person in charge in April 1996 is displayed on the work schedule table, where a person in charge of the person-in-charge number "1" is "Yamada" who is in charge of "Camera" and has a day off on "April 1996" "1(Monday)." Since "2 (Tuesday)" to "7 (Sunday)" are left blank, these columns indicate that "Yamada" is scheduled to work normally. Since "Early Attendance" is indicated in "11 (Thursday)," it indicates that he will begin working earlier than the time zone of the normal duty.

The news collection schedule terminal 11B reads data on a work schedule table from the DB server 7 through the network 8, inputs necessary information in each column of the work schedule table, and again writes the work schedule table into the DB server 7 through the network. Since data on the work schedule table is stored in the DB server 7, it can be referenced from terminals connected through the network 8, for example, from the news collection management terminal 11.

Next, the news collection decision table illustrated in FIGS. 7 and 8 will be described.

As has been described in connection with the news collection schedule table, the news collection decision table is automatically created from the news collection schedule table in the above-mentioned manner.

Figure 7:
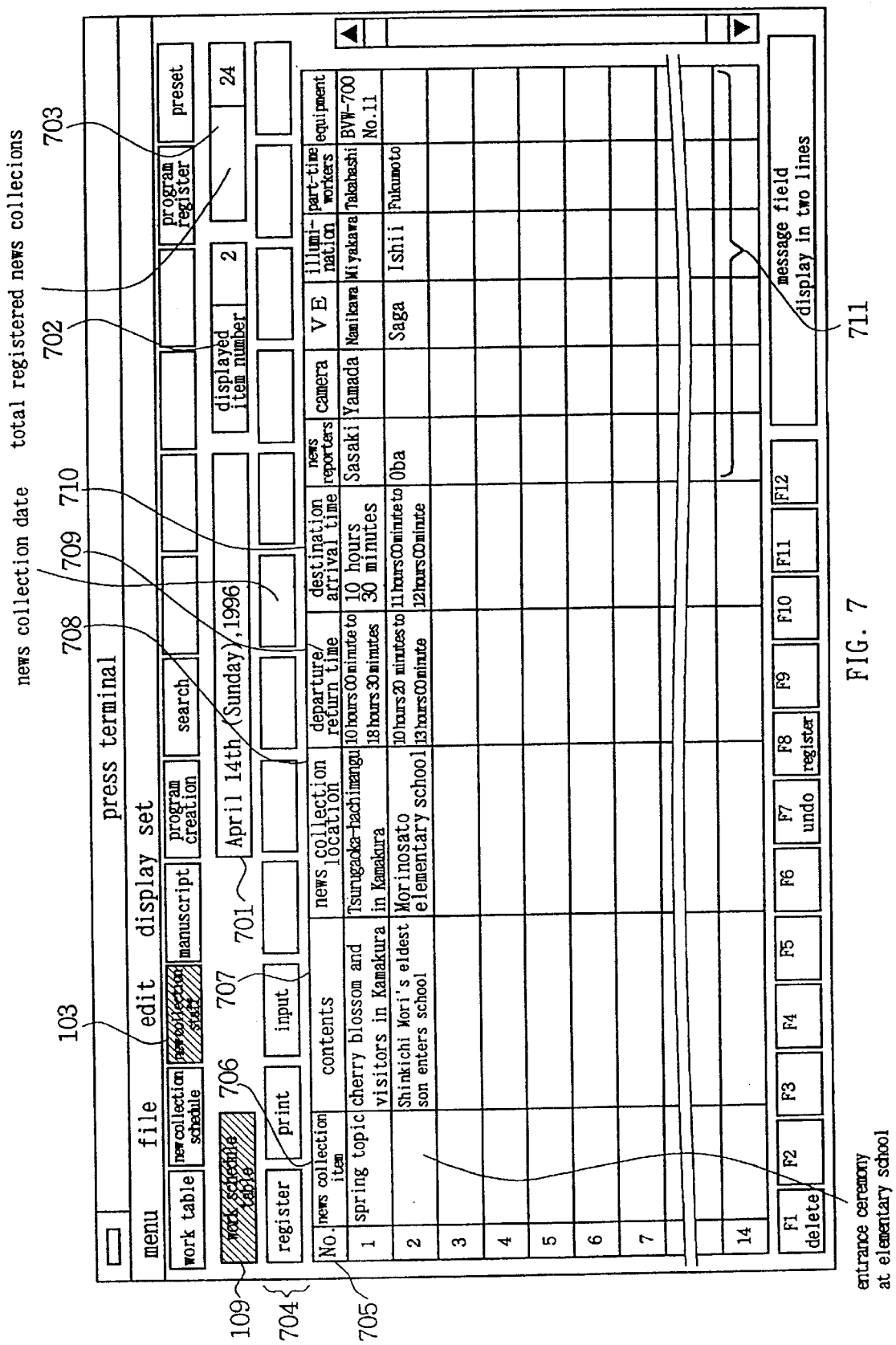
FIG. 7 is an example of a work schedule table screen displayed on a work schedule input terminal in the news production support section.

FIG. 7 illustrates an example in which News Collection Staff 103 has been selected, and a news collection decision table is displayed. "News Collection Decision Table" is displayed in a display field 108, and News Collection Staff 103 and the display field 109 are displayed with shading to indicate that this item has been selected.

Below the display field 109, a variety of buttons 704 are displayed.

Adjacent to the display field 109, News Collection Date 701, Displayed Item Number 702, and Total Registered Number 703 are displayed, respectively.

Also, below the variety of buttons 704, Item Number "No." for indicating a news collection item number; "News Collection Item" 706 for indicating an item to be collected as news; "Contents" 707 for indicating the contents to be collected; "News Collecting Location" 708 for indicating a location where news materials are collected; "Departure/Return Times" 709 for indicating a departure time at which the staff leaves for the news collecting location and a return time at which the staff returns to the broadcasting station from the news collecting location; "Local Time" 710 at which the staff arrives at the news collecting location or the staff starts collecting news materials; and respective items 711 for indicating an assigned news reporter in charge of each news collection item, a member in charge of devices at the news collecting location, and devices for news collection.

In FIG. 6, News Collection Date 701 is "Apr. 14, 1996 (Sunday) in the news collection table, where the number of news collection items registered for this date is "2," and a total of 24 news collection items have been registered in the news collection decision table in the DB server 7. News Collection Item "No." 705 designated as "1" has News Collection Item 706 "Spring Topic, and " News Collection Contents 707 indicates that "Cherry Blossoms in Kamakura and How Tourist Enjoy" is collected. News Collection Location 708 is "Tsurugaoka Hachiman Shinto Shrine in Kamakura City," Departure and Return Times 709 are set to "10:00–17:30," the time at which the staff arrives at the news collection location or starts collecting news materials is "10:30." As indicated in the members-in-charge items columns 711, a news reporter assigned to this news collection item is "Sasaki," a cameraman in charge is "Yamada," and so on. In this way, each member in charge and the names of devices used in the news collection are displayed. Also, in News Collection Item 705 "2," a member in charge of camera and the names of devices to be used are left blank. This means that a member in charge of camera and devices to be used have not been selected at a current time.

In this news collection decision table, when members in charge and devices for news collection are selected and inputted for each news collection item, the aforementioned work situation table and device using situation are displayed on the screen such that members in charge and devices to be used for each news collection item can be inputted to respective columns 711 of the news collection table with reference to the displays.

Figure 8:
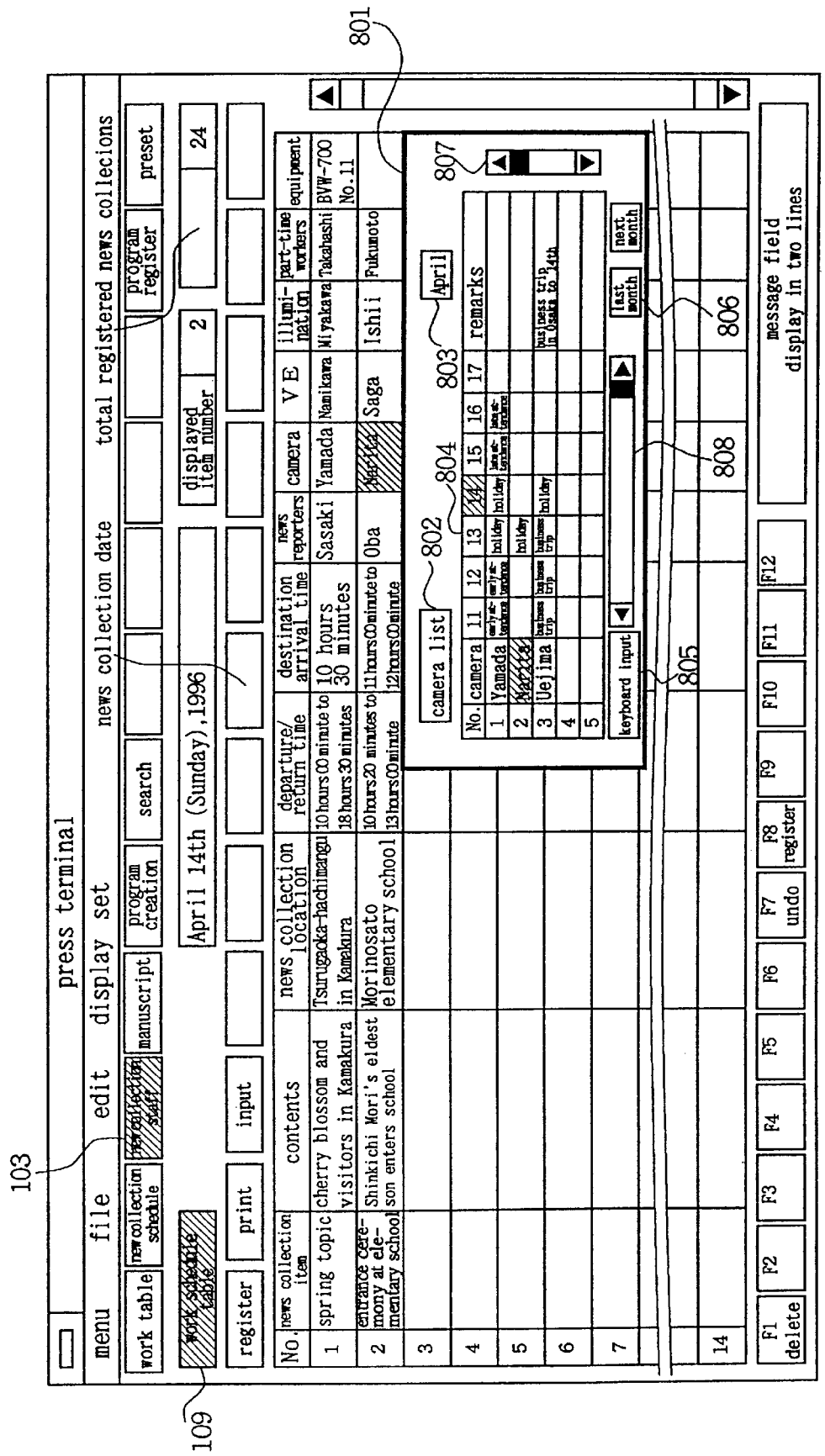
FIG. 8 is an example of a screen on which an equipment staff list is displayed on the work schedule table screen displayed on the work schedule input terminal in the news program production support section.

FIG. 8 illustrates that a work situation table is displayed in a popup style on the news collection decision table in a central portion of the screen. A work situation table 801 shown in FIG. 8 is displayed by selecting the Camera column in the member-in-charge and device items 711 of the news collection decision table with a manipulation means such as a mouse, not shown, of the news collection staff terminal 11C (for example, clicking the mouse thereon), resulting in displaying the work situation table 801. The associated fields are displayed with shading on the screen to indicate that these fields have been selected.

In the work situation table 801 shown in FIG. 8, a display field 802 and a month display field 803 are positioned in an upper portion, and a work schedule table 804 is displayed in a table form. "Cameraman List" is displayed in the display field 802, and "April" is displayed in the month display field 803, so that a work situation of cameramen in April is listed in the work schedule table 804. When a predetermined member is selected in the work situation table 801 with the manipulation means of the news collection staff terminal 1C, a selected column is displayed with shading. In the case of FIG. 8, since News Collection Date 701 in the news collection decision table indicates "Apr. 14, 1996," a field filled with "14" in the work schedule table 804 in the work situation table 801 is displayed with shading. It can be seen from the work schedule table 804 that "Yamada" and "Ueshima" in charge of camera are "Absent" on "14th day" so that "Narita" is selected on the work schedule table 804 with the manipulation means of the news staff terminal 11C to display it with shading. Simultaneously, "Narita" is inserted in the camera column of the news collection item number "2" in the news collection decision table, and displayed with shading.

The work situation table 804 is additionally provided with a screen scroll function with which a display on the screen can be scrolled to display a desired item by manipulating a horizontal scroll bar 808 and a vertical scroll bar 807 with the manipulation means of the news collection staff terminal 1C.

While in the foregoing description, the work schedule table is referenced on the news collection decision table, a device list may be referenced on the news collection decision table in a similar manner.

(3-2) Operation

When Work Schedule Table 101 displayed on the screen is selected on the work schedule input terminal 11C in the news program production support section 2, a work schedule table as illustrated in FIG. 6 is displayed on a display means such as a monitor, not shown, of the work schedule input terminal 11C, in which each person in charge inputs required information in each column of the work schedule table. Data inputted in the work schedule table are stored in the DB server 7 from the work schedule input terminal 11C through the network 8.

The work schedule table may also be displayed on the device schedule terminal 11A in the news program production support section 2 in a similar manner.

When News Collection Staff 103 displayed on the screen is selected on the news collection staff terminal 11C in the news collection management terminals 11, a news collection decision table as illustrated in FIG. 7 is displayed on a display means such as a monitor, not shown, of the news collection management terminal 11. Then, a work schedule table 801 is displayed in a popup style by manipulating a predetermined column in the person-in-charge and devicesto-be-used items 711 in the displayed news collection decision table. Then, a member in the work schedule table 801 is appropriately selected to insert the selected member in the predetermined column of the items 711 in the news collection decision table. Subsequently, when data have been inputted to predetermined columns of the items 711, Register in the variety of buttons 600 is selected with a manipulation means to terminate the assignment of news collection staff in the news collection decision table. Data on the news collection decision table with the selected members registered therein are stored in the DB server 7 from the news collection staff terminal 11C through the network 8. On the device schedule terminal 11A, a reference to a device schedule table may be made similarly to a reference to the work schedule table on the news collection decision table. When "Devices" of the items 711 in the news collection decision table is selected, a device schedule table is displayed as is the case of the work schedule table. As a desired item is selected to input data therein, the data is inputted to the corresponding item column in the news collection decision table. Data registered in the news collection decision table is stored in the DB server 7 from the device schedule terminal 11A through the network 8.

Figure 9:
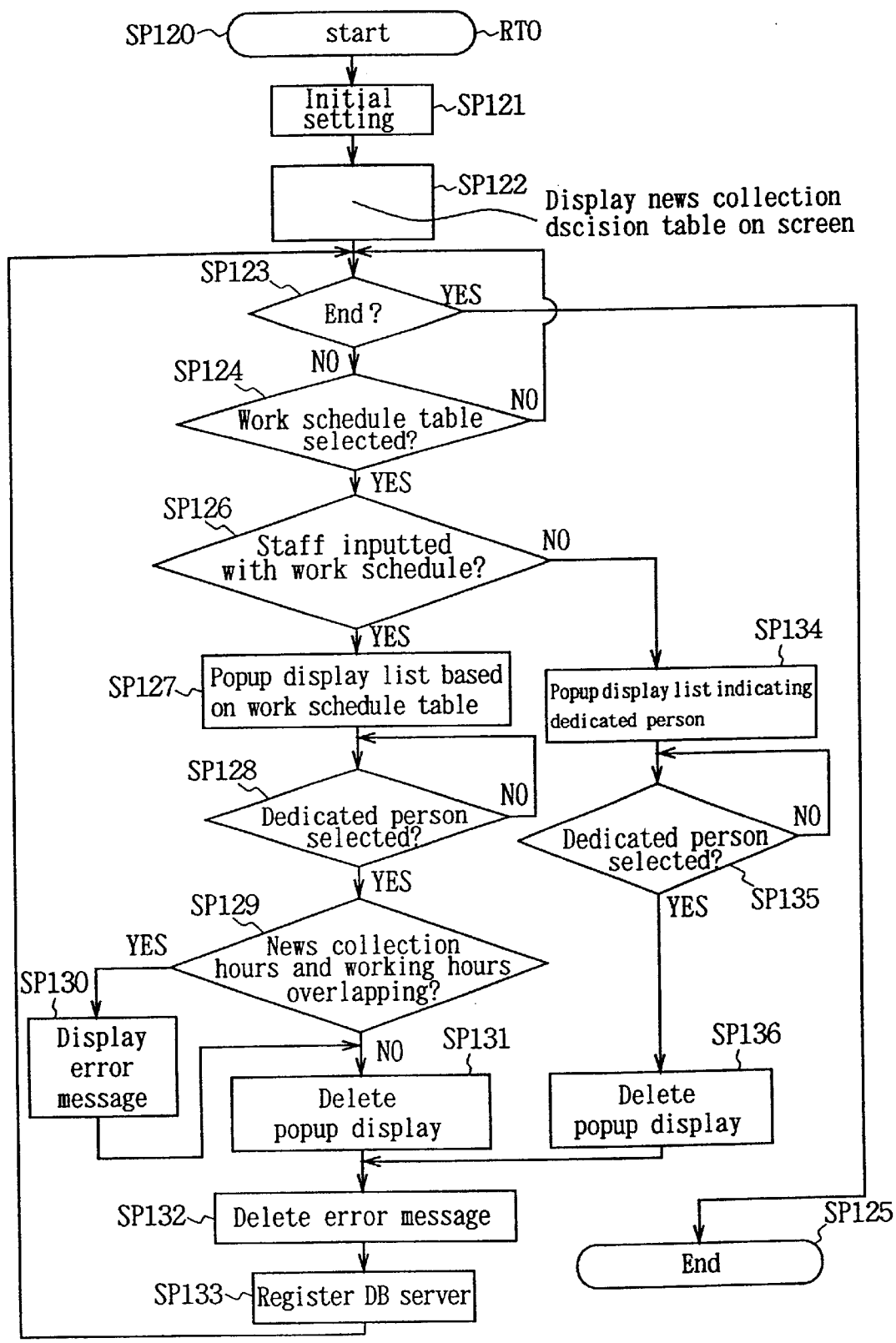
FIG. 9 is a flow chart representing a processing procedure for referencing an equipment schedule table on a news collection decision table displayed on a screen.

FIG. 9 illustrates a flow chart for referencing a work schedule table for a news collection decision table.

As illustrated in FIG. 9, when the processing for referencing a work schedule table for a news collection decision table is started (step SP120), initial settings are applied to the work schedule input terminal 11A at step SP121 for displaying a work schedule table on the screen thereof for reference on a news collection decision table.

Next, at step SP122, a news collection decision table as illustrated in FIG. 6 is displayed on the screen of a display means such as a monitor, not shown, of the work schedule input terminal 10.

Then, it is determined at step SP123 whether or not the display of the news collection decision table on the screen is terminated on the work schedule input terminal 10. If it is terminated (when YES), the processing proceeds to step SP125, where the processing for referencing the work schedule table is terminated.

If it is not terminated (when NO), the processing proceeds to step SP124 where it is determined whether or not a staff column is selected on the news collection decision table. The determination as to whether or not the staff column is selected is made by checking whether or not an item in which a staff member is inputted is selected in the items 711 of the news collection decision table.

If selected at step SP124 (when YES), the processing proceeds to step SP126, where it is determined whether or not a work schedule can be inputted for a staff member, in other words, whether or not a work schedule has been inputted for the staff member. This step is provided to determine whether or not a work schedule has been inputted for the staff member because a work schedule has not been inputted for each staff member in the work schedule table so that no work schedules may be displayed for respective staff members in a work schedule table which is displayed in a popup style together with the news collection decision table.

If a staff member for whom a work schedule can be inputted is found at step SP126 (when YES), the processing proceeds to step 127, where a work schedule table is displayed in a popup style together with the news collection decision table, as illustrated in FIG. 8.

Next, the processing proceeds to step SP128 where it is determined whether or not selection is made to a staff member who can work on the news collection date from the work schedule table displayed in a popup style together with the news collection decision table. The processing does not proceed to the next step until a staff member who can work is selected at step SP128.

As the selection is made to a staff member who can work at step SP128 (when YES), it is determined at step SP129 whether or not news collection hours on the news collection date overlap with working hours. If they overlap (when YES), the processing proceeds to step SP130 where an error message is displayed to draw attention of a person who is operating a sequence of these processing on the news collection staff terminal 11C.

If they do not overlap at step SP128, the work schedule table displayed in a popup style is erased from the screen (step SP131), and the error message is also erased (step SP132). Then, data on the news collection decision table, through which the news collection staff has been assigned, are registered in the DB server 7 through the network 8. Then, the processing again returns to step SP123 to execute the processing procedure described above.

Figure 10:
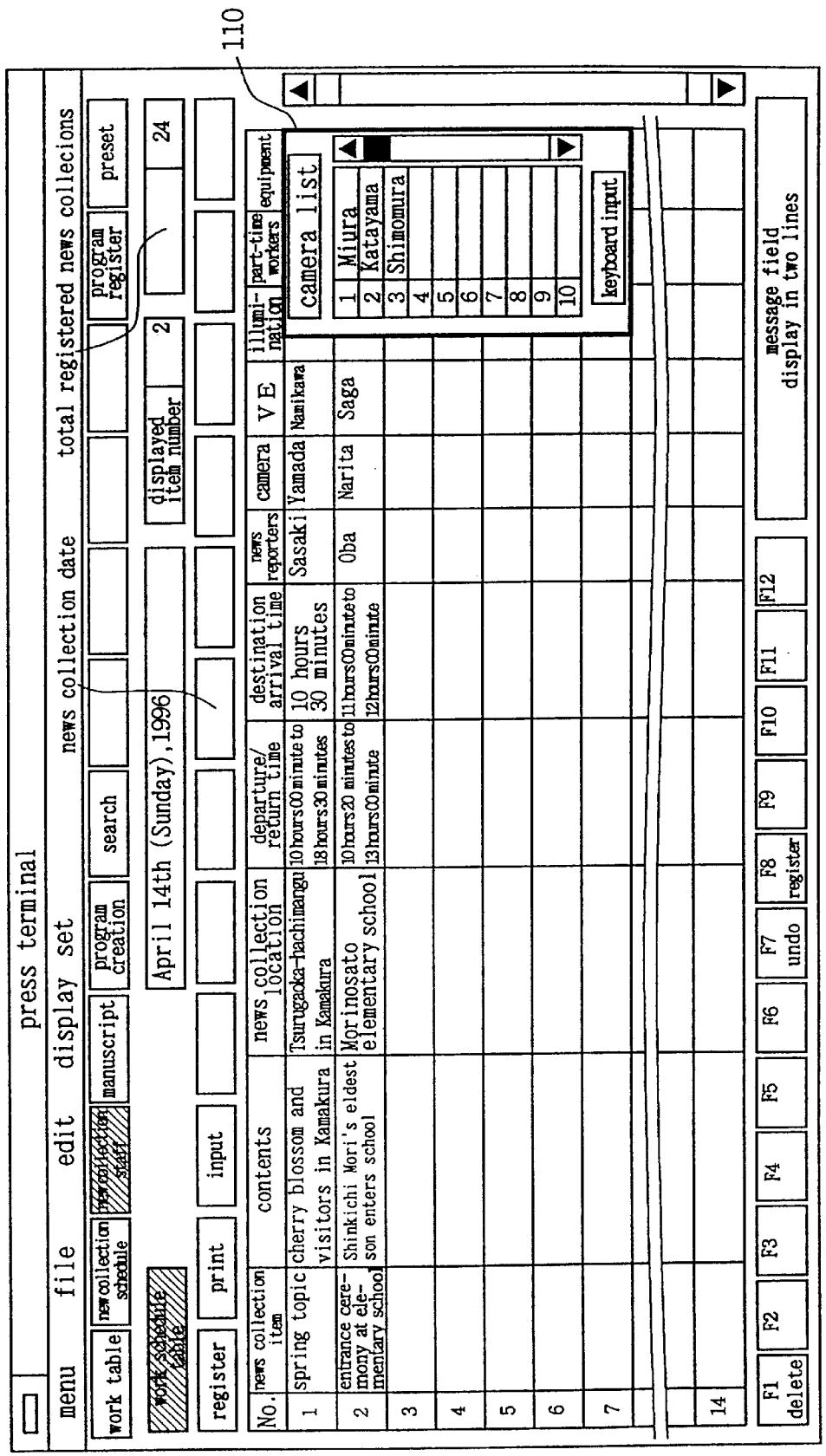
FIG. 10 is an example of a screen on which the equipment staff list is displayed on the work schedule table screen displayed on the work schedule input terminal in the news program production support section.

Incidentally, if a staff member for whom a work schedule cannot be entered is found at step SP126 (when NO), this means that the selected staff member has no work schedule, in which case the processing proceeds to step SP134 where a news collection staff candidate list 110 shown in FIG. 10 is displayed in a popup style.

As illustrated in FIG. 10, the news collection staff candidate list 110 displays a list of candidates in charge of each device, from which a desired member can be selected on the screen.

After the news collection staff candidate list 110 is displayed in a popup style at step SP134, it is determined at step SP135 whether or not a staff member has been selected from the list 110. If no staff member has been selected (when NO), the processing again returns to step SP135 to repeat this processing until a staff member is selected. When a staff member is selected from the candidate list at step SP135 (when YES), the candidate list displayed in a popup style on the news collection decision table is erased from the screen (step SP136), and thereafter, the processing returns to step SP132 to execute similar processing to the foregoing.

While described above has been the processing for assigning a news collection staff member from the news collection decision table, processing for assigning a news collection device from the news collection decision table can be executed completely in the same manner, with similar displays provided on the screen. More specifically, instead of the work schedule table displayed in a popup style by the execution of the processing illustrated in FIG. 9, a device schedule table is similarly displayed in a popup style. Then, only by replacing a selection of staff member with a selection of a device, the assignment of a news collection device can be executed on the news collection decision table along the processing described above.

In this way, as information for deciding items for each news collection, such as the work schedule table for assigning a news collection staff member displayed in the news collection decision table, or a device table for assigning a device to be used during news collection, is displayed in a popup style over a portion of the news collection decision table, a person in charge of the creation of the news collection decision table can readily select a member who can work on the news collection date, devices which can be used on the news collection data, and so on based on the popup display. In addition, even if working hours of a member in charge of news collection or using hours of a device or the like are changed while the news collection decision table is being created, such changed contents can be readily recognized by a person in charge of input manipulations.

Further, the work schedule input terminal 11C on which the work schedule table is created, and the device schedule input terminal 11A on which the device schedule table is created are interconnected through the network 8, such that their data are stored in the DB server 7 connected through the network 8, so that the assignment of news collection staff members and the assignment of devices to be used can be readily achieved after confirming ever latest work situations of news collection staff members and device using situation.

In addition, since tasks for creating the news collection decision table are improved in efficiency, an employee in charge of the tasks can concentrate on his essential work.

Furthermore, since the latest work situation and device using situation can be always confirmed, this eliminates a failure in news collection due to improper assignment of news collection staff.

(4) About On-Air Manuscript
(4-1) Manuscript Creating Screen

Figure 11:
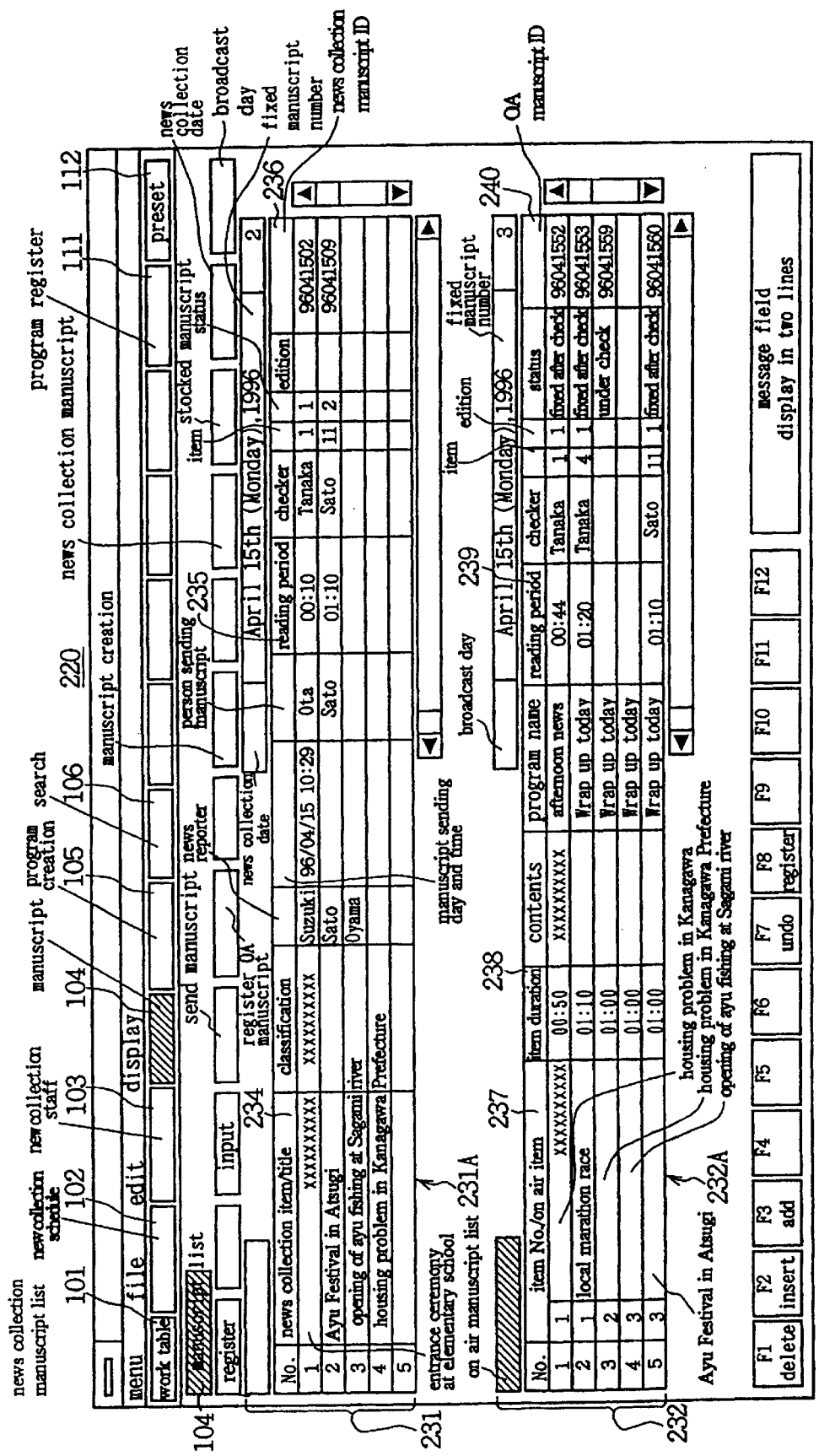
FIG. 11 is an example of an on-air manuscript input initial screen displayed mainly on a desk terminal in the news program production support section.

FIG. 11 illustrates an initial screen for inputting an on-air manuscript.

An on-air manuscript refers to a news manuscript that will be actually pronounced by an announcer for each collected news item in a news program. Required information therefor is inputted on the initial screen illustrated in FIG. 11, and an actual on-air manuscript is created on a manuscript input screen illustrated in FIG. 12.

As a manuscript button 104 is selected in an upper portion of the screen illustrated in FIG. 11 similarly to the screen on which a work schedule table or the like is displayed, "Manuscript List" is displayed in a display field 104, and the initial screen appears for inputting a manuscript. This initial screen is displayed in two separate areas for a news collection manuscript list 231 and an on-air manuscript list 231, as illustrated in FIG. 11.

Here, the news collection manuscript list 231 provides a data list related to news collection manuscripts created by employees in charge (press members) who have collected news materials at news collection locations. The on-air manuscript list 232 provides a data list related to manuscripts (on-air manuscripts) which have been finished by a person in charge (editor) who had checked the news collection manuscripts created by press members, and revised them into a final transmittable form.

First, the news collection manuscript list 231 will be described with reference to FIG. 11.

An item column 231A in the news collection manuscript list 231, which is assigned a number "No" for each news collection item, is composed of "News Collection Item/Title"234 mainly for indicating the title of a news collection item; "Reading Period" 235 for indicating a time period for which an announcer pronounces a news collection manuscript created by a press member; and "News Collection Manuscript ID" 236 for indicating an identification number of the news collection manuscript created by the press member.

An item column 232A in the on-air manuscript list 232, which is assigned a number "No." for each on-air item, is composed of "Item No./On-Air Item" 237 mainly for indicating the contents of an on-air item in brief; "Item Duration" 238 for indicating an item duration for which each on-air item is transmitted; "Reading Time" 239 for indicating a time period for which the on-air manuscript is actually pronounced; and "OA Manuscript ID" 240 for indicating an identification number of the on-air manuscript corrected by an editor, all of which are provided for each item.

Next, the creation of a news collection manuscript will be described.

Figure 12:
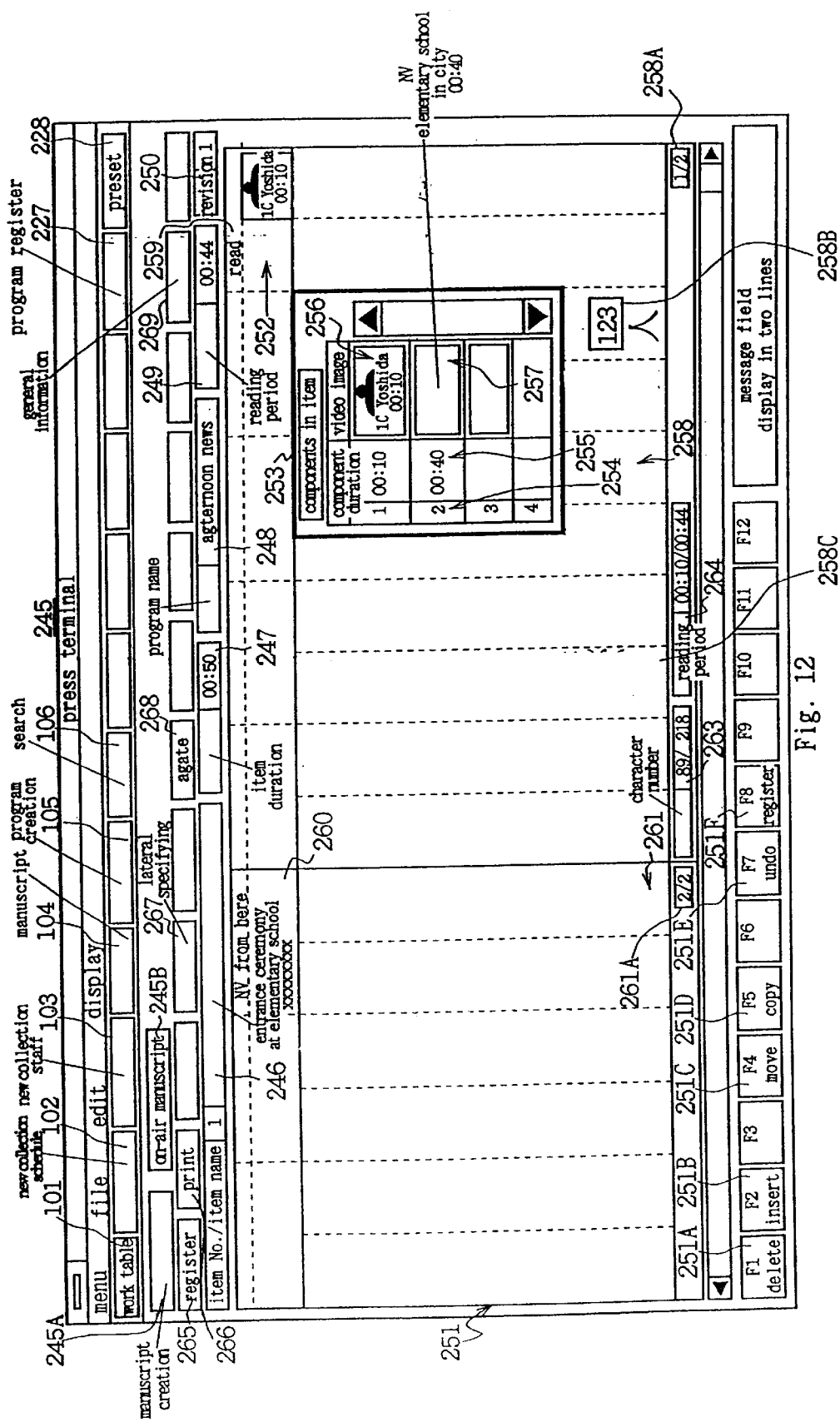
FIG. 12 is an example of an on-air manuscript input screen displayed mainly on a desk terminal in the news program production support section.

For creating a news collection manuscript, more specifically, for a press member to create a manuscript based on news materials collected at news collection locations, a manuscript creating screen illustrated in FIG. 12 is opened by selecting a desired item column 231A in the news collection manuscript list 231 on the initial screen for the manuscript creation illustrated in FIG. 11. The creation of a news collection manuscript is advanced mainly on the news reporter terminal 15 in FIG. 1. A news collection manuscript may also be created similarly on any branch office/branch station/club terminal 6. Irrespective of a news collection manuscript created by a similar method to that for creating a news collection manuscript on the news reporter terminal 15 or a simple news collection manuscript, manuscripts created on the branch office/branch station/club terminals 6 are sent to the news reporter terminal 15 through the public line 16 or through the dedicated line 13. In an alternative, all manuscripts may be created on the news reporter terminal 15 without sending manuscripts from the branch office/branch station/club terminals 6.

A news collection manuscript is created on FIG. 12 displayed on a display screen, not shown, of the news reporter terminal 15.

A news collection manuscript shown in FIG. 12 is described.

As mentioned above, the screen for creating a news collection manuscript illustrated in FIG. 12 is displayed by selecting a desired manuscript item in the news collection manuscript list 231A on the initial screen for creating a manuscript in FIG. 11. For reference, FIG. 12 shows an example in which "Entrance Ceremony at XXXXX Elementary School" has been selected from the news collection manuscript list 231A in FIG. 11. In FIG. 12, buttons, Create Manuscript 245A and On-Air Manuscript 245B are provided below buttons including On Screen Work Schedule Table 101, News Collection Schedule 102, and so on. These are buttons for selecting a news collection manuscript or an on-air manuscript for the manuscript creating screen.

A variety of buttons are defined below the manuscript creation button 245A and the on-air manuscript button 245B.

Register 265 is a button for registering a created manuscript. This register button 265 is selected when a created manuscript is to be registered.

Print 266 is selected when a created manuscript is to be printed out by a printing machine such as a printer, not shown, annexed to the terminal.

A lateral specifying button 267 is selected when an inputted and displayed manuscript is to be displayed in a vertically aligned form. For example, in FIG. 12, as the Lateral Specifying 267 is selected for a number "123" 258B vertically displayed when it was inputted in a manuscript input field 258, the number "123" 258B is displayed in a horizontally aligned form as shown in FIG. 12.

Agate 268 is a button for automatically displaying kana letters alongside characters inputted in Chinese characters in an inputted and displayed manuscript. For example, kana letters "まんかい" can be displayed alongside the Chinese characters "満開" 258C in the manuscript input field 258 of FIG. 12 by selecting Agate 268.

Figure 13:
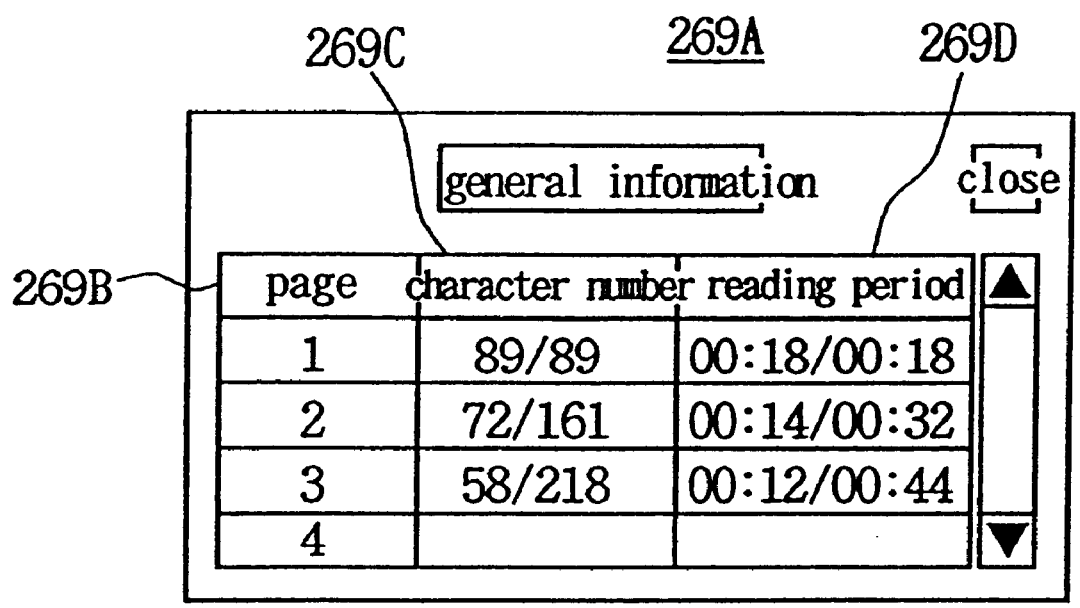
FIG. 13 is an example of a screen related to overall information displayed on a manuscript input screen.

General Information 269 is a button for displaying information on the number of letters in an inputted manuscript and an entire reading time required for the manuscript, later described. While the general information is shown in FIG. 13, detailed description thereon will be given later.

Below these various buttons, a display field 246 is provided for indicating an item of a manuscript. This corresponds to a selected manuscript item on the news collection manuscript list 231A of FIG. 11. In the case of FIG. 12, "Entrance Ceremony at xxxx Elementary School" is displayed together with an item number ("Item No.").

Item Duration 247 is displayed on the right side of the display field 246 for indicating a duration for which this item is broadcast. Duration for which Item Name "Entrance Ceremony at xxxx Elementary School" is "00:50," i.e., 50 seconds. A field on the right of this displays Program Name 248 of a program in which this item is broadcast. In the example of FIG. 12, this is an item broadcast in Afternoon News xxx." A field on the right of this indicates a time period for which Item (Item displayed on the display field 246) broadcast in Program Name 248 is pronounced by an announcer. In the example of FIG. 12, a time period for which the manuscript of this item is pronounced is indicated as "00:44," i.e., 44 seconds. A field on the right of this displays Revision 250 for indicating the number of times a created manuscript has been corrected or modified by an editor and then printed out. In the example of FIG. 12, since the manuscript has not been corrected or modified by an editor, "1," i.e., once is displayed.

In addition, in substantially a central portion of the screen, a manuscript input frame 251 is found for displaying an inputted manuscript. A manuscript inputted with an input means such as a keyboard, not shown, provided for the news reporter terminal 15 or the like, is displayed in this manuscript input frame 251. A manuscript input frame 251 is generally composed of a message field 259; material mark fields 252, 260; and manuscript input fields 258, 261. The manuscript input fields 258, 261 are separated into pages by solid lines, and page fields 258A, 261A display to that effect. In the example of FIG. 12, these fields displays "1/2" and "2/2" to indicate that the manuscript input field 258 on the right of the solid line on FIG. 12 is the first page, and the manuscript input field 261 on the left is the second page.

The message field 259 is a field for an input operator to display a brief message in this column. In FIG. 12, "Read" is displayed for "1/2" page, while "NV Material From Here" is displayed for "2/2" page, thus indicating that the "1/2" page of the manuscript is pronounced by an announcer while he appears on the television screen in actual broadcasting, and that the "2/2" page is pronounced while a video material (NV material: News Video material), which was collected in a news collection, is televised in actual broadcasting.

Below the message field 259, the material mark fields 252, 260 are displayed. This material mark indicates each of components in each program displayed in a program component table or cue sheet information, where each component is represented by a mark such as a drawing, characters, or the like so as to readily distinguish whether an actually broadcast video image is assigned to an announcer, or assigned to a video image recorded in a news collection, or the like, as will be described later in detail. In the material mark field 252 of "1/2" page in FIG. 12, "1C Yoshida 00:10" is displayed with characters and a drawing, taken from the program component table or the cue sheet information. This means that announcer Yoshida is imaged with a camera designated number 1 (camera 1: 1C), and announcer Yoshida pronounces a created manuscript for ten seconds.

For displaying a material mark in each of the material mark fields 252, 260, this material mark field 252 or 260 is selected with a selecting means such as a mouse, not shown, provided for the news reporter terminal 15, to display a program component table or cue sheet information, later described, corresponding to a selected manuscript in a popup style together with the manuscript input fields 258, 261. Displayed in the example of FIG. 12 is a popup 253 composed of Component Number 254 assigned to each of components in a program; Broadcasting Duration 255 assigned to each component, for which the component is actually broadcast; and material marks 256, 257. As a desired mark is selected from the displayed popup 253 with a selecting means, not shown, for example, a mouse is "clicked" thereon, and the desired mark is "dropped" at a desired material mark field 252 while the mouse is being "clicked," the material mark 256 in the popup display 253 is displayed in the material mark field 252 of the manuscript input screen. In this event, the display position of this popup display 253 may be freely moved with the selecting means, so that it may be freely moved to a location where the popup display 253 does not hinder the creation of a manuscript.

Also, if the material mark 256 indicative of a camera shot image of announcer "1C Yoshida" illustrated in FIG. 12 is selected, the material mark 256 is displayed as glued in the material mark field 252. Meanwhile, a cursor is moved to a position from which data should be inputted in the manuscript input field 258 of "1/2" page, thus entering an input ready state.

In this way, a manuscript to be pronounced by the announcer is inputted, while confirming the material mark 256 of announcer "1C Yoshida" displayed in the material mark field 252, thereby making it possible to establish a one-to-one correspondence between the material mark 256 and the input manuscript. In addition, since the message displayed in the message field 259 can be confirmed, the announcer can pronounce an on-air manuscript, while readily confirming the contents of a broadcast video image to be transmitted.

Subsequently, a manuscript for "2/2" page is inputted as is the case of the aforementioned example, after the manuscript for "1/2" page has been inputted on the news reporter terminal 15 or the like.

As a desired material mark field 260 is selected, a popup 253 is similarly displayed. A desired component mark is selected and glued in the material mark field 260, and a manuscript is actually inputted in the manuscript input frame 261. While confirming "NV Elementary School in City 00:40" displayed in the material mark field 260, a manuscript to be pronounced by an announcer during the transmission of this video material is inputted. Thus, the material mark 257 and the manuscript on "2/2" page can be placed in one-to-one correspondence, so that the announcer can pronounce the on-air manuscript while readily confirming the contents of the broadcast video image on the air.

Number of Characters 263 on the manuscript input screen indicates the number of characters inputted in the entirety of this item and the number of characters in the manuscript inputted in this page. In the example of FIG. 12, since Number of Characters 263 displays "89/218," this indicates that the number of characters inputted in the entire manuscript of two pages is "218" characters, of which "89" characters in the manuscript are inputted in the first page ("1/2" page).

Reading Time 264 on the manuscript input screen, which functions similarly to Number of Characters 263, indicates a total reading time assigned to this item, and a reading time available for this page of the manuscript. In the example of FIG. 12, "00:10/00:44" is displayed, indicating that a total reading time is 44 seconds for two pages, and a time available for pronouncing the first page ("1/2" page) is 10 seconds out of 44 seconds.

Below the manuscript input fields 258, 261 (in a lower portion of the manuscript input screen), a variety of function selecting buttons are displayed.

The function selecting buttons comprises F1key 251A to which a deletion function is assigned for deleting an inputted manuscript; F2 key 251B to which an insertion function is assigned for inserting necessary words in a sentence of a manuscript; F4key 251C to which a move function is assigned for moving a specified sentence to a desired position; F5 key 251D to which a copy function is assigned for copying a specified sentence; F7 key 251E to which an undo function is assigned for canceling the preceding processing and returning to the previous but one processing; and F8key 251F to which a register function is assigned for registering an inputted manuscript.

On the other hand, when the number of characters and a reading time are desirably confirmed for all pages of a manuscript thus inputted, General Information 269 within a variety of buttons positioned above the manuscript input field 258 may be selected to display General Information 269A illustrated in FIG. 13.

General Information 269A displays the number of characters and a reading time for each page of a manuscript. In the example of FIG. 13, General Information 269A is composed of Page 269B, Number of Characters 269C, and Reading Time 269D. The number of characters in the "first" page of a manuscript is "89" characters, and a reading time allocated to an announcer for pronouncing this page is "00:18," i.e., 18 seconds. The number of characters in the "second" page is indicated as "72/161" which represents that the number of characters in the "second" page is 72 characters, and a total number of characters in the first and second pages of the manuscript amounts to 161 characters. A reading time for the announcer to pronounce the "second" page is indicated as "00:14/00:32" which represents that the reading time for the "second" page is 14 seconds and a total time for pronouncing the first and second pages of the manuscript amounts to 32 seconds.

If no error is determined after confirming information related to General Information 269A, the popup 253 displayed on the manuscript creating screen illustrated in FIG. 12 is closed, and the register button 265 is selected. By selecting the register button 265, a created manuscript is stored in the DB server 7 as an on-air manuscript file from the news reporter terminal 15 through the network 8.

Then, as the print button 266 is selected, the on-air manuscript is printed out from a printing machine such as a printer, not shown, provided for the news reporter terminal 15. The announcer can correctly pronounce the manuscript while confirming the printed manuscript.

Incidentally, it is contemplated that after an on-air manuscript has been inputted as described above, components of a program itself is changed on the desk terminal 18 or the like in the news program production support section 2.

Even in such a case, each item in the popup 253 displayed on the manuscript creating screen following any change in components of a program component table is also changed in real time, so that a manuscript can be correctly inputted from the manuscript creating screen in accordance with a changed item.

(4-2) Operation

Figure 14:
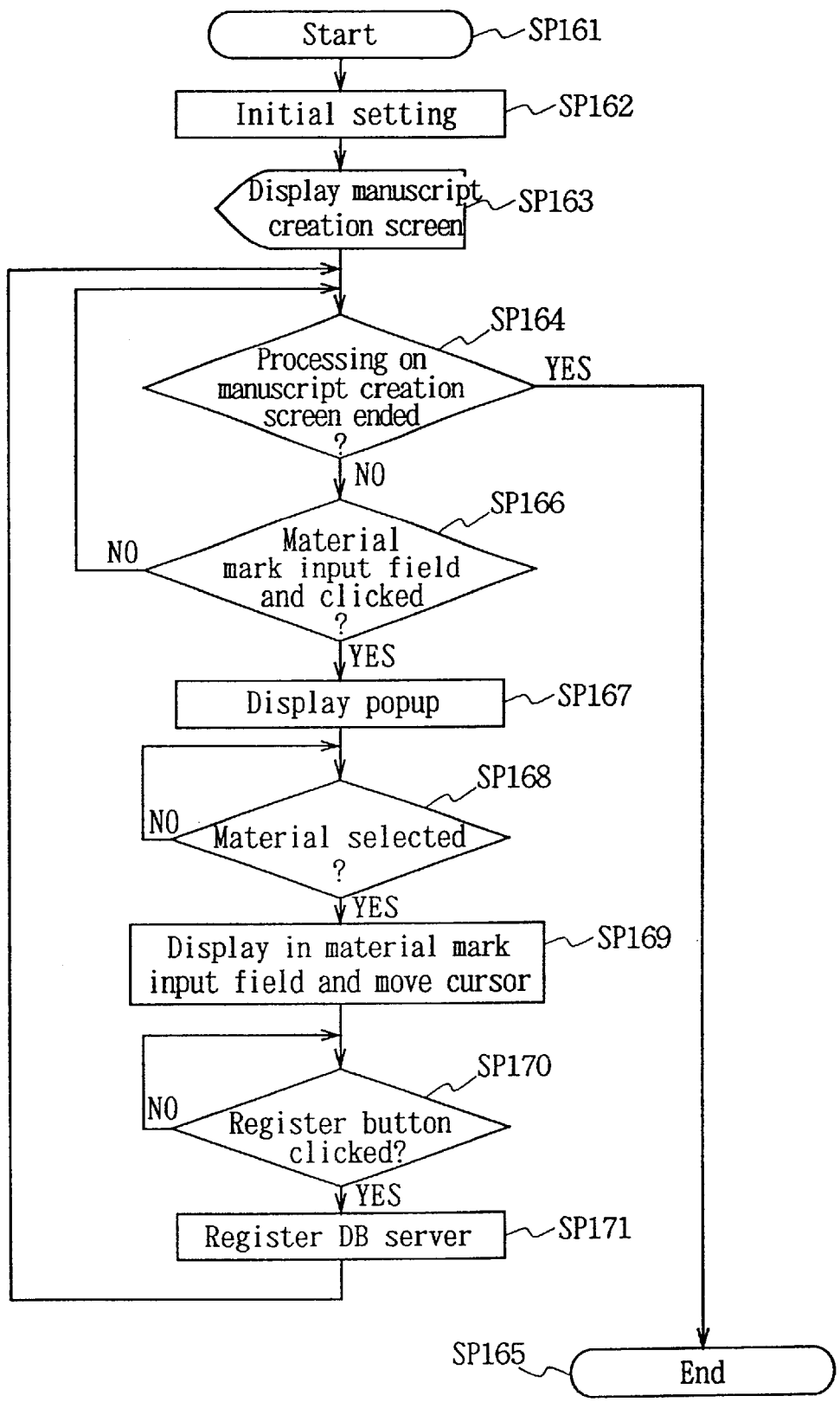
FIG. 14 is a flow chart representing a processing procedure for creating an on-air manuscript.

FIG. 14 illustrates a flow chart for creating an on-air manuscript with reference to each item in the aforementioned program component table in a popup.

As the on-air manuscript creation processing is started (step SP161), the initial screen illustrated in FIG. 11 is displayed (step SP162).

When a predetermined manuscript item is selected from the item field 231A of news collection manuscript list 231, the processing proceeds to step SP163 where the screen is switched from the initial screen illustrated in FIG. 11 to the manuscript creating screen illustrated in FIG. 12.

Next, the processing proceeds to step SP164 where it is determined whether or not the processing on the manuscript creating screen is terminated. This is a determination as to whether or not the on-air manuscript creation processing is terminated or not. If terminated (when YES), the processing proceeds to step SP165 where the creation processing is terminated. If not terminated (when NO), the creation processing proceeds to step SP166.

At step SP166, it is determined whether or not a material mark input field has been selected on the manuscript creating screen and a mouse button has been depressed. This is determined by checking whether or not a mouse has been clicked on the material mark input field 252 or 260 on the manuscript creating screen of FIG. 12. If it is determined that the mouse button has not been depressed (when NO), an indication is given to indicate that no material mark input field has been selected and the mouse button has not been depressed, followed by the processing again proceeding to step SP164. If depressed (when YES), the processing proceeds to step SP167.

At step SP167, the popup 253 for indicating a program component table or cue sheet information illustrated in FIG. 12 is displayed together with the manuscript creating screen.

Next, the processing proceeds to step SP168 where it is determined whether or not a desired material mark has been selected from the displayed popup 253. This step is repeated until a selection is made.

When selected (when YES), the processing proceeds to step SP169 where the material mark selected from the popup 253 is displayed in the material mark input field of the manuscript creating screen, and the popup 253 is closed. In this event, since the material mark includes a component duration displayed therein as described above, the component duration can be confirmed without viewing the component duration displayed in the program component table or the cue sheet information. Then, at step SP169, a manuscript is actually inputted.

Next, the manuscript creation processing proceeds to step SP170 where it is determined whether or not the register button 265 has been selected. This is a step provided for determining whether or not a created manuscript is to be stored in the DB server 7 after all manuscript input tasks have been completed. This step SP170 is repeated until the register button 265 is depressed.

When the register button is depressed (when YES), the processing proceeds to step SP171 where data on the inputted manuscript or the like is registered in the DB server 7. Then, the manuscript creation processing again proceeds to step SP164 and is repeated until the manuscript creation processing is terminated (until NO is determined at step SP164).

By repeating the foregoing processing, a material mark is selected from the popup display for each of the material mark input fields on the manuscript creating-screen, and a manuscript to be pronounced by an announcer is inputted. In this way, each of manuscripts divided for each of components in a program (the manuscript input field 258 and the manuscript input field 261) are corresponded to a material mark (a material mark displayed in the material mark field 252 and a material mark displayed in the material mark field 260) on a one-to-one basis, thus associating on-air manuscripts with the program component table (or the cue sheet information) to create readily readable manuscripts for announcers.

Also, since data on the program component table or the like corrected or modified on the desk terminal 18 or the like in the news program production support section 2 are registered in the DB server 7, such corrections or modifications are reflected to the program component table or the like displayed on the manuscript creating screen in real time, thus making it possible to correct or modify a manuscript likewise along the corrected or modified components. This prevents announcers from erroneously pronouncing manuscripts on the air due to discrepancies between manuscripts and components of a program.

Incidentally, in the embodiment described above, an on-air manuscript is printed out so that an announcer pronounces the printed manuscript. The present invention, however, is not limited to this. Alternatively, a display screen such as a monitor may be provided on a desk in front of an announcer to display an on-air manuscript mentioned above on this display screen, such that the announcer pronounces the displayed on-air manuscript.

In addition, while the foregoing embodiment has been described for an example in which an on-air manuscript is created on the desk terminal 18, the present invention is not limited to this. Alternatively, a manuscript may be created on an arbitrary terminal connected to the network. In addition, in this alternative, similar effects can be produced to those of the foregoing embodiment.

(5) Program Component Table
(5-1) Creation of Program Component Table

The program component table will be described below in detail.

The program component table is created on the desk terminal 18 in the news program production support section 2 in the program production and transmission apparatus of FIG. 1.

As illustrated in FIG. 1, the news program production and transmission apparatus is connected to the master room 36B through the interface. In this embodiment, the master room is connected through the gateway 40 as illustrated in FIG. 1.

Then, program data required to create a program table and a program component table is sent from the master room 36B to the desk terminal 18 through the gateway 40. On the desk terminal 18, a program table and a program component table are automatically created based on the program data sent thereto from the master room 36B.

Figure 16:
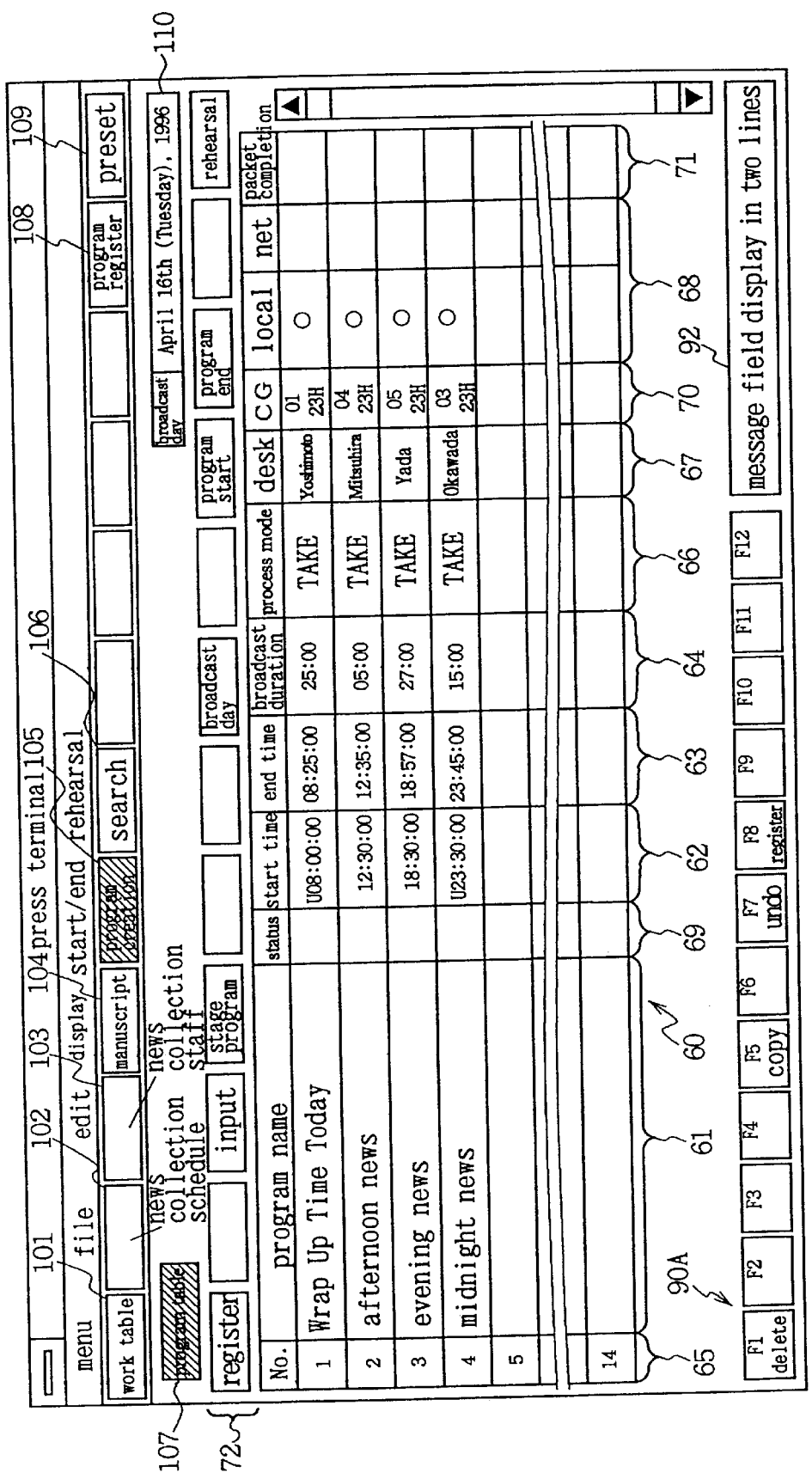
FIG. 16 is a diagram illustrating an example of a program table displayed on a screen.

The program table refers to a table for indicating a start time, an end time, a broadcasting duration and so on for each program. FIG. 16 illustrates an example of the program table. Although details will be described later, the table displays information such as program names, a start time, an end time and so on of each program, and so on for news programs of a day, as shown in FIG. 5.

Figure 17:
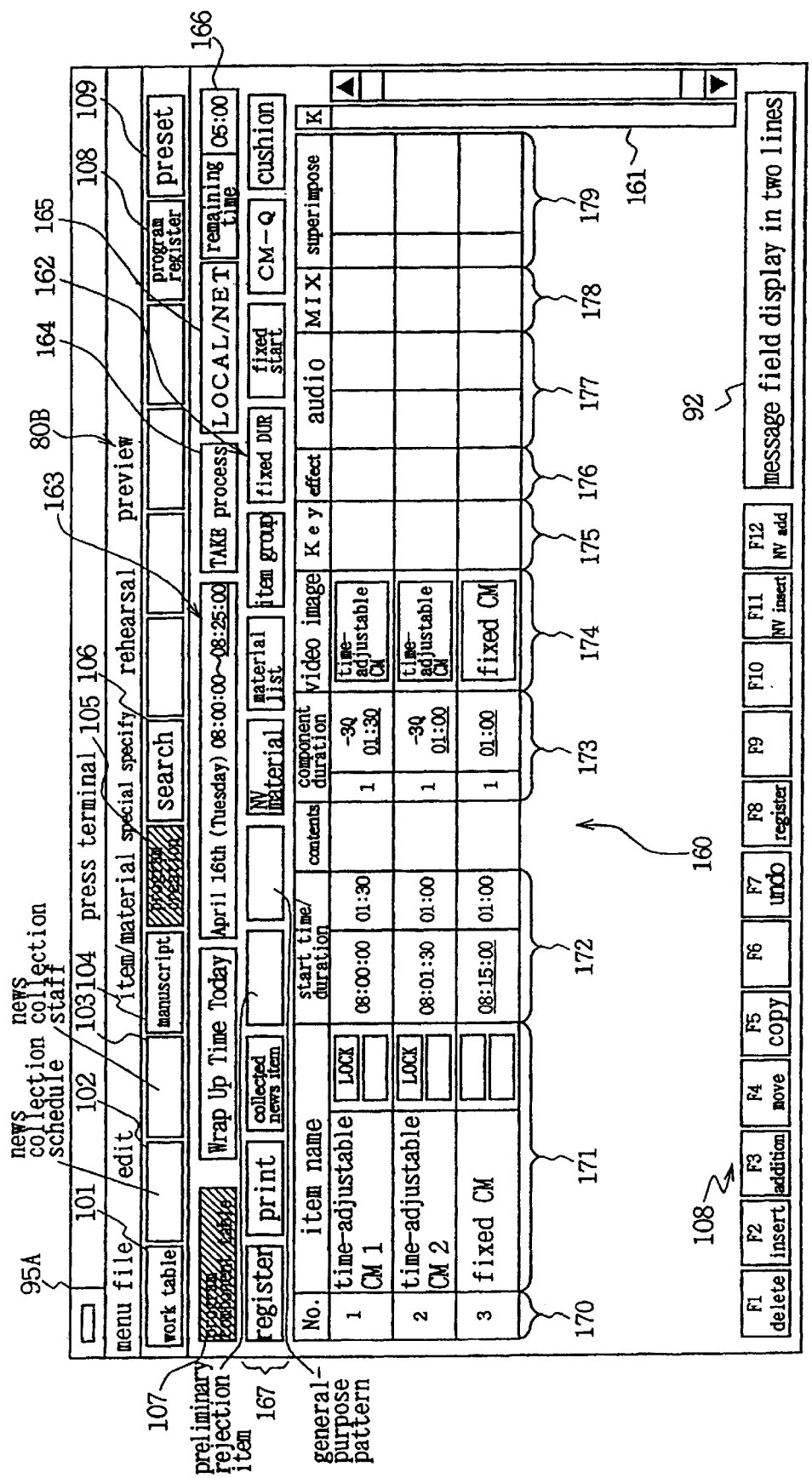
FIG. 17 is a diagram illustrating an example of a program component table displayed on a screen.
Figure 18:
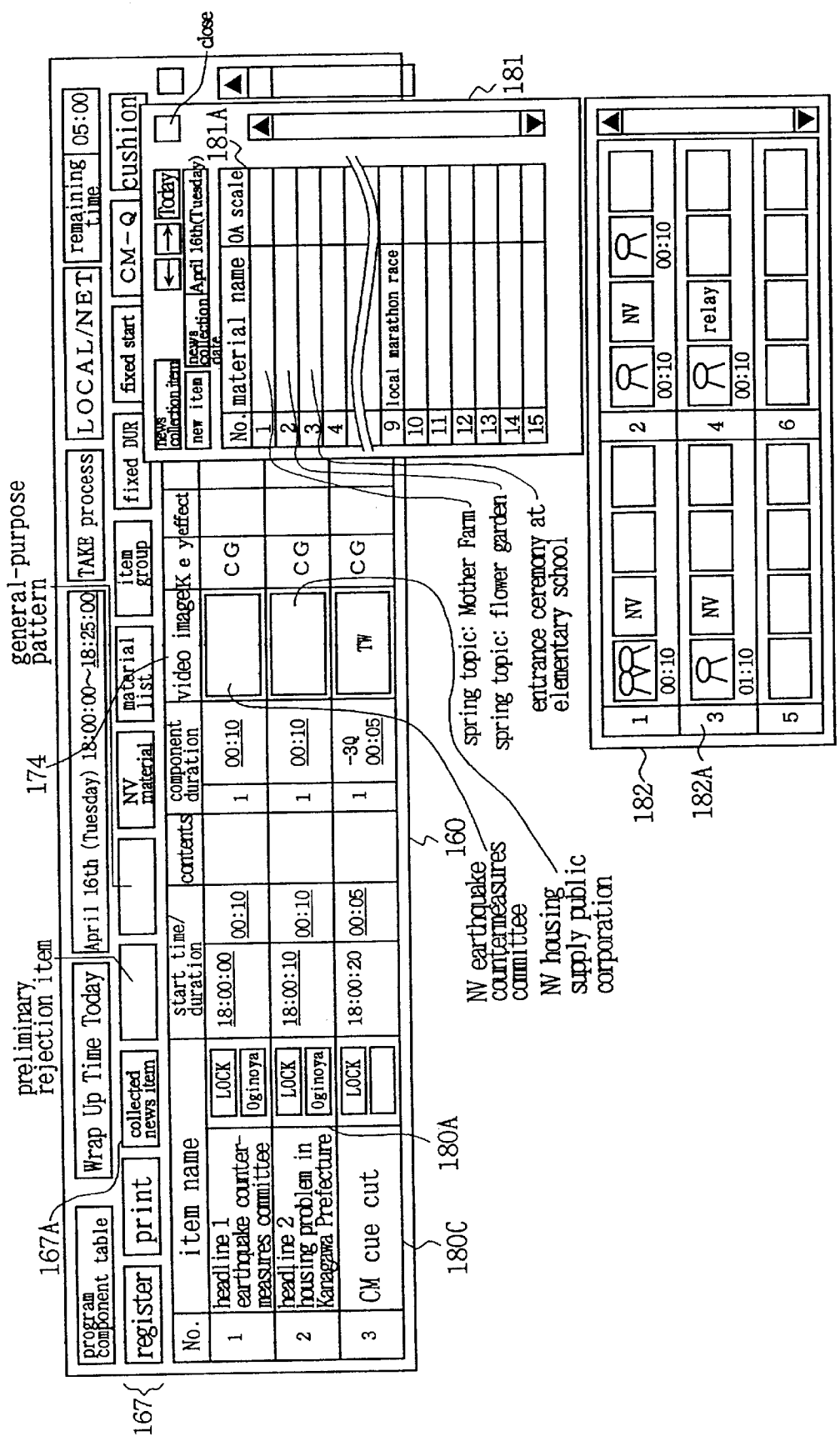
FIG. 18 is a diagram illustrating an example of how a video icon is inserted in a video column in a program component table displayed on a screen.

The program component table refers to a table for indicating components in a program, examples of which are illustrated in FIGS. 17 and 18. Although details will be described later, the program component table provides information such as an item name, a start time of each item, and so on for each item of a program.

The program table and the program component table are automatically created on the desk terminal 18 based on program data transferred from the master room 36B through the gateway 40 and the network 8. The program data transferred from the master room include information such as a program ID for identifying each program; a program name indicative of a name or the like of each program; a start time of each program; an end time of each program; distinction as to start and end times have been definite or indefinite (time-adjustable); and so on. The desk terminal 18 automatically creates a program table from these program data. Also, the program data transferred from the master room include a start time and an end time of a CM (commercial) inserted into a program; information for classifying whether a CM is a time-adjustable CM or a definite CM; and so on. The desk terminal 18 automatically creates a program component table based on these program data. The time-adjustable CM will be described later.

The structure of the program table will be described with reference to FIG. 15(A).

A program table shown in FIG. 15(A) is composed of ID 140 for indicating a program ID; Program Name 141; Start Time 142 and End Time 143 of the program; Local 144 for indicating whether or not the program is transmitted to local stations; and Net 145 for indicating whether or not the program is transmitted to other stations in the same network group. "U" in the field of Start Time 142 indicates that the associated program is a time-adjustable program, the start time of which is not definite. Specifically, "U" indicates that although the program is scheduled to start at "08:00" or just at 8 o'clock, it is not definite that the program is started just at 8 o'clock. For reference, since "U" is not displayed in End Time 143 of this program, it is definite that the program will end at "08:25:00" or 8 o'clock 25 minutes.

Next, the structure of the program component table will be described with reference to FIG. 15(B).

A program component table shown in FIG. 15(B) is composed of No. 150 for indicating an item number of each component in a program; Item Name 151 for indicating an item name; Start Time/Duration 152 for indicating a start time of each item and a broadcasting duration of the item; Component Duration 153 of the item; and Organization 154 for indicating how the program is organized.

As shown in FIG. 15(B), the program component table comprises three items. The item number 1 has Item Name "Time-Adjustable CM" or a CM without definite start time, Start Time "08:00:00" or at 8 o'clock, and the duration of the CM indicated as "1:30" or one minute and thirty seconds. Since this CM is a time-adjustable CM, it is not definite that this CM is broadcast just at 8 o'clock. "−3Q" in the field of Component Duration 153 indicates that a CM initiating pulse is sent to the master room 36B connected through the gateway 40 three seconds before the time-adjustable CM is broadcast based on this program component table. The time-adjustable CM initiating pulse will be described later in detail.

Program data transferred from the aforementioned master room 40 are the most basic data in the organization of a program and components in the program, and positioned as "skeleton" data for producing the program. The news program production and transmission system 1 produces and transmits news programs based on these program data. Then, the desk terminal 18 in the news program production support section 2 progresses the creation of components in a program in detail based on the program data transferred from the master room.

Here, the master room 36B is a department responsible for governing the overall broadcasting station with respect to the transmission of programs in the broadcasting station. Then, the master room 36B and the news program production and transmission apparatus 1 are interconnected through the gateway 40 in the network, so that the news program production and transmission apparatus 1 can communicate with the master room to provide reliable broadcasting. Also, a program table and a program component table can be automatically created on the desk terminal 18 from data transferred thereto from the master room 36B, components of a news program can be created in the news program production and transmission apparatus 1, and detailed components of the program can be created from the automatically created program table and program component table. It is therefore possible to provide reliable broadcasting as well as save the effort of producing the program table and the program component table.

Described next will be the creation of further detailed program table and program component table from a program table and a program component table automatically created on the desk terminal 18.

Final program table and program component table are completed on the desk terminal 18 based on a program table and a program component table automatically created based on program data from the master room 36B.

Examples of the program table and the program component table displayed on a display means such as a monitor, not shown, of the desk terminal 18 are illustrated in FIGS. 16 and 17, respectively.

First, the structure of the program table will be described in detail with reference to FIG. 16.

The program table illustrated in FIG. 16 is automatically created on the desk terminal 18 based on program data transferred thereto from the master room 36B, and displayed on a display means such as a monitor, not shown, of the desk terminal 18.

Like the manuscript input screen illustrated in FIG. 12, Work Schedule Table 101 for displaying working situations of staff members; News Collection Schedule Table 102 for displaying a news collection schedule table; News Collection Staff 103 for displaying a news collection decision table for assignment of news collection staff members and so on; Manuscript 104 for displaying the manuscript input screen; and Create Program 105 for displaying a program table or a program component table are displayed in an upper portion of the screen. By selecting this Create Program 105 with a selecting means such as a mouse, not shown, the program table illustrated in FIG. 16 is displayed. Program Creation 105 and a display field 107 are displayed with shading for indicating that the selection has been made.

Broadcasting Date 110 is positioned on the right side of the display field 107, and indicates that a program table for a program to be broadcast on "Apr. 16, 1996 (Tuesday)" is being displayed in this example.

Below the display field 107, a variety of setting buttons 72 are displayed. In the example of FIG. 16, a register-button for registering a program table for storage in the DB server 7, and so on are displayed.

Below the variety of buttons 72, an automatically created program table is displayed in a table form.

The program table is composed of No. 65 for indicating a program number of each program; Program Name 61 for indicating the program name of each program; Situation 69 for indicating whether or not the program has already been broadcast (on the air); Start Time 62 for indicating a start time of the program; End Time 63 for indicating an end time; Broadcasting Duration 64 for indicating a broadcasting duration of the program; Operation Mode 66 for indicating an operation mode of the program; Desk 67 for indicating the responsible of the program; CG 70 for displaying information related to computer graphics; Local Net 68 for indicating information as to whether the program is transmitted to local stations or to stations in the same network group; and Complete Packet 71 for displaying information related to a complete packet.

When a desired program item in the program table is selected on the screen, a program component table indicating components of each program is displayed as illustrated in FIG. 17. FIG. 17 illustrates a program component table of a program of Program Number "1" with Program Name "Wrap Up Time Today" selected in FIG. 16.

In FIG. 17, buttons, Work Schedule Table 101, News Collection Schedule 102, News Collection Staff 102, Manuscript 104, Create Program 105, Search 106, each for displaying associated table, are displayed in an upper portion of the screen, in a structure similar to the program table display screen of FIG. 16. "Program Component Table" is displayed in a display field 107 to indicate that a program selection table is displayed on the screen. Create Program 105 and the display field 107 are displayed with shading to indicate that this table is selected.

Displayed on the right of the display field 107 are a program name column 162 for indicating the program name of this program; a broadcasting date and time column 163 for indicating broadcasting date and time at which this program is broadcast; an operation mode column 164 for indicating an operation mode; a local/net column 165 for indicating whether the program is transmitted to local stations or stations in the same network group; and a remaining time column 166 for displaying a remaining time of the program.

Below the display field 107, a variety of setting buttons 167 are displayed.

Within the variety of setting buttons 167, Register is a button for storing a created program component table in the DB server 7; and Print is a button for printing out the created program component table by a printing machine such as a printer. The remaining buttons will be described later.

Below the variety of buttons 167, a program component table 160 is displayed in a table form.

The program component table 160 is composed of No. 170 for indicating an item number of each item constituting a program; Item Name 171 for indicating an item name; Start Time/Duration 172 for indicating a start time and a broadcasting duration of each item; Component Time 173 for indicating a time at which an initiating pulse is sent to the master room, when a time-adjustable item is specified, together with a broadcasting duration of each item; Video 174 for indicating which video image is represented by the item; Key 175 for displaying key information; Effect 176 for displaying information related to special effects; Audio 177 for displaying information related to audio in the item; MIX 178 for displaying information related to audio mixing; and Telop 179 for displaying information indicative of telop. Details on the respective items will be described later.

Next described is how a new item is added using the created program component table.

When Create Program 105 is selected on the desk terminal 18, the program table illustrated in FIG. 16 is displayed. A program in which an item is to be added is selected from this program table. When selected, a program component table is displayed for the program in which an item is to be added, illustrated in FIG. 17, and the item is inserted into a position at which the item is to be added.

An example of newly adding an item from the program component table will be described with reference to FIG. 18.

When News Collection Item 167A is selected from the variety of setting buttons 167, a news collection item table 181 indicative of news collection items is displayed in a popup style on the program component table screen as illustrated in FIG. 18. This news collection item table 181 comprises data based on a news collection decision table created on the news collection management terminal 11 in the news program production support section 2. Specifically, data on the news collection decision table created on the news collection management table 11 is stored in the DB server 7 through the network 8, so that the data on the stored news collection decision table are converted into the form of the news collection item table 181 illustrated in FIG. 18 for display.

Here, for creating an item entitled "Spring Topic: Mother Farm" with the item number 1 in the new collection item table 181 between an item having an item name "Headline 2: Housing Problem in Kanagawa Prefecture" with the item number 2, and an item having an item name "CM cue cut" with the item number 3 on the program component table 160, the item number 1 is first selected in the news collection item table 181 displayed in a popup style. The line of this item number is displayed in another color to visually distinguish the selected line from the rest of lines.

Then, as the line of the item number 2 is selected in the program component table 160, the item "Spring Topic: Mother Farm" is newly added between "CM Cue Cut" and "Headline" as illustrated in FIG. 19. In this event, "Spring Topic: Mother Farm" is assigned an item number "3," and the item number of "CM Cue Cut" is automatically incremented by one to be "4" since the new item has been added.

Turning back to FIG. 18, a popup 182, in which component patterns inserted in Video 174 in the program component table 160 are displayed in icon form, is displayed together with the news collection item table 181.

This popup 182 displays respective component patterns in the form of icon as illustrated in FIG. 18, such that a desired component pattern can be selected on the screen. The selection of a component pattern is made through a selecting manipulation such as clicking with a manipulation means such as a mouse, not shown.

In the manner described above, a program table and a program component table are automatically created from program data from the master room 36B transferred to the desk terminal 18, and the program component table is subjected to addition and correction on the desk terminal 18 to complete the program component table. The completed program component table is stored in the DB server 7 through the network 8.

(5-2) Procedure for Automatically Creating Program Component Table

Here, the processing for automatically creating a program component table on the desk terminal 18 based on program data transferred thereto from the master room 36B will be described with reference to FIG. 20.

Figure 20:
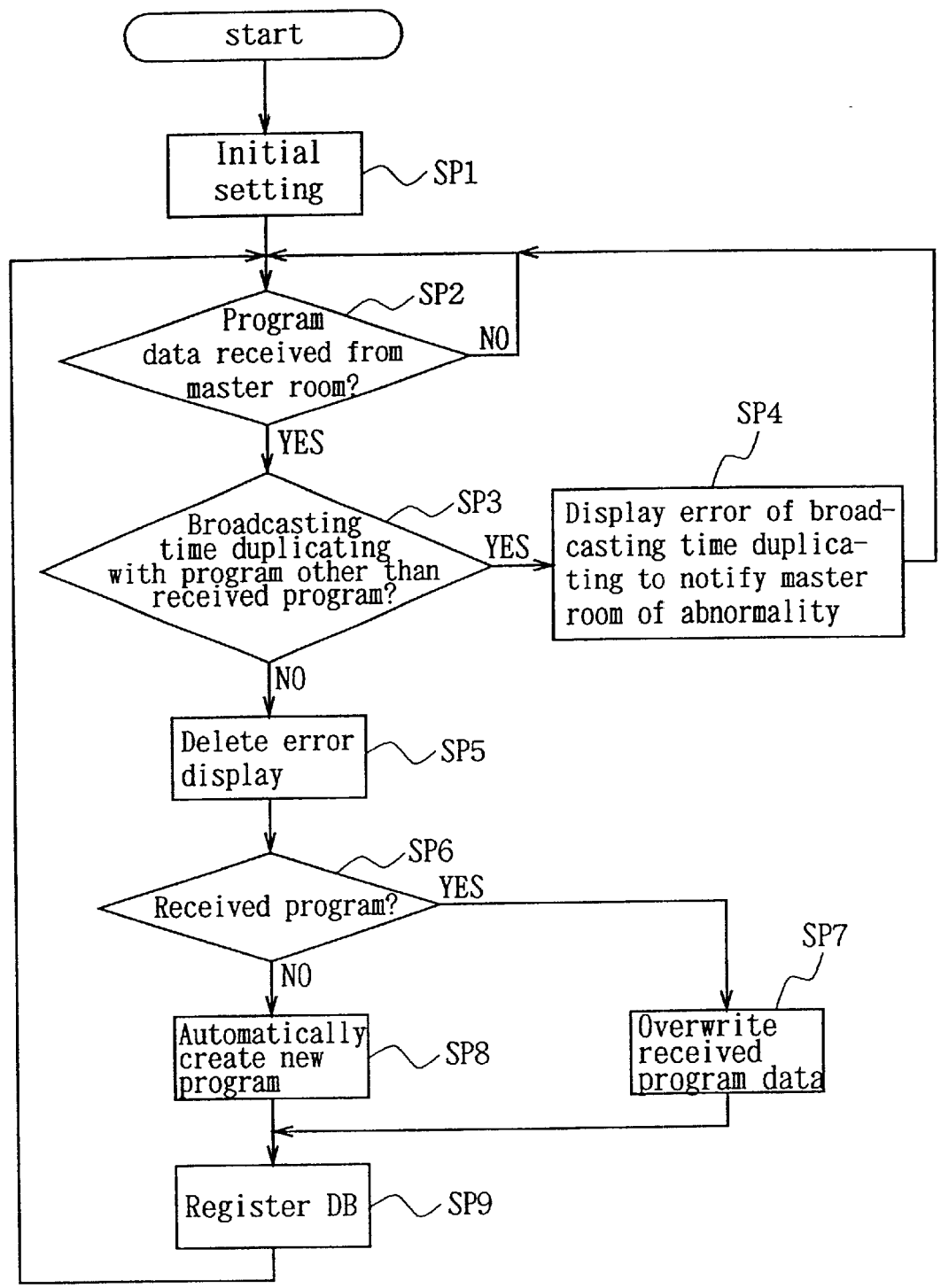
FIG. 20 is a diagram illustrating an example of a flow chart representing a processing procedure for automatically creating a program component table from program data.

FIG. 20 illustrates a flow chart related to the processing for automatically creating a program component table. When this processing for automatically creating a program component table is started (step SP1), initial settings are applied to the desk terminal 18, on which a program component table is to be displayed, for displaying the program component table (step SP2).

Next, the processing proceeds to step SP2, where it is determined whether or not program data have been received from the master room. As described above, this step SP2 is repeated until program data required for automatically creating a program component table, for example, data on a start time, an end time and so on of a CM to be broadcast in a program, are received. When such program data is received from the master room, the processing proceeds to the next step SP3.

At step SP3, it is determined whether or not a broadcasting period of a received program overlaps with that of another program. More specifically, a broadcasting time of a program from the received program data is compared with broadcasting times of programs previously registered in the DB server 7 to determine whether or not the broadcasting time overlaps with others. If the overlapping is determined (when YES), the processing proceeds to step SP4. At this step SP4, an error message is displayed for indicating that the broadcasting period overlaps with another program. The error message may be displayed together with the program component table on a display means such as a monitor of the desk terminal 18, on which the program component table is displayed, or may be announced through a buzzer, a lamp or the like provided on the desk terminal 18. In addition, the master room 36B may also be notified of the error through a similar error message, a buzzer, a lamp or the like. Subsequently, the processing again returns to step SP2.

On the other hand, if no overlap error is found at step SP3 (when NO), the processing proceeds to step SP5 where if an error message has previously been displayed, the error message is erased, and then the processing proceeds to step SP6.

At step SP6, it is determined whether or not the received program data are equal to previously received program data which have already been registered. This is determined by comparing the program ID of the latest program data received by the desk terminal 18 with the program IDs of program data registered in the DB server 7. If it is determined at step SP6 that the program data have been received (when YES), the processing proceeds to step SP7 where the received program data are overwritten with the latest program data. Then, the processing proceeds to step SP9.

On the other hand, if it is determined at step SP6 that the program data have not been received (when NO), the processing proceeds to step SP8 where a new program is automatically created. In other words, a new program table and program component table are automatically created.

Then, the processing proceeds to step SP9 where a program table and a program component table created by the overwritten program data, or newly created program table and program component table are registered in the DB server 7.

(5-3) Parallel Input and/or Modification Operations to Program Component Table from a Plurality of Terminals In the foregoing, description has been made on an example in which the desk terminal 18 automatically creates a program table and a program component table based on program data transferred thereto from the master room through the gateway 40 and the network 8, and displays a news collection item table from the. automatically created program table and program component table in a popup style, and adds items therein to complete the program component table. In the following, parallel processing from a plurality of terminals will be described for further inputting and/or modifying data in respective items of the created news component table.

The desk terminals 18 will be first described.

Figure 21:
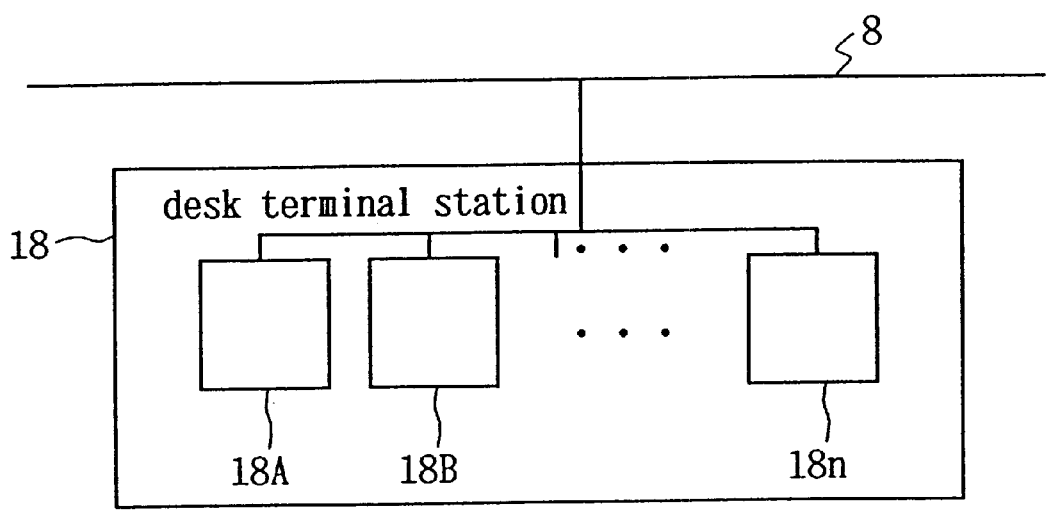
FIG. 21 is a diagram illustrating an example of the configuration of a desk terminal.

As illustrated in FIG. 21, the desk terminals 18 comprises a plurality of desk terminals 18A, 18B, . . . 18n (n=A, B, . . . ). Each of the desk terminals 18A, 18B, . . . , 18n is connected to the network 8, so that program data are transferred thereto from the aforementioned master room 36B to automatically create a program table and a program component table thereon.

For example, description is made on an example of inputting data to and modifying data in Item 170A with Item Number "1" and Item Name "Head Line 1: Earthquake Countermeasure Committee" in a program component table 160 illustrated in FIG. 22.

When inputs and modifications are performed for each item in the same program component table simultaneously in parallel from a plurality of desk terminals 18A, 18B, . . . , 18n, a program component table registered on another terminal is invalidated. More specifically, when a program component table is registered on a certain desk terminal, all data in the program component table are registered and reflected to the remaining desk terminals, so that data in the component table, simultaneously inputted or modified, are invalidated. In this event, data must be again inputted after the program component table is registered. For this reason, operations such as input, modification and so on cannot be performed on each item in a program component table simultaneously from a plurality of terminals.

Accordingly, the present invention defines an area in the program component table in which data input and modification are allowed for each operator or each terminal, such that no inputs are permitted to items out of this area from other terminals. In addition, the contents of inputted or modified data in a program component table on-a certain terminal are immediately notified to other terminals so as to prevent input and modification to the same item.

Description will be continued with reference to FIGS. 22 and 23.

A lock button 171A provided in an Item Name column 171 of a program component table 160 is selected with a selecting means, not shown, of the desk terminal 18A. As a result, other desk terminals 18 are prohibited from inputting to and modifying in this item "Headline 1." Specifically, the desk terminal 18A is allowed to input to and modify in this selected item, whereas input and modification operations for the selected item cannot be performed from the remaining desk terminals. The selection of the lock button 171A is communicated to the DB server 7 through the network, and the DB server 7 sets an item use flag related to input/modification for the item. This causes the DB server 7 to prohibit the remaining desk terminals 18B, . . . , 18n other than the desk terminal 18A from accessing to the specified item "Headline 1" for input and/or modification.

For reference, the prohibition of access for input and/or modification to the item "Headline 1" 170A set by selecting the lock button 171A on the desk terminal 18A is maintained until the prohibition is released again by the lock button 172 on the desk terminal 18A, so that the desk terminals 18B, . . . , 18n other than the desk terminal 18A are prohibited from accessing to the item for input and/or modification.

When the prohibition of access for input and/or modification is set by selecting the lock button 171A as illustrated in FIG. 23, the lock button 171A "Lock" is displayed in a different color than a background color. For example, when the background is in white, "Lock" on the desk terminal 18A is displayed in red, while the lock buttons "Lock" in the same item is displayed in yellow on the remaining desk terminals 18B, . . . , 18n. In this way, on the plurality of desk terminals 18A, 18B, . . . , 18n on which the program component table is being simultaneously processed in parallel, it is possible to readily identify, in accordance with the color of the lock button 171A "Lock" being red or yellow, whether an input and/or modification operation is in progress for a predetermined item displayed in the program component table on another terminal, i.e., whether an access to the item for input and/or modification is allowed from one's own terminal.

If the access is allowed, the other terminals may be notified that the access is allowed, whereby input and modification operation can be actually performed for an item or a component in the program component table from the plurality of desk terminals 18A, 18B, . . . , 18n.

After predetermined input and modification has been completed, the created program component table is registered and stored in the DB server 7 from the respective desk terminals 18A, 18B, 18n through the network.

(5-4) Procedure for Inputting and/or Modifying Program Component Table

Figure 24:
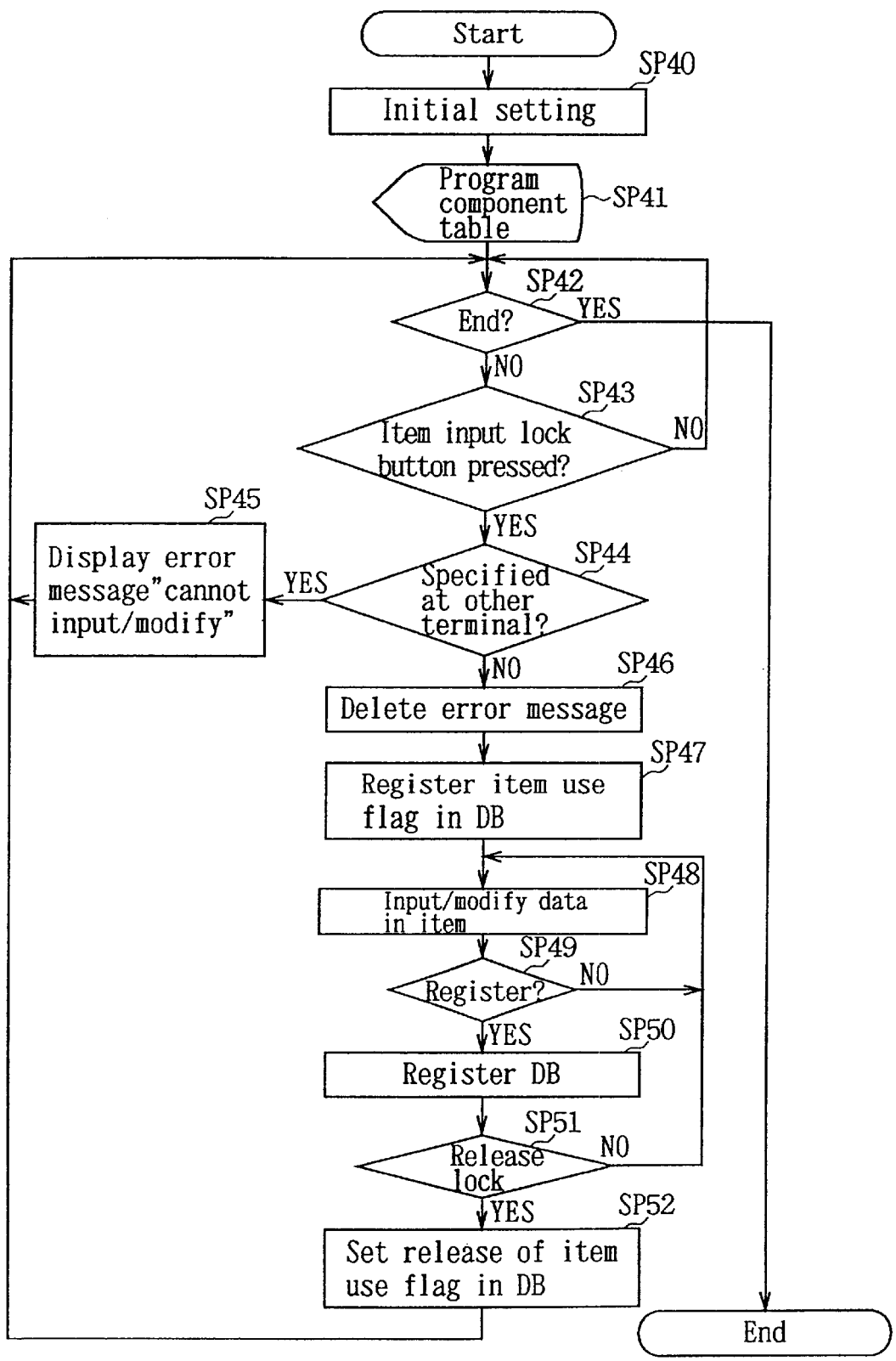
FIG. 24 is a diagram illustrating an example of a flow chart representing a processing procedure for setting prohibition of input access from another terminal for a predetermined item.

In the following, the foregoing processing for setting the prohibition of an access to a predetermined item for input from another terminal will be described with reference to FIG. 24.

When the processing for prohibiting another terminal from an input access is started, initial settings are applied at step SP40 for displaying a program component table, and so on.

Next, the processing proceeds to step SP41 where a program component table is displayed on the screen. The display on the screen in this case is a program component table 160 which is displayed by selecting Create Program 105 as illustrated in FIG. 17.

After the program component table is displayed, the processing proceeds to step SP42 where it is determined whether or not an instruction has been issued to terminate the program component table. If the termination instruction has been issued (when YES), the processing for inputting to and/or modifying in the program component table is terminated. If no termination instruction has been issued (when NO), the processing proceeds to step SP43.

At step SP43, it is determined whether or not an item input lock button has been depressed. This is determined by checking whether or not the lock button 171A in the program component table 160 has been selected or not, as illustrated in FIG. 23. If the lock button 171A is not depressed, input to and/or modification in each item of the program component table are not allowed, so that the processing again proceeds to step SP42 if No is returned at this step SP43. Then, these steps (SP42 and SP43) are repeated until the lock button 171A is depressed. Eventually, if it is determined that the lock button 171A has been depressed (when YES), the processing proceeds to step SP44.

At step SP44, it is determined whether or not access prohibition has already been set for the selected item intended for input and/or modification by depressing the lock button 171A on another terminal. This can be determined from the color of the lock button 172 in the program component table in FIG. 23 by checking whether the lock button 141 is displayed in a particular color, as described above. If the access prohibition has been set (when YES), the processing proceeds to step SP45 where an error message "Input and/or Modification Are Not Allowed" is displayed on a display means such as a monitor, not shown, of the terminal (step S45), followed by the processing proceeding again to step SP42. If such setting has not been made on any other terminal so that the access is not prohibited (when NO), the processing proceeds to step SP46.

At step SP46, if an error message has been displayed on the program component table screen, the error message is erased, and the processing proceeds to step SP47.

At step SP47, an item use flag is registered in the DB. When a lock button 171A for a desired item is depressed on the program component table 160 but the lock button 171A is not specified on other terminals, the item use flag is registered in the DB server 7 in order to indicate that a use access to the item for input and modification has been specified on a certain terminal, and information on that is displayed on the other terminals. In this way, input to and/or modification in the specified item can be performed on the certain terminal. Conversely, input to and modification in the specified item cannot be performed from the remaining terminals.

Next, at step sp48, input to and modification in the item in the program component table are performed to complete the program component table. After terminating predetermined input and modification, the processing proceeds to step SP49.

At step SP49, it is determined whether or not the program component table, which has undergone input and modification, is registered. In the program component table on the screen illustrated in FIG. 17, this is determined by checking whether or not "Register" has been selected from the variety of buttons 167. If it is not registered (when NO), the processing again returns to step SP48 to execute the processing for inputting data to an item and modifying data in an item of the program component table. When it is registered, the processing proceeds to the next step SP50.

At step SP50, data which have undergone input and modification on the program component table are stored in the DB server 7 through the network 8 to register the program component table in the DB.

Subsequently, the processing proceeds to step SP51 where it is determined whether or not the item input lock button depressed at step SP43 is released. This is determined by checking whether or not the lock button 171A, which has been locked in the program component table illustrated in FIG. 23, is released. For example, since the locked state is released by again selecting the locked lock button 171A with a selecting means such as a mouse, the determination can be made by checking whether or not the lock button 171A for an item again intended for input and modification has been selected. If the locked state is not released (when NO), the processing again returns to step SP48 to input data to and modify data in an item. If the locked state is released (when YES), the processing proceeds to step SP52.

At step SP52, setting is made to release a registered use flag for an item of interest in the DB server 7. By thus setting, it is possible to display the fact that the item intended for input and modification has been released from the locked state on terminals other than the used one. In the aforementioned example, the yellow color, in which the lock button 171A for the locked item of interest has been displayed in FIG. 23, disappears to indicate that the locked state has been released.

Then, the processing again returns to step SP42.

When the processing for inputting to and modifying in items (or components) in the program component table is terminated in the foregoing manner, each item in the program component table is registered in the DB server 7 through the network 8, thus terminating a procedure for inputting to and modifying in the program component table.

Figure 25:
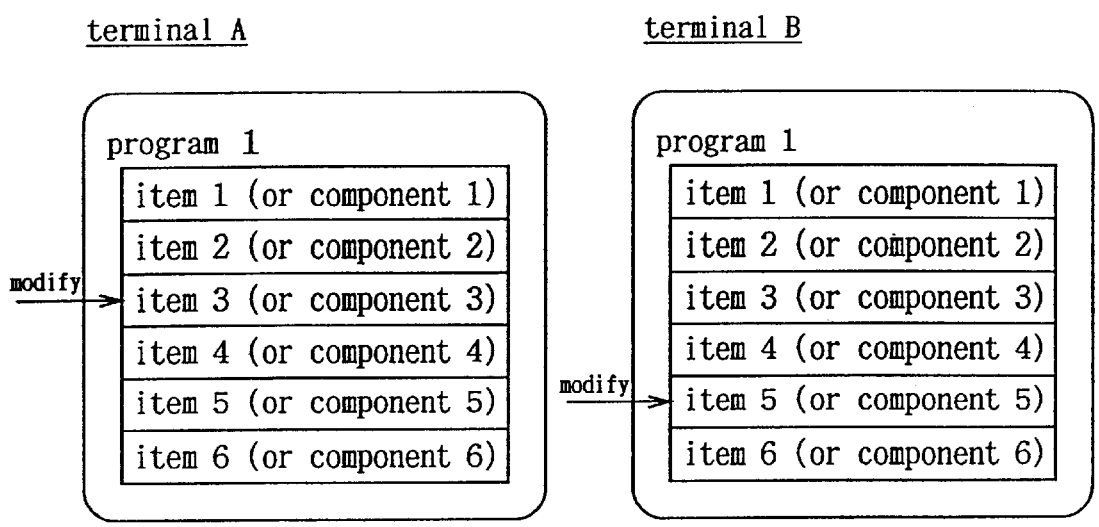
FIG. 25 is a diagram illustrating an example in which a certain item or component on a program component table is simultaneously being edited on two terminals.

FIG. 25 conceptually illustrates the operation of each terminal performed when each item or each component of a program component table undergoes works such as input and modification from a plurality of desk terminals in parallel.

As illustrated in FIG. 25, the same program component table for a program 1 is displayed on a desk terminal A and on a desk terminal B. On the terminal A, an item 3 (or a component 3) of the program 1 is modified, while on the terminal B, an item 5 (or a component 5) of the program 1 is modified.

Assuming herein that the program component table is registered at an earlier stage with the contents modified on the terminal A, the item 3 (or the component 3) only has been modified, so that the item 3 (or the component 3) is rewritten with the new contents on the remaining terminals including the terminal B. The contents of the remaining items (or components) including the item 5 (or the component 5) other than the item 3 (or the component 3) are left unchanged, thus allowing an operator of the terminal B to continue works such as input to and modification in the item 5 (or the component 5).

In addition, it is also possible to prohibit works such as input and modification for the item 3 (or the component 3) from the remaining terminals including the terminal B from the time works such as input and modification have been started for the item 3 (or the component 3) on the terminal A to the time such works are terminated.

As described above, according to the present invention, works such as input to and modification in a program component table can be performed simultaneously from a plurality of terminals, thereby achieving a significant reduction in work time for creating the program component table.

(5-5) Setting of Fixation Frame

As described above, a program component table is automatically created from program data, and works such as input to and modification in respective items and respective components in the program component tables are performed from a plurality of terminals in parallel to eventually complete a detailed organization of a program to be broadcast. In the organization of such a program, there exist items and components which actually have broadcasting times (transmission times) previously fixed, as previously mentioned. For example, there is an item which has a fixed transmission time, for example, a CM which must be broadcast without fail from a fixed time point in a certain program. On the other hand, there is also a CM which must be broadcast without fail in a certain program, as mentioned above, however, its transmission time is not fixed, i.e., a time-adjustable CM or the like. In this way, since a certain program contains items having fixed transmission times and items such as a time-adjustable CM which do not have fixed transmission time, these items should be distinguished in any method when a program component table is created for determining details of the program. In the present invention, a fixation frame is displayed in the form of strip for associated items or components, which are defined as fixed items having fixed transmission times, in a program component table, with a remaining time within each fixation frame additionally displayed, thereby making it possible to readily confirm fixed items and to prevent erroneous inputs during the creation of the program component table.

(5-6) Procedure for Setting Fixation Frame

A method of setting a fixation frame will be described with reference to FIGS. 26–28.

Figure 26:
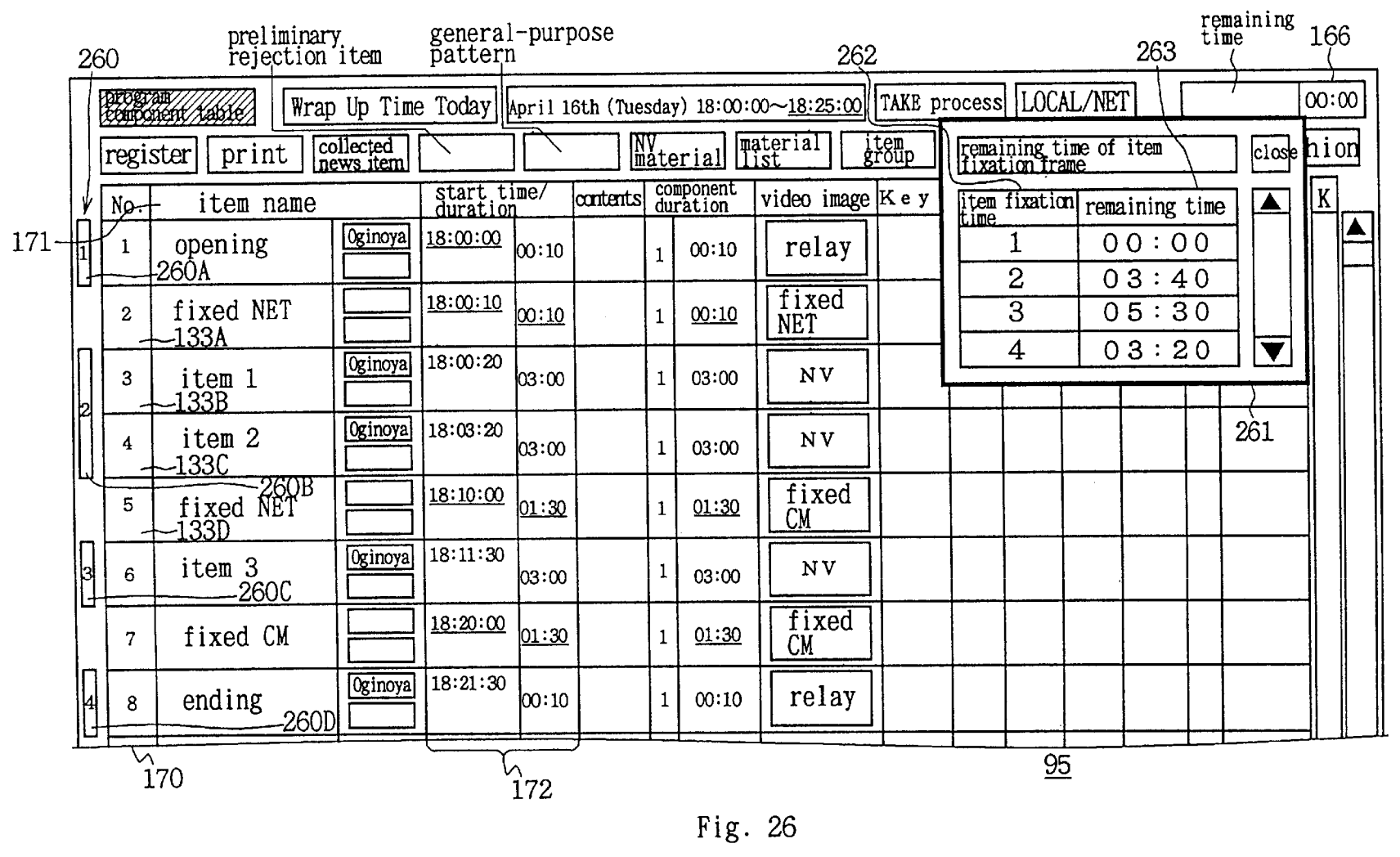

In FIG. 26, fixation frames are displayed in the form of strip on the left of Item Number "No." 170 in a program component table. Here, Item Name "Fixed CM" of Item Number "5" and Item Name "Fixed CM" of Item Number "7" are items which have fixed broadcasting transmission times in this program. A transmission start time of Item Number "5" and a transmission duration of the item are indicated as "18:10:00" in Start Time/Duration 172, meaning that the item is broadcast for one minute and thirty seconds from 6 o'clock 10 minutes 0 second in the evening. Also, a transmission start time and a transmission duration of Item "7" are "18:20:00" and one minute thirty seconds from that time. Therefore, an item sandwiched by these two items are allocated a limited time period. For instance, Item "6" sandwiched by Items "5" and "7" is an item which is allocated from "18:11:30" or 6 o'clock 11 minutes 30 seconds in the evening to the start time of the next Item "7" or 6 o'clock 20 minutes 0 second in the evening. Thus, this Item "6" is defined as a fixed frame, so that a strip display 260 is provided in the program component table, as illustrated in FIG. 26.

Further, a fixation frame number is displayed for each fixation frame as illustrated in FIG. 26. Specifically, on the left side of Item Number "1," a fixation frame number 1 is displayed together with a strip-shaped display 260A indicative of a fixation frame. Also, on the left of Item Numbers "3" and "4" sandwiched by Item Number "2" (Item Name "Fixed Net") and Item Number "5" (Item Name "Fixed CM"), which are fixed items, a fixation frame number 2 is displayed together with a strip-shaped display 260B indicative of a fixation frame. By thus displaying fixation frame numbers together with associated strip-shaped displays indicative of fixation frames, the distinction of the respective fixation frames are made clear.

Additionally, a fixation frame itself may be displayed in a different color from a background color of a program component table to permit the operator to readily identify the fixation frame. Alternatively, each fixation frame may be displayed in a different color in order to more clearly distinguish respective fixation frames, thereby permitting the operator to readily recognize each fixation frame.

Components of each item are sequentially inputted such that the remaining time 166 for each fixation frame included in the program component table is reduced to zero.

In this event, a remaining time display window 261 may be provided on the program component table for indicating remaining times for respective fixation frames. This remaining time display window 261 can be displayed by selecting Remaining Time 166 with a selecting means such as a mouse, not shown.

As illustrated in FIG. 26, the remaining time display window 261 displays a remaining time 263 for each fixation frame number 262. For example, Fixation Frame Number "1" has a remaining time "00:00" or no remaining time, while Fixation Frame Number "2" has Remaining Time 263 "03:40" or a remaining time of three minutes and forty seconds.

The operator can input each item and component in each fixation frame, while displaying the remaining time display window 261 to confirm the remaining time for each fixation frame, thus readily completing the program component table.

Also, in a program progress table, referred to as a cue sheet, for indicating what is broadcast when in how program organization within a broadcasting time period, later described, a strip-shaped display may be provided corresponding to an item range of a fixation frame, if such fixation frame is defined for each item. Moreover, a fixation frame number identical to that in the program component table may be displayed in this cue sheet.

Next, the operation for displaying a fixation frame will be described with reference to FIG. 27.

Figure 27:
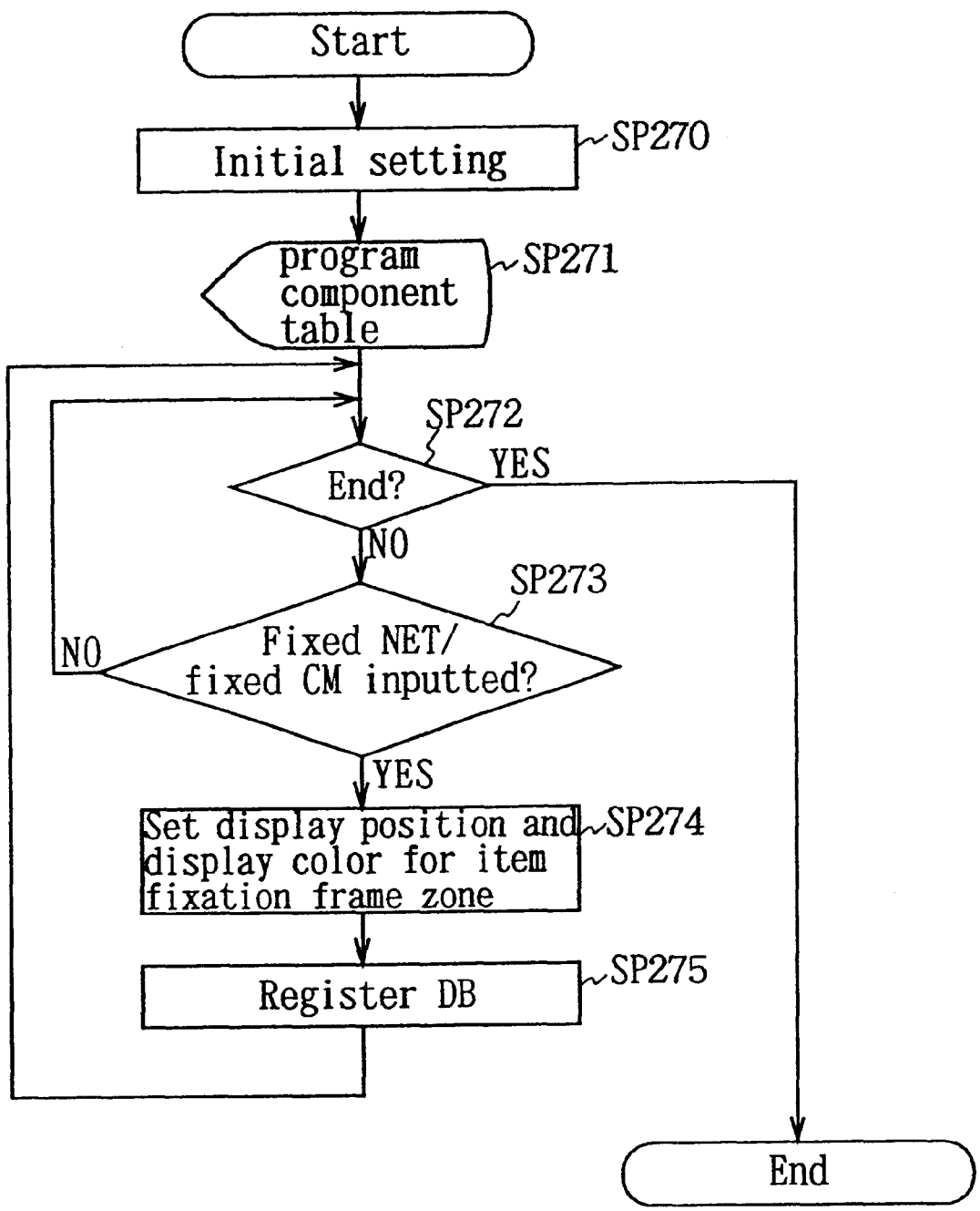
FIG. 27 is a diagram illustrating an example of a flow chart for displaying time fixation frames on a program component table.
Figure 28:
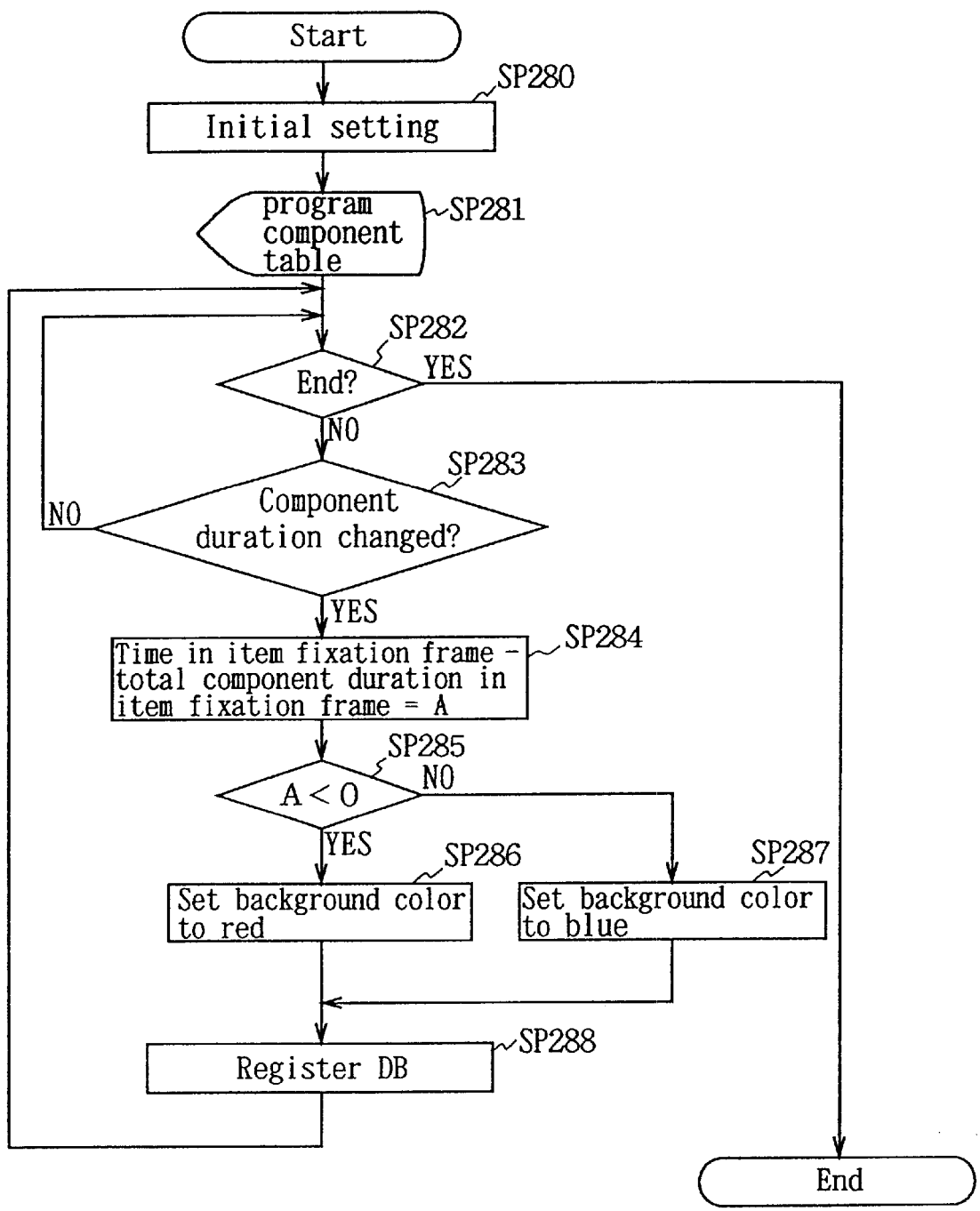
FIG. 28 is a diagram illustrating an example of a flow chart for calculating a remaining time period in a time fixation frame on a program component table, and displaying on the screen whether or not a component or an item can be inputted in the time fixation frame.

FIG. 27 illustrates a processing procedure for displaying a fixation frame in the form of strip. The fixation frame in the form of strip is displayed on a terminal on which a program component table is created, in this embodiment, the desk terminal 18.

This processing procedure, when started, first proceeds to step SP270 where initial settings are applied for displaying a fixation frame in the program component table, and so on.

After the initial settings have been applied at step SP270, the processing proceeds to step SP271 where the program component table is displayed on a display means such as a monitor, not shown, of the desk terminal 18.

After the program component table is displayed, the processing proceeds to step SP272 where it is determined whether or not an instruction has been issued to terminate the program component table. This determination can be made by checking whether or not an instruction has been issued to close the display itself on the program component table on the screen.

If the termination instruction is issued (when YES), the processing for displaying a fixation frame in the form of strip is also terminated.

If no termination instruction is issued (when NO), the processing proceeds to step Sp723.

At this step SP273, it is determined whether or not a fixed NET, which is an item assigned to a broadcasting station of the same group, having fixed start time and end time, and/or a fixed CM having fixed broadcasting start time and end time have been inputted in the program component table. Generally, information on these fixed NET and fixed CM are transferred from the master room 36B to the desk terminal 18 through the gateway 40 and the network 8. In other words, the fixed NET and the fixed CM are information determined by the judgement of the master room 36B responsible for the management of the entire broadcasting station, so that the news program production and transmission apparatus 1 is not generally allowed to determine start and end times of the fixed NET or the fixed CM. Of course, all in a program may be determined in the news program production and transmission apparatus 1 to define the fixed NET and the fixed CM. However, the determination at step SP273 is made by checking whether or not the fixed CM and information on the fixed CM have been transferred from the master room 36B to the master room 36B and the DB server 7.

If the fixed NET or the fixed CM has not been inputted (when NO), the processing again returns to step SP272.

At step SP273, when the fixed NET or the fixed CM has been inputted (when YES), the processing proceeds to step SP274. At step SP274, a fixation frame between the fixed NET and the fixed CM is displayed in the form of strip, wherein a position at which a strip is displayed (display location) and a color of the displayed strip (display color) are set here to actually display the fixation frame in the program component table in the form of strip.

Then, the processing proceeds to step SP275 where information on the display of the fixation frame in the form of strip is registered in the DB server 7. After the information has been registered, the processing proceeds to step SP272 to repeat the foregoing processing until the display of the program component table is terminated.

Next, a processing procedure for calculating a remaining time for each fixation frame displayed in the remaining time display window 261 will be described with reference to FIG. 28.

When the processing for calculating a remaining time for a fixation frame is started, this processing first proceeds to step SP281 where initial settings are applied for displaying a program component table, and so on.

After the initial settings have been applied at step SP281, the processing proceeds to step SP282 where the program component table is displayed on a display means such as a monitor, not shown, of the desk terminal 18.

After the program component table has been displayed at step SP282, the processing proceeds to step SP283 where it is determined whether or not an instruction has been issued to terminate the program component table. This determination is identical to that at step SP272 illustrated in the aforementioned FIG. 27.

Afterwards, if no termination instruction has been issued (when NO) at step SP282, the processing proceeds to step SP283 where it is determined whether or not a component duration has been changed. This is determined by checking whether or not each item or each component has been newly added or modified in the program component table to cause a change in each item or a duration of a component. When no change has been made (when NO), the processing again proceeds to step SP282.

If the component duration has been changed (when YES), the processing proceeds to step SP284 where a remaining time A within the fixation frame is calculated. The calculation is made by subtracting a transmission duration of each item or component, produced by the change, from the time within the fixation frame to derive a remaining time in the fixation frame. For example, turning back to FIG. 28, if the organization of Item Number "3" (Item Name "Item 1"), which is an item within a fixation frame (Fixation Frame Number "2") set between Item Number "2" (Item Name "Fixed NET") and Item Number "5," is modified to change a component duration of this item to "03:00" or three minutes and zero second, the remaining time is calculated at this step SP282 in the following manner. Specifically, a time within the fixation frame (Fixation Frame Number "2") is calculated to be nine minutes and forty seconds since the end time of Item Number "2" (Item Name "fixed NET") is at 6 o'clock 0 minutes 20 seconds in the afternoon because its start time and transmission duration are "18:00:10" and "00:10," respectively, i.e., this is broadcast for ten seconds from 6 o'clock 0 minutes 10 seconds in the afternoon, and the start time of Item Number "5" (Item Name "Fixed CM") is at "18:10:00" or 6 o'clock 10minutes 0second in the afternoon. Also, due to the change in each item within the fixation frame, a total of transmission durations or component durations of Item Number "3" (Item Name "Item 1") and "4" (Item Name "Item 2") amounts to six minutes and zero second since the component durations of Item Numbers "3" and "4" are "03:00" and "03:00." Therefore, the remaining time of this fixation frame is calculated to be three minutes and forty seconds by subtracting the component durations of the respective items equal to six minutes and 0 second from a time period available within the fixation frame equal to nine minutes and forty seconds.

When the remaining time A of the fixation frame has been calculated at step SP284 in the calculation method described above, the processing proceeds to step SP285.

At step SP285, it is determined whether or not the calculated remaining time A is smaller than zero.

If the remaining time A is smaller than zero (when YES), the processing proceeds to step SP286 where a background of the fixation frame is displayed, for example, in red to make the operator recognize that no remaining time is left in the fixation frame. Conversely, if the remaining time is zero or more (when NO), the processing proceeds to step SP287 where the background of the fixation frame is displayed, for example, in blue, thus permitting the operator to recognize that the remaining time is still left in the fixation frame. Here, the background of the fixation frame is displayed in blue or red to permit the recognition of whether or not available time is still left in the fixation frame. However, the recognition is not of course limited to this particular manner. Alternatively, the fixation frame may be displayed in any color when there is no remaining time to notify the operator of the fact that there is no remaining time, and the fixation frame may not be changed at all in color if available time is left to have the operator recognize that there is still remaining time.

After the processing at steps SP286, SP287 is ended, the processing for calculating the remaining time proceeds to step SP288 where data such as the calculated remaining time of the fixation frame and so on are registered in the DB server 7. The processing again proceeds to step SP282 to repeat this processing until a termination instruction is issued for the program component table (when YES at step SP282).

The information related to the remaining time in the fixation frame is displayed in the remaining time display window 261 on the program component table, as described above, where a remaining time is displayed for each fixed frame number 262.

As heretofore described, a strip is displayed to indicate a fixation frame between items such as a fixed CM, a fixed NET and so on, which has a previously fixed broadcasting transmission time, in a program component table, a fixation frame number 262 is displayed for each fixation frame, and an indication of a remaining time in each fixation frame is displayed, thereby making it possible to obviate oversight of fixation frames and permit the operator to readily recognize the fixation frames. Further, works such as setting and modification in each item in a program component can be advanced while referencing a remaining time of a fixation frame, thus readily creating a program component table with an improved efficiency.

While in the foregoing embodiment, remaining times of component durations are displayed in a window when an item or a component is assigned to a predetermined fixation frame, the present invention is not limited to this. Alternatively, a remaining time of each fixation frame may be displayed next to the fixation frame in the program component table, in which case the fixation frame can be set without fail while viewing a remaining time in each fixation frame and a component duration.

In addition, while the foregoing embodiment has been described for an example in which a strip indicative of a fixation frame is displayed in color, the present invention is not limited to this. For example, the display of a strip indicative of a fixation frame may be blinked, such that the operator is allowed to recognize the fixation frame displayed in the form of strip in a different display method from other items in the program component table.

Further, while the foregoing embodiment has been described for the case where a strip representative of a fixation frame is displayed corresponding to the fixation frame, the present invention is not limited to this. For example, the fixation frame may be displayed in a different color or blinked such that an item in the fixation frame itself may be displayed visually different from fixed items such as a fixed NET, a fixed CM and so on. In this way, fixed items and fixation frames can be readily recognized, thus providing similar effects to the foregoing embodiment.

(5-7) Partial Rehearsal Setting in Program Component Table

The program component table is created as described above.

After inputs to required items have been all ended, it is necessary to confirm whether or not each item in the program, component table, for example, information such as Key items (175 in the program component table on the screen illustrated in FIG. 17) and Effect (176 in the same drawing) can be realized as inputted, prior to broadcasting by rehearsing the program component table just as the actual broadcasting.

A rehearsal function in a conventional program component table is such that a rehearsal start time is specified for each program to execute a rehearsal. For this reason, all items in a program component table must be rehearsed from the beginning to the end, thus spending a lot of time for the rehearsal. Therefore, when true confirmation is desired or when a rehearsal is desired to see whether a program can be executed as inputted, a working efficiency is significantly degraded.

Also, it is often the case that image materials such as NV materials (Video materials for News), still images and so on are not ready until immediately before the start of broadcasting, so that even if a rehearsal is executed, it is unknown whether or not items will be executed as they are inputted in a program component table. If a rehearsal desired portion can be specified to execute a rehearsal therefor, the working efficiency will be largely improved.

In the present invention, a rehearsal desired portion can be specified in a program component table as mentioned above, such that the specified portion only can be rehearsed.

This partial rehearsal function will be described with reference to FIGS. 29–34.

FIG. 29 illustrates how a rehearsal is set from a program table.

A partial rehearsal can be specified not only from a program component table but also from a program table which displays a start time, an end time, a program name and so on of each program.

As illustrated in FIG. 29, a program, for which a rehearsal is desired, is specified on the program table displayed, for example, on a display means such as a monitor, not shown, of the desk terminal 18. For specifying, a desired program is selected, for example, from the program table displayed on the screen through a manipulation on a manipulation means such as a mouse. A selected program is displayed in a different way from other program component, such as displayed in a different color, thus permitting the operator to recognize that a desired program has been selected. The example of FIG. 29 shows that Program Number "3" (Program Name "Evening News") has been selected as a program for which a partial rehearsal is performed.

For setting a partial rehearsal to the selected program, "Rehearsal" 300 in a menu tool bar 301 as illustrated in FIG. 30 is selected with a selecting means such as a mouse to specify a rehearsal for the selected program. In the example of FIG. 30, a rehearsal is specified for Program Name "Evening News" with Program Number "3," and "(Rehearsal)" is displayed following Program Name "Evening News" 284 in a program name column 292 including the program for which the rehearsal has been specified. In this way, it can be confirmed from the program table that a rehearsal has been specified for Program Name "Evening News."

After a rehearsal has been specified for a desired program on the program table, a rehearsal is next specified on a program component table.

Figure 31:
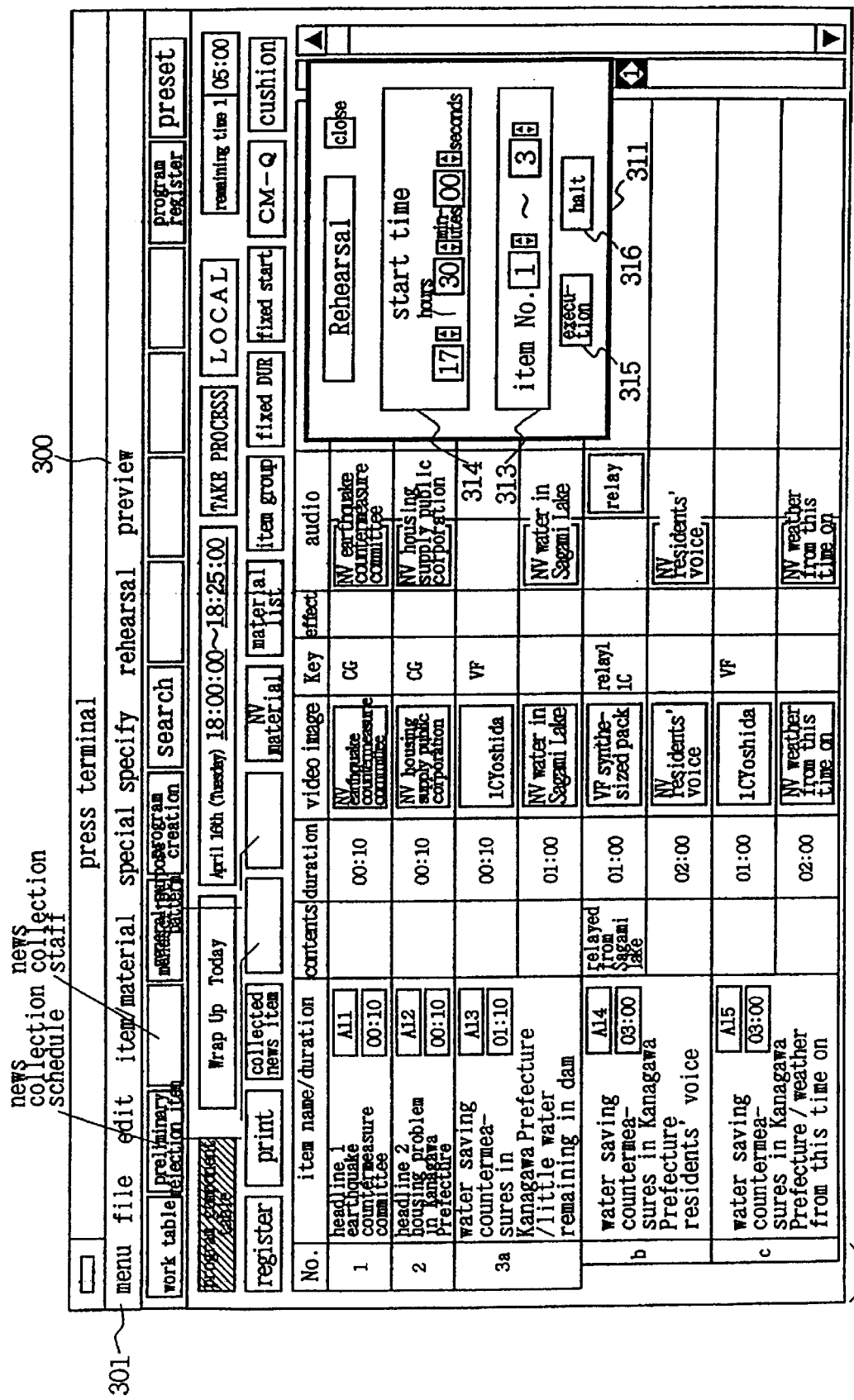
FIG. 31 is a diagram illustrating an example of a display on a screen on which a popup is displayed for setting a partial rehearsal on a program component table.

For specifying a rehearsal on a program component table, Rehearsal 300 in a menu tool bar 301 is first selected with a selecting means such as a mouse, as illustrated in FIG. 31. When selected, a rehearsal popup 311 is displayed on the screen.

The rehearsal popup 311 comprises a start time field 314 for inputting a time at which a rehearsal is started; an item number input field 313 for inputting Item Number 170 displayed on the program component table; an execution button 315 which is selected on the screen when a rehearsal is actually executed; and a stop button 316 for stopping a rehearsal in the middle.

The start time field 314 is a field for inputting a time at which a rehearsal is to be started, and necessary information is inputted thereto with an input means such as a keyboard, not shown.

The item number field 313 is an input field for inputting Item Number 170 of the program component table, for which a rehearsal is desired, and an item number is inputted similarly from the input means such as a keyboard, not shown.

In the example of FIG. 31, "17:30:00" has been inputted in the start time field 314, and "1~3" has been inputted in the item number input field 313, thus indicating that a rehearsal is started at 5 o'clock 30 minutes 0 second in the evening, and that the rehearsal is performed for items from Item Number 170 set to "1" (Item Name "Headline 1") to Item Number 170 set to "3a" (Item Name "Water Saving Countermeasures in Kanagawa Prefecture"). Then, when the rehearsal is actually performed for the specified items from the specified start time, the execution button is selected on the screen with a selecting means such as a mouse to execute the rehearsal. If the rehearsal is stopped in the middle, the stop button is selected with the selecting means. Then, these specified start time and item numbers are registered in the DB server 7 through the network 8.

A procedure for setting a rehearsal on a program table will be described with reference to FIG. 32.

Figure 32:
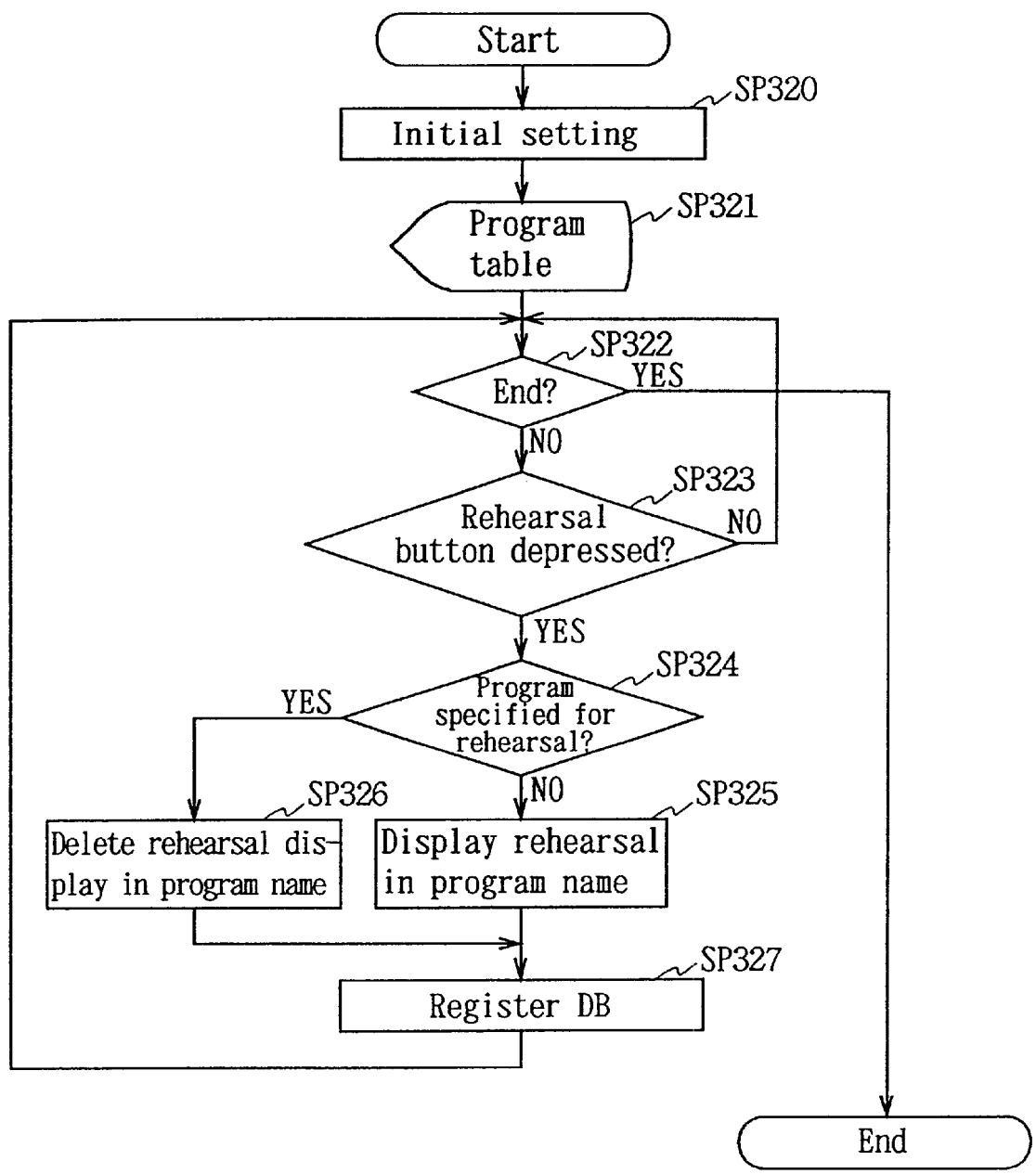
FIG. 32 is a diagram illustrating a flow chart for specifying a program subjected to a partial rehearsal on a program table.

FIG. 32 is a flow chart of the aforementioned processing procedure for setting a rehearsal on a program table. When the processing procedure for setting a rehearsal on a program table is started, the processing proceeds to step Sp320 where initial settings are applied for displaying a program table, and so on.

After the initial settings have been applied, the processing proceeds to step SP321 where a program table is displayed on the desk terminal 18. While the terminal on which the program table is displayed is herein chosen to be the desk terminal 18, the program table or a program component table may be of course displayed on any terminal connected to the network 8 other than the desk terminal 8 to execute the following setting processing. However, this embodiment is described below on the assumption that the program table is displayed on the desk terminal 18.

When the program table is displayed on a display means such as a monitor, not shown, of the desk terminal 18, the processing proceeds to step SP323.

At step SP323, it is determined whether or not an instruction has been issued to terminate the program table. If the termination instruction is issued after the program table is closed on the screen, or the like (when YES), this processing is terminated.

If no termination instruction has been issued (when NO), the processing proceeds to step SP323 where it is determined whether or not the rehearsal button has been depressed.

The determination as to whether or not the rehearsal button has been depressed is made by checking whether or not Rehearsal 300 in the menu bar 301 has been selected with a selecting means such as a mouse. If the rehearsal button is not depressed (when NO), the processing proceeds to step SP322.

If the rehearsal button has been depressed (when YES), the processing proceeds to step SP324 where it is determined whether or not a program has been specified for a rehearsal. This determination as to whether or not a program has been specified for a rehearsal is made by checking whether or not "(Rehearsal)" indicating that a rehearsal is specified is displayed together with the program name in the program name column 292 of the program component table. If "(Rehearsal)" is displayed (when YES), the display of specified rehearsal is erased (step SP326). If "(Rehearsal)" is not displayed (when NO), "(Rehearsal)" indicating that a rehearsal is specified is displayed in Program Name at step SP325 since there is no display, indicating that a rehearsal is specified for the program, together with the program name in the program name column 292, in spite of a program for which a rehearsal has been specified.

After the processing at steps SP326 and step 325 has been ended, the processing proceeds to step SP327 where a rehearsal set to the target program is registered in the DB server 7. Then, the processing again proceeds to step SP322 to repeat the foregoing processing.

Figure 33:
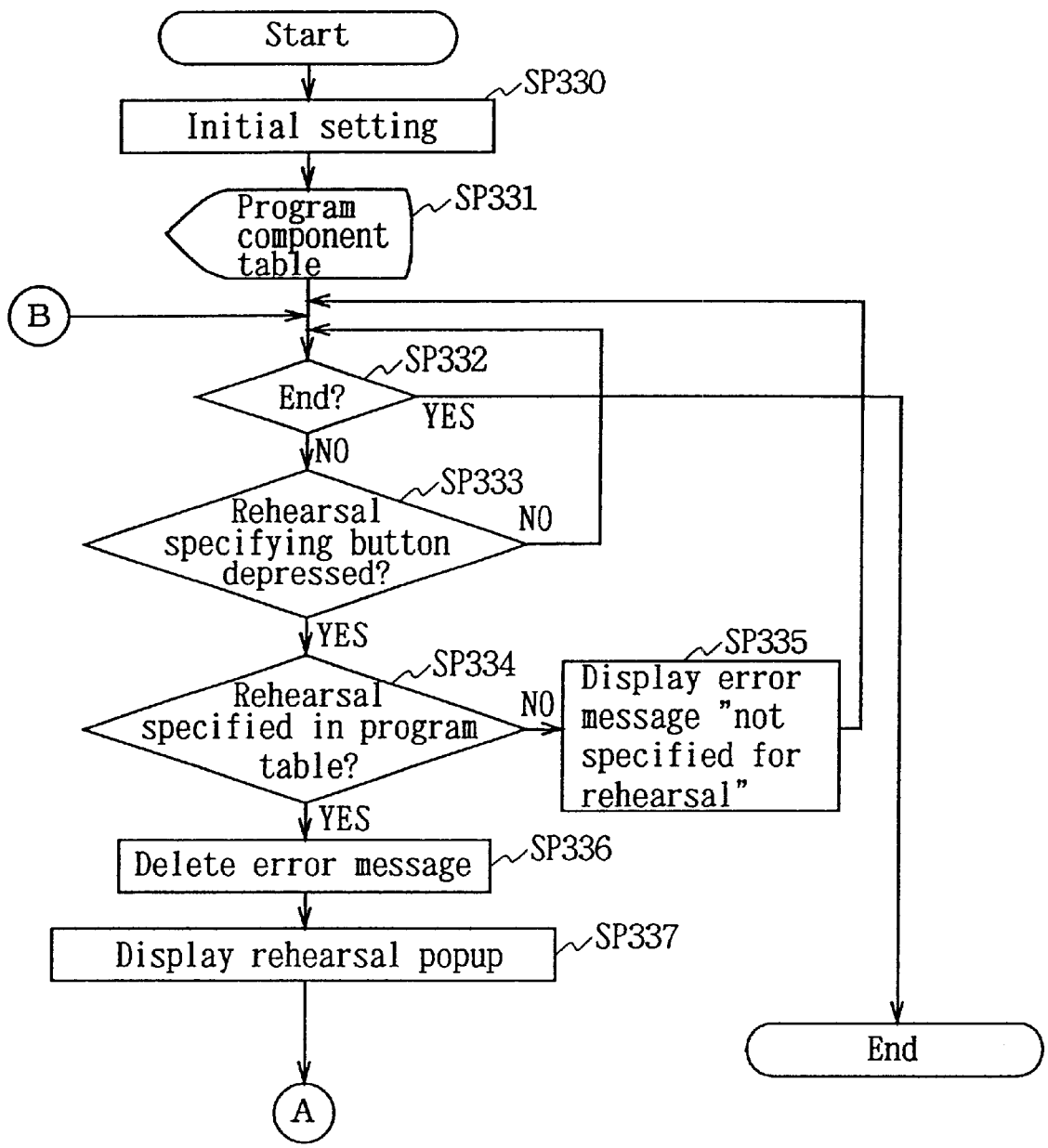
FIG. 33 is a diagram illustrating a flow chart for specifying a component or an item subjected to a partial rehearsal on a program component table.
Figure 34:
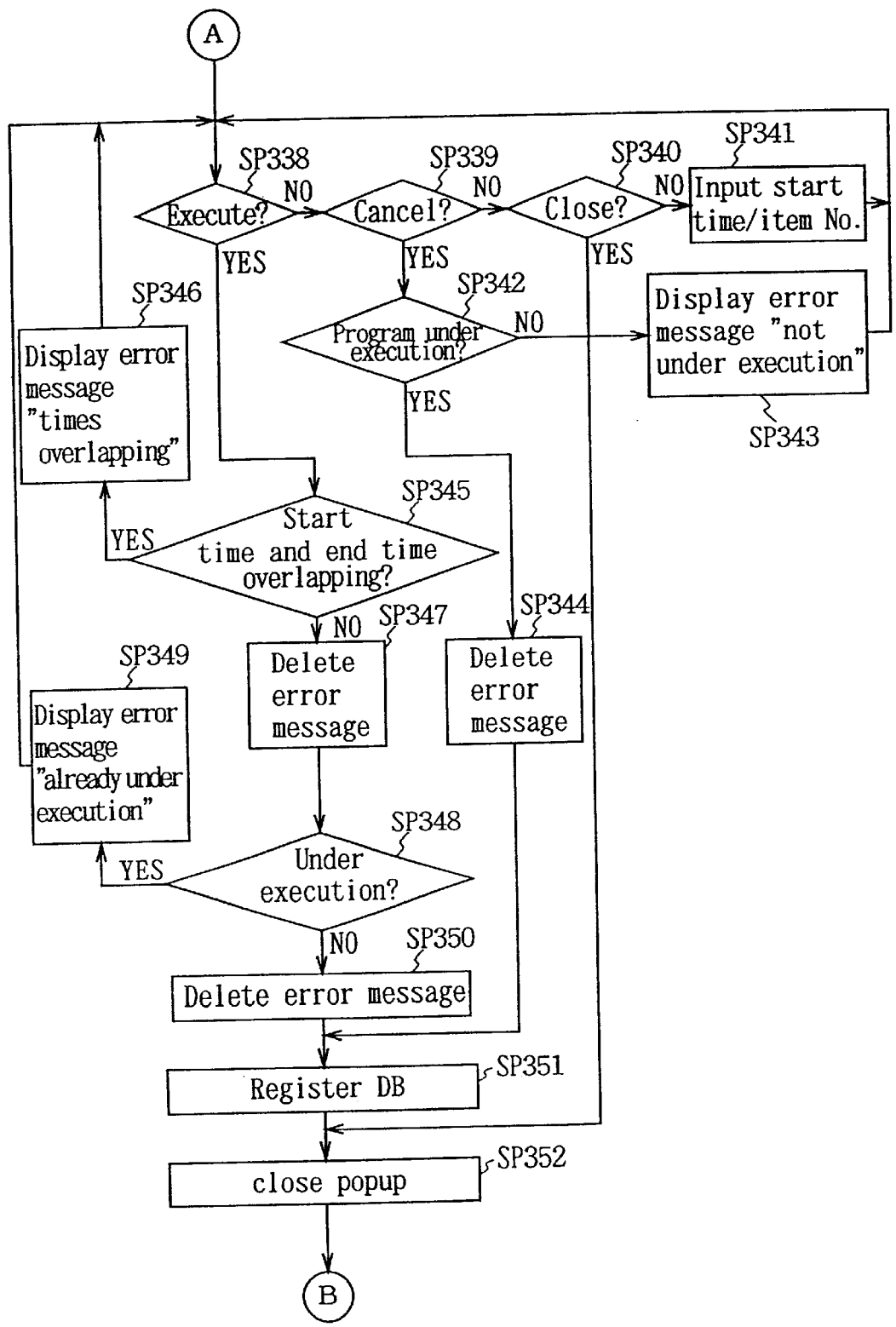
FIG. 34 is a diagram illustrating a flow chart for specifying a component or an item subjected to a partial rehearsal on a program component table.

When the rehearsal setting is completed for the target program from the program table, a rehearsal is then set for each item or component from the program component table, as illustrated in FIGS. 33 and 34.

FIGS. 33 and 34 illustrate flow charts representing a processing procedure for setting a rehearsal for each item or component from a program component table.

As illustrated in FIG. 33, when the processing procedure for setting a rehearsal on a program component table is started, initial settings are applied (step SP330), and a program component table is displayed (step SP311). It is determined at the next step SP332 whether or not an instruction is issued to terminate the displayed program component table. If a termination instruction has been issued (when YES), the rehearsal setting procedure is immediately terminated.

When no termination instruction has been issued (when NO), the processing proceeds to step SP333 where it is determined whether or not the rehearsal specifying button has been depressed. This is determined by checking whether or not Rehearsal 301 in the menu tool bar 300 has been selected in the program component table, in the manner described above.

When the rehearsal specifying button has not been depressed (when NO), the processing again proceeds to step SP332.

When the rehearsal specifying button has been depressed (when YES), the processing proceeds to step SP334.

At step SP334, it is determined whether or not a rehearsal has been specified on a program table. This is determined at this step SP334 because for setting a rehearsal on a program component table, unless a rehearsal has been specified on the program table, a rehearsal cannot be set on the program component table. Therefore, if no rehearsal has been specified (when NO), the processing proceeds to step SP335 where an error message "Rehearsal Has Not Been Specified" is displayed. This error message is displayed, for example, in a message field 92 in a lower portion of a screen on which the program component table is displayed. The error message is not particularly limited to being displayed in the message field 92, and may be displayed at any location on the screen. After the error message is displayed, the processing again proceeds to step SP332, to repeat the foregoing processing until a rehearsal is specified, as long as the program component table is not terminated.

If a rehearsal has been specified on the program table (when YES), the processing proceeds to step SP336 where, if the error message has been displayed at step SP335, the error message is erased at this step. The processing then proceeds to step SP337.

At step SP337, a rehearsal popup is displayed, followed by the processing proceeding to step SP338 illustrated in FIG. 34.

At step SP338, it is determined whether or not a rehearsal is executed with items displayed on the rehearsal popup 311. The determination as to whether or not the rehearsal is executed is made by checking whether or not the execution button 315 has been depressed on the rehearsal popup 311. If not executed (when NO), the processing proceeds to step SP339 where it is determined whether or not the rehearsal is stopped by checking whether or not the stop button 316 has been depressed on the rehearsal popup 311. If not stopped (when NO), the processing proceeds to step SP341 where a start time and/or item numbers, displayed on the rehearsal popup 311 are inputted. In other words, if the execution button 315 is not depressed (when NO at step SP338) and the stop button 316 is neither depressed (when NO at step SP339), the processing proceeds to step SP340 where it is determined whether or not the rehearsal popup 311 is closed. If the rehearsal popup 311 is not closed (when NO), the processing proceeds to step SP341 where predetermined items are inputted for the rehearsal. After necessary information has been entered in the start time field 314 and/or the Item Number 313, the processing again proceeds to step SP338.

On the other hand, if the closing of the rehearsal popup 311 is selected at step SP340 (when YES), the processing proceeds to step SP352 where the rehearsal popup 311 is closed at this step. After the popup 311 is closed, the processing again proceeds to step SP332 as illustrated in FIG. 32.

When the stop button is selected at step SP339 (when YES), the processing proceeds to step SP342 where it is determined whether or not a program, for which the rehearsal has been stopped at step SP339, is a program for which the rehearsal is currently being executed. If it is not the program for which the rehearsal is currently being executed (when NO), the processing proceeds to step SP343 where an error message "Not Executed" is displayed. This error message is displayed in the error message field 92 or the like in the program component table, as is the case of the display of the error message at step SP335 (FIG. 33), thus permitting the operator to recognize this. After the error message is displayed at step SP343, the processing again proceeds to step SP338.

On the other hand, if the a program, for which the stoppage of the rehearsal has been selected at the step 342, is being rehearsed (when YES), the processing proceeds to step SP344 where if an error message has been displayed, this error message is erased. The processing then proceeds to step SP351 where information on the specified stoppage of the rehearsal is registered in the DB server 7 through the network 8.

At step SP338, if the execution of the rehearsal is selected (when YES), the processing proceeds to step SP345 where it is determined whether or not the rehearsal start time and end time of the item, for which the execution of rehearsal has been specified, overlap with the actual broadcasting transmission time (on-air time).

If overlapping is found here (when YES), the processing proceeds to step SP346 where an error message "Time Is Overlapping" is displayed. The error message is displayed in the error message field 92 or the like in the program component table, as is the case of the aforementioned example, to permit the operator to recognize it. After the error message is displayed at step SP346, the processing proceeds to step SP338.

If the start time does not overlap with the actual on-air time at step SP345 (when NO), the processing proceeds to step SP347 where if the error message has been displayed, the error message is erased. After the displayed error message is erased at step SP347, the processing proceeds to step SP348.

At step SP348, it is determined whether or not an item or a component, for which the execution of a rehearsal has been specified, is an item or a component for which a rehearsal is being executed. If the item or the component is now put into rehearsal (when YES), the processing proceeds to step SP349 where an error message "Already Under Execution"

is displayed. The error massage is displayed in the error message field 92 or the like, as is the case of the foregoing example, to permit the operator to recognize it. If not executed at step SP348 (when NO), i.e., if the item or the component, for which the execution of rehearsal has been specified, is not now put into rehearsal, the processing proceeds to step SP350 where the displayed error message is erased. Then, the processing proceeds to step SP351 where each item for which a rehearsal has been specified is registered in the DB server 7 through the network 8. After the registration in the DB, the processing proceeds to step SP352 where the rehearsal popup 311 is closed. Then, the processing again proceeds to step SP332 (FIG. 33) to repeat the foregoing processing.

Thus, the setting for a partially specified rehearsal is completed, thereby making it possible to set a rehearsal for a target item or component or to set the stoppage of a rehearsal for an item or a component which is now being rehearsed in the program component table.

While the foregoing embodiment has been described for the case where the execution of a rehearsal is set for a plurality of consecutive items in a group, the present invention is not limited to this. For example, the execution of a rehearsal may be set, for example, for consecutive Item 1 to Item 4 in a group and consecutive Item 6 to Item 9 in a group such that the rehearsal can be executed simultaneously for these groups. In this case, for example in FIG. 31, a plurality of item input fields are provided instead of only one item number input field 313, and necessary information may be inputted in each of them to execute the rehearsal in a manner similar to the foregoing embodiment.

Also, while the foregoing embodiment has been described for the case where an item number and a start time in a program component table, comprising an item for which a rehearsal is executed, are inputted to the item number input field 313 and the start time field 314 displayed on the rehearsal popup 311, the present invention however is not limited to this. Alternatively, a rehearsal may be set by manipulating Item Name 171 in the program component table corresponding to a target item with a manipulation means such as a mouse. In this way, a rehearsal can be set for each item or component through simple input manipulations, while still producing similar effects to those in the foregoing 22 embodiment.

Further, while in the foregoing embodiment, a rehearsal can be set in items, a rehearsal may be set in components of a program, in which case similar effects to those in the foregoing embodiment can be produced.

As has been described in Section (1-1) General Configuration of News Program Production and Transmission Apparatus, a cue sheet is created in the transmission equipment control section 5 based on a program component table created in the news program production support section 2. Specifically, a program component table created on the desk terminal 18 in the news program production support section 2 is inputted to the transmission equipment control terminal 31 and the cue sheet terminal 39, and a cue sheet is created based on this program component table. Of course, the cue sheet may be created on a variety of terminals constituting the transmission equipment control section 5 or in a variety of terminals other than those in the transmission equipment control section 5 as long as the cue sheet is created based on the program component table. Further, a cue sheet may be created together with a program component table in the news program production support section 2. This is because a variety of terminals constituting the news program production and transmission apparatus 1 are all interconnected through the network 8, so that a program component table can be fetched into the variety of terminals through this network 8.

A cue sheet refers to a program progress table for indicating what is broadcast when and in which program organization within a broadcast time period. An example of a cue sheet displayed on a screen is illustrated in FIG. 3(C). This screen is displayed mainly on a display means such as a monitor, not shown, of the cue. sheet terminal 39 in the transmission equipment control section 5. Actually, video and audio data are sequentially transmitted based on this cue sheet from the on-air server 22, VTR 35, camera 38, CG transmitter 37 through the switcher 30.

Details on the cue sheet screen will be described with reference to FIG. 3(C).

The cue sheet, as a whole, displays a transmission start time, a transmission duration and so on for each item or component of a certain program, similarly to the program component table. In addition, an item list is displayed simultaneously.

In an upper portion, the cue sheet screen 950 comprises a program name display field 965 in which the name of a program is entered; a transmission mode display field 966 for indicating whether this program is a program transmitted from a Local broadcasting station or a program transmitted from a Net broadcasting station; a program broadcasting date and time field 967 for indicating the broadcasting date and broadcasting time zone of the program; an operation mode display field 968 for displaying an operation mode of the program to be broadcast, i.e., automatic TAKE, TAKE and so on; a current time field 969 for displaying the current time; and display field 970 for displaying a delay time or an advance time of the program. Within these, the operation mode such as automatic TAKE, TAKE and so on will be described later.

In the example illustrated in FIG. 3(C), "Wrap Up Time Today" is found in the program name field 965. The transmission mode of this program is transmission from a "Local" station, as can be seen in the transmission mode field 966. The broadcasting date and time is indicated as "May 10, 1996 (Friday) 08:00:00~08:25:00" or this program is broadcast on Friday May 10, 1996 in a broadcasting time from 8 o'clock 0 minute 0 second in the morning to 8 o'clock 25 minutes 0 second in the morning. The operation mode is set to "TAKE operation." The current time is indicated as "96/05/10 08:00:15" or at 8 o'clock 0 minute 15 seconds in the morning on Friday May 10, 1996. A delay or advance time of this program is indicated as "00 minute 00 second," that is, the program is going on just as displayed in the cue sheet without delay or advance.

Provided below these display fields are an item number column 952 for displaying an item number for each item in the form of table; an item name/duration column 953 for displaying an item name of each item and a transmission duration of each item; a contents column 954 for adding the contents of each item; a duration column 955 for indicating a transmission duration of each item; a video column 956 for indicating what a video image of each item is like, for example, whether an NV material, which is a video in a collected news material, or a video image in a studio; a special effect display column 957 for displaying the contents of a variety of special effects applied to each item; a K column 958 for indicating that a material desired to be automatically transmitted irrespective of the progress of the program is found at that item position; a scroll bar 959 for scrolling the cue sheet 950 on the screen; and a start time column 951 for indicating a broadcasting start time of each item. The K column 958 will be described later.

In the cue sheet screen illustrated in FIG. 3(C), for example, Item Number 952 "1" includes an item of Item Name 953 "Headline 1: Earthquake Countermeasure Committee." The broadcasting start time of this item is at "08:00:00" or at 6 o'clock 0 minute 0 second in the morning; a broadcasting duration of this item is shown as "00:10" or ten seconds; Video 956 is shown as "NV Earthquake Countermeasures," i.e., an NV (News Video) material previously provided in news collection, and including video images utilizing "CG" or computer graphics; and Audio 957 is shown to be an NV material similar to Video 956.

Further on the right side, an item list 960 is displayed.

This item list serves as a field for displaying a list of program items for viewing a list of respective items on the cue sheet screen which cannot be displayed on the screen.

The item list is composed of an item number column 963; an item name column 964; and scroll buttons 961, 962 for scrolling the list on the screen. The item number column 963 and the item name column 964 correspond to the item number column 952 and the item name display column 953 displayed in the form of table, respectively.

Below the cue sheet screen, a function button field 971 is provided for executing a variety of functions. On the right of this function button field 971, a message field 972 is provided for displaying a message associated with the cue sheet.

The cue sheet as described above is created in the transmission equipment control section 5 based on a program component table created on the desk terminal 18 of the news program production support section 2, and displayed on a display means such as a monitor, not shown, of the cue sheet terminal 39. The cue sheet data created on the cue sheet terminal 39 or the like is inputted to the equipment control unit 32 through the transmission equipment control terminal 31 of the transmission equipment control section 5 to control the switcher/mixer 30, the on-air server 22 and so on, which are fed with material data including video data and audio data actually used in the broadcasting, thus transmitting materials for items and components described in the cue sheet during the broadcasting.

The transmission equipment control section 5 sequentially executes items and components, which are minimum units of a program, based on the cue sheet, in which case a timing trigger for the execution is TAKE switch data outputted from a trigger unit 55 and internal clock data outputted from a clock 33. Specifically, scheduled program data described on the cue sheet are executed in sequence based on the TAKE switch data and the internal clock data. Then, the transmission equipment control section 5 transfers a control signal to controlled equipment in response to this timing trigger to control the controlled equipment. Also, a new cue sheet is displayed on terminals corresponding to the progress of the program organization.

In this embodiment, description will follow, assuming that controlled equipment controlled by the transmission equipment control section 5 are the on-air server 22 and the switcher/mixer 30. As illustrated in FIG. 1. Of course, other than those, when an editor, a VCR (Video Cassette Recorder), and a cassette automatic changer for accommodating a large number of cassettes storing materials to select a desired cassette as required for transmitting materials are used as transmission equipment, the transmission control section 5 can also control these devices as controlled equipment.

The TAKE switch data is a switch data for executing the aforementioned items and components through manual manipulations. Thus, items and components, for which a TAKE operation has been specified, are respectively executed in response to a trigger from a TAKE switch, serving as the trigger 55. For items and components, for which an automatic operation has been specified, when such an item or a component is entered, a count is started in accordance with clock data from the clock 33 serving as an internal clock, and the trigger 55 automatically issues a TAKE trigger after the lapse of a predetermined time to execute the next item or component.

In this way, a program normally includes a mixture of items and components which are preferably executed in response to a trigger from the operator, and items and components which are preferably executed automatically. Conventionally, a selection can be made only for each program between the TAKE operation for execution in response to a trigger from the operator and the automatic operation for automatically executing a program.

When the selection is made for each program, the TAKE operation must be performed for all items in each program if the same manipulations are to be executed every day in the same program, thereby imposing quite laborious manipulations on the operator. When a live program is broadcast, the operator will be charged with so much burdens that the operator is likely to manipulate erroneously.

The present invention enables one of two kinds of operations, i.e., the TAKE operation and the automatic operation to be specified for each of items or components in a program, and provides a display for this on the aforementioned program component table and cue sheet.

Examples of the display are conceptually shown in FIGS. 35 and 36.

FIG. 35 indicates the TAKE operation or the automatic operation for each component on a program component table. A component duration column 354 of each component displays a transmission duration of each component that is accompanied with an underline displayed therebelow. This component displayed with the underline indicates an automatic operation mode which does not require a manual operation of the operator. On the other hand, a component having a component duration without underline indicates a TAKE operation mode which requires a manual TAKE operation.

In the example of FIG. 35, "Component 1" started at "18:00:00" or at 6 o'clock in the evening is executed in the manual TAKE mode. Specifically, "Component 1" is executed when the operator manually manipulates the TAKE switch. Then, as the TAKE operation is performed for executing "Component 1," a TAKE signal is automatically sent from the trigger 55 after "00:05" or five seconds, which is the component duration of "Component 1," to automatically execute "Component 2." Further, since "Component 2" also has a component duration displayed in the component duration column 354 with underline, the next "Component 3" is also automatically executed. Specifically, after a component duration "00:05" or five seconds of "Component 2" from the start time "18:00:05" of "Component 2" or from 6 o'clock 0 minute 5 seconds, a TAKE signal is sent from the trigger 55 to automatically execute the next "Component 3." Since the next "Component 3" does not have an underlined component duration displayed in the component duration column 354, a TAKE signal is sent from the trigger 55 in the TAKE operation mode, i.e., by manually manipulating the TAKE switch.

The program component table is also provided with a column 356 for displaying whether or not the TAKE operation is required for executing a component, thus indicating whether each component is in TAKE operation mode or in automatic operation mode.

In the example of FIG. 35, "Manual TAKE Required" is displayed since the manual TAKE is required for executing "Component 1," and "Manual TAKE Not Required" is displayed since the TAKE signal is automatically sent in "Component 1" for executing "Component 2," thus permitting the operator to readily recognize the TAKE operation mode or the automatic operation mode.

Next, an example of displaying whether the TAKE operation mode or the automatic operation mode on a cue sheet will be described with reference to FIG. 36.

The cue sheet can also display whether each component is in TAKE operation mode or in automatic operation mode similarly to the program component table. Likewise, in this case, a component duration of each component in a component duration column 362 is displayed with an underline if the component is set in automatic operation mode, i.e., if the component does not require manual TAKE, thus permitting the operator to recognize the operation mode. On the other hand, a component which does not have an underlined component duration in the component duration column 362 indicates that this component is in TAKE operation mode which requires a manual TAKE operation.

As described above, since the manual TAKE operation mode or the automatic operation mode is displayed for each component or item on the program component table or the cue sheet, and executed for each component or item, the operator's manipulation is facilitated and the operator is less burdened, thus eliminating troubles during transmission due to erroneous manipulations.

Next, description will be made on a method of setting the TAKE operation mode and the automatic operation mode on a screen on which a program component table or a cue sheet is displayed in the foregoing manner.

Assume first that all items and components in a program are operated in manual TAKE mode. Then, a popup is displayed with a "Fixed DUR" button on the screen for each item and each component to input necessary information for switching a desired item or component from the manual TAKE mode to the automatic operation mode, thus setting the TAKE operation mode and the automatic operation mode. Of course, it is contemplated that when an overall program is operated in automatic operation mode, a predetermined button or the like is selected to display each item in a popup style, and necessary information is entered therein to switch each item or component from the automatic operation mode to the manual TAKE operation mode. It is also contemplated that each item or component in a program is switched between the manual TAKE mode and the automatic operation mode irrespective of whether an overall program is in manual TAKE mode or in automatic operation mode. However, it is also contemplated that if such switching is performed in items or components of a program, the operator will be forced to switch all items and components, resulting in an increase in work time. This embodiment will be described in connection with switching to the automatic operation for each component or item in a program using the "Fixed DUR" button when the overall program is operated in manual TAKE mode.

This method of changing the operation mode using the "Fixed DUR" button may be implemented in a program component table. Although detailed description is omitted here, it is also contemplated that the operation mode may be changed using the fixed DUR button also on a cue sheet screen.

FIG. 37 illustrates an example of a program component table displayed on a press terminal or the desk terminal 13 in the news program production support section 2.

A fixed DUR button 371 is displayed on this program component table on the screen for displaying a fixed DUR popup. The number of an item or a component (Item No. or Component No.), which is to be automatically operated, is selected on the program component table with a selecting means such as a mouse, and the fixed DUR button 371 is selected to display a fixed DUR popup 381 illustrated in FIG. 38. For reference, a selected item or component is distinguished from the rest of items by changing a background color.

Figure 38:
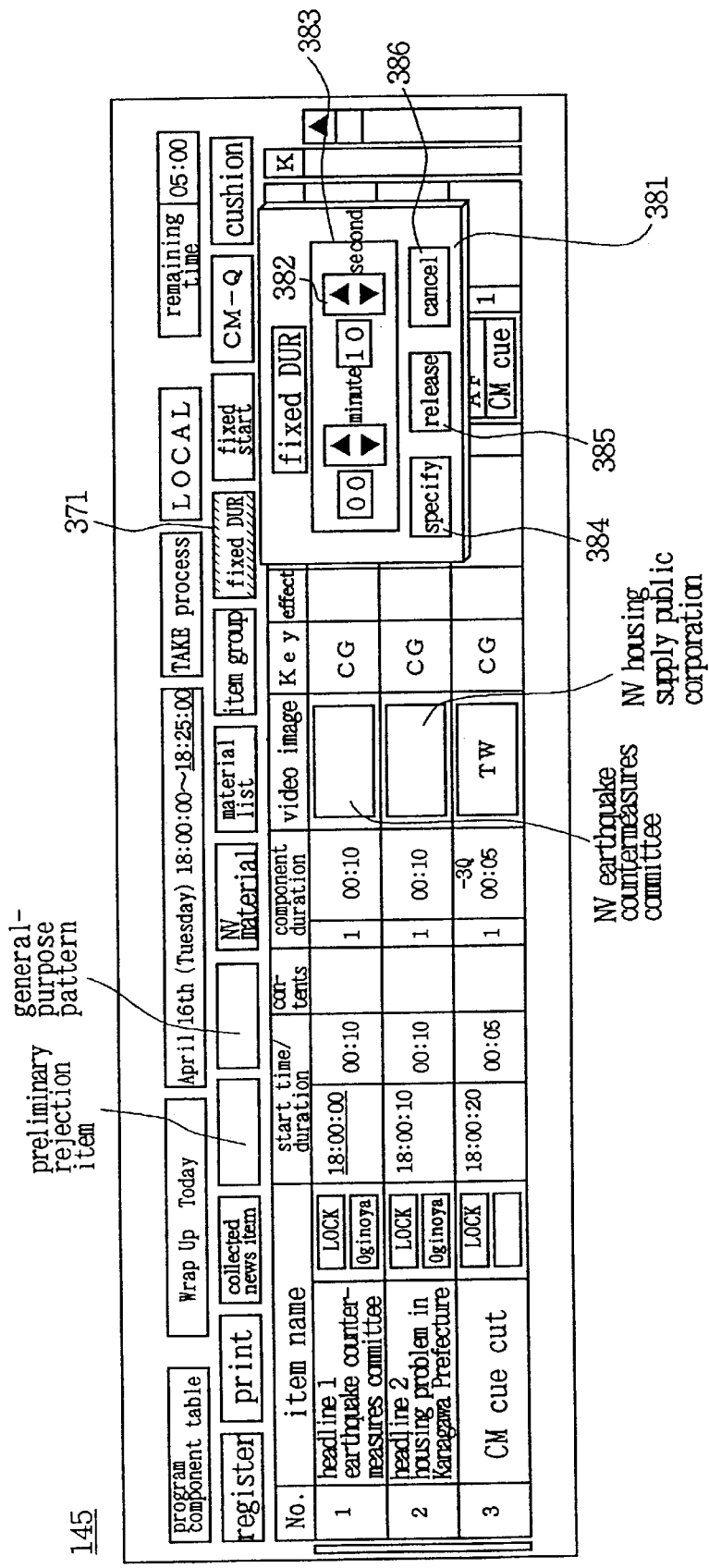
FIG. 38 is an example of a popup on which a component and an item to be set in automatic operation mode have been specified for specifying a time.

As illustrated in FIG. 38, the fixed DUR popup 381 comprises a time display window 383; a specify button 384; a release button 385; and a cancel button 386.

A time adjust button 382 is displayed in the time display window 383 for inputting a time at which a specified component or item is to be automatically operated. In the example of FIG. 38, the automatic operation mode is entered after ten seconds from the start time of Item Number 1 (Item Name "Headline 1: Earthquake Countermeasure Committee").

The specify button 384 is specifying by manipulating or depressing this button 384 with a manipulation means such as a mouse on the screen after necessary information has all been inputted, when an item or a component is to be switched to the automatic operation mode with the inputted information.

The release button 385 is manipulated when a component or an item in a program, which has been specified in automatic operation mode, is released, that is,.when an item or a component specified in automatic operation mode is released to the manual operation mode. The automatic operation mode can be released by a manipulation such as depressing on the button 385 with a manipulation means such as a mouse.

The cancel button 386 is a button for closing the fixed DUR popup 381 displayed in a popup style. Its manipulation is similar to the above-mentioned specify button 384 and release button 385.

Figure 39:
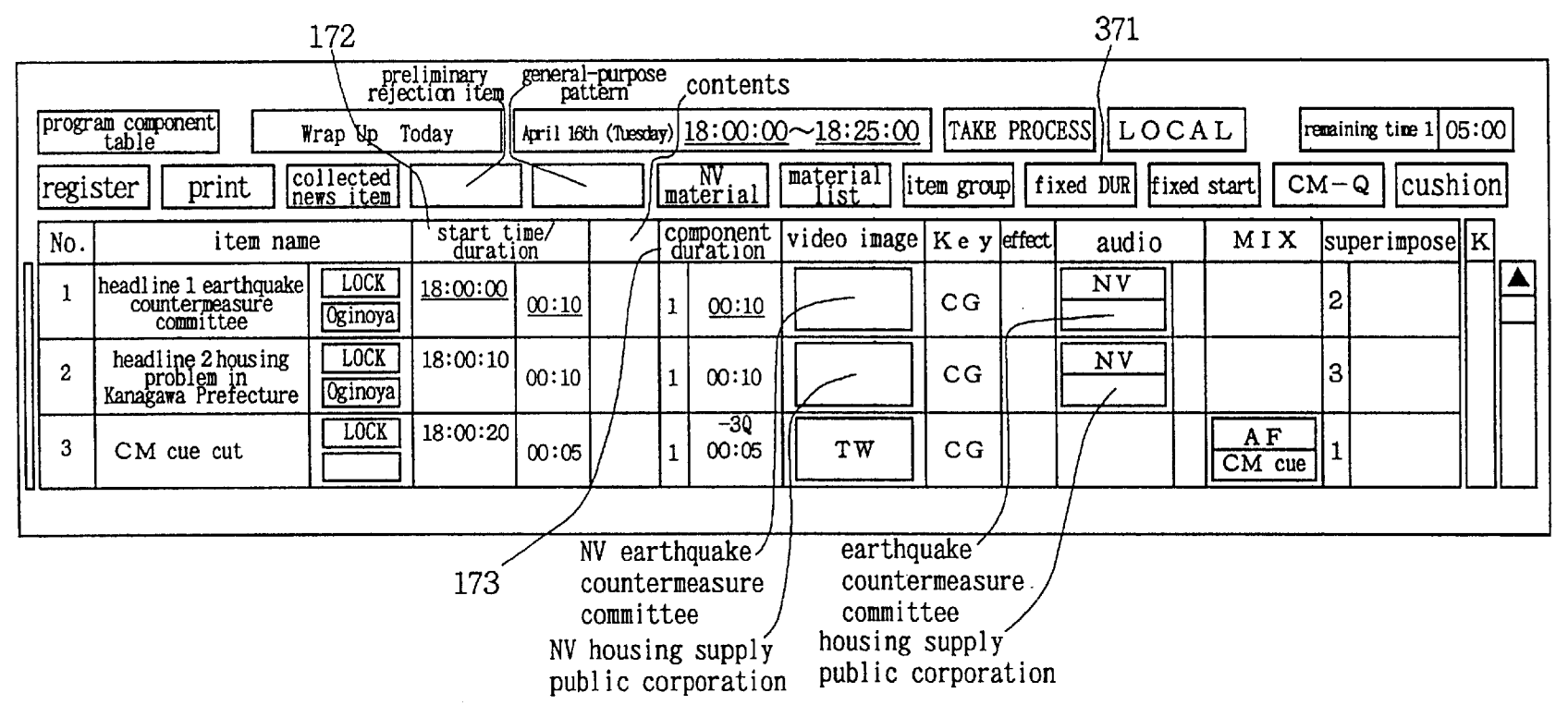

When necessary information is inputted on the fixed DUR popup 381 and the displayed popup 381 is closed, an underline 173 is displayed below a component duration displayed in a component duration column 173 of a specified item, as illustrated in FIG. 39. In addition, the item specified in automatic operation mode is displayed on the program component table. When a plurality of components forming an item have all been specified in automatic operation mode in the aforementioned method, the item duration displayed in the start time column 172 is also accompanied with an underline 172. In the example of FIG. 39, an item with Item Number 1 (Item Name "Headline 1: Earthquake Countermeasure Committee") has a single component which has been specified in fixed DUR or automatic operation mode, so that an underline is displayed below an item duration in the start time column 172 for indicating the automatic operation mode.

Figure 40:
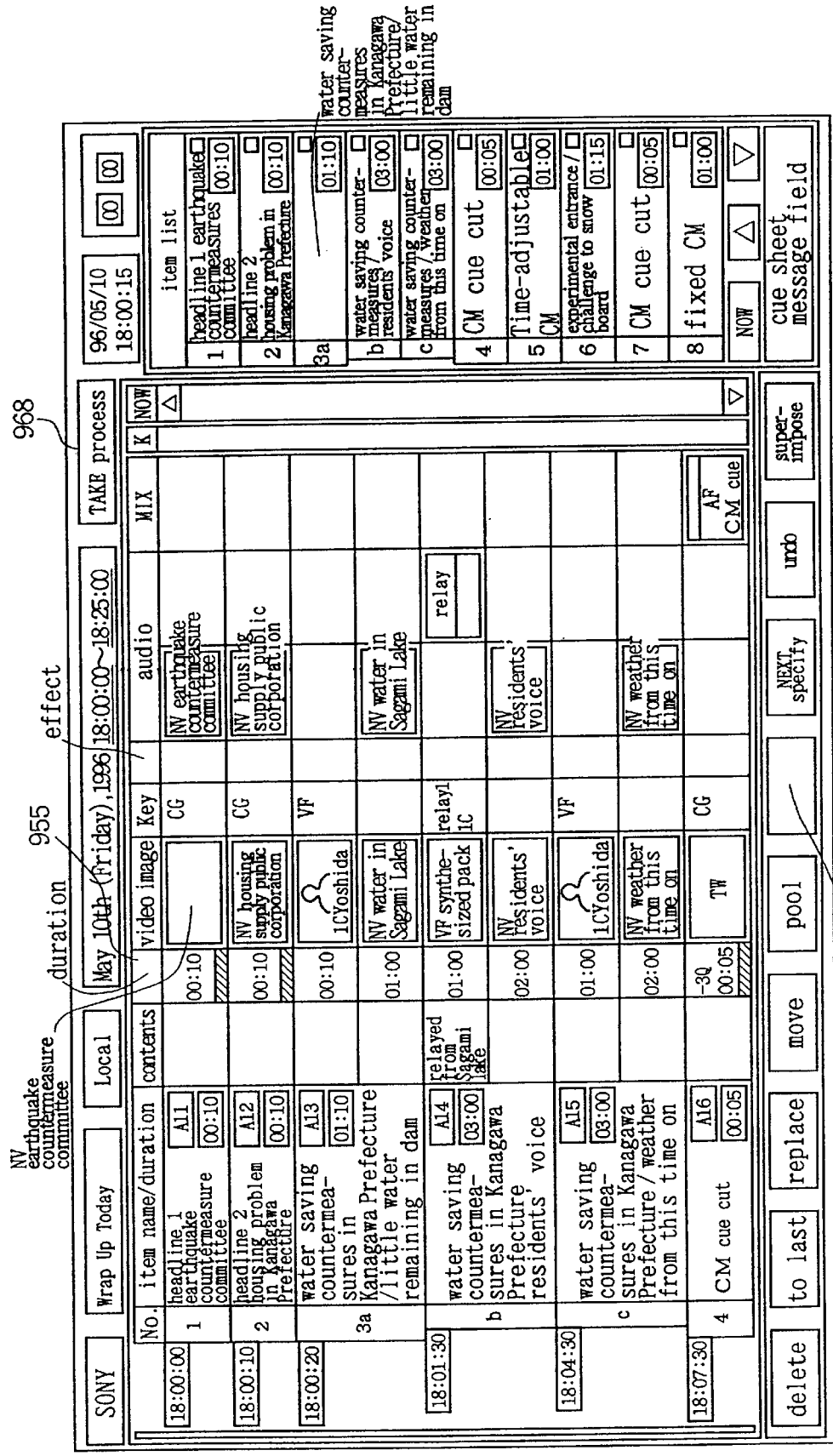
FIG. 40 is a diagram illustrating an example of a cue sheet comprising components and items for which the automatic operation mode has been specified.

FIG. 40 illustrates an example of a cue sheet screen comprising items which have been specified in automatic operation mode.

As illustrated in FIG. 40, an operation mode field 968 displays "TAKE Operation" indicating that the overall program is in manual TAKE mode. Component durations of respective items are displayed with an underline in a duration column 955 of Item Number 1 (Item Name "Headline 1: Earthquake Countermeasure Committee), Component Number 2 (Item Name "Headline 2: Housing Problem in Kanagawa Prefecture") and so on, thus indicating that these items are specified in automatic operation mode, as described above.

Next, the operation for specifying an operation mode for each of the above-mentioned items and components will be described with reference to FIG. 41.

Figure 41:
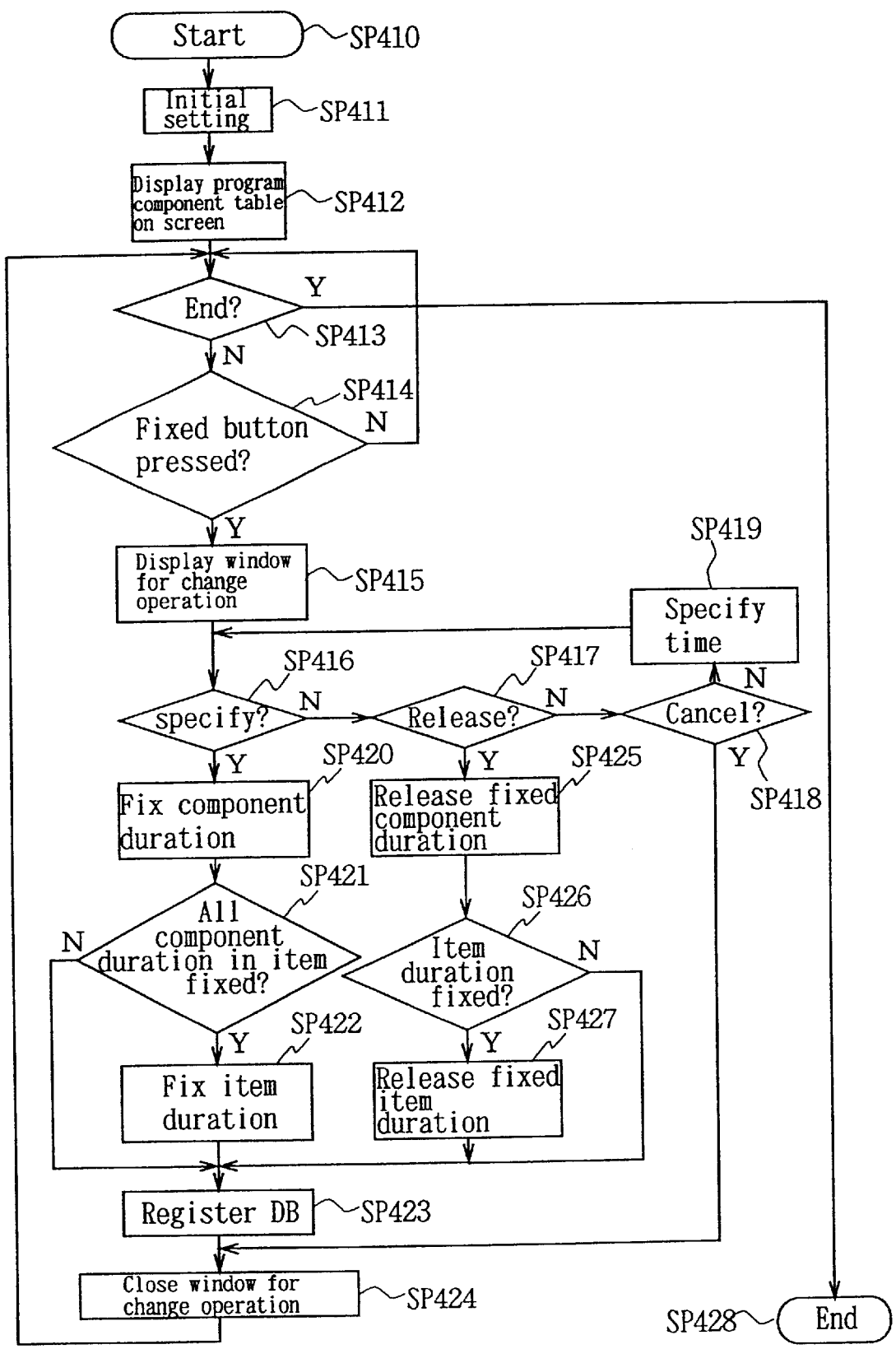
FIG. 41 is a diagram illustrating an example of a flow chart for specifying the automatic operation mode.

FIG. 41 illustrates a flow chart representing a processing procedure for specifying the above-mentioned operation mode.

As the processing for specifying an operation mode is started (step SP410), initial settings are applied (step SP411).

Next, the processing proceeds to step SP412 where a program component table is displayed on a terminal. In this case, since the program component table is displayed, it is displayed on the desk terminal 18 in the news program production support section 2. Of course, since the remaining terminals other than the desk terminal 18 are connected through the network 8, the program component table may also be displayed at step SP142 on any terminal other than the desk terminal 18, for example, on a sub-input terminal 34 in the transmission equipment control section 5. However, described in the following is an example in which the program component table is displayed on the desk terminal 18 for executing the following processing.

After the program component table is displayed on the desk terminal 18, the processing proceeds to step SP413 where it is determined whether or not the display of the program component table is terminated. If not terminated (when NO), the processing proceeds to step SP414.

At step SP414, it is determined whether or not a fixed DUR button has been depressed. As illustrated in FIG. 37, the fixed DUR button 371 is displayed together with the program component table, and the determination is made by checking whether or not this button 371 has been depressed on the screen with a manipulation means such as a mouse.

When the fixed DUR button has been depressed (when YES), a fixed DUR popup is displayed. As previously described in connection with FIG. 38, the fixed DUR popup 381 is displayed together with the program component table. Next, the processing proceeds to step SP416.

At step SP416, it is determined whether or not a specify button has been depressed. This determination is made by checking whether or not the specify button 384 has been depressed on the screen with a manipulation means such as a mouse on the fixed DUR popup 381. If the specify button 384 has not been depressed (when NO), the processing proceeds to step SP417.

At step SP417, it is determined whether or not a release button has been depressed. This is determined likewise by checking whether or not the release button 385 has been depressed on the screen with a manipulation means such as a mouse on the fixed DUR popup 381.

If the release button has not been depressed (when NO), the processing proceeds to step SP418 where it is determined whether or not Cancel has been depressed. This is determined likewise by checking whether or not the cancel button 386 has been depressed on the popup 381.

If the cancel button 386 has not been depressed (when NO), a desired time displayed in the time display window 383 is specified on the popup 381 (step SP419).

A time is specified by inputting necessary information with the time adjust button 382 using a manipulation means such as a mouse, a keyboard or the like to fix an automatic operation time for an item which is to be specified in automatic operation mode. The processing then proceeds again to step SP416.

On the other hand, if the specify button is depressed at step SP416, the processing proceeds to step SP420 where the component duration is fixed, and the duration is displayed with an underline in the component duration column 173 of the program component table. Next, the processing proceeds to step SP421.

At step SP421, it is determined whether or not all components in an item have been specified in fixed DUR. This determination is made by checking whether or not necessary information has been inputted for all components in an item on the popup 381, and they have been specified in automatic operation mode, i.e., fixed DUR. If all the components in the item have been specified in fixed DUR (when YES), the processing proceeds to step SP422 where the item duration is fixed. At this step, the item duration displayed in the start time column 172 of the program component table is accompanied with an underline, thus indicating that all the components in the item have been specified in fixed DUR, i.e., in automatic operation mode. Then, the processing proceeds to step SP423.

On the other hand, when all the components in the item have not been specified in fixed DUR at step SP421 (when NO), the processing proceeds to step SP423.

At step SP423, the above-mentioned information on items and components, for which the item duration has been fixed, are stored and registered in the DB server 7 through the network 8. Then, the processing proceeds to step SP424 where the fixed DUR popup 381, displayed at step SP415, is closed. Afterwards, the processing again proceeds to step SP413.

On the other hand, if the release button is depressed at step SP417 (when YES), fixed DUR of component durations of selected items and components, i.e., the specified automatic operation mode is released (step SP425), and the processing proceeds to the next step SP426.

At step SP246, it is determined whether or not the item duration has been fixed. If the item duration has been fixed (when YES), the fixation of the item duration is released (step SP427). If the item duration has not been fixed (when NO), the processing proceeds to step SP423. After the fixation of the item duration is released at step SP427 (step SPS427), the processing proceeds likewise to step SP423 where the released automatic operation mode is registered in the DB server 7.

On the other hand, if the cancel button 418 is depressed at step SP418 (when YES), the processing proceeds to step SP424: where the displayed popup 381 is closed.

As described above, by switching each component or item in a program between the automatic operation mode and the manual TAKE mode, the operation mode is displayed for each component or item on the cue sheet, thus facilitating manipulations when the program is transmitted. Since the operator is less burdened with manipulations, troubles during transmission due to erroneous manipulations will be reduced. Also, while the on-air broadcasting, if operated manually, involves very complicated manual manipulations, the on-air broadcasting can be precisely realized without requiring any manipulations.

While in the foregoing embodiment, the fixed DUR popup is displayed on a separate window simultaneously with the program component table for specifying the automatic operation mode, an operation mode specify column may be provided for each item or component in the program component table such that necessary information is inputted thereto with a manipulation means such as a keyboard, a mouse or the like to specify an operation mode for each item or component. In addition, for distinguishing from the program component table, the program component table may be closed once when the fixed DUR popup is displayed so as to only display the fixed DUR popup on the screen.

Further, while in the foregoing embodiment, the operation mode is specified on the program component table, the operation mode may also be specified on a cue sheet screen for each item or component in the manner described above.

As described above, respective components and items in a program are executed and broadcast on the air through automatic manipulations in accordance with the cue sheet, without relaying on the operator's manual TAKE operation or the operator's manual manipulations.

In such transmission, start times and so on previously displayed on the cue sheet may be slightly delayed or advanced depending on the progress of the program. Particularly, during live broadcasting, a program is not always progressed as described in a cue sheet (or described in a program component table).

However, in some cases, an arbitrary video or audio material is preferably transmitted at a determined time irrespective of such delay or advance of a program.

For example, there may be a case where back ground music (BGM) is provided or a telop of a program is displayed before several minutes (or several seconds) from the end of the program irrespective of the progress of the program.

Such a material, which is to be transmitted without fail at a fixed time, has been manually transmitted through the operator's manual TAKE operation or the like. For this reason, the on-air transmission cannot always be carried out as instructed by a program producer due to erroneous manual manipulations causing a failure in providing BGM or displaying a telop at a predetermined time, due to an improper manual transmission timing resulting in only a portion of the telop being displayed during the program, and so on.

In the present invention, taking into account such a situation, an input column is provided in a program component table for each of items and components (or materials such as video and audio) which are to be automatically started at predetermined fixed times irrespective of the progress or delay and advance of programs, and this information is displayed not only on the program component table but also on a cue sheet.

In the following, detailed description will be given with reference to FIGS. 42–46.

As illustrated in FIG. 42, the program component table includes a K column 429. This K column 429 is specified for each item such that materials, which are to be automatically started irrespective of the progress of programs as mentioned above, can be automatically started within the item.

By selecting or clicking a selecting means such as a mouse on an item position of the K-column 429, which is to be automatically started, on the screen, a K-setting popup 430 is displayed as illustrated in FIG. 43. Then, necessary information is entered on this popup 430 to enable an entered arbitrary material to be automatically transmitted at the position of the item specified in the K column 429 irrespective of the progress of programs.

As illustrated in FIG. 43, the K-setting popup 430 displays Item Number 431 for each item to be automatically transmitted, and is composed, for each Item Number 431, of a start time/duration column 432 for entering a time at which automatic start is desired and its transmission duration; a K-setting image column 433 for entering a video icon which is the same kind of video icon displayed in the video column 174 of the program component table; a K-setting audio column 434 for entering an audio icon which is the same kind of audio icon displayed in the audio column 177 of the program component table; a false start column 435 for indicating that start of an audio material or the like is performed; and a close button 436 for closing the K-setting popup 430.

For reference, the example of FIG. 43 shows that K-setting is performed to Item Number "15" (Item Name "Ending") in the program component table; Audio "AF" (indicating an audio file. This is, for example, an audio file recorded in the on-air server 22, and similar to that displayed by the program material popup 182 on the program component table of FIG. 18) is transmitted for "00:15" or 15 seconds from the start time "18:24:45" or 6 o'clock 24 minutes 45 seconds within this item; and this material is transmitted by false start.

Each of these items may be inputted by inputting necessary information with an input means such as a keyboard, a mouse or the like. When necessary information has been inputted, the popup 430 is closed by a manipulation such as clicking of the close button 436 on the popup 430 with a manipulation means such as a mouse on the screen.

Figure 44:
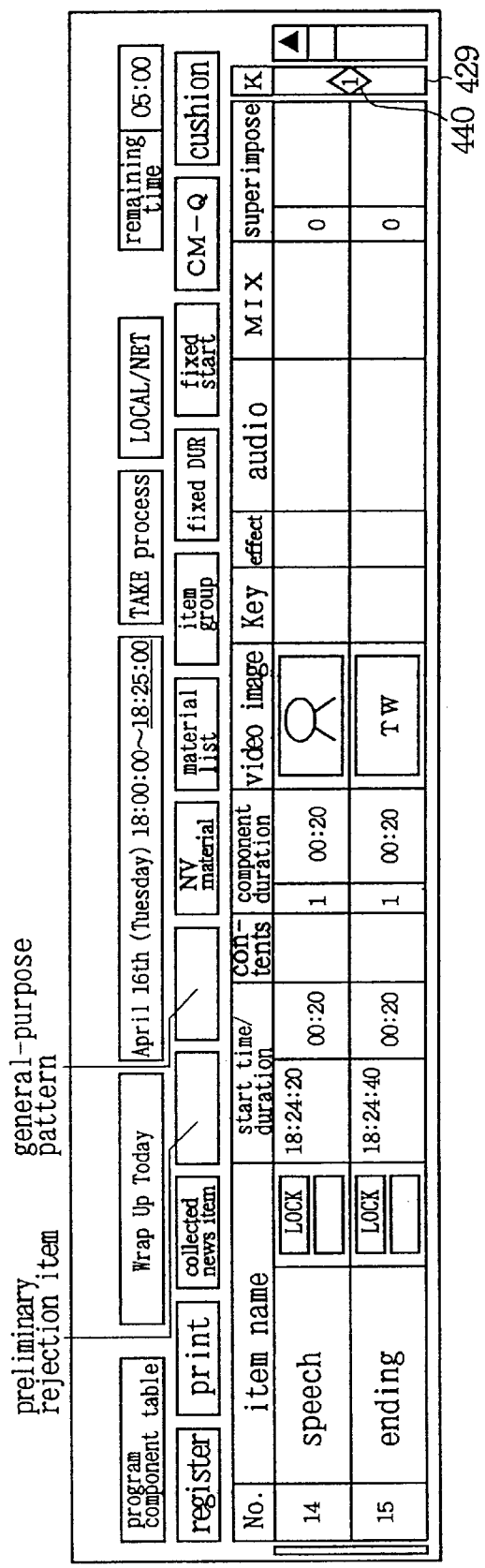
FIG. 44 is a diagram illustrating an example of a program component table on which a material to be automatically started has been selected.

After necessary K-setting manipulations have been completed, a display 440 indicative of the K-setting is displayed in the K-column 429 of the program component table, as illustrated in FIG. 44. In FIG. 44, a rhomb is displayed. In addition, a number ("1") indicative of how many K-settings have been performed in one program is also added. This corresponds to the number which has been entered in the item number field 431, of the K-setting popup 430.

Figure 45:
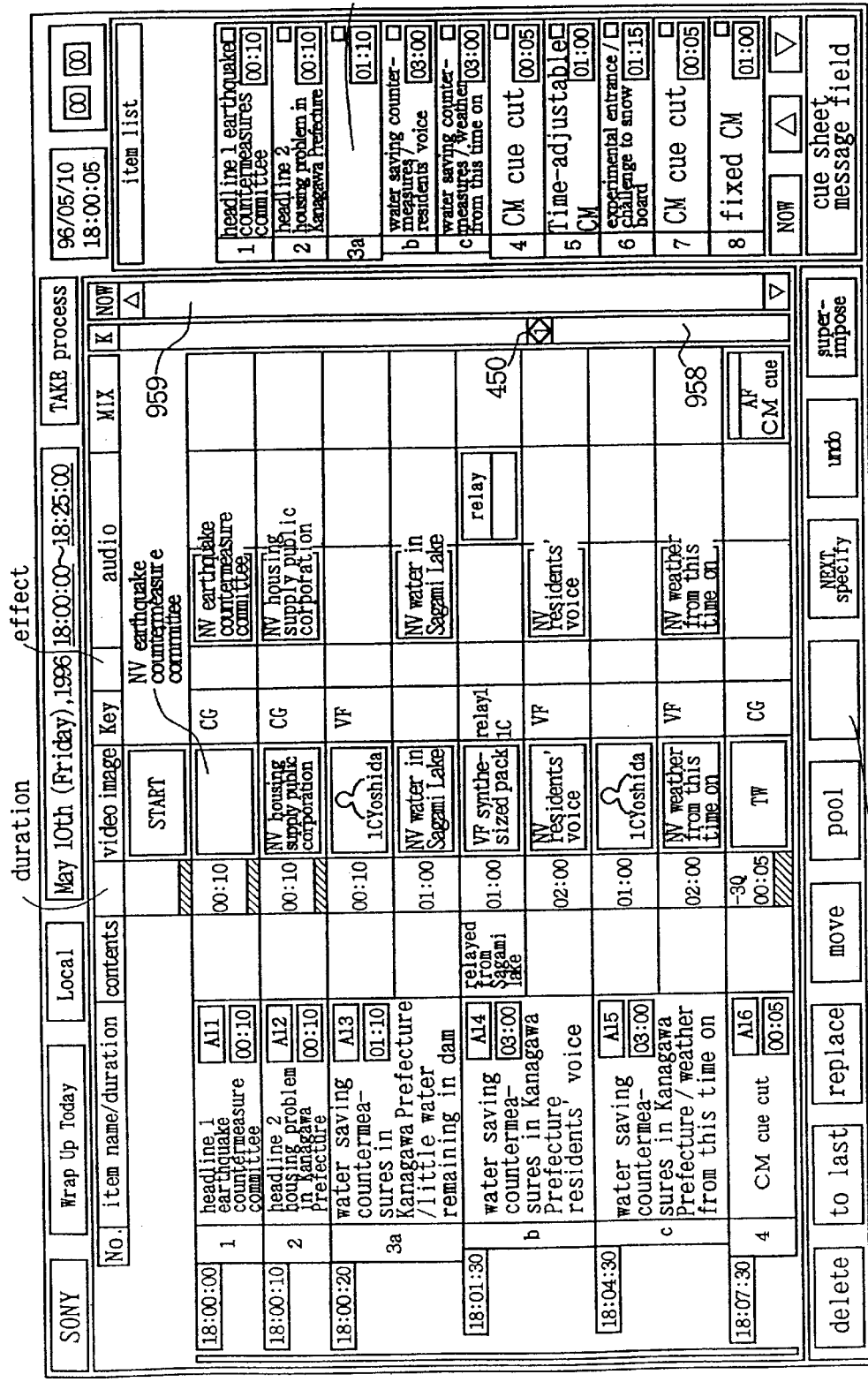
FIG. 45 is a diagram illustrating an example of a cue sheet on which a material to be automatically started has been selected.

FIG. 45 illustrates an example of a cue sheet screen corresponding to the program component table in which the K-setting has been performed. In FIG. 45, a display 450 is given to indicate that a material, which is desired to be automatically transmitted irrespective of the progress of programs, has been specified (K-set) in the second component of Item Number "3b" (Item Name "Water Saving Countermeasures in Kanagawa Prefecture: Residents' Voices"), as indicated in the K column 958. This is also accompanied with the number ("1" in the example of FIG. 45) similarly to the program component table, and is a number corresponding to the item number set in the program component table. Thus, the operator can recognize from this number which material from the beginning in a program has been specified (or how many materials have been specified) also on the cue sheet.

Figure 46:
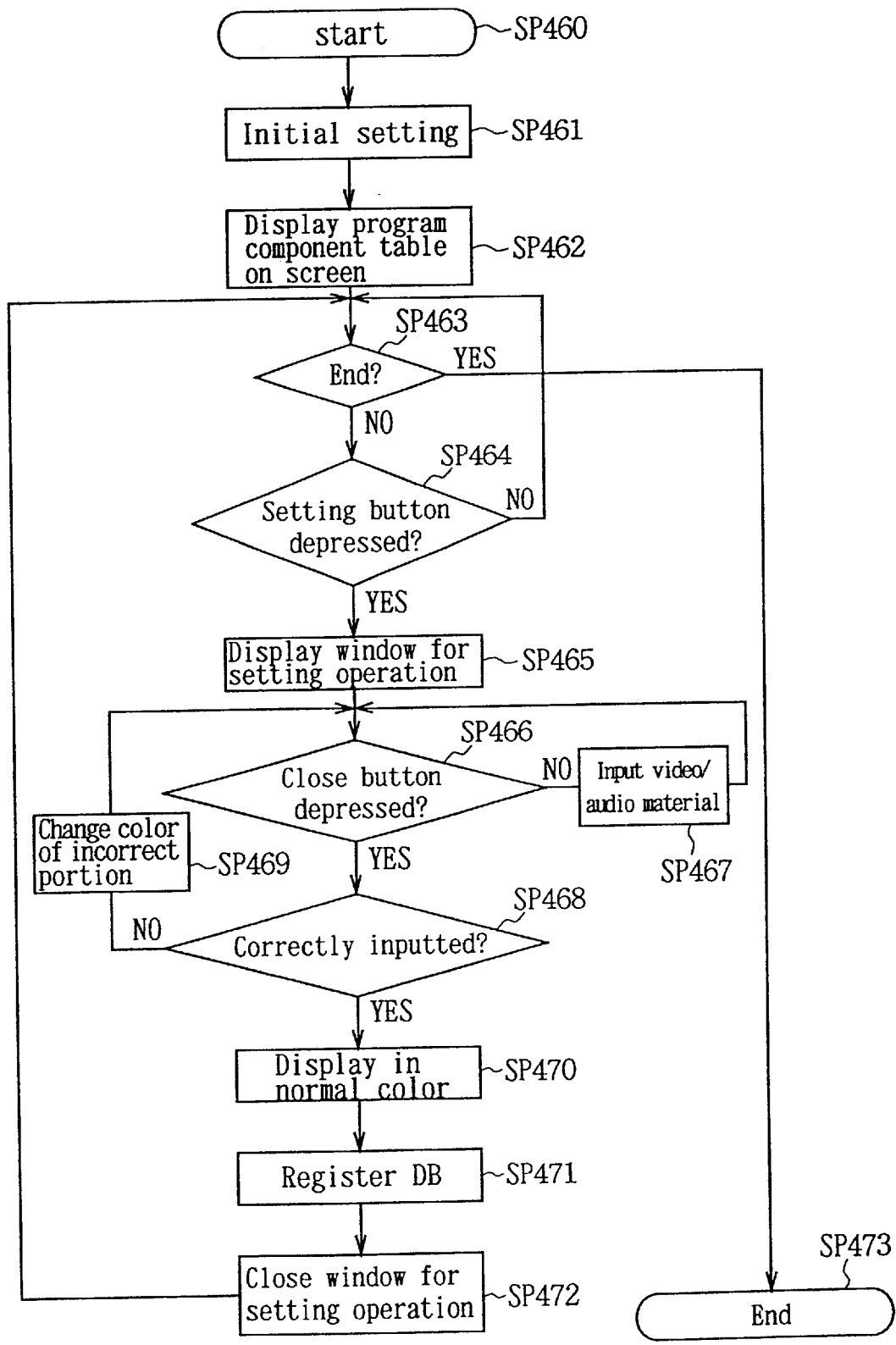
FIG. 46 is an example of a flow chart representing a processing procedure for setting a material to be automatically started.

FIG. 46 illustrates a flow chart representing a setting processing procedure for performing the K-setting on the program component table. The setting in this case is performed on a news program for which a program component table is created.

As illustrated in FIG. 46, when the K-setting processing is started (step SP460), initial settings are applied (step SP461), and a program component table is displayed on the screen (step SP462).

Next, the processing proceeds to step SP463 where it is determined whether or not the display of the program component table on the screen is terminated.

If the screen is not terminated (when NO), the processing proceeds to step SP464 where it is determined whether or not the setting button has bee depressed. This determination is made by checking whether or not the K column 429 in the program component table has been depressed on the screen with a manipulating means such as a mouse. If not depressed (when NO), the processing again proceeds to step SP463.

If the K column 429 is depressed (when YES), the K-setting popup 430 is displayed (step SP465).

Next, the processing proceeds to step SP466 where it is determined whether or not the close button has been depressed. This determination is made by checking whether or not the close button 436 on the popup 430 has been manipulated for selection, or clicked with a manipulation means such as a mouse on the screen. If not depressed (when NO), necessary information is inputted to a predetermined column in the K-setting popup 430 (step SP467), followed by the processing again proceeding to step SP466.

If the close button 466 has been depressed at step SP466 (when YES), it is determined whether or not correct input has been made. This determination is made by checking whether or not necessary information has been correctly inputted in the K-setting popup. For example, this is determined by checking whether or not a start time within a transmission duration of a program has been correctly inputted in the start time column 432 of the setting popup 430. If a start time out of the transmission duration of the program has been inputted in the start time column 432 of the popup 430 (when NO), the color is changed in the column in which correct input has not been made, here the start time column 432 on the popup (step SP469), followed by the processing again proceeding to step SP466.

On the other hand, if it is determined at step SP468 that correct input has been made (when YES), the column in which correct input has been made is displayed in a normal color (step SP470), and information inputted to the setting popup 430, a specified position, and so on are registered in the DB server 7 through the network 8 (step SP471). Then, the processing proceeds to step SP472 where the setting popup is closed from the screen, and again proceeds to step SP463.

When the display of the program component table is terminated at step SP463 (when YES), the processing proceeds to step SP473 to terminate the processing for setting an item or a component which is automatically started irrespective of the progress of a sequence of programs.

In this way, since the automatic start can be set for each component or item such that a desired material can be automatically transmitted irrespective of the progress of programs, a need for manual manipulations performed at a determined fixed time is eliminated, thereby making it possible to provide reliable on-air transmission without forgotten material or time shift. In addition, since the operator is less burdened with works during transmission, the operator can be devoted to his essential transmission operations.

In the example described above, actual transmission of a K-set material is performed by the equipment control unit 32 that controls the switcher 30, the on-air server 22 and so on, which are controlled equipment connected thereto, based on time data such as a K-set start time and so on inputted from an upper level to the control equipment unit 32, for example, time data inputted from the clock 33 such as the internal clock to the equipment control section 32. For the manual manipulation, i.e., the manual TAKE operation, the operator manually manipulates the trigger 55 such as a trigger switch to provide a trigger to the equipment control unit 32, as described above, and transmission data such as materials and so on corresponding to items and components specified from the upper level are transmitted in response to this trigger. It is therefore possible to automatically transmit an arbitrary material at an arbitrary position by the aforementioned K-setting.

As previously described, in a program, material data are transmitted on the air for each component or item in accordance with a predetermined cue sheet. However, in a broadcasting station, it is actually possible that an urgent material must be urgently transmitted. For example, current news has just been transmitted during the broadcasting of a new program to end up in a situation where the program cannot be progressed along the cue sheet by any means during the broadcasting.

On the other hand, components and items in a program are sequentially executed one by one and transmitted on the air. When a certain item or component is under execution, the next item or component displayed on a cue sheet is scheduled to be transmitted next to the currently transmitted component or item (this component is hereinafter referred to as the NEXT component. The following description is made on the assumption that a minimum unit of a program is a "component.").

At a time at which a component specified as a NEXT component is actually transmitted, the component next to the component specified as the NEXT component is treated as a NEXT component, and thus components are sequentially transmitted.

When an urgent component is to be transmitted on the air instead of a component specified as a NEXT component on a cue sheet, or when a component specified as a NEXT component is to be changed on a cue sheet, it is desirable that such change would be freely performed, or the like.

Conventionally, such a component specified as a NEXT component has been changed by moving the component, deleting the component, skipping the component, or the like.

With such a method, it is difficult or substantially impossible for the operator to perform the changing operation, which must be done with urgency, during live broadcasting because the operation for specifying a NEXT component involves very complicated manipulations. Also, when a transmitted component is specified as a NEXT component, manipulations are involved for again inputting the component from a program component table, again inputting the component to a cue sheet, and so on. Such manipulations are substantially impossible during transmission. Conventionally, therefore, the changing operations occurring during transmission cannot be carried out in consequence, so that components and items in a program are to be transmitted without departing from the previously inputted cue sheet, thus preventing flexible on-air transmission.

The present invention enables a component inputted in a cue sheet to be arbitrarily specified, a NEXT component to be freely changed, a transmitted component to be specified as a NEXT component, and a preparation situation to be displayed for a material of a component specified as a NEXT component on a cue sheet.

In the following, detailed description thereon will be given with reference to FIGS. 47–49.

FIG. 47 conceptually illustrates operations for changing a material in a component specified as a NEXT component.

FIG. 47(A) illustrates that a first component 470, a second component 471, . . . , to a fifth component 474 are displayed in order on a cue sheet, wherein the first component 470 has been transmitted, the second component 471 is currently on the air, and the third component 472 is a NEXT component. Here, for clarifying that the second component 471 is currently on the air, a frame 475 of the second component 472 is displayed in a color different (for example, red) from the frames of the remaining components.

Also, for clarifying that the third component 472 is a NEXT component, its frame is displayed in a color (for example, green) different from the frame 475 of the component currently on the air, and also different from frames of other components, for example, the frame of the fourth component 473 (here, assume that the frames of the first component 470 and the fourth component 473 are represented in white). Also, since no material has been prepared for forming the fifth component 474, the overall component (icon representing the component) is displayed in a color (for example, gray) different from the remaining components.

On the cue sheet screen described above, when the third component 472 specified as a NEXT component is changed, and the fifth component 474 is to be specified as a NEXT component (in other words, the fifth component is to be brought to the current position of the third component), a predetermined manipulation is performed to modify the cue sheet as illustrated in FIG. 47(B). This predetermined manipulation will be described later.

Specifically, the second component 471 is currently on the air, and the fifth component is specified as a NEXT component so that its frame 476 is displayed in green indicative of a NEXT component. Also, since the fifth component 474 is moved to the original position 472 of the third component, The third component 472, which was a NEXT component, and the fourth component 473 are sequentially moved down on the cue sheet. In this event, preparation of materials is started for the fifth component 474 which has just been specified as a NEXT component. When the preparation is completed so that materials are ready for transmission, its display is changed from gray, indicating that it is not ready, to white to indicate that the preparation is completed.

Further, after FIG. 47(A) is changed to FIG. 47(B), the third component 472 and the fourth component 473 have been deleted by performing predetermined manipulations, which is illustrated in FIG. 47(C). By deleting the third and fourth components, a sixth component 477 and a seventh component 478 are displayed next to the fifth component 476, which has been specified as a NEXT component, on the cue sheet. The manipulation for deleting a component will be described later.

FIG. 47(D) is a diagram when the first component 470, which has been transmitted, is specified as a NEXT component next to the second component 471 which is currently on the air. In addition, in this case, a transmitted component can be specified as a NEXT component by performing a predetermined manipulation on the cue sheet screen. Details on this manipulation will be described later.

A method of display and manipulation on an actual cue sheet screen will be described with reference to FIG. 48.

Figure 48:
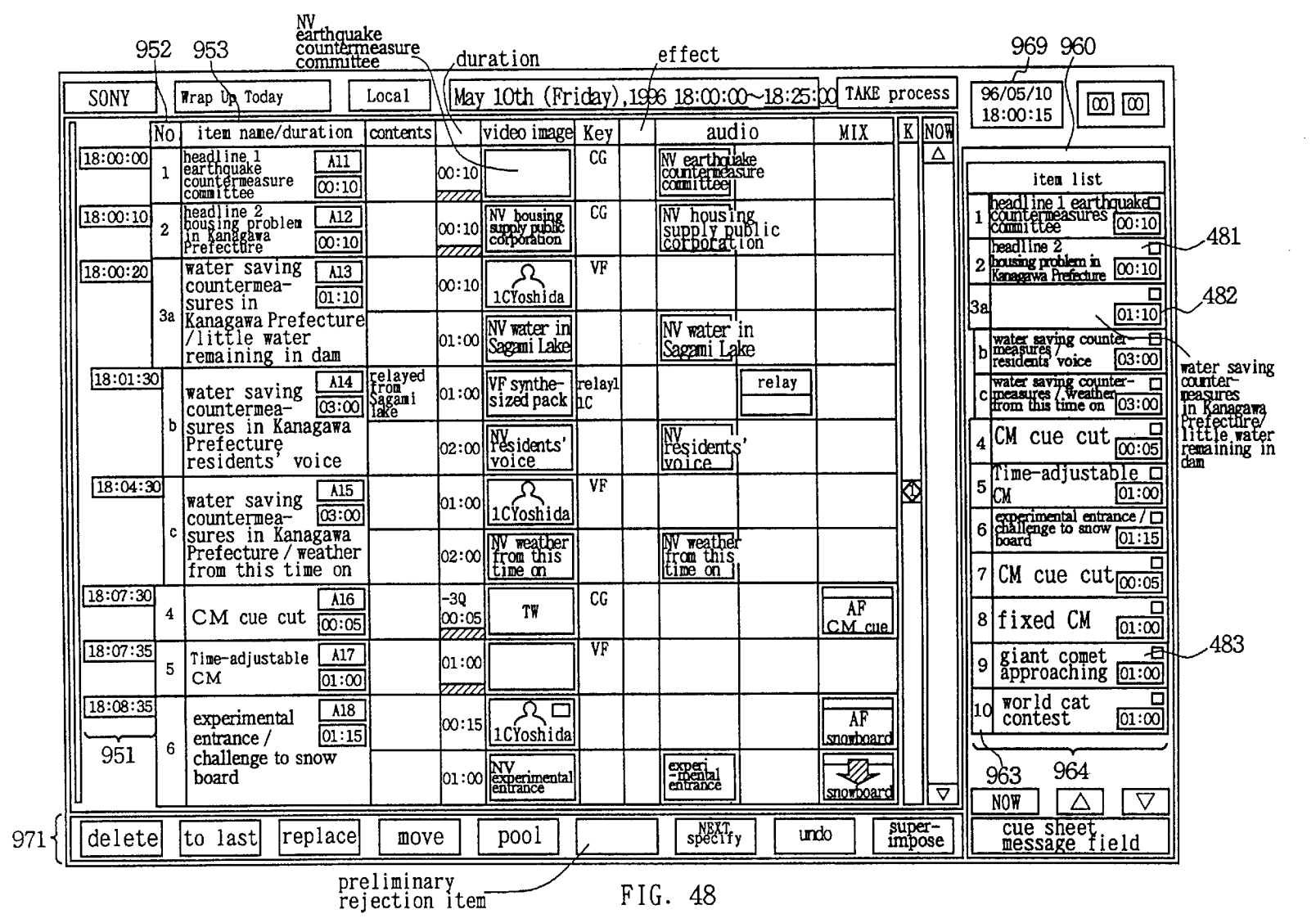

Currently, the broadcasting is in progress along the cue sheet screen illustrated in FIG. 48, and the current time is "96/05/10 18:00:15" from the current time field 969 or 6 o'clock 0 minute 15 seconds on May 10, 1996. Therefore, within items on the cue sheet, Item Number "2" (Item Name "Headline 2: Housing Problem in Kanagawa Prefecture") is currently on the air. For indicating that this item is currently on the air as described above, the item column 964 of this item and a frame 481 of the item number column 963 in the item list 960 in a right portion of the screen are displayed in a color (here, red) different from that of the remaining items. Also, since the item next to this item is Item Number "3a" (Item Name "Water Saving Countermeasures in Kanagawa Prefecture: Little Water Remaining in Dam"), this item is a NEXT item (specified as a NEXT item). For indicating that this item is a NEXT item as described above, its frame is displayed in a color (here, green) different from that of the remaining items. In the example of FIG. 48, a frame 482 of Item Number "3a" (Item Name "Water Saving Countermeasures in Kanagawa Prefecture: Little Water Remaining in Dam") in the item list 960 is displayed in green.

Description will be made on manipulations for specifying an item with Item Number "9" (Item Name "Giant Comet Approaching") as a NEXT item in place of the item with Item Number "3a" which has been specified as a NEXT item in the situation mentioned above.

First, an item which is to be specified as a NEXT item is selected on the item list. In this case, since the item with Item Number "9" is selected, this item is selected by a manipulation such as clicking with a selecting means such as a mouse, not shown, on the screen. The background color of the selected item is changed. Next, a NEXT specify button is selected within function buttons 971 positioned in a lower portion of the cue sheet screen. This selection is also made by a manipulation such as depression of this button with a selecting means such as a mouse, not shown. When selected, the selected item is specified as a NEXT item, moved to a position next to the item on the air on the screen, with the subsequent items being shifted backward. If items on the air have been specified in a group, the selected item is moved next to the group. Then, its frame is displayed in a color which indicates a NEXT item. In this event, the frame 482 of the Item Number "9" is displayed in green after it is moved. FIG. 49 illustrate an example in which Item Number "9" is specified as a NEXT item, so that its frame 482 is displayed in the color.

As to deletion of a component, a component is readily deleted by selecting the item to be deleted from the item list 960 and manipulating a delete button in the function buttons 971. For selecting an item, as is the case of selecting an item to be specified as a NEXT item, an item to be deleted is selected with a selecting means such as a mouse on the screen. The background color of the selected item is changed. Afterwards, a delete button in the function buttons 971 is selected by a manipulation such as clicking on the screen using a manipulation means such as a mouse to delete the selected item.

Likewise, when a once transmitted item is specified as a NEXT item, an item to be specified as a NEXT item is selected from the item list in a manner similar to the aforementioned manipulation for specifying a NEXT item. Then, the NEXT specify button in the function buttons 971 is depressed on the screen to specify the selected item as a NEXT item.

Otherwise, when a desired item is selected on the item list and a to-last button in the function buttons 971 is selected, for, example, the selected item is moved to the last of the program. A combination of the function buttons 971 and a selection of a desired item on the item list enables manipulations for moving the position of each item on the cue sheet, replacing items, and the like on the screen.

The foregoing operations for changing a NEXT component or a NEXT item, and so on can be performed mainly on the cue sheet terminal 39 in the equipment control section 5. Additionally, the manipulations may also be made from other terminals in the equipment control section 5.

The aforementioned processing procedure for specifying a NEXT component (or a NEXT item) on the cue sheet screen will be described with reference to FIG. 50.

Figure 50:
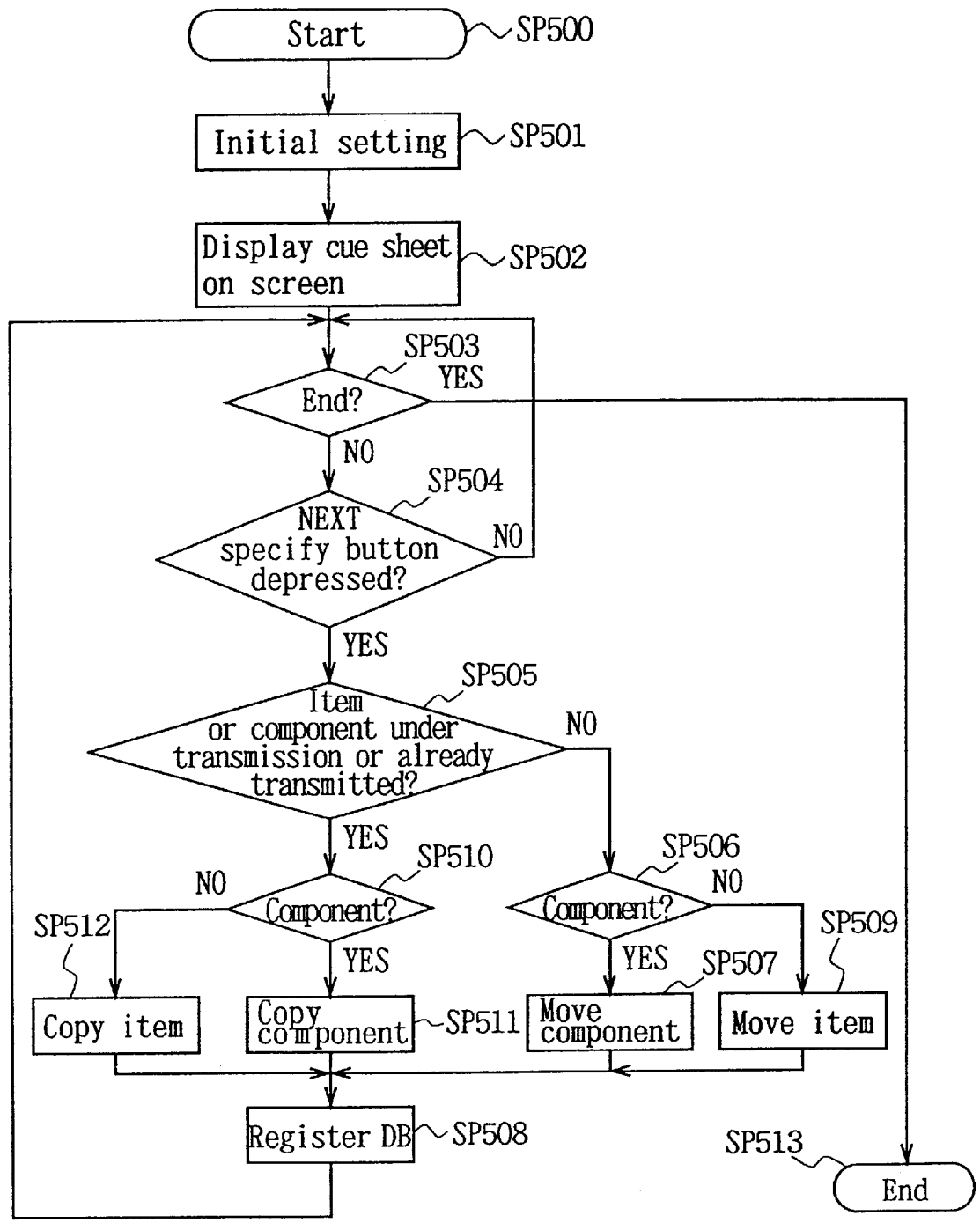
FIG. 50 is a diagram illustrating an example of a flow chart representing a processing procedure for changing the order of items specified for NEXT items.

FIG. 50 illustrates a flow chart of the processing procedure.

As this processing for arbitrarily specifying a NEXT component is started (step SP500), initial settings are applied (step SP501), and a cue sheet screen is displayed on the cue sheet terminal 39 (step SO502). Next, the processing proceeds to step SP503.

At step SP503, it is determined whether or not the display of the cue sheet screen is terminated. This determination is made by checking whether or not a predetermined terminating manipulation has been performed on the cue sheet screen. If the cue sheet screen is not terminated (when YES), the processing proceeds to step SP504 where it is determined whether or not the NEXT specify button has been depressed.

This determination is made by checking whether or not the NEXT specify button in the function buttons 171 displayed on the cue sheet has been depressed on the screen by a manipulation such as clicking with a manipulation means such as a mouse, as described above. If the NEXT specify button has not been depressed (when NO), the processing again proceeds to step SP503.

When the NEXT specify button has been depressed (when YES), the processing proceeds to step SP505 where it is determined whether or not an item or a component specified as a NEXT item or component is on the air or has been transmitted. If the NEXT specified item or component is not on the air or has not been transmitted (when YES), the processing proceeds to step SP506.

At step SP506, it is determined whether or not the NEXT specified is a component. If the NEXT specified is a component (when YES), the processing proceeds to step SP507 where the selected component is moved to a NEXT position. Then, the processing proceeds to step SP508 where information on the component specified as a NEXT item and so on is registered in the DB server 7 through the network 8. After the registration is made at step SP508, the processing again proceeds to step SP503.

On the other hand, if the NEXT specified is not a component at step SP506 (when NO), the NEXT specified is an item so that the NEXT specified item is moved to a NEXT position (step SP509), and information on the item specified as a NEXT item and so on is registered in the DB server 7 (step SP508).

In addition, when the NEXT specified item or component is on the air or has been transmitted at step SP505 (when YES), it is determined whether or not the NEXT specified is a component (step SP510).

When the NEXT specified is a component (when YES), the NEXT specified component is duplicated (copied) to a NEXT position (at the position of a component next to the component on the air on the cue sheet) (step SP511), and this information is registered in the DB server (step SP508).

On the other hand, if the NEXT specified is not a component (NO at step SP510), the NEXT specified is an item, so that this item is copied to a NEXT position, and this information is registered in the DB server 7 (step SP508).

As described above, a NEXT component can be arbitrarily specified to facilitate associated manipulations an the cue sheet, thereby eliminating troubles on the air due to erroneous manipulations of the operator. Also, since a NEXT component can be freely replaced in a short time on the cue sheet, a sudden reorganization of a program is possible, thus realizing flexible transmission. In addition, when a once transmitted material is again transmitted, the operator can manipulate rapidly without errors.

Now, detailed description will be given as to how materials including data such as video and audio to be actually broadcast are recorded in the on-air server 22.

As has been described several times, a cue sheet is created in the transmission equipment control section 5 based on a program component table created in the news program production support section 2, and material data including video data and audio data constituting each item and each component are transferred from the on-air server 22 and so on and transmitted based on the cue sheet.

The material data have been recorded in the on-air server 22 or the like and are transmitted based on a cue sheet. If they are not ready for transmission, respective items and components on the cue sheet have a background color displayed in a different color from that of respective items and components, which have been prepared (for example, components and items ready for transmission have a background displayed in white, while those not ready for transmission have a background displayed in gray or the like), and preparation for transmission is immediately made so as to be in time at a transmission time described on the cue sheet.

Here, material data are edited with the non-linear editor 26 and the linear editor 20 in the news material creation management section 3 so as to serve as material data (news materials) to be actually transmitted, and the edited news materials are recorded in the on-air server 22.

Then, the news materials recorded in the on-air server 22 is transferred from the on-air server 22 and so on for transmission by the equipment control unit 32 in the transmission equipment section 5 based on the cue sheet.

In the following, detailed description will be made on the recording of news materials from the news material creation management section 3 to the on-air server 22 and transmission from the on-air server 22.

News materials recorded in the on-air server 22 and information on recorded news materials are managed on the on-air server management terminal 25 in the news material creation management section 3. More specifically, which news materials are recorded in the on-air server 22, and which materials are transmitted are managed on a screen displayed on the on-air server management terminal 25. Actually, the operator manipulates a GUI-based screen on the on-air server management terminal 25 to input the information in the server control terminal 23 through the network 8, and control the on-air server 24 from the server control terminal 23 through the equipment control unit 24.

Here, description will be made on a recording screen for indicating the recording of news materials, and a transmission material for indicating the transmission of news materials, both displayed on the on-air server management terminal 25. Subsequently, the aforementioned recording and transmission of materials and associated control will be described in a more specific manner.

Figure 51:
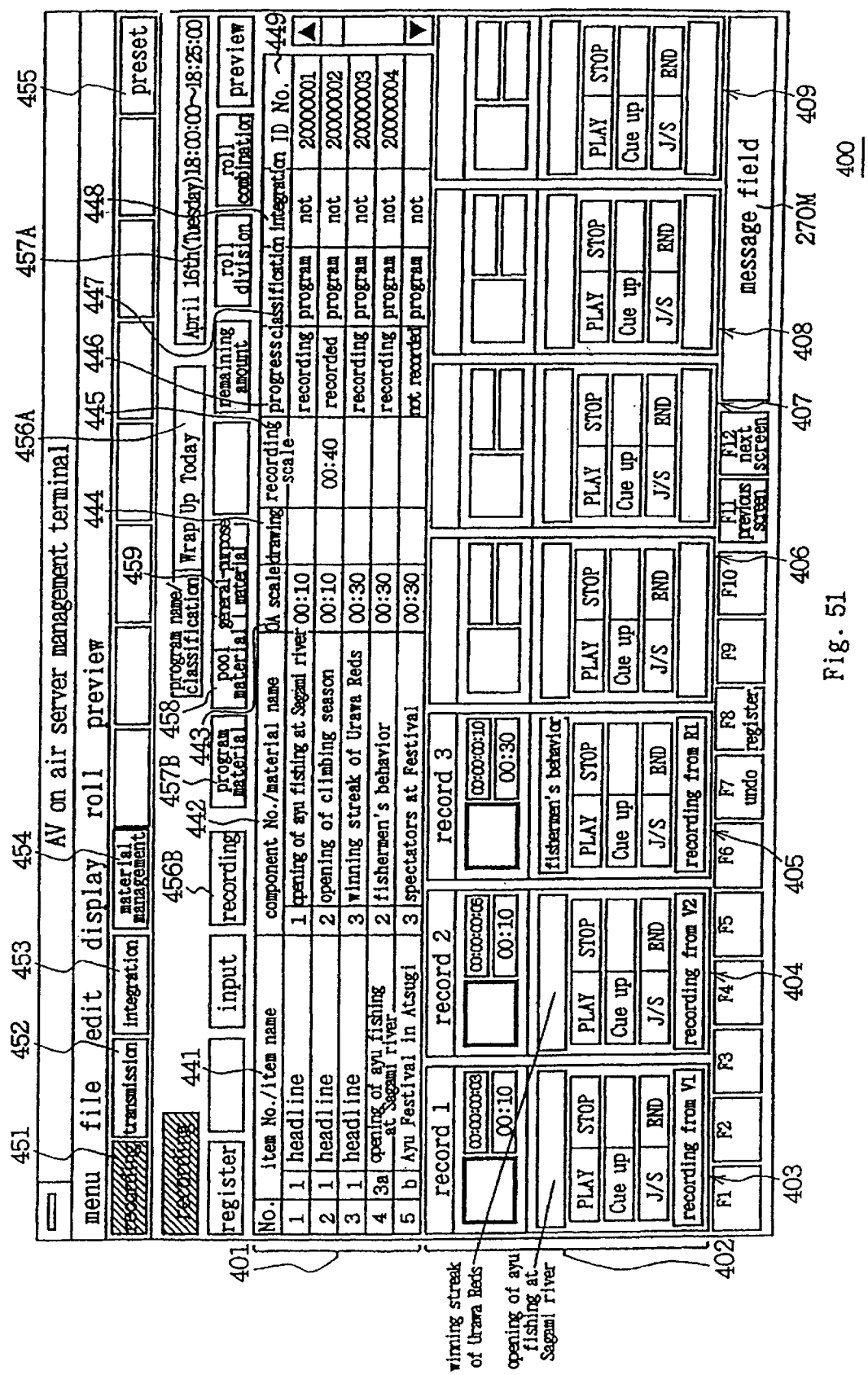
FIG. 51 is a diagram illustrating an example of a recording screen displayed on an on-air server management terminal.

FIG. 51 illustrates an example of a recording screen displayed on a display means such as a monitor, not shown, of the management terminal 25 for managing the on-air server 22. This recording screen is described below in detail.

A recording screen 400 mainly comprises a variety of menu tool bars and screen switching buttons 451, 452, 453, 454, 455 for switching screens between the recording screen, a transmission screen and so on in an upper portion of the screen; a news material display field 401 for indicating which news materials are to be recorded or have been recorded for each item or each component in a cue sheet or a program component table; a status display field 402 for actually indicating the status of recording of a material for each item or component; and a variety of buttons displayed in a lower portion of the screen. The example illustrated in FIG. 51 shows that a recording button 451 has been selected in the screen switching buttons so that the recording screen is being displayed.

In this case, since the recording screen is selected, the recording button 451 is displayed in a different color from the remaining switching buttons in the screen switching buttons or blinked, thus indicating that this button is selected.

Below the screen switching buttons, a program name/ classification display field 456A for indicting a program name, and a broadcasting date and time field 457A, for indicating the date and time at which the program is broadcast, on its right on the screen are displayed in substantially a central portion of the screen.

In the example of FIG. 51, a program name "Wrap Up Today" is displayed in the program name/classification display field 456A, and the date and time at which this program is actually broadcast is displayed as "18:00:00–18:25:00, April 16 (Tuesday)" from the date and time field 457A, i.e., this is a program broadcast from 6 o'clock 0 minute 0 second in the evening on Tuesday, April 16 and ended at 6 o'clock 25 minutes 0 second.

Generally, the recording screen displayed by selecting the recording button 451 is that for the program closest to a scheduled broadcasting time of programs to be broadcast on that day. Of course, by depressing a setting button, not displayed on the screen, to change a variety of settings, the program second closest to the scheduled broadcasting time, for example, may be displayed.

Further, below the screen switching buttons on the screen, a variety of setting buttons 456B, 457B, 458, 459 are displayed on the screen.

The recording button 456B is a button for actually recording a material in the on-air server 22. For example, as an item or a component to be recorded in the on-air server is selected from the news material display field 401, and this recording button 456B is selected by a manipulation such as clicking with a manipulation means such as a mouse, not shown, on the screen, the selected item or component is recorded in the on-air server 22.

A program material button 457B is a button for displaying a list of materials in a program. Details on this material list will be described later.

A pool material button 458 is a button that is selected when a news material recorded in the on-air server 22 is to be specified as a pool material. When this button is selected, a pool material popup is displayed, so that necessary information is entered in this popup to specify a pool material. Description on the pool material and its manipulations will be given later.

A general purpose material button 459 is a button that is selected when a news material recorded in the on-air server 22 is to be specified as a general purpose material. When this button is selected, a general purpose material popup is displayed, so that necessary information is entered in this popup to specify a general purpose material. Description on the general purpose material and its manipulations will be given later.

While a variety of buttons are displayed on the screen in addition to the buttons mentioned above, description thereon is omitted here.

Below the variety of setting buttons, the news material display field 401 is displayed on the screen for indicating information on each component and each item in the program. The news material display field 401, having substantially a similar structure to the program component table and a cue sheet, is composed of an item number/item name display column 441 for indicating an item number and an item name for each item or component; a component number/material name display column 442 for indicating a component number and its material name; an OA scale column 443 for indicating an actual transmission duration of each component; an image column 444 for displaying a video icon which is displayed in a video column of a program component table or the like; a recording scale 445 for indicating a recorded time of a news material which has been actually recorded in the on-air server 22; a progress column 446 for indicting a progress status of recording of each component or item in the on-air server 22; a classification column 447 for entering simple information on each item to indicate whether each component or item includes a pool material or a general purpose material, or whether or not each component or item includes a material to be deleted that is displayed in the news material display field 401 as an item but is not actually transmitted, and so on; an integration column 448 for describing information as to whether or not an associated item or component has been integrated, wherein news materials which need not be recorded in the on-air server 22, for example, after they are transmitted, are integrated for recording in a library 28; and an ID number column 449 for displaying an ID number of a news material associated with each item or component.

In the example illustrated in FIG. 51, for example, an item with Recording Number "1" has Item Number/Item Name 441 indicated as "1. Headline" and Component Number/Material Name 442 indicated as "Opening of Ayu Fishing at Sagami River." Actual transmission duration of this component is "00:10" from OA Scale 443 or ten seconds. Whether or not this material has been actually recorded in the on-air server is indicated as "Recording" from the progress column 446, i.e., the news material of this component is currently being recorded in the on-air server 22. Therefore, since the material has not been recorded, nothing is displayed in the recording scale column 445. The classification column 447 indicates the classification of each component whether or not each component is a general purpose material, a pool material, or the like. This component has not been integrated since "Not" is displayed in the integration column 448. In addition, the ID number of this component is indicated to be 20000001" in the ID number column 449.

Further, below the news material display field 401, the status display field 402 is displayed on the screen for indicating the status of each material.

In FIG. 51, since the recording screen is being displayed, the status display field 402 indicates a recording situation for each component, where a status display field 403 for Recording 1 displays the status of Component Number 1 (Material Name "Opening of Ayu Fishing at Sagami River"); and a status display field 404 for Recording 2 displays the status of Component Number 3 (Material Name "Urawa Reds, Successive Wining"), respectively.

In FIG. 51, seven recording status situations 403, 404, 405, 406, 407, 408, 409 are displayed in the status display field 402 on the screen, where recording situations of different materials are displayed therein, respectively. Details on the status display field 402 on the recording screen 400 will be described later.

Next, description will be made on a transmission screen displayed on the on-air server management terminal 25.

This transmission screen is a screen for managing how a news material recorded in the on-air server 22 will be transmitted and has actually been transmitted.

Figure 52:
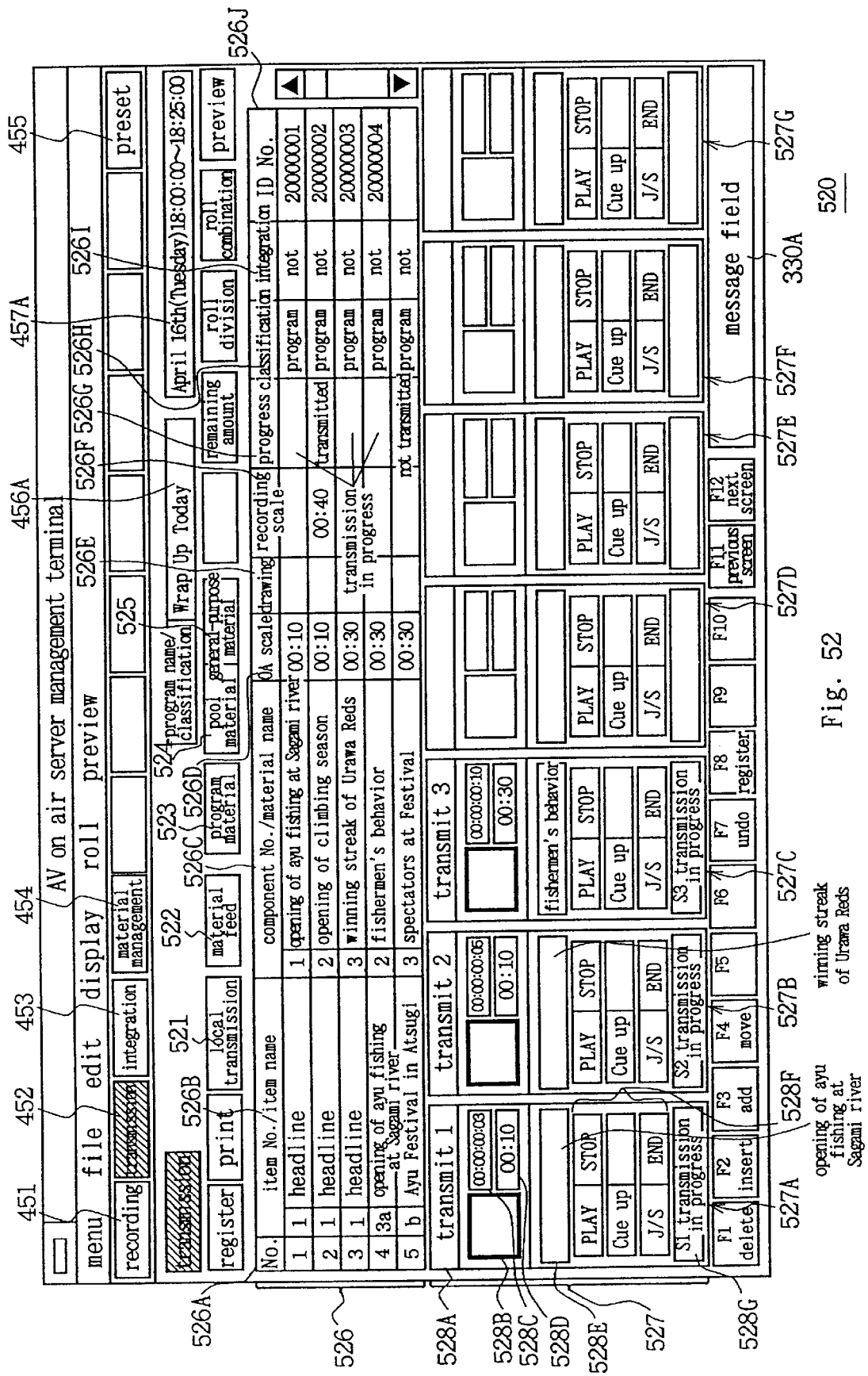
FIG. 52 is a diagram illustrating an example of a transmission screen displayed on an on-air server management terminal.

FIG. 52 illustrates an example of the transmission screen displayed on a display screen such as a monitor, not shown, of the management terminal 25.

This transmission screen 520 comprises, as a whole, a variety of menu tool bars and screen switching buttons 451–455 in an upper portion of the screen; a news material display field 526 for indicating information on each item and each component similar to that on each item and component displayed on the program component table or the cue sheet, as to which news materials are to be transmitted or have been transmitted; a status display field 527 for actually indicating the status of transmission of a material for each item or component; and a variety of buttons displayed in a lower portion of the screen. The example illustrated in FIG. 52 shows that a transmission button 452 has been selected in the screen switching buttons so that the transmission screen is being displayed.

In this case, since the transmission screen is selected, the transmission button 452 is displayed in a different color from that of the remaining switching buttons in the screen switching buttons or blinked, thus indicating that this button is selected.

In the example of FIG. 52, a program name "Wrap Up Today" is displayed in the program name/classification display field 456A, and the date and time at which this program is actually broadcast is displayed as "18:00:00–18:25:00, April 16 (Tuesday)" from the date and time field 457A, i.e., this is a program broadcast from 6 o'clock 0 minute 0 second in the evening on April 16 and ended at 6 o'clock 25 minutes 0 second.

Generally, the transmission screen displayed by selecting the transmission button 452 is that for the program closest to a scheduled broadcasting time of programs to be broadcast on that day, as is the case of the recording screen. Of course, by depressing a setting button, not displayed on the screen to change a variety of settings, the program second closest to the scheduled broadcasting time, for example, may be displayed.

Further, below the program name/classification field 456A, a variety of setting buttons 521, 522, 523, 524, 525 and so on are displayed on the screen.

As to a local transmission button 521, when there is an item or a component which has a news material to be transmitted to a local station, this transmission button 521 is selected to display a popup which displays a local transmission list. By entering necessary information in this popup, materials can be specified for transmission to a local station in items or components. The local transmission list will be described later.

A material feed button 522 is a button for displaying a material destination list. Details on this material destination list will be described later.

A program material button 523 is a button for displaying a material list for each program. Details on the material list will be described later.

A pool material button 524 is a button that is selected when a news material recorded in the on-air server 22 is to be specified as a pool material, as is the case of the recording screen. A general purpose material button 525 in turn is a button that is selected when a news material is to be specified as a general purpose material. The pool material and the general purpose material, and their manipulations will be described later.

While a variety of buttons are displayed on the screen in addition to the buttons mentioned above, description thereon is omitted here.

Below the variety of setting buttons, the news material display field 526 is displayed on the screen for indicating information on each component and each item in the program. The news material display field 526 has the same structure as that of the news material display field 401 of the aforementioned recording screen. The news material display field 526 is composed of a transmission number column 526A for indicating a transmission number for each item or component to be transmitted; an item number/item name display column 526B for indicating an item number and an item name for each item or component; a component number/material name display column 526C for displaying a component number and its material name; an OA scale column 526D for indicating an actual transmission duration of each component; an image column 526E for displaying a video icon; a recording time column 526F for indicating a time recorded in the on air server 22; a progress column 526G for indicting a progress status of recording of a material in the on-air server 22; a classification column 526H for indicating the classification as to whether each component includes a pool material or a general purpose material, and so on; an integration column 526I for indicating information as to whether or not an associated item or component has been integrated; and an ID number column 526J for adding an identification number of each component or each item. The OA scale will be described later.

In the example of FIG. 52, an item with Transmission Number 2 has Item Number "1," Item Name "Headline" and Material Name "Simultaneous opening of Mountains." A transmission duration is "00:10" from the OA scale column 526D, i.e., ten seconds; the progress status is "Recorded" from the progress column 526G, specifically, indicating that this material has been recorded in the on-air server 22; an actually recorded time is "00:40" from the recording scale column 526F, i.e., the material has been recorded for 40 seconds. Also, this material is not integrated, and its identification number is indicated as "20000002."

Below the news material display field 526, a status display field 527 is displayed. Since this is a transmission screen, the status indicative of a transmission situation is displayed for each component. Similarly to FIG. 51, the example illustrated in FIG. 52 also displays status displays 527A–527G for seven components. The status displays in this transmission screen will be described later.

Next, manipulations for recording a news material on the recording screen, and manipulation for transmitting a news material on the transmission screen will be described with reference to FIGS. 53–56.

First, recording manipulations on the recording screen will be described with reference to FIG. 53.

When the recording screen display button 451 is selected to display the recording screen on the screen displayed on the on-air server management terminal 25 as described above, the recording screen 400 illustrated in FIG. 51 is displayed. Then, when a desired component displayed on the material display field 401 is selected and the recording button 456 is also selected on the recording screen, a recording popup illustrated in FIG. 53 is displayed. This recording popup 530 may be displayed superimposed on the recording screen on the same screen on which the recording screen has been displayed, or the recording screen may be once closed to open the recording popup 530.

Figure 53:
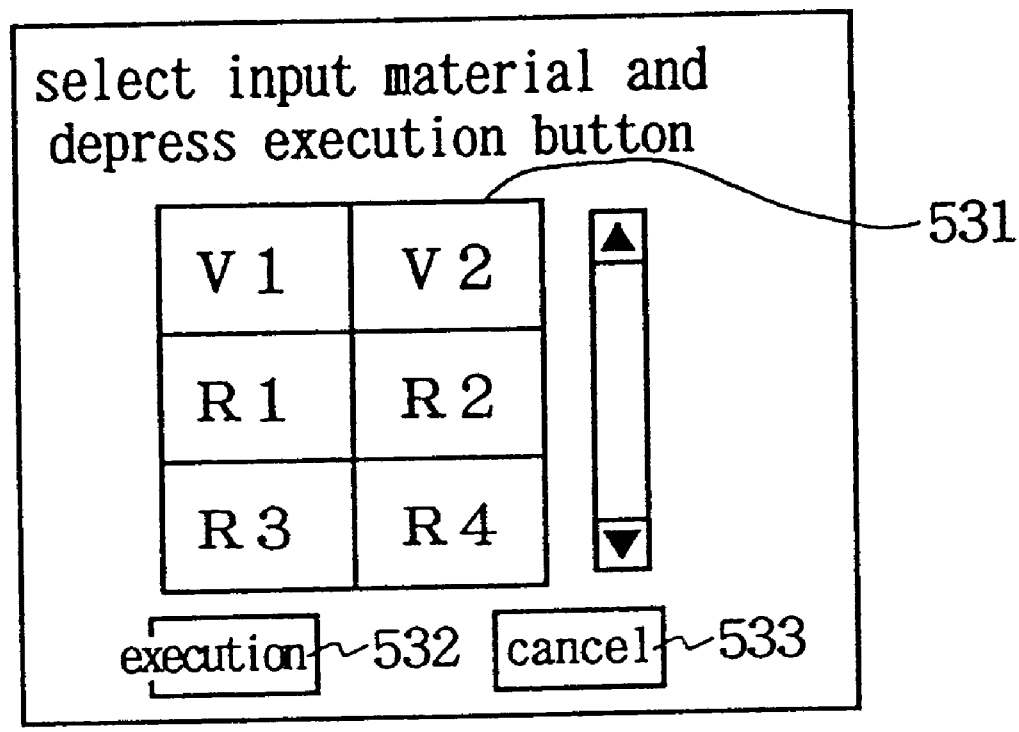
FIG. 53 illustrates an example of a popup display for selecting a material to be inputted to an on-air server.

As illustrated in FIG. 53, on the recording popup 530, a source of a material to be recorded in the on-air server 22 is selected to record the selected material from the source in the on-air server 22.

The recording popup 530 comprises a source display field 531; an execution button 532; and a cancel button 532. Displayed in the source display field are devices and lines which serve as sources of materials connected to the on-air server 22. The example of FIG. 53 shows "V1" indicating that the source is-a first video tape recorder; "V2" indicating that the source is a second video tape recorder; "R1"–"R4" indicating line numbers when sources are connected through lines. A source displayed in the source display field is selected with a selecting means such as a mouse, not shown, on the screen, and the execution button 532 is depressed with a manipulation means such as a mouse on the screen, causing the selected material to be recorded in the on-air server, and the status of recording to be displayed in the status display field 402 of the recording screen. The display in this status display field 402 will be described later. On the other hand, if the recording of a material is stopped and the recording popup 530 is to be closed from the screen, this may be done by manipulating the cancel button 533 with a manipulation means.

Next described is the transmission of a material on the transmission screen.

For the transmission of a material, a recorded material is transmitted from transmission equipment such as the on-air server 22 in accordance with cue sheet information as previously described. Therefore, it can be determined on the transmission screen whether or not a material to be transmitted is transmitted to local stations.

Figure 54:
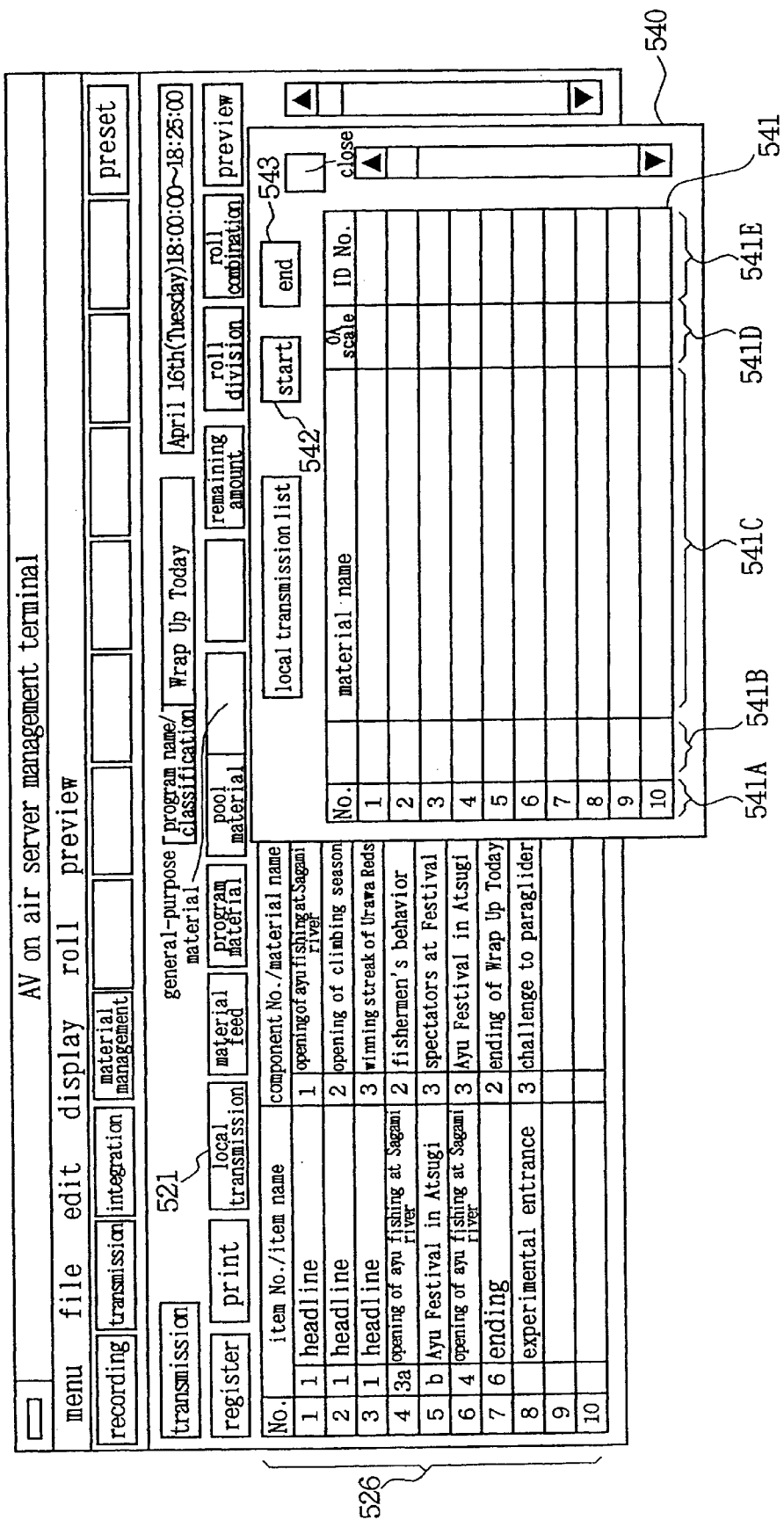
FIG. 54 illustrates an example of a transmission screen on which a popup is displayed for selecting a destination of a material on the transmission screen.
Figure 55:
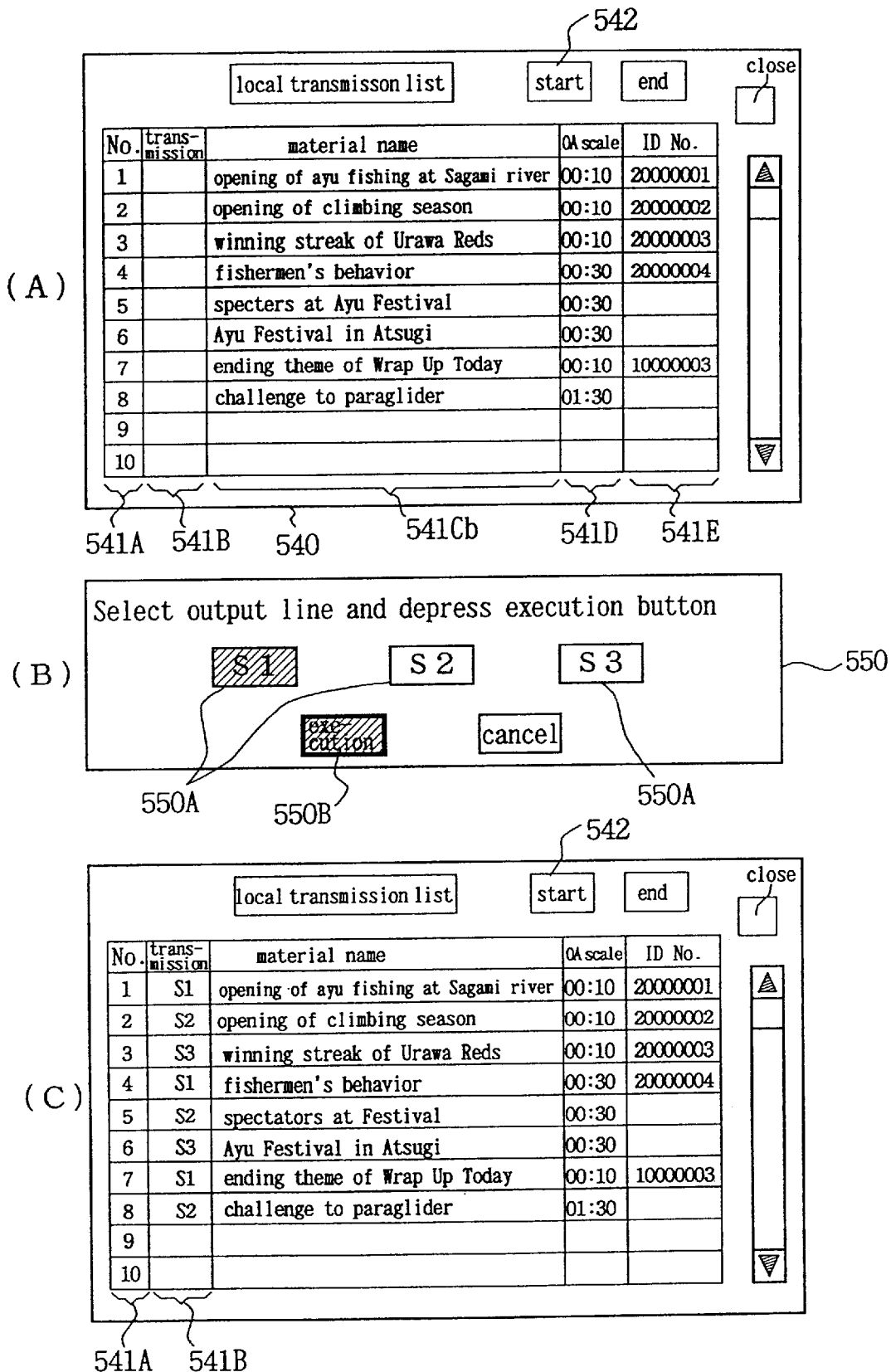
FIG. 55 is a diagram illustrating details of a popup for selecting a destination of a material on a transmission screen.

More specifically, as illustrated in FIG. 54, the local transmission list 521 is selected on the transmission screen with a selecting means to display a local transmission list popup 540 in which a local transmission list is displayed.

By entering information on each item or component to be transmitted to local stations in this transmission list popup 540, materials associated with the entered component or item are transmitted to the local stations.

The local transmission list 540 is composed of a transmission number column 541A in which a transmission number is assigned; a transmission destination column 541B for displaying a transmission destination; a material name column 541C for indicating the name of a material to be transmitted to local stations; OA Scale 541D for indicating an actual transmission duration; and an ID number column 541E for indicating the identification number of each material.

The local transmission list popup 540 illustrated in FIG. 54 is displayed superimposed on the recording screen as an example. Of course, the transmission screen may be once closed such that this local transmission list popup 540 is opened on the screen, as is the case of displaying the recording popup 530. In addition, the example illustrated in FIG. 54 displays a state in which no component is to be transmitted to local stations.

For inserting a component to be transmitted to local stations into this popup 540 from the state illustrated in FIG. 54, the component to be transmitted to local stations is selected from the news material display field of the recording screen. The selection may be made by a manipulation such as clicking on the screen with a selecting means such as a mouse, not shown. The selected component is displayed in a color different from that of the remaining component or blinked. Afterwards, when a desired position in the material display column 541 on the local transmission list popup 540 is selected by a manipulation such as clicking on the screen with a selecting means such as a mouse, the component selected on the recording screen is inserted into the selected position. Subsequently, a component to be transmitted to local stations is inserted into the popup 540 in a similar manipulation method. Alternatively, necessary information may be inputted directly on the popup 540 using an input means such as a keyboard.

FIG. 55(A) is an example of the transmission list popup 540 in which components to be transmitted to local stations have all been inserted in the transmission list popup 540.

When a transmission destination list column 541B of a component to be transmitted is selected by a manipulation such as clicking with a manipulation means such as a mouse in this state, a local transmission destination list popup 550 illustrated in FIG. 55(B) is displayed superimposed on the transmission list popup 540. Of course, this transmission destination list popup 550 may only be displayed on the screen after the transmission list popup 540 is closed on the screen. With the display of the transmission destination list popup 550, the component selected on the transmission list popup 540 is displayed in a color or blinked so as to be different from the remaining components.

The transmission destination list popup 550 displays Line Number 550A for indicating output lines to local stations. Of course, the output lines may be displayed not only as numbers but also as images. A desired line number is selected from this Line Number 550A to specify an output line. This selection is made by a selecting manipulation such as clicking with a selecting means such as a mouse on the screen. Afterwards, by depressing an execution button 550B on the transmission destination list popup 550, the selected output line is set for the component, and the transmission destination list popup 550 is closed.

By repeating the selection of an output line for the component to be transmitted to local stations through the foregoing manipulations, all local transmission destinations are set for the selected component.

An example of the transmission list popup 540, after transmission destinations have all been selected, is illustrated in FIG. 55(C). As illustrated in FIG. 55(C), transmission destinations are entered in the transmission destination column 541B.

Then, by a manipulation such as depression of a start button 542 on the local transmission list popup 540 with a manipulation means such as a mouse on the screen, the items entered in this list popup 540 are set for execution.

How a material is actually transmitted from the on-air server 22 is displayed in the status display field 527 of the transmission screen, details of which will be described later.

While a local station is specified for each item or component on the transmission screen through the manipulations described above, a transmission destination may be simply specified for an item or a component, in a more general aspect, on the transmission screen, through similar manipulations performed when a local station is specified.

More specifically, when the material feed button 522 is selected by a selecting manipulation such as clicking with a manipulation means such as a mouse on the transmission screen 520 illustrated in FIG. 52, a material feed transmission list popup 560 illustrated in FIG. 56(A) is displayed. This popup may also be displayed superimposed on the transmission screen as is the case of the transmission list popup 540, or this popup 560 may only be displayed on the screen after the transmission screen is closed.

The material feed transmission list popup 560 comprises a list number column 563A; a destination column 563B; Material Name 563C; OA Scale 563D; and an ID number column 563E for indicating a material identification number of each material, as illustrated in FIG. 56(A). This structure is the same as the local transmission list popup 540.

FIG. 56(A) illustrates a popup 560 which shows a state in which no material has been specified on the material feed transmission list. For selecting a material, a component for which a transmission destination is to be specified is selected in the news material display field 401 on the recording screen, similarly to the manipulations on the local transmission list popup 540, and a desired display field 563 is selected on the material feed transmission list 560, whereby the material is inserted in the feed transmission list popup 560. The material may be inputted directly from this popup using an input means such as a keyboard.

Afterwards, as the destination column 563B of the material to be specified is selected, the column 563B or the entire list line is displayed in a color different from the remaining lines or blinked, and a destination list popup 564 is displayed. This popup 564 displays a list of destinations, so that a desired destination is selected on this popup 564 to insert the selected destination in the selected destination column 563B in the list display field 563. By repeating these manipulations subsequently, destinations are specified. Alternatively, a destination may be inputted directly in the destination column 563B.

An example of the material feed transmission list popup, on which a destination has been specified in the transmission column 563B is illustrated in FIG. 56(B).

Eventually, when execution is desired after required insertion and entrance have been completed, a start button 561 is depressed for setting. A transmission situation in this event is also displayed in the status display field 527 of the transmission screen, details of which will be described later.

Next, detailed description will be given on the status display field 402 displayed on the recording screen 400 illustrated in FIG. 51, and the status display field 527 displayed on the transmission screen 520 illustrated in FIG. 52.

First, the status display field 402 displayed on the recording screen 400 will be described with reference to FIG. 57.

A material is actually recorded in the on-air server 22 by the execution button 532 on the recording popup 530.

An example illustrated in FIG. 57(A) shows a state of the status display field 402 before the recording of a material is actually started. The example illustrated in FIG. 51 corresponds to the status displays 406–409 of the status display field 402. In this event, manipulations in the status display field 402 is prohibited.

As illustrated in FIGS. 57(A) and 57(B), the status display field 402 is composed of a display field 571; a time code field 572 for indicating a recorded time of each component; an OA scale field 573 for indicating a transmission duration, identical to the OA scale displayed in the OA scale column 443 of the recording screen 400; a material name field 574; a variety of manipulation buttons BTN; and a message field 576.

FIG. 57(B) shows a state immediately before recording of a material is started by the execution button 532 on the recording popup 530. As illustrated in FIG. 57(B), "Recording 1" is displayed in the display field 571, and a time code "00:00:00:00" is displayed in Recording Scale 572. Also, an OA scale "00:10" or ten seconds indicative of a component duration of each component is displayed in the OA scale field 573. A time displayed in the OA scale field 573 in this state is a component duration that has previously determined on a cue sheet or a program component table, and is counted down when the recording is actually started in accordance with a duration of a recorded material. Then, as the time in the OA scale field 573 reaches zero, alarming sound is generated to notify the operator. When exceeding zero, the time is displayed in negative and is counted up.

The display of the counted down time in this OA scale serves as a reference for determining at which position the recording should be stopped when a recording operation is manually performed.

Conventionally, recording of a material through manual manipulations has been performed such that the operator actually confirms while viewing a video image on a monitor or the like, and depresses a stop button or the like so as to terminate the recording operation at the timing at which the recording should be terminated, thus terminating the recording. With this method, the OA scale such as the length, duration and so on of a material actually used in broadcasting is unknown, so that if a person other than an editor is involved in such a recording operation, the person cannot determine where to stop the recording, resulting in erroneous manipulations. Thus, the actually broadcast contents are likely to be partially different. To solve this problem, the OA scale such as a broadcasting duration or a component duration is previously displayed in time during the recording manipulations, as mentioned above, and the time is counted down as the recording time is increased after the recording is started, thereby making it possible to look for the timing of terminating the recording through manual manipulations. Also, the displayed time is counted down, and alarming sound is generated when the count value reaches zero, so that the operator can look for the timing of terminating the recording in a readily viewable manner. Further, since the value is counted up in the negative direction after passing zero, it is also possible to discriminate a sacrifice material other than a required material, and how long the material has been recorded as well.

The operation in the status display field 403 in the recording screen is further described with reference again to FIG. 57. As illustrated in FIG. 57(B), the status display field 403 comprises a recording name field 571; a recording scale field 572; an OA scale field 573; a material name field 574 for indicating a material name; and a message field 576 for indicating a recording message. The example illustrated in FIG. 57(B) indicates that a material name is "Opening of Ayu Fishing at Sagami River," and a current recording situation is "V1 Material in ST-BY," that is, the material indicated in the material name field 574 is supplied from a material in "V1" which is now in standby.

After the standby is over, the operation proceeds to FIG. 57(C), where the recording of the material "Opening of Ayu Fishing at Sagami River" is automatically started from the source "V1." "Recording from V1" is displayed in the message field 576, the value in the recording scale field is counted up as the recording time is increased, and meanwhile the count value in the OA scale field 573 is counted down as the recording time is increased.

In this event, video data in course of recording is displayed in a recorded material frame field 575, and the frame of this frame field 575 is displayed in red to indicate that a recorded material is currently present. Of course, it is sufficient if the operator can recognize that a material is now being recorded, so that the frame may be displayed in a color different from red or blinked. This enables the operator to readily recognize that a material is now being recorded from a source by confirming the status display field 403. At this time, "Recording" indicating that the recording is currently in progress is displayed in the progress field 446 of the recording screen 400, while the same video frame as that displayed in the recorded material frame field 575 is displayed in the image column 444. In addition, a stamp image indicative of the first frame of the recorded material is displayed in the recorded material frame field 575. Similarly, the same stamp image is displayed in the image column 444 of the recording screen 400.

Here, the recording of the material is automatically started, whereas the termination of the recording is done through a manual manipulation or an automatic manipulation. With the manual manipulation, the recording is terminated when the aforementioned stop button is depressed. However, since the recording is not terminated unless the manual manipulation is performed, the recording of a material is automatically terminated after a certain amount of the material has been recorded. This time (or position) at which the automatic termination is conducted is previously set.

Here, the recording of a material is automatically terminated after OA Scale+a previous cut (several seconds)+a sacrifice cut (several seconds). The previous cut refers to a previous cut portion of a material to be actually used, which may include color bar information, textual information and so on. The sacrifice cut, in turn, refers to video data which may be broadcast when a broadcasting time or the like should be extended for some reason. Generally, a sacrifice cut extends from 5 seconds to 20 seconds, and a material is recorded to have a sufficient margin.

Therefore, as to masking of a variety of manipulation buttons BTN on the status display field 403, the stop button for stopping the recording and the end button for ending a display in the status display field 403 and so on are released from the masking, so that these buttons can be manipulated.

If the recording of a material is desirably terminated earlier than the time displayed in OA Scale, this can be executed by a manipulation such as clicking with a manipulation means such as a mouse on the stop button 577 on the screen.

When the stop button 577 is clicked, the recording of a material from the source "V1" is terminated, the display in the progress field 446 of the recording screen 400 is changed to "Recorded," and the actually recorded time is displayed in Recording Scale 445.

Also, when the recording is to be stopped during the recording of a material illustrated in FIG. 57(C), this is executed by a manipulation such as clicking on the end button 578 with a manipulating means such as a mouse. At this time, a recording stop popup is displayed on the recording screen 400. By inputting necessary information in this popup, details on this recording stop popup will be described later.

As the recording of a material on the on-air server 22 progress to cause the time displayed in OA Scale to be counted down to zero, alarming sound is generated as mentioned above, permitting the operator to recognize that the material has been recorded in the on-air server 22 by a portion indicated in OA Scale. In this event, if the stop button 577 is not depressed so that the recording operation is not stopped, OA Scale displays the count value in negative, and the count value is counted up. In other words, the aforementioned material for a sacrifice cut is recorded in the on-air server 22. FIG. 57(D) illustrates the state of the status display field 430 when the count value in the OA scale field 573 has reached zero.

If the stop button 577 is depressed at the time OA Scale displays "0" the recording of the material is terminated, with "Recorded" being displayed in the progress field 466 of the recording screen 400, as mentioned above.

If the recording is not stopped through a manual manipulation or with the stop button, the material is continuously recorded in the on-air server 22 up to the aforementioned previously set time (or position) at which the recording is automatically terminated.

When the recording has been performed for a set time for the recording previously set in OA Scale, Recording Scale or the like, or when the recording is stopped by a manual manipulation or by depressing the stop button 577 at this time, the stop button 577 is masked, and "Recorded" indicating that the recording has been terminated is displayed in the recording message field 576. In addition, "Recorded" is displayed in the progress field 446 of the recording screen 400. Further, the color in which the frame of the recorded material frame field 575 also disappears.

Next, the screen of the status display field 527 in the transmission screen will be described with reference again to FIG. 52.

Also, in this case, the status display field 527 of the transmission screen has a similar structure to the status display field 403 in the recording screen, and comprises a transmission name field 528A; an image display field 528B for displaying an image to be transmitted; a transmission time field 528C for indicating a transmission time of a material to be transmitted; an OA scale field 528D for indicating an OA scale of the material to be transmitted; a material name field 528E for indicating the material name of the material to be transmitted; a variety of manipulation buttons 528F associated with the status display field of the recording screen; and a message field 528G for displaying a transmission message.

While materials are transmitted based on a cue sheet, images and other information on materials to be transmitted can be readily recognized by the operator with the status display field 527 in the transmission screen 520 on the on-air server management terminal 25.

In the status display field 527A of FIG. 52, a material with Transmitted Material Name "Opening of Ayu Fishing at Sagami River" is indicated, and "S1Under Transmission" is found in the message field 528G, indicating that the material is now being transmitted to a destination S1. Also, a transmitted image is displayed in the transmission screen field 528B. Furthermore, the transmission time field 528C and the OA Scale field 528D display times corresponding to the time of the transmitted image, respectively.

In addition, the progress field 526G in the transmission screen 520 also displays "Under Transmission" indicating that the material is now being transmitted.

This on-air server 22 is capable of simultaneously recording and transmitting materials through a plurality of channels (simultaneous recording and transmission is also possible), so that the status display 402 in the recording screen 400 and the status display 527 in the transmission screen 520 provide status displays for a plurality of channels. In the example illustrated in FIG. 51, the status display 402 provides status displays 403, 404, 405, indicating that three materials (for three channels) are simultaneously being recorded. The example illustrated in FIG. 52 provides status displays 527A, 527B, 527C, indicating that three materials (for three channels) are simultaneously transmitted.

Next, a terminating manipulation through an end button popup, involving on-screen manipulations of end buttons 577, 528G in the status displays 402, 527 in the recording screen 400 and the transmission screen 520, will be described with reference to FIG. 58.

Figure 58:
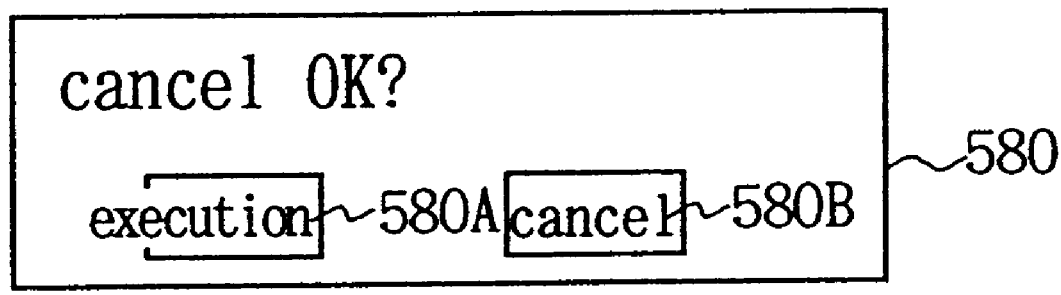
FIG. 58 illustrates an example of a popup displayed for stopping recording a material or transmitting a material on a recording screen or a transmission screen.

When the end button 577 or 528G in the status display is selected by a manipulation such as clicking with a manipulation means such as a mouse, not shown, an end display popup 580 illustrated in FIG. 58 is displayed.

This popup 580 has a structure for providing a confirmation display "Are You Sure That Recording Is Stopped?" together with an execution button 580A and a cancel button 580B. When recording or transmission is actually stopped, this popup 580 is displayed on which the stoppage is performed by manipulating the execution button 580A. Thus, recording or transmission is not stopped by manipulating the end button 577 or 528G. On the other hand, if recording or transmission is not stopped, the cancel button 580B is manipulated on this popup 580 to do so. This is for avoiding, for example, the operator from erroneously manipulating the end button 577 or 528G.

A manipulation of these buttons 580A, 580B is realized by a selecting manipulation such as clicking with a manipulation means such as a mouse, not shown.

Next, a processing procedure for displaying and counting down the aforementioned OA Scale on the recording screen will be described with reference to FIGS. 59 and 60.

Figure 59:
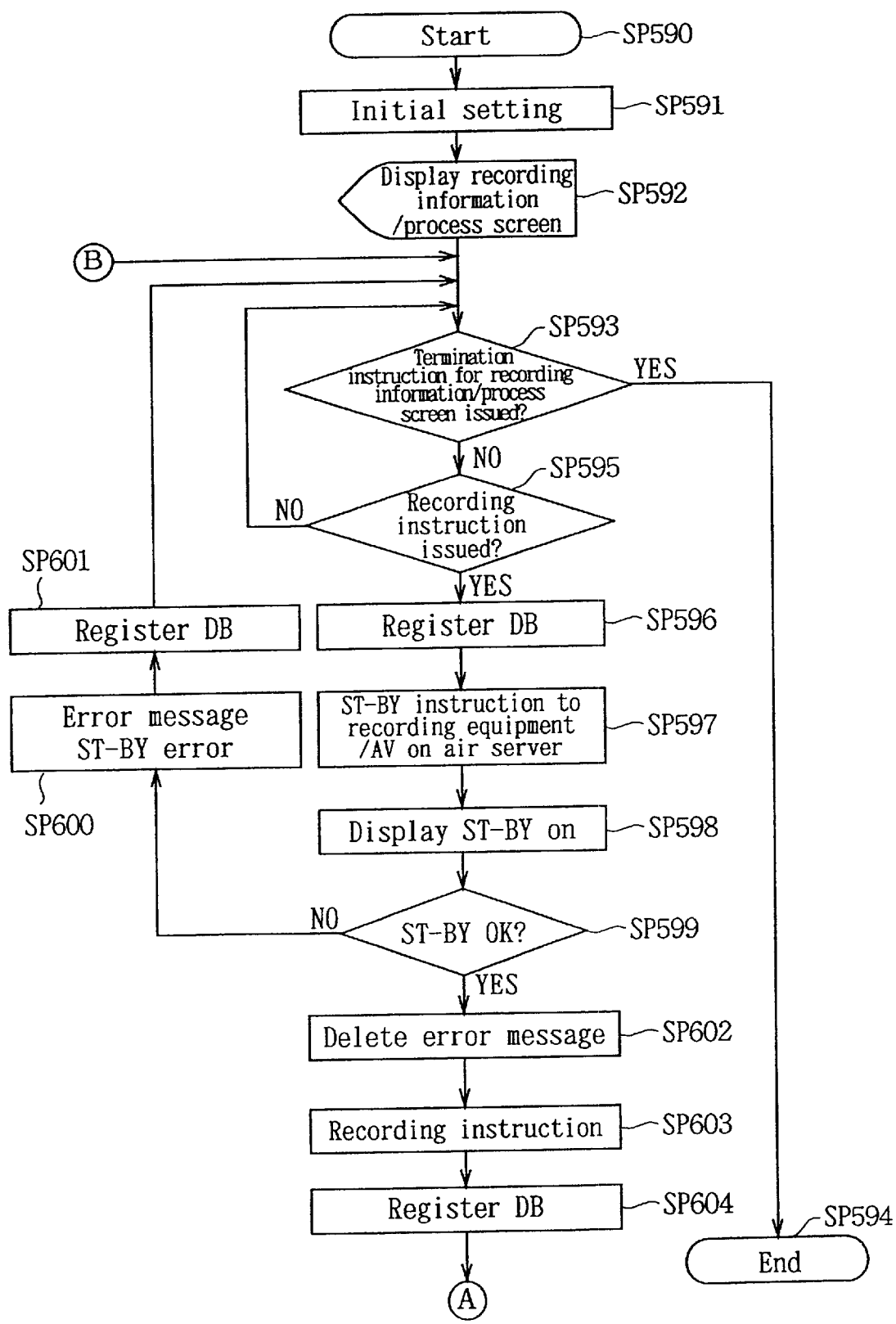
FIG. 59 is a diagram illustrating an example of a flow chart representing a processing procedure for recording a material on a recording screen.
Figure 60:
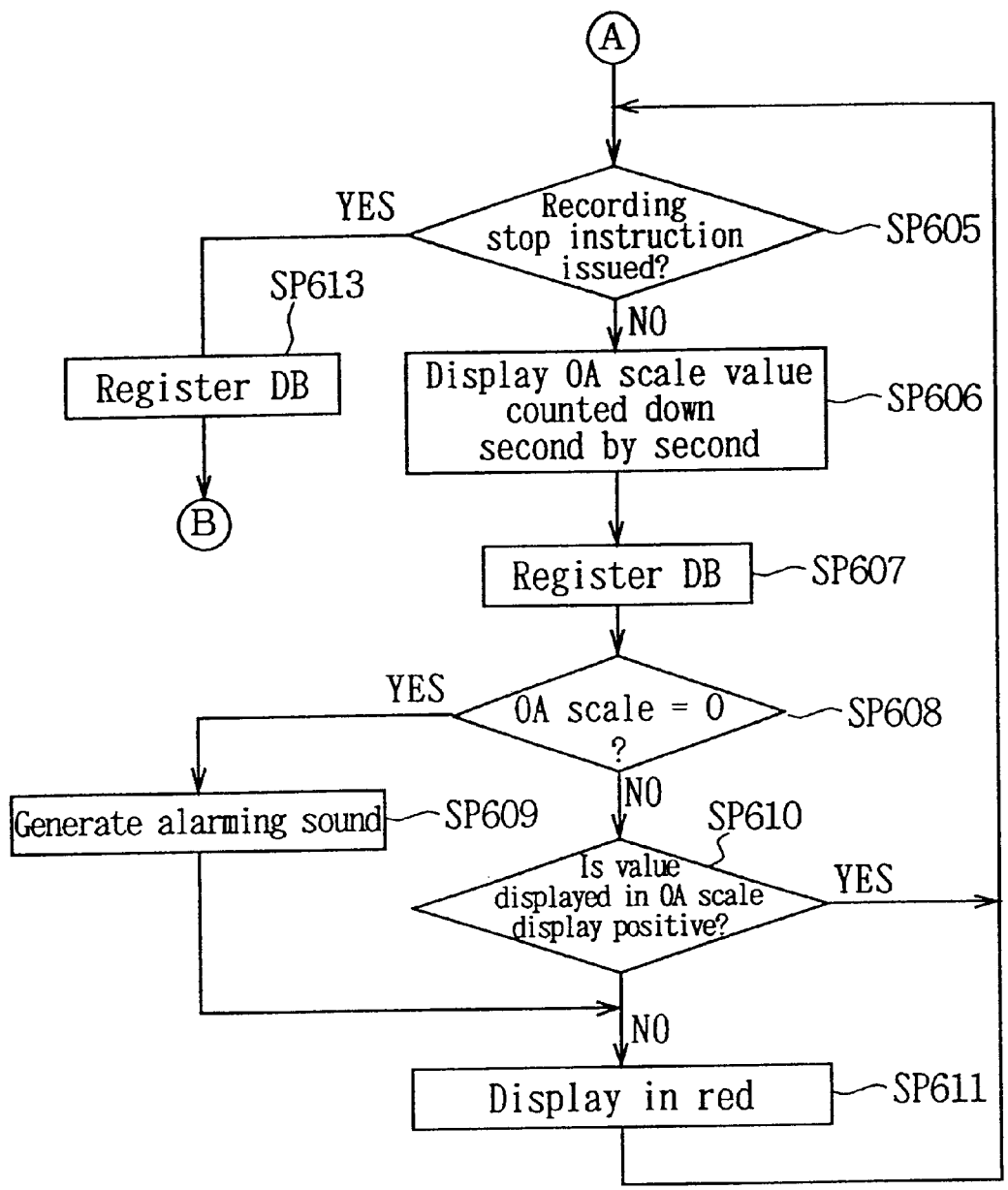
FIG. 60 is a diagram illustrating an example of a flow chart representing a processing procedure for recording a material on a recording screen.

FIGS. 59 and 60 illustrate flow charts related to the processing for recording a material in the on-air server 22, displaying the OA Scale on the recording screen, and counting down a time in OA Scale.

When this processing is started (step SP181), initial settings are applied (SP182), and the recording screen is displayed on a display means such as a monitor, not shown, of the on-air server management terminal 25 (step SP183).

Next, the processing proceeds to step SP184 where it is determined whether an instruction has been issued to terminate the recording screen.

FIGS. 59 and 60 illustrate flow charts related to the processing for recording a material in the on-air server 22, displaying OA Scale on the recording screen, and counting down a time in OA Scale.

When this processing is started (step SP590), initial settings are applied (SP591), and the recording screen is displayed on a display means such as a monitor, not shown, of the on-air server management terminal 25 when the recording button 451 is selected (step SP592).

Next, the processing proceeds to step SP593 where it is determined whether an instruction has been issued to terminate the recording screen. If the termination instruction has been issued to terminate the recording screen 400 (when YES), this processing is terminated (step SP594). If no termination instruction has been issued (when NO), the processing proceeds to step SP595.

At step SP595, it is determined whether or not a recording instruction has been issued. The determination as to whether or not a recording instruction has been issued is made by checking whether or not a component to be recorded has been selected on the recording screen 400 and whether or not a selecting manipulation such as clicking of the recording button 456 with a selecting means such as a mouse has been performed on the screen. If no recording instruction has been issued (when NO), the processing again returns to step SP593. On the other hand, if a recording instruction has been issued (when YES), the processing proceeds to step SP596.

At step SP596, an instruction is issued to record a selected material in the on-air server 22, and the contents of the instruction are registered in the DB server 7 through the network 8.

Next, the processing proceeds to step SP597 where a standby is instructed to a capturing device and the on-air server. For this purpose, when a selected material is recorded, for example, from a VTR 21 as a capturing device to the on-air server 22, a standby instruction is issued to the VTR 21 and the on-air server 33, i.e., an instruction is issued to perform recording preparation.

Next, the processing proceeds to step SP598 where Standby is displayed. Specifically, the on-air server management terminal 25 prepares capturing devices such as the on-air server 22 and the VTR 21 for recording, and displays "ST-BY" indicative of a standby state on the recording screen.

Next, the processing proceeds to step SP599 where it is determined whether or not the devices have been placed in standby. This is determined by checking whether or not the on-air server 22 and the capturing device are ready for recording. If they are not ready for recording (when NO), this means that the on-air server 22 and the capturing device is in a situation where they cannot be prepared for recording for any reason such as incorrect connection of the on-air server 22 with the capturing device, in which case the processing proceeds to step SP600.

At step SP600, an error message is displayed on the recording screen for indicating that the preparation has not been done, and this information is registered in the DB server 7 (step SP601), followed by the processing again proceeding to step SP593.

On the other hand, if the preparation has been done for recording at step SP599 (when YES), the preparation for recording has been done, so that if an error message is being displayed on the recording screen, this message is erased.

Next, the processing proceeds to step SP603 where a recording instruction is issued to the on-air server 22 and the capturing device. More specifically, data indicative of the recording instruction is sent from the on-air server management terminal 25 to the server control terminal 23 for managing the on-air server 22. The server control terminal 23 sends data indicative of the recording instruction to the on-air server 22 based on the data indicative of the recording instruction sent from the equipment control unit 24. Then, the data instructed to be recorded is recorded in the on-air server 22. In addition, a recording instruction is also sent to the capturing device, for example, the non-linear editor 26 to transfer data including video and audio constituting a component or an item instructed to be recorded to the on-air server 22.

The recording of the material in the on-air server 22 is started, and meanwhile a message "Recording from V1" indicating that a material is being recorded is displayed on the recording screen on the on-air server management terminal 25. In addition, the display in the progress field 446 of the recording screen is changed from "Unrecorded" to "Recording" indicating that a component instructed to be recorded is now being recorded.

That information, i.e., the material instructed to be recorded and the information indicating that the material is now being recorded in the on-air server 22, is registered in the DB server 7 (step SP604).

Next, the processing proceeds to step SP605 in FIG. 60, where it is determined whether or not an instruction has been issued to terminate the recording. This recording termination instruction is determined by checking whether or not the stop button 578 in the status display field 402 has been selected with a manipulation means such as a mouse from the screen. If no termination instruction has been issued (when NO), the processing proceeds to step SP606.

At step SP606, the time displayed in OA Scale is counted down second by second. As described above, OA Scale is previously displayed for indicating a time for transmission, and the time in OA Scale is counted down as the material is recorded. Of course, this count-down display may be provided in frames or the like, instead of on the one-second basis, and is counted down every unit time.

Next, the processing proceeds to step SP608 where it is determined whether or not a time displayed in OA Scale has been counted down to zero. When the time displayed in OA Scale reaches zero (when YES), this means that a material required for transmission has been recorded, so that alarming sound is generated for prompting the operator to issue an instruction for terminating the recording, as described above (step SP609). Then, the processing proceeds to step SP611.

On the other hand, if the time in OA Scale is not zero at step SP608 (when NO), it is determined whether or not the time displayed in OA Scale is being counted down without reaching zero (step SP610). If the time in OA Scale display is being counted down (when YES), the processing again proceeds to step SP605. If the time displayed in OA Scale has exceeded zero and is being counted up in the negative direction (when NO), the frame of the OA scale field is displayed in red (step SP611). Of course, the color of the frame may be any other color instead of red, as long as it is recognizable for the operator. Alternatively, the frame may be blinked. Then, the processing again proceeds to step SP605 to repeat the processing.

On the other hand, if a recording termination instruction has been issued at step SP605 (when YES), the processing proceeds to step SP613 where information indicating that the recording has been terminated is registered in the DB server 7. Then, the processing again proceeds to step SP593.

In the foregoing manner, when a material for transmission is recorded in the on-air server 22, OA Scale indicative of the time of the actually transmitted material is counted down on the recording screen, whereby the timing at which the recording is terminated is readily found by the operator. Further, a desired material can be precisely recorded for a recording time.

According to the foregoing embodiment, the alarm sound is generated at the time the time displayed in the OA scale field is counted down to zero. Alternatively, the termination of recording may be notified in a variety of methods, for example, blinking of the stop button 577 to notify the operator of the termination of recording, and so on.

Also, the time counted down in OA Scale is displayed for an actual transmission time of a transmitted material, which has been set in a cue sheet or a program component table, and the time for the aforementioned recording of a sacrifice cut is counted up in the minus direction. Alternatively, the time displayed in OA Scale may be counted down including the sacrifice cut. In this case, the alarming sound is generated at the time the display is counted down to reach zero.

Further, while the down-counted time in OA Scale is found in the recording screen on the on-air server management terminal 25, OA scale may de displayed on a recording screen displayed on any other terminal, for example, on the desk terminal 18, as long as the terminal is connected to the network 8, so that the time in OA Scale is counted down.

Furthermore, while the foregoing description has been made on OA Scale on the recording screen, where a displayed time is counted down, OA Scale for displaying the down-counted time may be displayed on the transmission screen.

As described above, materials (including video data and audio data) of a program such as a news program, transmitted from the broadcasting station, is previously edited, and then recorded in the on-air server 22. In this event, credit information such as the name of a material and so on is recorded at the beginning of the material, so as to confirm whether or not the material has been transmitted, when the material is transmitted.

Conventionally, when material are recorded in an on-air server, credit information such as the names of the materials, broadcasting dates, program names, item names, the order of transmission within items is written together with the materials based on information at the time of recording. However, if these materials are used in a plurality of programs, sent to net stations, or integrated for preservation, or if a program in which they are broadcast is changed, or if the order of transmitting the materials is changed, the credit information must be rewritten and again recorded in the on-air server 22 each time it has been changed, thus causing very complicated and laborious operations as well as a confusion in transmission of materials during the transmission.

To solve this problem, the present invention provides a credit information writing unit before and after the on-air server, wherein a credit writing unit is disposed on the recording side for writing credit information when materials are recorded in the on-air server, and a credit writing unit is disposed on the transmission side for writing credit information when materials are transmitted from the on-air server. Thus, credit information can be written separately for recording of a material and for transmission of a material, such that a material name only can be written upon recording, while the credit information such as a broadcasting date, a program name, an item name and so on can be written in accordance with a transmission purpose upon transmission. In addition, the credit information is used so as to be superimposed together with a video image on the transmission side to confirm a transmitted material. In the following, the credit information writing unit will be described in detail with reference to FIGS. 61–64.

Figure 61:
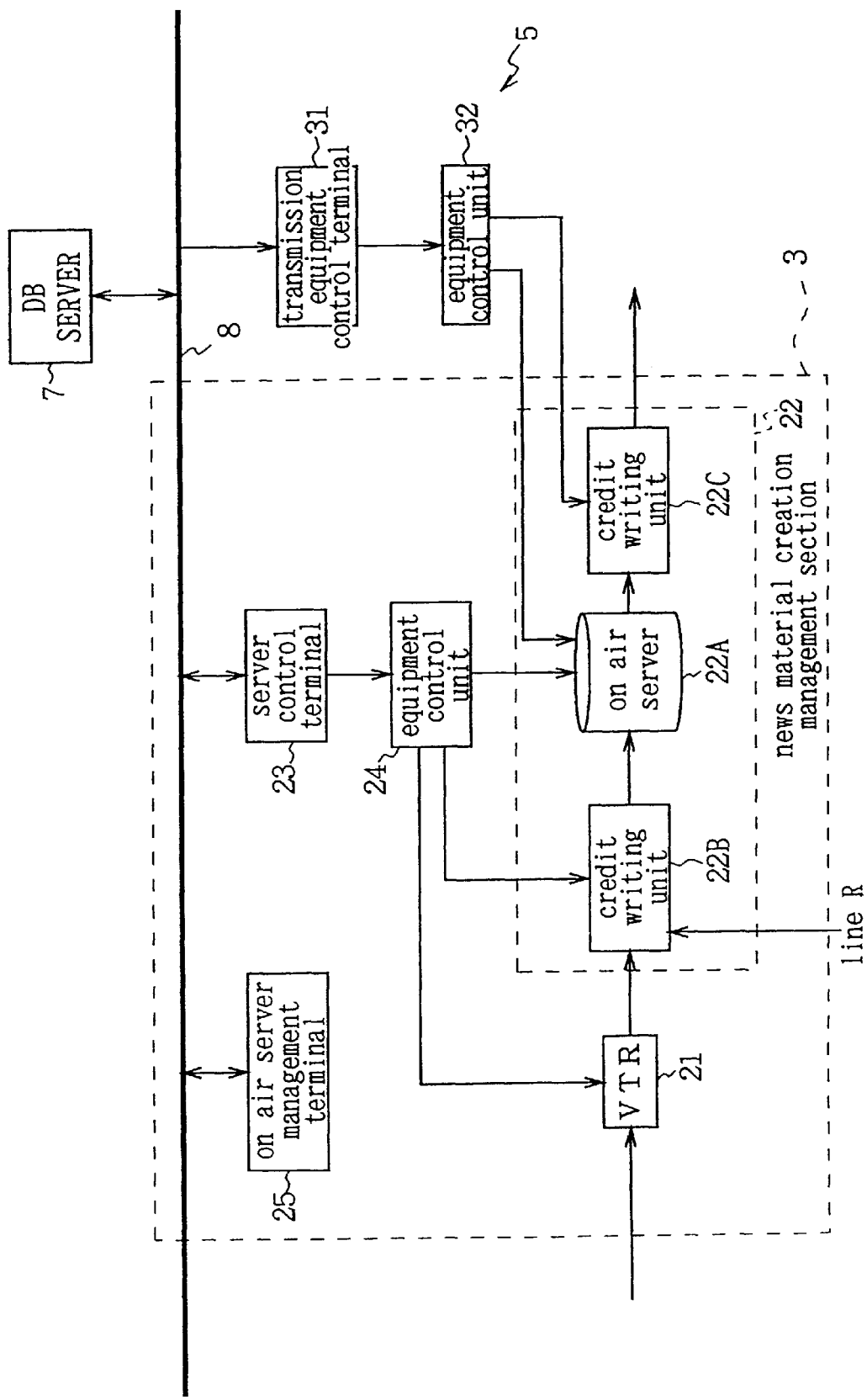
FIG. 61 is a diagram illustrating details of the configuration of a news material creation management section.

FIG. 61 is an example in which the credit writing unit is provided on the recording side and the transmission side of the on-air server 22, respectively.

While materials to be recorded in the on-air server 22 are described below as being transferred from the VTR 21, materials may be of course transferred from the non-linear editor 26 illustrated in FIG. 1, or may be transferred from any other transmission device. Further, materials may be transferred simultaneously from a plurality of transmission devices to the on-air server 22.

As illustrated in FIG. 61, the news material creation management section 5 comprises the on-air server terminal 25 on which the aforementioned recording screen or transmission screen is displayed for manipulations thereon; the VTR 21 from which transmission materials are transmitted; a recording-side credit writing unit 22B for receiving materials transferred from the VTR 21 to write credit information at the beginning or the like of an associated material; an on-air server 22A for recording a material having credit information written thereinto, outputted from the recording-side credit writing unit 22B; the server control terminal 23 for controlling the on-air server 22A; the equipment control unit 24 for actually controlling the VTR 21, the recording-side credit writing unit 22B, and the on-air server 22A based on control information from the server control terminal 23; a transmission-side credit writing unit 22C for writing credit information into a material outputted from the on-air server; the transmission equipment control terminal 31 for controlling transmission equipment in the transmission equipment control section 5; and the equipment control unit 32 for actually controlling transmission equipment based on control information from the transmission equipment control terminal 31. In addition, the on-air server management terminal 25, the server control terminal 23 and the transmission equipment control unit 31 are interconnected through the network 8. Here, assume that the equipment control unit 32 of the transmission equipment control section 5 controls the transmission of the on-air serve 22A of the news material creation management section 3 and the credit writing unit 22C.

The respective components will be further described in detail.

The on-air server management terminal 25 can display a recording screen and a transmission screen to provide information on materials recorded in the on-air server 22A, and display information on materials transmitted from the same, and so on, thus permitting the operator to readily recognize a recording situation and a transmission situation. Since details on the on-air server management terminal 25 have been described, the description is omitted here.

The server control terminal 23 generates equipment control data for the equipment control unit 24 based on data including a recording instruction from the on-air server management terminal 25, and reads first character data corresponding to recording instruction data stored in the DB server 7 through the network 8, and transfers the first character data to the credit writing unit 22B through the equipment control unit 24 as first credit data.

The equipment control unit 24 outputs a VTR control signal to the VTR 21 for instructing transmission of a material, based on equipment control data from the server control terminal 23, and also outputs a first credit writing control signal for controlling the credit writing unit 22B so as to write the first credit data into a material to be transferred, and a server control signal for controlling the on-air server 22 so as to record a material which has been instructed to be recorded. The VTR control signal, the first credit writing control signal and the server control signal from the equipment control unit 24 record a desired material and write credit information into the material to be recorded.

The VTR 21 reproduces a desired material from a cassette tape, not shown, in the VTR 21, on which materials are recorded, and outputs the reproduced material in accordance with a VTR control signal from the equipment control unit 24.

The recording-side credit writing unit 22B is controlled in accordance with the first credit writing control signal to add the first credit data to the beginning of a material outputted from the VTR 21 and output it to the on-air server 22A. The first credit data may be added, for example, to the end position or the like of a material, other than the beginning of the material.

Also, materials recorded in the on-air server 22A are transmitted in accordance with a cue sheet, wherein a transmission situation is displayed as a transmission screen on a display means such as a monitor, not shown, of the on-air server management terminal 25, as described above. On the transmission screen, destinations of materials to be transmitted are specified to transmit the materials to their respective destinations.

The transmission equipment control terminal 31 is provided with cue sheet information and material destination information, and generates equipment control data for controlling the on-air server 22A and the credit writing unit 22C, as well as reads second character data corresponding to a material transferred from the DB server 7 and outputs the second character data to the equipment control unit 31 as second credit data.

The equipment control unit 32 sends to the on-air server 22A a server control signal for controlling the on-air server 22A to transfer a material therefrom based on the equipment control data, and sends to the credit writing unit 22C a transmission-side credit writing unit control signal for controlling the credit writing unit 22C to write second credit writing data into a material transferred from the on-air server 22A based on the second credit data.

The on-air server 22A outputs a material stored therein based on the on-air server control signal from the equipment control unit 32 to the transmission-side credit writing unit 22C.

The transmission-side credit writing unit 22C adds the second credit data at a position at which credit information of a transferred material is written based on a second credit writing control signal, and outputs the material with the second data added thereto. FIG. 61 illustrates an example for describing the configuration of the credit writing unit 22B, 22C in a readily understandable manner, whereas the on-air server terminal 25 is actually connected directly to the on-air server 22A in order to display recording and transmission situations of the on-air server 22A on the recording screen and the transmission screen, respectively. In addition, the equipment control unit 24 of the news material creation management unit 3 may be configured so as to control the transmission-side credit writing unit 22C as well as the recording-side credit writing unit 22B.

FIG. 62 illustrates examples in which credit information is displayed on the on-air server management terminal 25.

FIG. 62(A) is an example of a material into which credit information has been written by the recording-side credit writing unit. On a display means such as a monitor, not shown, of the transmission equipment control terminal 31 or the on-air server management terminal 25, credit information indicating a material name is displayed together with a material, as illustrated in FIG. 62(A). In this case, the credit information written into the material by the transmission-side credit writing unit 22B is the material name alone.

FIG. 62(B) shows an example of a displayed material into which credit information has been written by the transmission-side credit writing unit 22C, provided on a display means such as a monitor, not shown, of the on-air server management terminal 25 or the transmission equipment control terminal 31. The credit information in this case shows transmission date and time, a program name, an item number on a cue sheet, an item name, a transmission order, and a material name. This is an example of a material, into which the credit information has been written, displayed when the material is transmitted to a local station.

FIG. 62(C) shows an example of a displayed material, into which credit information has been written by the transmission-side credit writing unit 22C. In this case, this is an example of a material transmitted to a destination. The credit information includes transmission date and time indicative of the date and time at which the material is transmitted, a destination, a source, and a material name.

The credit information shown in FIGS. 62(B) and 62(C) are such that the credit information other than the material name is transmitted as superimposed on an image to be transmitted. Of course, all the credit information may be superimposed.

Next, a processing procedure for writing credit information into a material, recording the material in the OA server, and transferring the material from the OA server will be described with reference to FIGS. 63 and 64.

Figure 63:
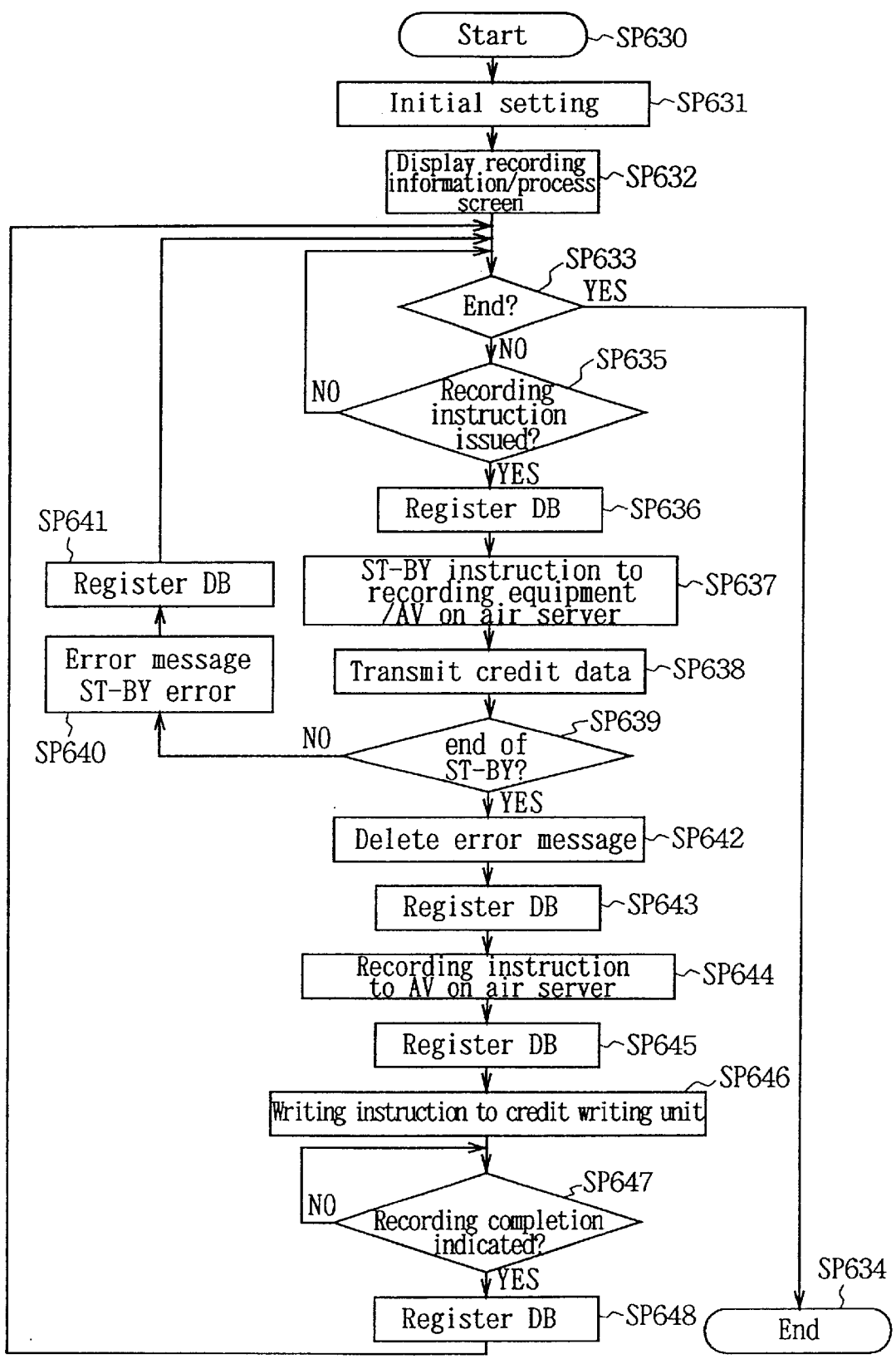
FIG. 63 is a flow chart representing a processing procedure for writing credit information for recording when a material is recorded in an on-air server.
Figure 64:
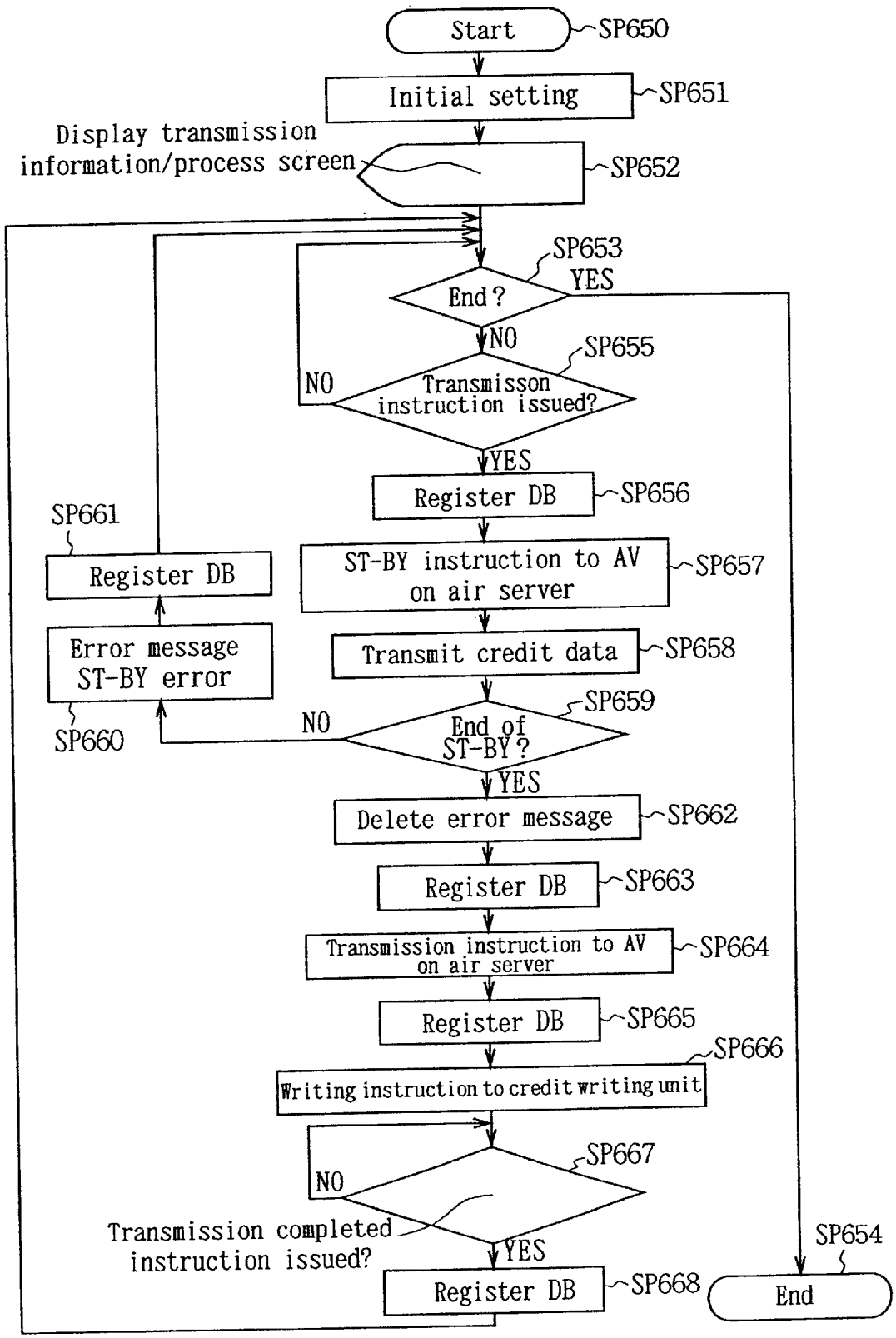
FIG. 64 is a flow chart representing a processing procedure for writing credit information for transmission when a material is transmitted from the on-air server.

FIG. 63 is a flow chart representing the processing for writing credit information into a material and recording the material.

First, when this processing is started (step SP630), initial settings are applied (step SP631), and a recording screen as illustrated in FIG. 51 is displayed on the on-air server management terminal 25 (step SP632).

Next, the processing proceeds to step SP633 where it is determined whether or not an instruction has been issued to terminate the recording screen. If the termination instruction has been issued (when YES), the recording screen is closed, and this processing is terminated (step SP634).

If no termination instruction has been issued (when NO), it is determined whether an instruction for recording a selected material in the on-air server 22 has been issued. If no recording instruction has been issued (when NO), the processing again proceeds to step SP633. If a recording instruction is issued (when YES), the processing proceeds to step SP636.

At step SP636, information indicating that the instruction has been issued to record the selected material is registered in the DB server 7, and then an instruction is issued to a capturing device and the on-air server to prepare for recording (step SP637). In addition, the aforementioned credit data is sent to the recording-side credit writing unit 22B (step SP638).

Next, the processing proceeds to step SP639 where it is determined whether or not the capturing device and the on-air server, to which the instruction was issued at step SP637, have passed a standby state. If not passed (when NO), the capturing device and the on-air server are still in a standby state for any reason, such as a failure in connecting the capturing device with the on-air server, so that an error message "Standby Error" is displayed (step SP640), and information indicative of the occurrence of an error is registered in the DB server 7 (step SP641), followed by the processing again proceeding to step SP633.

On the other hand, if the standby state has been passed at step SP639 (when YES), an error message, if displayed on the recording screen, is erased (step SP642), and information indicating that the error state has been eliminated is registered in the DB server 643 (step SP643).

Next, the processing proceeds to step SP644 where a recording instruction is issued to the on-air server. The recording instruction is issued by selecting the recording button 456 on the recording screen. Then, information indicating that the instruction has been issued to record the selected material is registered in the DB server 7 (step SP645).

Next, the processing proceeds to step SP646 where an instruction is issued to the recording-side credit writing unit 22B to write credit information at the beginning of the material or the like.

Then, the material, into which the credit information has been actually written, is recorded, and step SP647 is repeated until information indicating that the material has been recorded is given. When the recording is completed, "Recorded" is displayed in the progress field 446 of the recording screen.

Next, the processing proceeds to step SP648 where information on the material recorded together with the credit information is registered in the DB server 7. Then, the processing again proceeds to step SP633.

Next, the processing for writing credit information on the transmission side will be described with reference to a flow chart illustrated in FIG. 64.

When the processing for writing credit information on the transmission side is started (step SP630), initial settings are applied (step SP631), and a recording screen is displayed on the on-air server management terminal 25 (step SP632). Then, the processing proceeds to step SP633 where it is determined whether or not an instruction has been issued to terminate the recording screen.

If the termination instruction has been issued (when YES), the recording screen is closed, and this processing is terminated (step SP634). If no termination instruction has been issued (when NO), the processing proceeds to step SP655.

At step SP655, it is determined whether or not a transmission instruction has been issued. This determination is made from a transmission instruction by cue sheet information if a recorded material is transmitted for broadcasting, and by checking whether nor not the local transmission button 521 or the material feed button 522 has been selected on the transmission screen if the recorded material is transmitted for any other purpose. If no transmission instruction has been issued at this step (when NO), the processing again proceeds to step SP653. If a transmission instruction has been issued (when YES), the processing proceeds to step SP656.

At step SP656, information on the instruction for transferring the selected material is registered in the DB server 7.

Next, the processing proceeds to step SP657 where an instruction is issued to the on-air server 22 to prepare for transmission. Then, credit data is sent to the transmission-side credit writing unit 22C to write credit information into the material to be transmitted (step SP658).

Next, the processing proceeds to step SP659 where it is determined whether the on-air server 22A has completed the preparation for transmission. If the on-air server 22A is not ready for transmission (when NO), an error message "Standby Error" is displayed on the transmission screen (step SP660), and information indicating that an error has occurred in the transmission of the selected material is registered in the DB server 7 (step SP661). Then, the processing again proceeds to step SP653.

If the on-air server 22A has passed a standby state and completed the preparation for transmission at step SP659 (when YES), an error message, if displayed on the transmission screen, is erased (step SP662), and information indicating that the on-air server 22A has recovered from the error state is registered in the DB server 7 (step SP663).

Next, the processing proceeds to step SP664 where an instruction is issued to the on-air server 22A, since it is ready for transmission, to transmit the material, and then information indicating that an instruction has been issued to transmit the selected material is registered in the DB server 7 (step SP665).

Next, the processing proceeds to step SP666 where an instruction is issued to the transmission-side credit writing unit 22C to write credit information into the material to be transmitted.

Then, the material is actually transmitted from the on-air server 22A, and the credit information is written into a predetermined position such as the beginning of the material in the transmission-side credit writing unit 22C.

It is determined whether or not a required material has been transmitted (step SP667), and this step SP667 is repeated until the transmission ends. When the transmission ends, "Transmitted" is displayed in the progress field 526G of the transmission screen, and information indicating that the transmission of the selected material has been terminated is registered in the DB server 7 (step SP668). Then, the processing again proceeds to step SP653.

In the foregoing manner, the credit writing units are provided on both of the recording side and the transmission side of the on-air server, so that different credit information can be written separately when a material is recorded and when the material is transmitted. Also, the latest credit information is read from the DB server and transferred to the credit unit so that the latest credit information can be written.

Therefore, it is not necessary to rewrite credit information each time a material to be transmitted is changed, thereby making it possible to improve the operation efficiency and reliably confirm a material to be transmitted.

While the foregoing embodiment has been described in connection with credit information as textual information such as a material name, graphical information or both graphical and textual information may be displayed instead. In addition, information other than a material name and the above-mentioned credit information may of course be applied to the credit unit of the present invention.

It is also possible to previously store all credit information in the on-air server management terminal 25 such that credit information can be selected on the recording screen or the transmission screen on the management terminal 25, and an instruction is issued to write the credit information.

Materials edited by the editors 20, 26, for broadcasting a news program or the like, are recorded in the on-air server 22, where materials recorded in the on-air server 22 are managed on a program-basis. This is because a program component table and a cue sheet indicate items and components for each program, and a recording screen and a transmission screen, created based on them, also indicate items and components for each program.

In some programs, materials and so on commonly used in a plurality of programs must be recorded in the on-air server for each of the programs, thus degrading the efficiency of the operation for recording materials in the on-air server 22. Also, conventionally, materials frequently used in many programs for general purposes have not been transmitted from the on-air server 22.

More specifically, for recording materials in the on-air server, items and components must be inputted in the program component table. Materials for a special program and a documentary program cannot be previously recorded in the on-air server before items and components associated therewith are inputted in the program component table.

As one aspect of the present invention, the on-air server, in which edited materials are recorded, is provided with an area for recording materials which have not been determined in which program they are to be used, and materials which are likely to be again transmitted (these materials are hereinafter referred to as the pool materials), and an area for recording materials which may be frequently used for general purpose (these materials are hereinafter referred to as the general-purpose materials). In addition, a pool material button and a general-purpose material button are provided on the program component table and the cue sheet screen such that a material can be freely inputted to and outputted from the pool material area and the general-purpose material area, and materials, which have been edited but have not been determined in which program they are used, can be recorded in the on-air server. In addition, since materials can be stocked, a free broadcasting program can be organized, so that the operation efficiency is significantly improved for operators dedicated to the organization of a program.

The foregoing aspect will be described in detail with reference to FIGS. 65–73.

Figure 65:
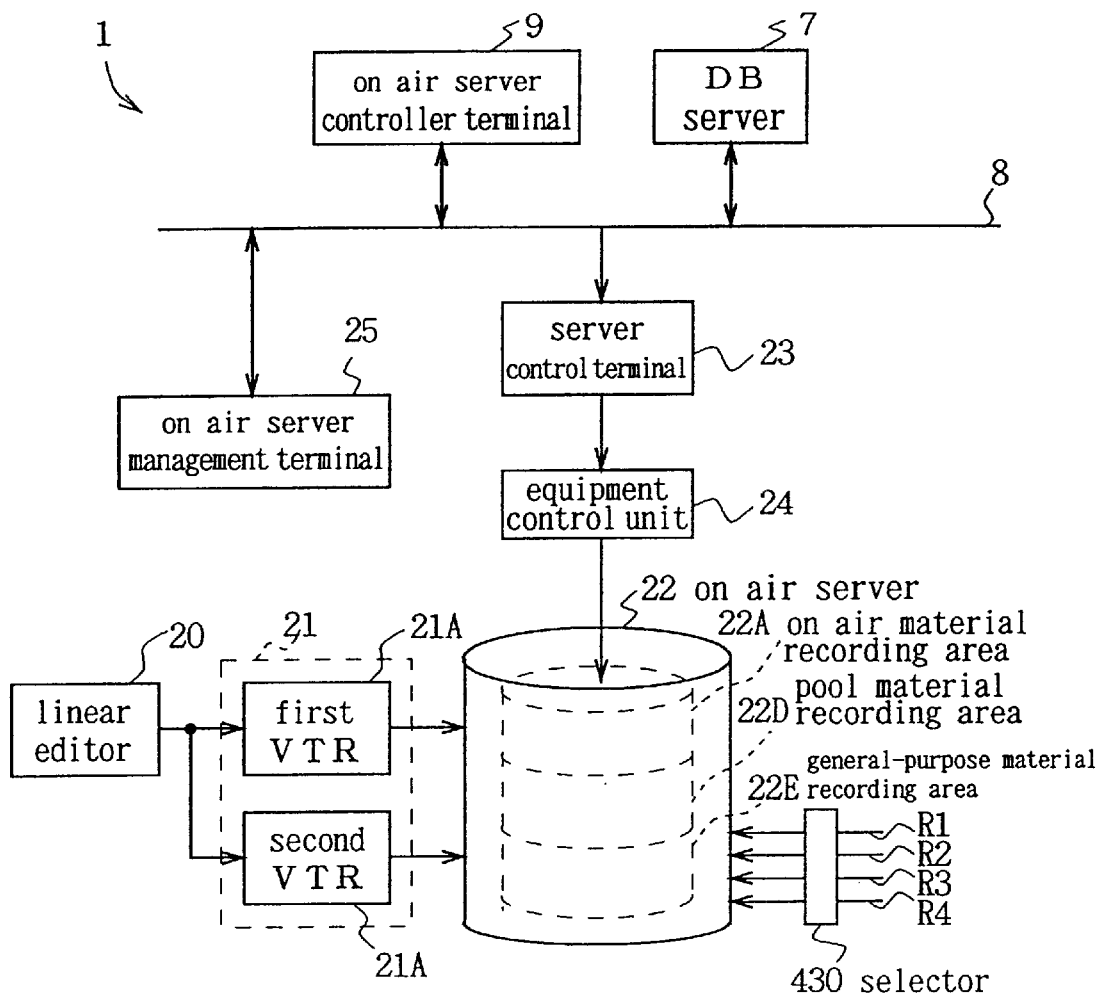
FIG. 65 is a diagram illustrating a detailed configuration of the news material creation management section.

As illustrated in FIG. 65, the on-air server 22 is divided into an on-air material recording area 22A for recording on-air materials which have been determined to be transmitted; a pool material recording area 22B for recording pool materials; and a general-purpose material recording area 22C for recording general-purpose materials which may be frequently used for general purpose.

As to the recording of on-air material in the on-air server 22, materials of components selected on a recording screen from lines R1–R4 from the VTR 21 serving as a capturing device, local stations and so on are recorded through manipulations on the recording screen displayed on the on-air server management terminal 25, as described above. Here, materials from the lines R–R4 are inputted to a selector 430, controlled by the equipment control unit 24, and a material from a line selected by the selector is recorded. When the on-air material is recorded, the equipment control unit 24 controls to record the on-air material in the on-air material recording area 22A of the on-air server 22. In other words, the equipment control unit 24 controls materials inputted to the on-air server such that on-air materials from the capturing device 21 and the selector 430 are recorded in the on-air recording area 22A.

Pool materials and general-purpose materials in turn can be selected from a program component table mainly displayed on the screen of the desk terminal 18 in the news program production support section 2. Selected data is inputted from the desk terminal 18 through the network 8, and from the server control terminal 23 to the equipment control unit 24. In accordance with the data, a control signal is sent to record pool materials in the pool material area 22B and general-purpose materials in the general-purpose material area 22C, thereby actually recording pool materials in the pool-material area 22B of the on-air server 22, and general-purpose materials in the general-purpose material area 22C.

Pool materials and general-purpose materials may also be selected from a cue sheet screen displayed on the cue sheet terminal 39, in which case selected data is inputted from the cue sheet terminal 39 to the control equipment unit 24 or the like through the network, so that respective data are recorded in respective regions in accordance with that data. A selection of a pool material or a general-purpose material from the program component table or the cue sheet will be described later.

Next, manipulations for selecting a pool material and a general-purpose material from a recording screen will be described in detail with reference to FIG. 51 and FIGS. 66(A), 66(B).

First, a selection of a pool material will be described.

Figure 66A:
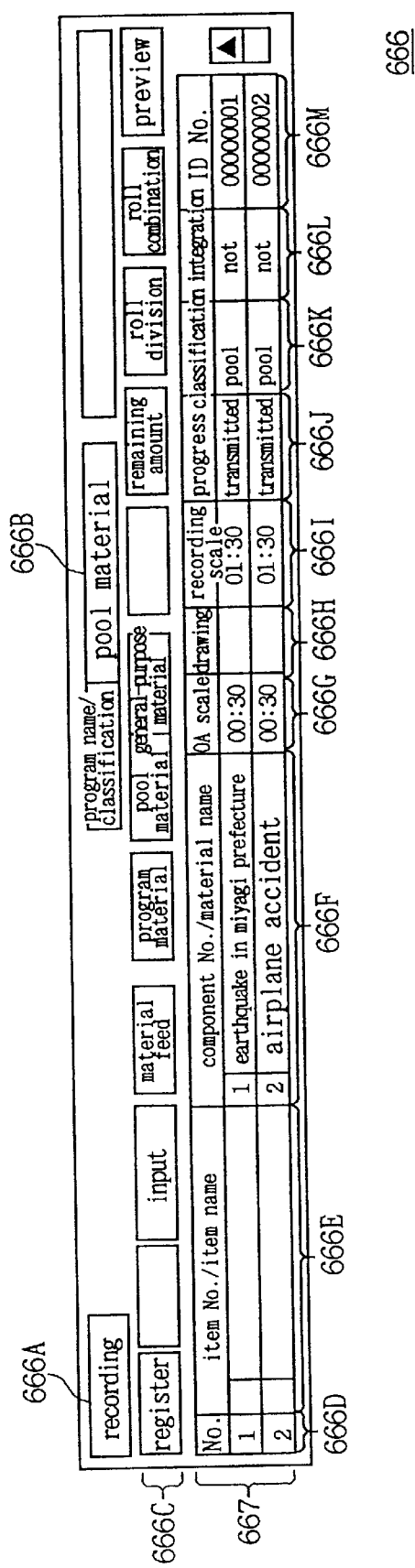
FIG. 66(A) is a diagram illustrating an example of a detailed screen structure for selecting a pool material from a recording screen.

When the pool material button 458 is selected on the recording screen 400 illustrated in FIG. 51, a pool material recording screen 666 illustrated in FIG. 66(A) is displayed. This screen may be displayed in a popup style so as to overlap over the recording screen 400, or this pool material recording screen 666 may be displayed after the recording screen 400 is once closed. Here, the latter case is described.

As to the structure, the pool material recording screen 666 comprises a recording display field 666A for indicating that this is a screen on the recording screen 400; a program name/classification field 666B for indicating that the currently opened screen is a screen for selecting a pool material; a variety of setting buttons 666C, and a pool material list 667 in the form of table having substantially the same structure to the recording screen for each item and each component.

The pool material list 667 is composed of a number column 666D for indicating a number of each material; an item number/item name column 666E for displaying each item number and item name; a component number/material name column 666F for displaying a component number and a material name of each component; an OA scale column 666H for displaying the aforementioned OA Scale; a recording scale column 666I for indicating an actually recorded time; a progress field 666J for displaying a progress situation of recording a material; a classification column 666K for indicating the classification of each component; an integration column 666L for displaying whether or not each material has been integrated; and an ID number column 666M for displaying an identification number of each component, each item and so on.

In the example illustrated in FIG. 66(A), OS Scale of Material Number "1" (Material Name "Earthquake in Miyagi Prefecture") is "00:30" or 30 seconds; Recording Scale is "01:30" or 1 minute and 30 seconds; and Material is "Recorded," i.e., the material has already been recorded in the on-air server. The classification of this component is "Pool Material," and Integration is "Not," i.e., it has not been subjected to integration.

Here, recording of material in the pool material area 22B of the on-air server 22 is performed by selecting a desired pool material from the pool material list 667, and "Record" in the variety of setting button 666C on the pool material recording screen 666. This selecting operation is executed by a selecting manipulation such as clicking on a desired region with a manipulation means such as a mouse, not shown, of the on-air server management terminal 25 on the screen.

Information on a selected material and information indicating that this material is recorded in the pool material area 22B, and so on are stored in the DB server 7 and so on. Information indicating that this material is actually recorded in the pool material area 22B, and so on may be managed by the server control terminal 23.

Also, for newly selecting a pool material on this recording screen 400 to record the pool material in the pool material area 22B of the on-air server 22, an input button in the variety of setting button 666C is selected by a manipulation such as clicking on the screen. When the input button is selected, a new pool material input popup 665 is displayed as illustrated in FIG. 66(B). This popup may be likewise displayed over the pool material recording screen 66 on the screen, or this popup 665 may be displayed after the pool material recording screen 666 is once closed.

This popup 665 is composed of a material name input field 665A for inputting a material name, and an OA scale input field 665B for inputting an OA scale of a material to be recorded.

On the popup 665, necessary information, i.e., the name of a material to be newly registered as a pool material is entered on the screen with an input means such as a keyboard, and an OA scale of the pool material to be newly registered is inputted similarly with an input means. In this way, the material, which is not displayed in the pool material list 667 of the pool material recording screen 666, is registered. Afterwards, the material newly registered in the pool material list 667 is selected, and a recording button in the variety of setting buttons 666C is selected to execute the recording.

Next, a selection of a general-purpose material from the recording screen 400 will be described.

Figure 66B:
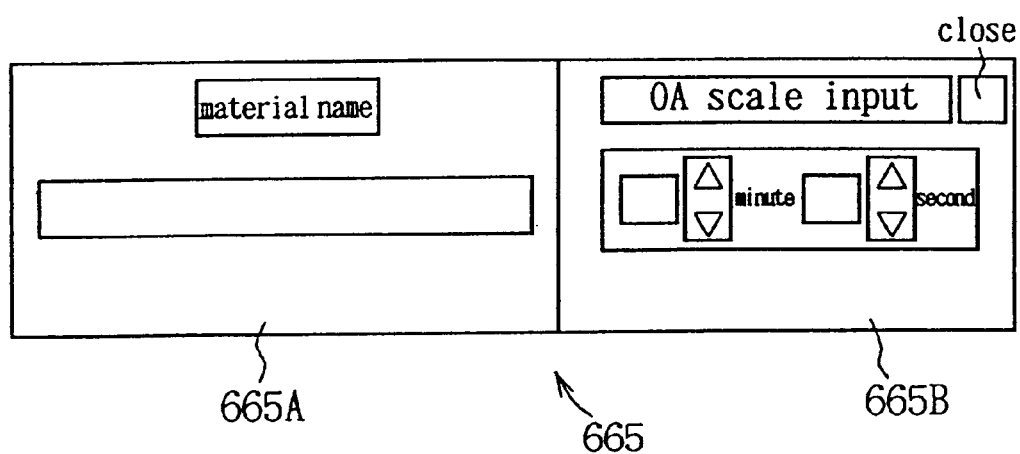
FIG. 66(B) is a diagram illustrating a detailed structure of a popup display for selecting a pool material.
Figure 66C:
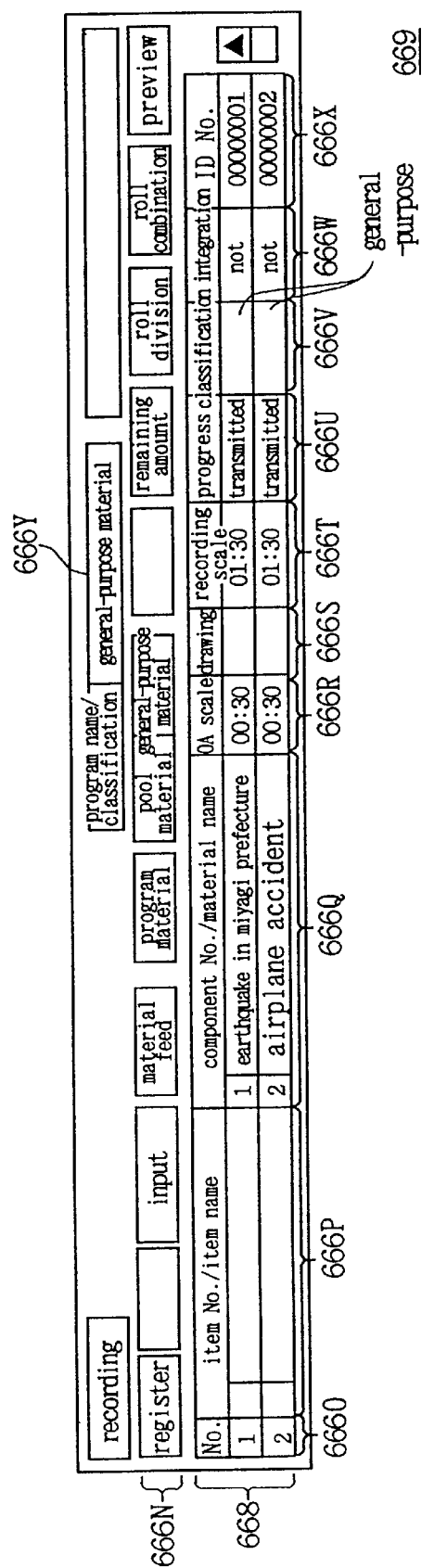
FIG. 66(C) is a diagram illustrating an example of a detailed screen structure for selecting a general material from a recording screen.

When the general-purpose material button 459 is selected on the recording screen 400 illustrated in FIG. 51, a general-purpose material recording screen 669 is displayed as illustrated in FIG. 66(C).

The general-purpose material recording screen 669, which has the same structure as the pool material recording screen 666, comprises a recording display field 666N; a program name/classification field 660Y; a variety of setting buttons 666N; and a general-purpose material list 668 for displaying a material list in the form of table.

The general-purpose material list 668 also has the same structure as the pool material list 667, and is composed of a material number column 6660; an item number/item name column 666P; a component number/material name column 666Q; an OA scale column 666R; an image column 666S; a recording scale column 666T; a progress field 666V; a classification column 666V; an integration column 666W; and an ID number column 666X.

Here, recording of a material in the general-purpose material area 22C of the on-air server 22 is executed by selecting a desired component from the general-purpose material list 668, and selecting a recording button in the variety of setting button 666N on the general-purpose material recording screen 669.

In addition, information on a selected material and so on are stored in the DB server 7 and so on.

For newly selecting a general-purpose material on the recording screen 400 to record the selected general-purpose material in the general-purpose material area of the on-air server 22, as an input button in the variety of setting button 666N is selected on the general-purpose material recording screen, an input popup is displayed as is the case of the pool material recording screen. Since the structure of this popup and manipulations associated therewith are also completely the same as those of the new pool material input popup, details are omitted there. A newly registered general-purpose material is registered in the list 668 of the general-purpose material recording screen 669. Then, as a recording button is manipulated after the registered material is selected, the general-purpose material is recorded in the general-purpose material area 22C of the on-air server 22.

Next, manipulations for selecting a pool material and a general-purpose material from a program component table will be described in detail with reference to FIGS. 17, 67, 68.

For assigning a pool material or a general-purpose material recorded in the on-air server 22 as an on-air material transmitted in a program, the recorded pool material or general-purpose material must be registered in a program component table.

In the following, manipulations for this operation will be described.

Figure 67:
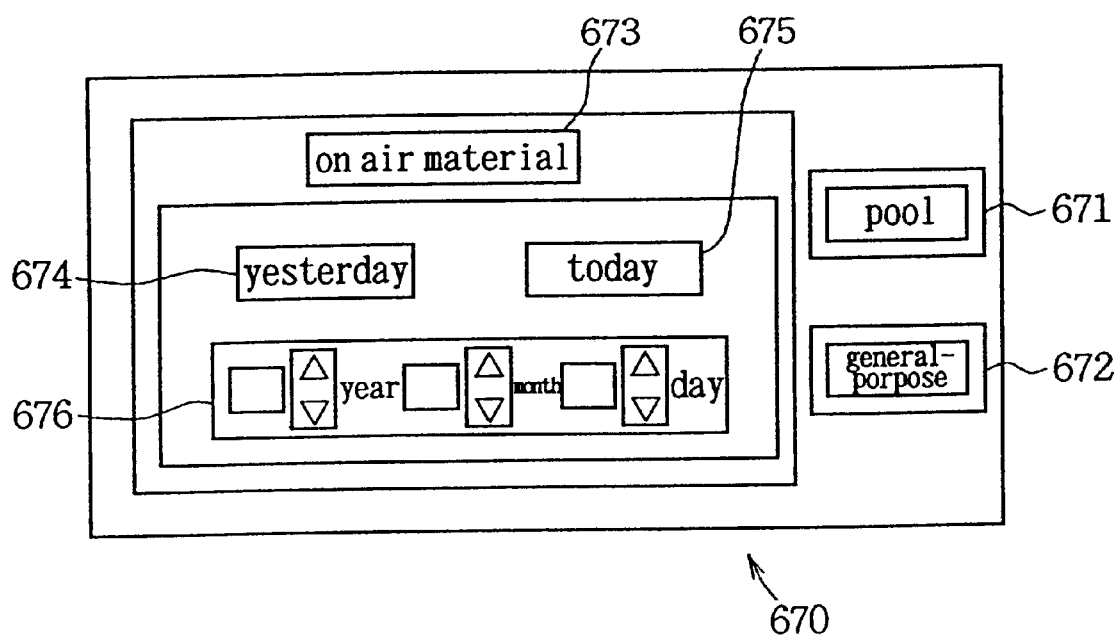
FIG. 67 is a diagram illustrating an example of a detailed screen structure of a material selection popup.

On the program component table 100 illustrated in FIG. 17, when the NV material button in the setting buttons 167 is selected by a selecting manipulation such as clicking with a manipulation means such as a mouse, a material selection popup 670 illustrated in FIG. 67 is displayed. This popup is displayed on a display means, not shown, of the desk terminal 18 in the news program production support section 2, on which the program component table is displayed.

The popup 670 mainly comprises a pool button 671 and a general-purpose button 672 for selecting whether a material recorded in the on-air server 22 is a pool material or a general-purpose material; and an on-air material button 673 for selecting an on-air material. Since the date on which a material was registered in the program component table must be inputted when the on-air material button 673 is selected, a variety of buttons are provided for inputting the date. These buttons include a yesterday button 674 for selecting an on-air material registered the day before; a today button 675 for selecting an on-air material registered the same day; and a date input field 676 for inputting a date for specifying, on the assumption that today is entered in the date column 163 of the program component table 100.

Now, description is made below on the case where the pool button 671 is selected.

Figure 68:
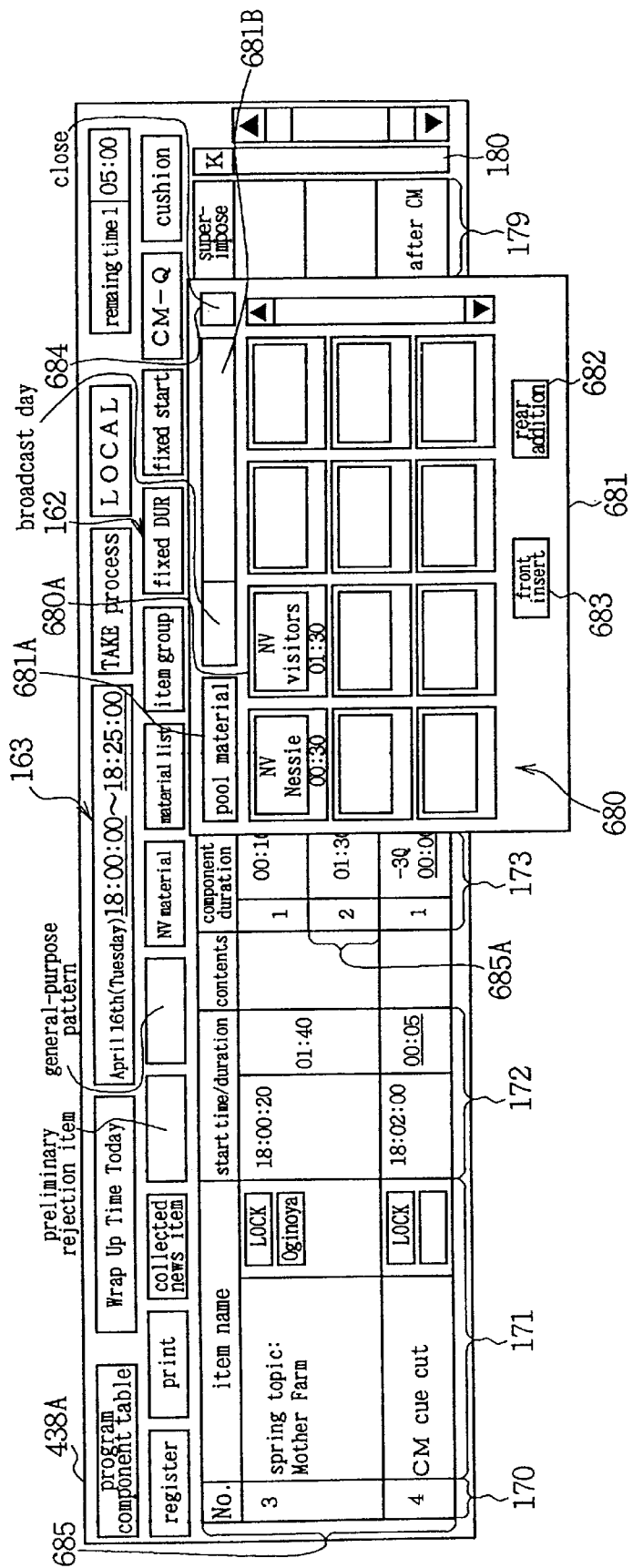
FIG. 68 is a diagram illustrating an example of a screen on which a list of pool materials recorded in a pool material region in the on-air server is displayed on a program component table.

When the pool button 671 is selected from the material selection popup 670, the material selection popup 670 is closed, and a pool material list popup 681 for indicating a list of pool materials recorded in the pool material area 22B of the on-air server 22 is displayed superimposed on the program component table 100, as illustrated in FIG. 68. A desired pool material is selected from this pool material list popup 681, and a component in the program component table, into which the pool material is inserted, is selected, resulting in inserting the pool material thereinto.

This pool material list popup 681 is composed of a display field 681A; a broadcasting date field 681B for displaying a broadcasting date; an icon display field 680 for displaying each @ pool material recorded in the pool material area 22B of the on-air server 22 in the form of icon; a front insertion button 683 for inserting a pool material in front of a line selected on the program component table 100; and a rear addition button 682 for inserting a pool material at the rear of a line selected on the program component table 100. In addition, the pool material icons 680 display component durations of respective materials, thereby permitting readily recognition of a component duration of a component added by inserting the pool material on the program component table. In addition, since Material Names for indicating the names of materials are simultaneously displayed, it is also possible to recognize what a selected material is like.

With the structure of the pool material list popup 681 described above, a pool material is actually inserted into the program component table through the following manipulations. Specifically, a line at which a pool material is to be inserted is selected within components in the program component table 100. The selected line is displayed in color or blinked, thus indicating that the line has been selected. Then, as the NV material button is selected, the material selection popup 670 illustrated in FIG. 67 is displayed, so that the pool button 671 is selected on this popup 670. The selection causes the material selection popup 670 to close, followed by the pool material list popup 681 displayed superimposed on the program component table. Here, as a desired pool material is selected, a component is newly added above or below the line selected on the program component table, thus inserting the pool material into the program component table. A selection as to whether the pool material is inserted above or below the selected line may be made by selecting the front insertion button 683 or the rear addition button 682 on the pool material selection popup 681. However, this selection, if made each time, causes a reduced work efficiency, so that rear addition, for example, may have been previously set. Thus, only by selecting the pool material icon 680, insertion is carried out.

Figure 69:
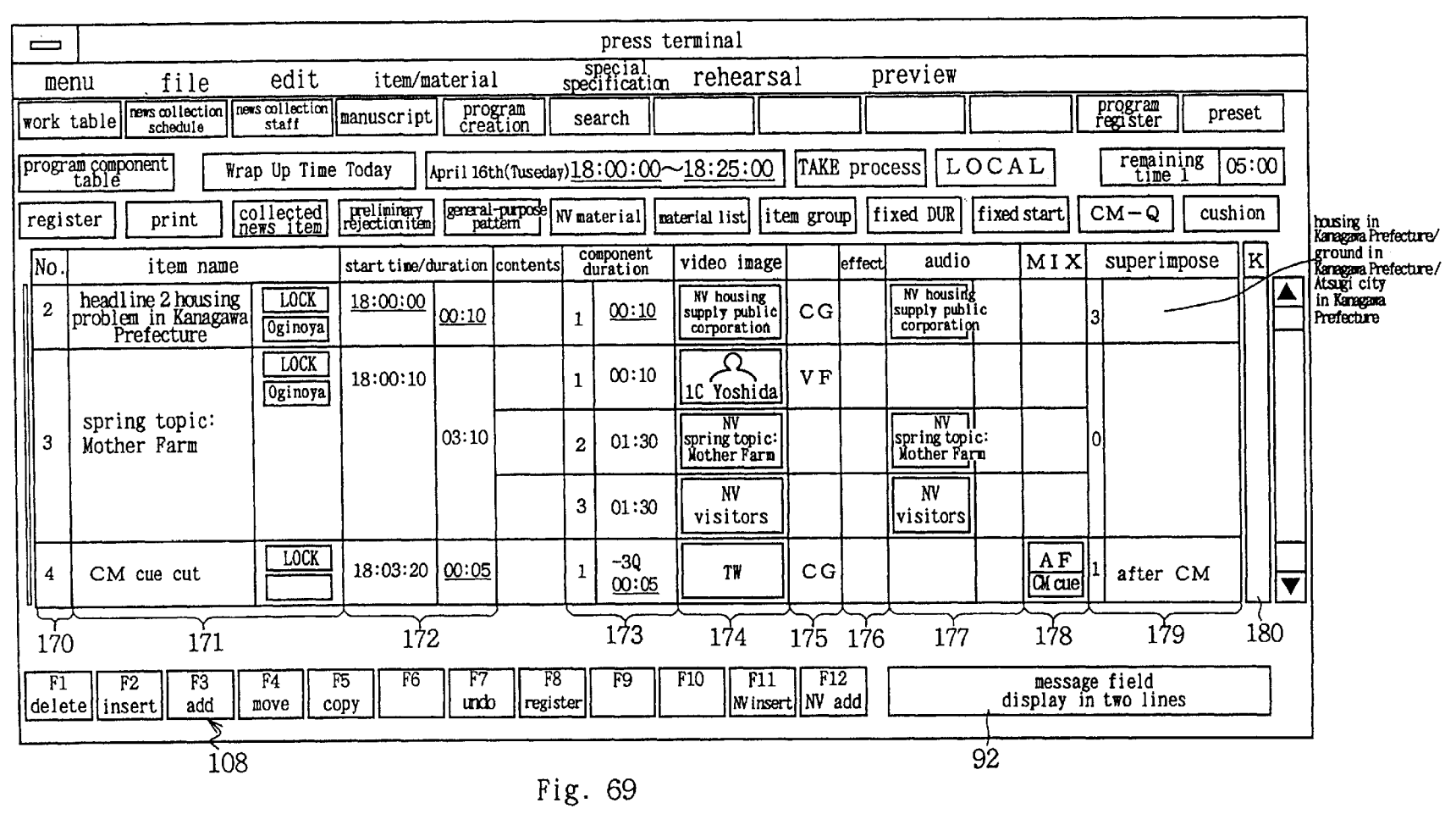

An example of a program component table, into which a pool material is actually inserted, is illustrated in FIG. 69.

Illustrated in this case is a program component table in which a pool material (Material Name "How Tourist Enjoy") is additionally inserted below a line selected on the program component table (the line of Component Number "2" of Item Name "Spring Topic: Mother Farm"). When this pool material is inserted, a component is newly added in the program component table 100, and a new component duration is displayed in the component duration column 172 of the item from the component duration of the pool material, and also a component duration is newly displayed also in the component duration column 173 of the added line.

Next, as to insertion of an additional general-purpose. material into the program component table 100, this involves completely the same manipulations as those required for the insertion of an additional pool material into the program component table, including a selection of a line on the program component table at which a general-purpose material is to be inserted, and a selection of the NV material button. Since the material selection popup 670 is displayed, the general-purpose material button 672 is selected thereon. The material selection popup 670 is closed, and the general-purpose material list popup is displayed superimposed on the program component table. This general-purpose material list popup has the same structure as the pool material list popup 681, except that "General-Purpose Material" is displayed in the display field 681A, and icons representative of general-purpose materials recorded in the general-purpose material area 22C of the on-air server 22 are displayed in the material icon field 680. Then, as a desired general-purpose material icon is selected, a component is newly added above or below the selected line.

Here, the general-purpose material list popup displayed over the program component table in a popup style only differs from the pool material list popup 681 and the display fields, detailed illustration and description therefor are omitted.

Next described is insertion of an additional pool material or a general-purpose material selected from a cue sheet screen displayed on the cue sheet terminal 39 into a cue sheet. However, the insertion of an addition pool material differs from the insertion of an additional general-purpose material only in the display field on the displayed screen, and manipulations therefor are the same, so that the insertion of an additional pool material is only described in the following, and description on the insertion of a general-purpose material is omitted.

Figure 70:
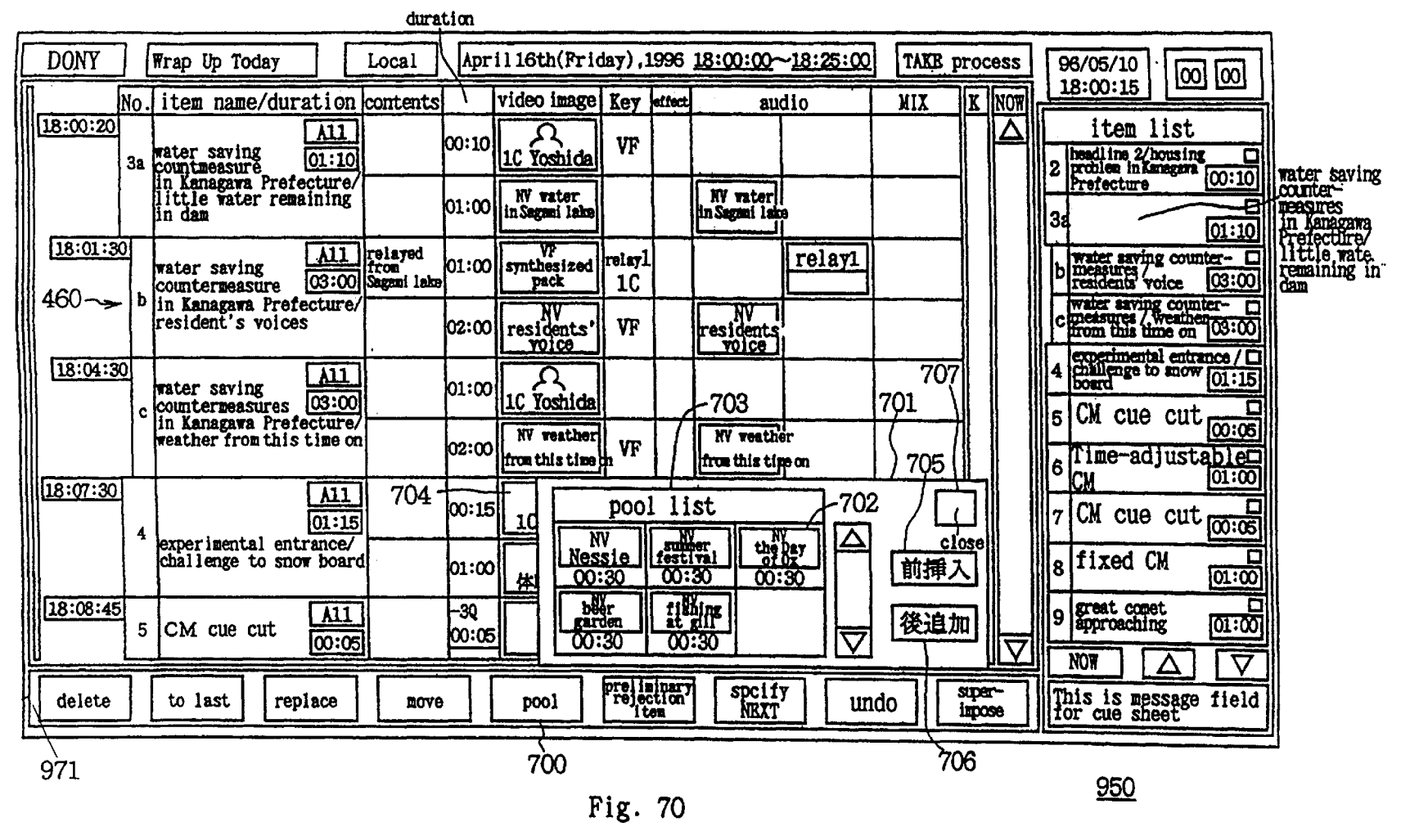

FIG. 70 illustrates an example in which a pool material list popup 701 is displayed in the pool material area 22C of the on-air server 22 together with a cue sheet screen 950.

For displaying this popup 701, the pool button in the setting buttons 171 is selected by a selecting manipulation such as clicking with a manipulation means such as a mouse on the screen of the cue sheet terminal 39, resulting in displaying the popup 701. The pool material list popup 701 comprises a display field 703; an icon display field 792 for displaying a list of pool materials in the form of icon; a front insertion button 705 for adding a pool material above a line selected on the cue sheet screen 950; a rear addition button 706 for adding a pool material below a selected line; and a close button 707 for closing the list popup 701.

Each of icons representative of pool materials displayed in the icon display field 792 provides a material name and a component duration, helping the operator in selecting a material.

Manipulations for inserting an additional pool material begin with selection of a line at which a pool material is to be added on the cue sheet screen 950. In the example of FIG. 70, a line 704 of the top component in Item Number "41" (Item Name "Experimental Entrance: Challenge to Snow Board") has been selected. The selected line is displayed in a certain color or blinked, thus indicating that this line has been selected. Then, as the pool button in the setting buttons 971 is selected, the pool material list popup 701 is displayed in a popup style superimposed on the cue sheet screen. A pool material to be inserted is selected from the icon display field 792 in the displayed pool material list popup 701. A selected icon is displayed in a certain color or blinked, thus indicating that this icon has been selected. Then, either the front insertion button 705 or the rear insertion button 706 is selected depending upon whether the pool material is inserted above or below the line selected on the cue sheet screen. After the selection, the close button 707 is selected to close this popup 701. Simultaneously with the closing of the popup 701, the selected line is newly added in the cue sheet screen 950, a component duration is displayed in a predetermined column of the cue sheet screen, and the item duration is also automatically corrected in accordance with the component duration.

Figure 71:
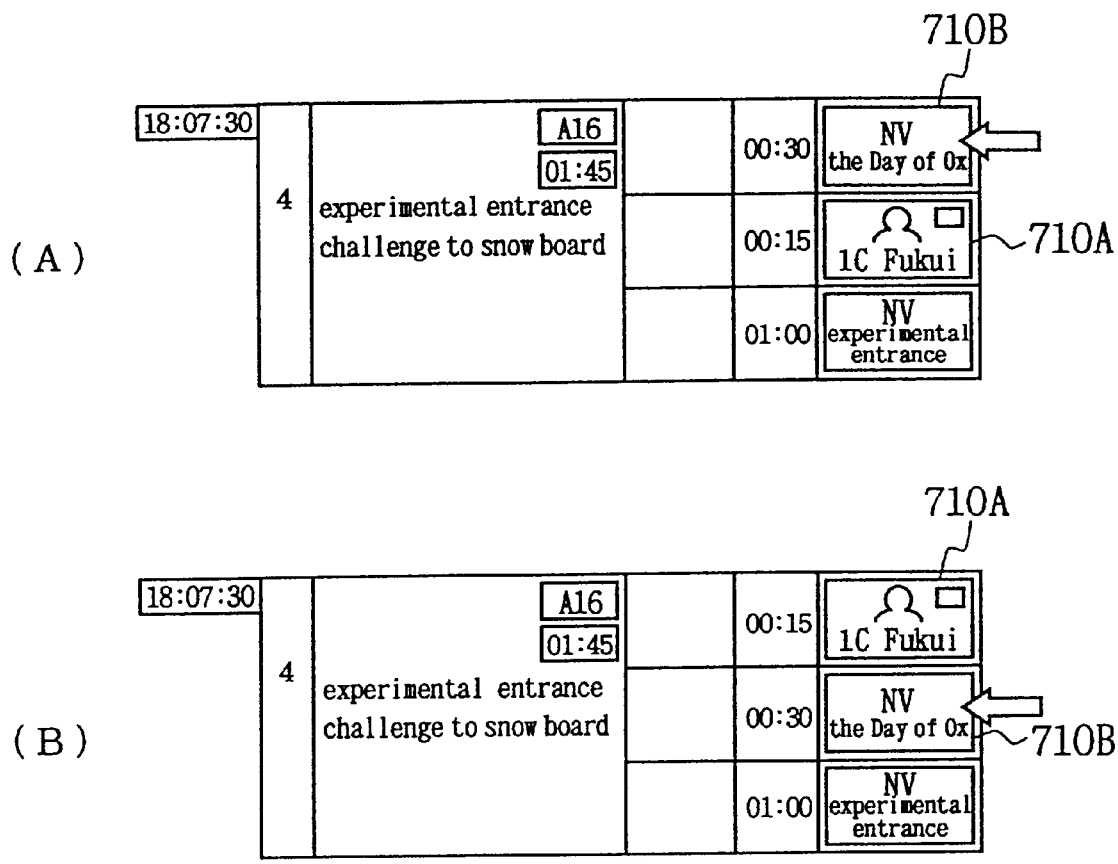
FIG. 71 is a diagram illustrating an example of a cue sheet screen on which pool materials are inserted before and after each component.

FIG. 71 illustrates examples of a pool material inserted above a line and a pool material inserted below a line.

FIG. 71(A) is an example in which the first component (a component with Component Duration "00:15") of Item Number "4" (Item Name "Experimental Entrance: Challenge to Snow Board") is selected, and Material Name "The Day of Ox during the Hottest Season of Summer" is inserted above the selected component on the pool list popup 701.

FIG. 71(B) is an example in which the same component of the same item number is selected, and the same component is inserted below the selected component by selecting "Rear Addition" button 706.

With completely the same manipulations, a general-purpose material can be inserted into the cue sheet screen. Specifically, a component line at which a general-purpose material is to be inserted is selected on the cue sheet screen. Then, as the general-purpose button (displayed in the same manner although not displayed in FIG. 70) in the setting buttons 971 is selected on the cue sheet screen, a general-purpose material list popup is displayed. This popup has the same configuration as the pool material list popup 701, except that "General-Purpose Material List" is displayed in the display field 703, and icons representative of general-purpose materials recorded in the general-purpose material area 22C of the on-air server 22 are displayed in the icon display field 702. A desired general-purpose material is selected from the icon display field 702, and whether the material is inserted above or below the selected line is determined with the buttons, thus inserting an additional component with the selected general-purpose material into the cue sheet.

Next, a procedure for recording a pool material and a general-purpose material respectively in the pool material area 22B and the general-purpose material area 22C of the on-air server 22, previously described, a procedure for additionally inserting a recorded pool material or general-purpose material into a program component table, and a procedure for additionally inserting a recorded pool material or general-purpose material into a cue sheet will be described with reference to flow charts.

First, the procedure for recording a pool material and a general-purpose material respectively in the pool material area 22B and the general-purpose material area 22C of the on-air server 22 will be described with reference to a flow chart illustrated in FIG. 72. However, since a procedure for recording a pool material and a procedure for recording a general-purpose material include substantially the same steps, the procedure for recording a pool material will be described with reference to the flow chart illustrated in FIG. 72, while no flow chart will be shown for the procedure for recording a general-purpose material.

Figure 72:
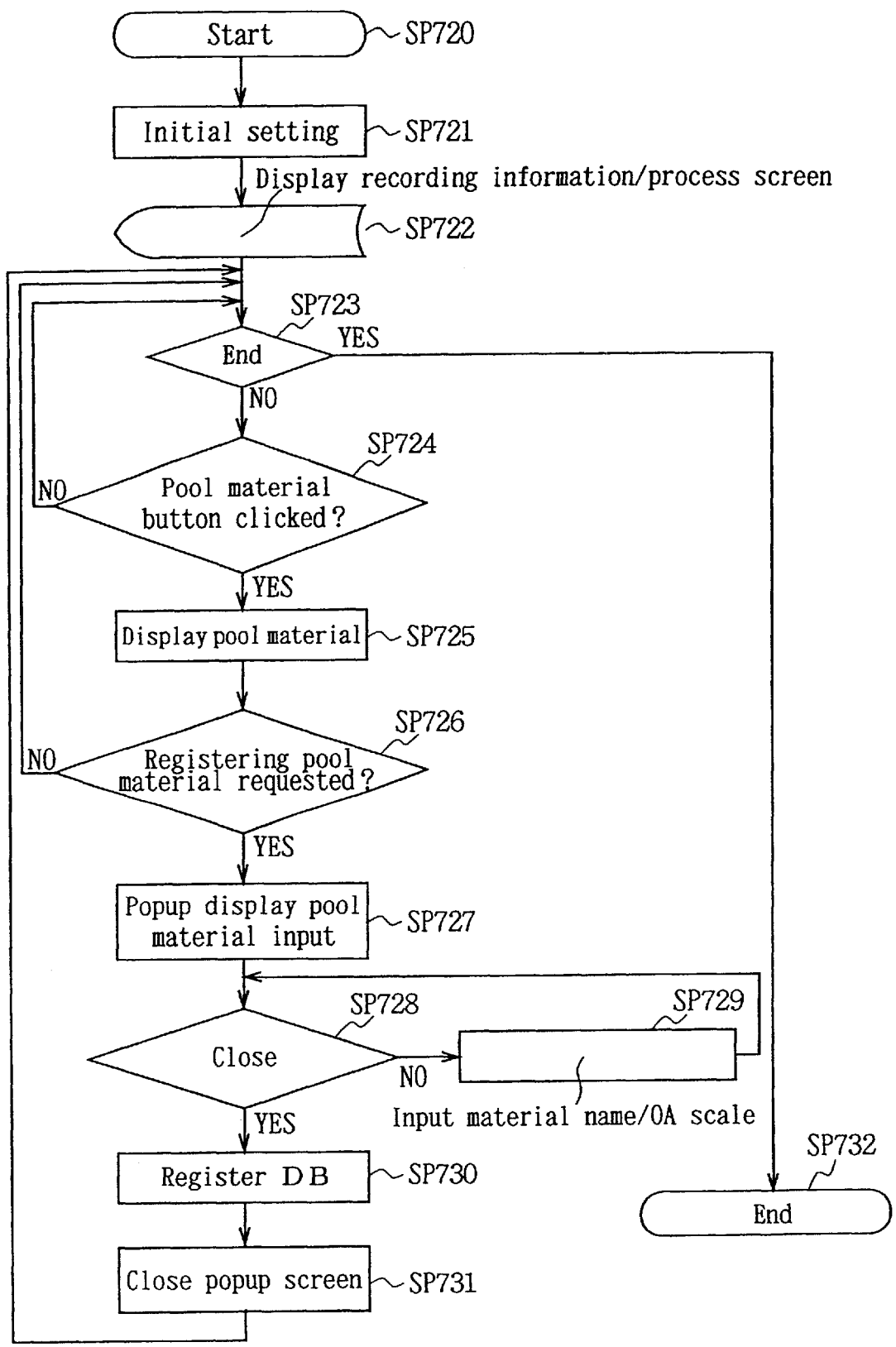
FIG. 72 is a diagram illustrating an example of a flow chart representing a procedure for recording a pool material in a pool material region.

As illustrated in FIG. 72, the processing for recording a pool material in the pool material area 22B of the on-air server 22 is started (step SP720), initial settings are applied on the on-air server management terminal 25 (step SP721), and a recording screen is displayed on a display means such as a monitor, not shown, of the on-air server management terminal 25.(step SP722).

Next, the processing proceeds to step SP723 where it is determined whether or not an instruction has been issued to terminate the recording screen. If the termination instruction is issued (when YES), the processing is terminated (step SP732). If no termination instruction is issued (when NO), the processing proceeds to step SP724.

At step SP724, it is determined whether or not the pool material button has been clicked. This determination is made by checking whether or not the pool material button 458 on the recording screen illustrated in FIG. 51 has been selected by a manipulation such as clicking with a selecting means such as a mouse. If not clicked (when NO), the processing again proceeds to step SP723. If clicked (when YES), the processing proceeds to step SP725.

At step SP725, pool materials are displayed. Specifically, the pool material recording screen 666 illustrated in FIG. 66(A) is displayed.

Next, the processing proceeds to step SP726 where it is determined whether or not a request has been made to register a pool material. This determination is made by checking whether or not the pool material list 667 in the pool material recording screen 666 contains a material to be registered. If a material to be registered has already been displayed in the pool material list 667 (when NO), i.e., if a material to be registered has already been registered in the pool material recording area 22B, the subsequent processing is not required, so that the processing again proceeds to step SP723. If not displayed in the pool list 667 (when YES at step SP726), a pool material must be newly added to the pool material list, so that the processing proceeds to step SP727 where a pool material input popup is displayed for registering a new pool material.

For the pool material input popup, the popup 665 as illustrated in FIG. 66(B) is displayed.

Next, the processing proceeds to step SP728 where it is determined whether or not this popup is closed. When not closed (when NO), the processing proceeds to step SP729 where a material name or an OA scale is inputted on the new pool material input popup 665. Then, the processing again proceeds to step SP728. When the popup is closed (when YES), the processing proceeds to step SP730.

At step SP730, information on a material newly registered as a pool material, for example, information on its material name, OA scale and so on is registered in the DB server 7. Then, the pool material input popup is closed, the pool material recording screen is closed (step SP731), and the processing again proceeds to step SP723.

When a general-purpose material is recorded, the processing may be realized by the flow chart for the processing of FIG. 72 in which the expression of the pool material is replaced with the expression of the general-purpose material at step SP724, step SP725, step SP726 and step SP727. Its procedure is also substantially the same.

Next, description will be made on a processing procedure for inserting an additional component including a pool material or a general-purpose material in a program component table. Also in this case, since the insertion of an additional pool material is the same as the insertion of an additional general-purpose material, the insertion of an additional pool material is described here, with details on the insertion of a general-purpose material being omitted.

Figure 73:
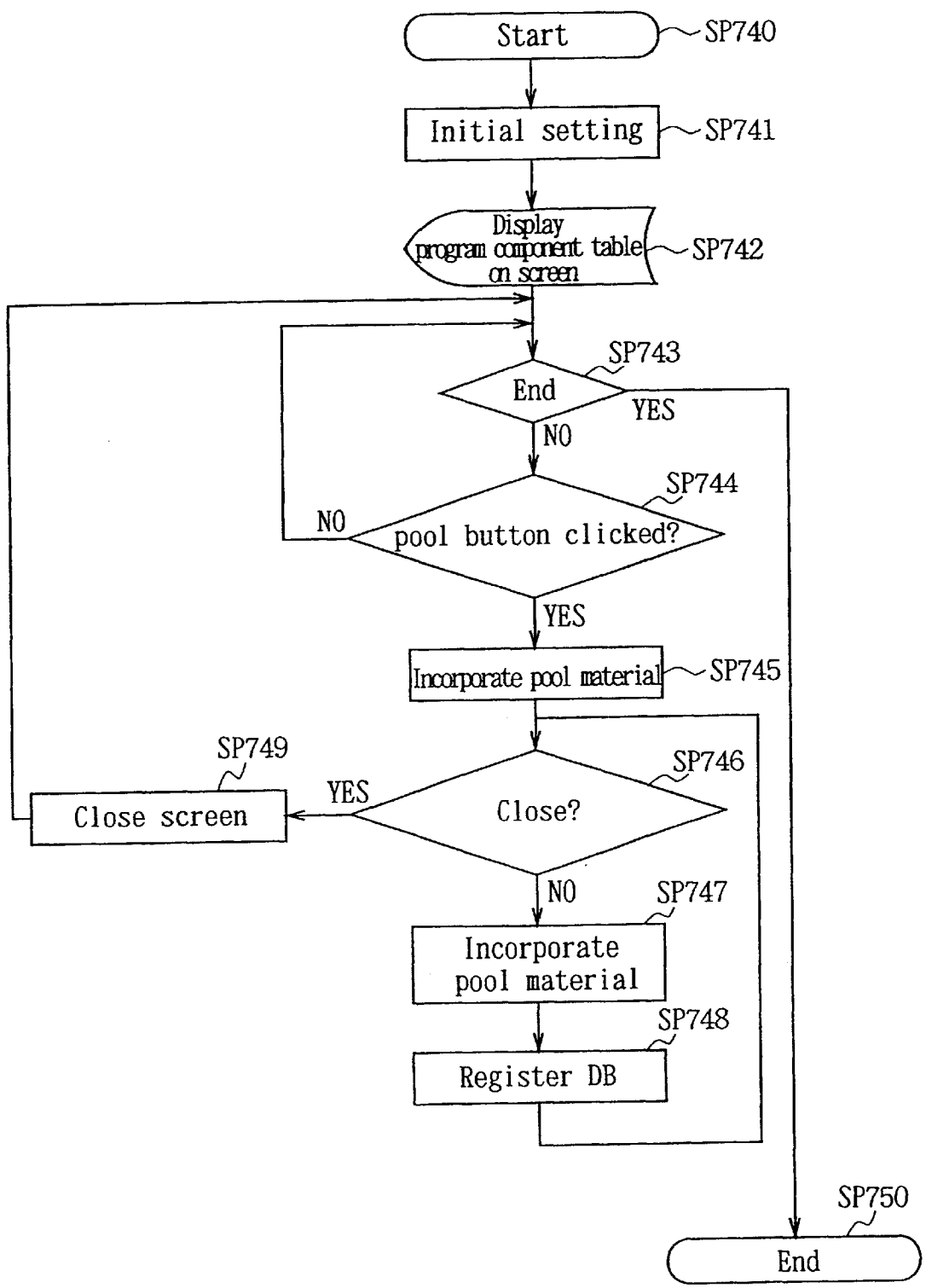
FIG. 73 is a diagram illustrating an example of a flow chart representing a processing procedure for newly inserting an additional pool material on a program component table.

FIG. 73 illustrates a flow chart related to the processing procedure for newly inserting an additional pool material into a program component table.

When starting the processing for inserting an additional pool material into a program component table displayed on a display means such as a monitor, not shown, of the desk terminal 18 in the news program production support section 2 (step SP740), initial settings are applied on the desk terminal 18 (step SP741), and the program component table is displayed (step SP742).

The processing next proceeds to step SP743 where it is determined whether or not an instruction has been made to terminate the program component table. If the termination instruction is issued (when YES), this processing is terminated (step SP750). If no termination instruction is issued (when NO), the processing proceeds to step SP744.

At step SP744, it is determined whether or not the pool button has been clicked. This determination is made by checking whether or not the pool button 671 on the material selection popup 670 has been selected by a manipulation such as clicking with a selecting means such as a mouse on the screen, where the material popup 670 has been displayed by selecting the NV material button in the setting button 167 of the program component table. If the pool button 671 has not been clicked (when NO), the processing again proceeds to step SP743. If clicked (when YES), the processing proceeds to step SP745.

At step SP745, a list of pool material recorded in the pool material area 22B is displayed. The pool material list popup 681 is displayed on the program component table illustrated in FIG. 68 by this step.

Next, the processing proceeds to step SP746 where it is determined whether or not the pool material list popup 681 displayed at step SP745 is closed. When closed (when YES), the pool material list popup 681 is closed (step SP749), and the processing again proceeds to step SP743. When not closing the popup 681 (when NO), the processing proceeds to step SP747.

At step SP747, processing, for incorporating a pool material into the program component table is executed. Specifically, a pool material selected on the pool material list popup 681 is additionally inserted at a line selected on the program component table. Then, information indicating that a pool material has been newly inserted into the program component table, and so on are registered in the DB server 7 (step SP748), and the processing again proceeds to step SP743.

A flow chart for illustrating a procedure for inserting a general-purpose material into the program component table may be created by replacing the pool material with a general purpose material at steps SP744, SP745, SP747 in FIG. 73. With this replacement, the processing is executed completely in the same procedure.

Similarly, insertion of an additional pool material into a cue sheet may be executed along the flow chart illustrated in FIG. 73, provided that the program component table at step SP742 is replaced with a cue sheet. Thus, the processing for inserting an additional pool material into the cue sheet is represented by completely the same flow chart.

Furthermore, insertion of an additional general-purpose material into a cue sheet may be executed along the flow chart illustrated in FIG. 73, provided that the program component table is replaced with a cue sheet at step SP742 and the pool material is replaced with a general-purpose material at steps SP744, SP745, SP747 in the flow chart illustrated in FIG. 73. Thus, the processing for inserting an additional general-purpose material into the cue sheet is represented by completely the same flow chart.

As described above, since the on-air server is provided with the pool material recording area 22B for recording pool materials and a general-purpose material recording area 22C for recording a general-purpose region, it is possible to record edited materials, which have not been determined in which program they are broadcast, in the on-air server. Also, since materials can be edited and recorded in the on-air server before a program component table is created, i.e., the materials can be stocked, the work efficiency is improved in creating a program component table, and a broadcasting program can be broadcast freely at any time.

The foregoing embodiment has been described for the case where a pool material or a general-purpose material is additionally inserted into a program component table or a cue sheet. Contrary to this, an on-air material on a program component table or a cue sheet may be converted to a pool material or a general-purpose material on the program component table or the cue sheet. In this case, a material to be converted to a pool material or a general-purpose material, for example, is selected by a manipulation such as clicking on the program component table or the cue sheet, and a pool material list popup or a general-purpose material list popup is displayed. As the pool button or the general-purpose button is selected, the material is displayed in the list. In this way, the on-air material is recorded in the pool material recording area 22B or the general-purpose material recording area 22C of the on-air server 22.

While a variety of display methods are contemplated with respect to displays on the screen for a pool material list, a general-purpose material list, representations of selection buttons, and so on, it is intended that such variations are all encompassed in the present invention.

When the transmission of materials from the on-air server 22 has been terminated based on cue sheet data, materials recorded in the on-air server 22 are recorded on tape cassettes by a VTR, in consideration of the capacity of the on-air server 22. Then, edited materials or the like newly used in programs or transmissions are recorded in the on-air server 22. When these materials have been recorded, they are likewise recorded on tape cassettes by a VTR. Repeating these operations, the news program production and transmission apparatus 1 is actually used in a broadcasting station.

The operation for recording materials recorded in the on-air server 22 on tape cassettes is referred to as an integration operation. The on-air server 22 does not an infinite capacity, so that if materials except for the foregoing general-purpose materials and pool material, and so on are left in the on-air server after they have been transmitted, other materials required for another news program cannot be recorded in the on-air server.

The integration operation is performed in view of the problem mentioned above. Tape cassettes having materials stored therein are automatically placed on a predetermined shelf in a plurality of cassette shelves, referred to as a cassette auto-changer, and used as a library in future.

As such, the integration operation is an indispensable operation for producing programs.

The integration operation as mentioned above has involved collecting materials after the termination of broadcasting, and manipulating an editor connected to the on-air server to create an integration tape. Further, a list of integrated materials (integration list) has been created by an operator using a word processor or the like each time the integration operation is performed. Therefore, the integration operation, which must have been performed every day, has required much labor and time. In addition, a created integration tape is provided with a label adhered thereon for indicating a hand-written tape number. Therefore, if the label comes off, if characters thereon becomes unclear, or the like, the tape is identified with difficulties.

To eliminate this inconvenience, the present invention automatically creates an integration list for specified programs after the broadcasting is terminated, and automatically executes the integration based on the created list at a specified time.

Detailed description thereon will be given below with reference to FIGS. 74–83.

Figure 74:
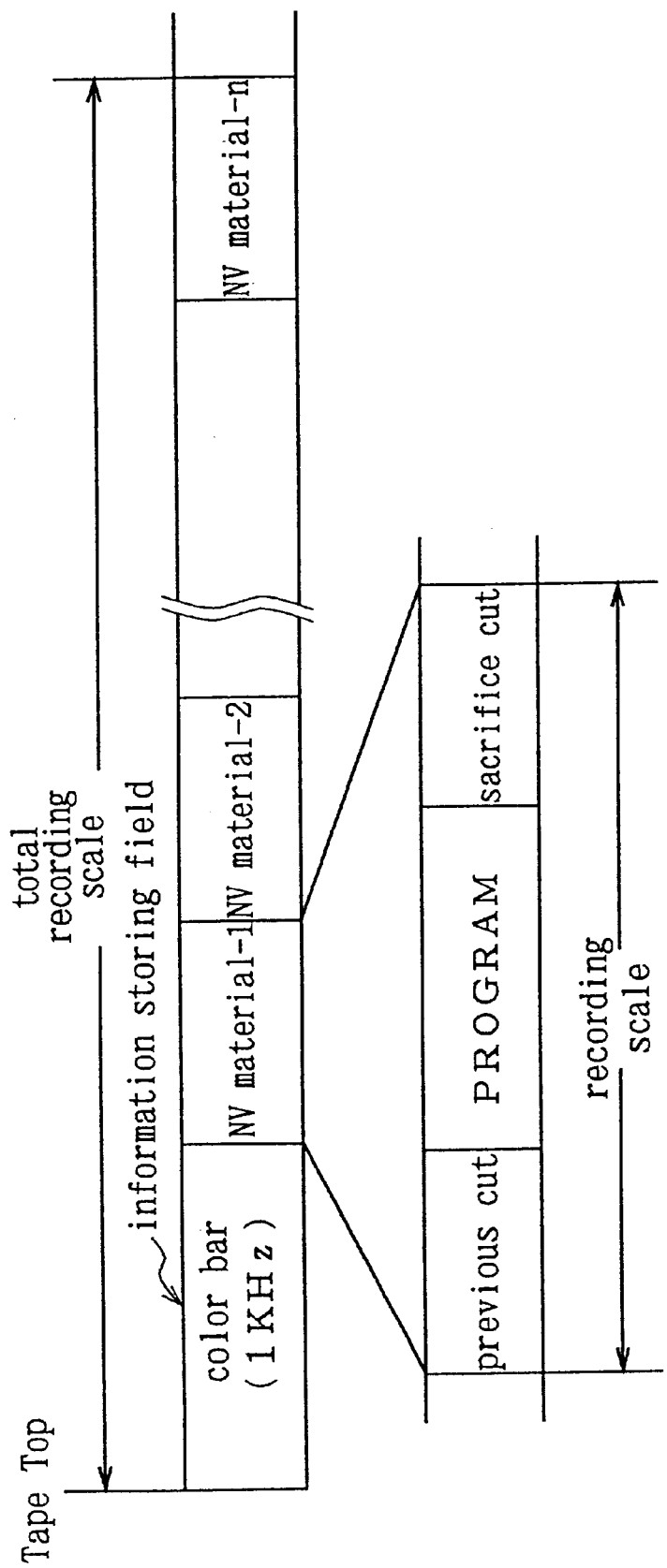
FIG. 74 is a diagram illustrating an example of a format on a tape in a tape cassette for integrated materials recorded on the tape.

FIG. 74 illustrates an example of a tape format for a cassette tape on which integrated materials have been recorded.

As illustrated in FIG. 74, a plurality of materials have been stored on the tape, where recorded materials include programs which are data having lengths corresponding to component durations specified in a program component table or a cue sheet as transmission materials, and materials including previous cuts and sacrifice cuts. At the head of an integration tape, there is a field for recording color bar information comprising data of several seconds. Data comprising a plurality of materials and data comprising this color bar information are combined to form a total recording scale.

While materials are recorded on an integration tape in accordance with the format mentioned above, associated operations can be automatically executed on an integration creating screen displayed on the on-air server management terminal 25.

Figure 75:
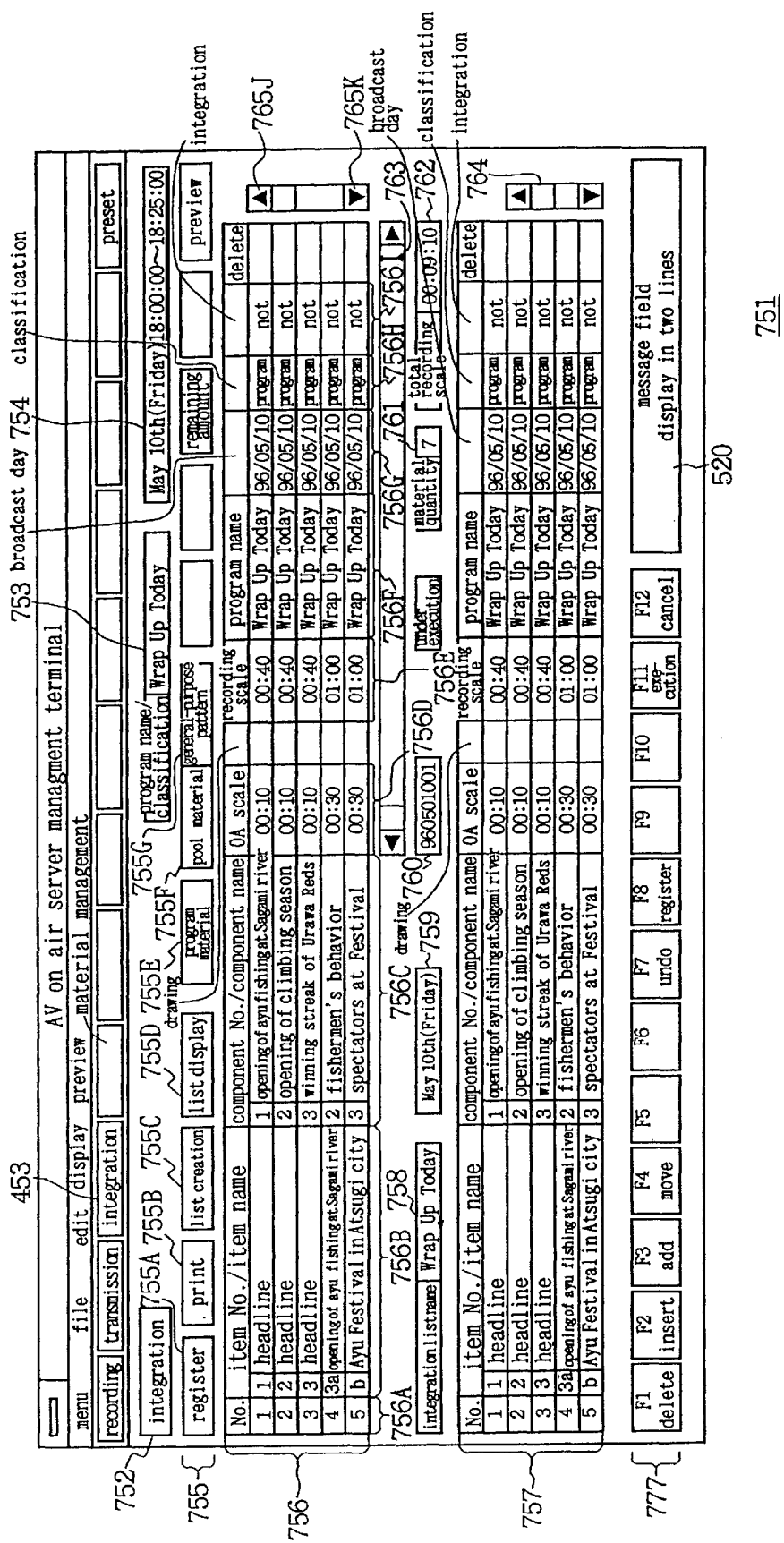
FIG. 75 is a diagram illustrating an example of an integration list creating screen displayed on the on-air management terminal.

An example of the integration creating screen displayed on the on-air server management terminal 25 is illustrated in FIG. 75.

In the following, this screen is described in detail.

For the integration creating screen 751, a selecting manipulation such as clicking on an integration button 453 results in displaying the creating screen 751 as illustrated in FIG. 75.

The integration creating screen 751 generally composes a display field 752 for indicating which screen is being currently selected; a program name/classification field 753 for displaying a program name and classification; a date and time column 754 for displaying date and time; a setting button field 755 in which a variety of setting buttons are provided; a material display field 756 for displaying materials used in a program displayed in the program name field 753; an integration list display field 757 for displaying a list of materials to be integrated; and a menu button field 765 for providing a variety of menu buttons.

The material display field 756 is mainly composed of a number field 756A for assigning a number to each material; an item number/item name field 756B for displaying an item number and an item name corresponding to an item on a program component table or a cue sheet; a component number/material name column 756C for displaying a component number and a material name of each component; an OA scale column 756D for displaying an OA scale of each material; a recording scale column 756E for displaying a recording scale of each material; a program name column 756F for displaying a program name; a broadcasting date column 756G for displaying a broadcasting date on which a material was broadcast; a classification column 756H for indicating the classification of each component; and an integration column 756I for indicating whether a material has been integrated or not.

In addition, scroll bars 765J, 765K are provided for scrolling the screen so as to display all materials in the program.

The integration list display field 757 for displaying an integration list has completely the same structure as the material display field 756, so that description thereon is omitted here. Displayed above the integration list display field 757 are a list name field 758 for displaying the list name of the integration list; a date field 759 for displaying a date; an identification number field 760 for displaying the identification number of the list; a material quantity field 761 for displaying a total number of listed materials; and a total recording scale field 762 for displaying a total recording scale.

With manipulations for inserting a material displayed in the material display field 756 into the integration list on the integration list creating screen displayed as above, the integration list is automatically created, and the aforementioned integration operation is automatically executed when a time entered in the list is reached. Details on these manipulations will be described later.

The display of materials intended for integration in the integration list display field 757 can be previously set by a system setting depending upon whether all materials in a program are integrated; materials specified on a program component table are to be integrated; or pool materials or general-purpose materials are to be integrated. FIG. 75 shows an example in which all materials in a program are displayed in the integration list display field 757. Here, description is made on an example in which a material is specified for integration on a program component table to display it in the list display field 757.

Figure 76:
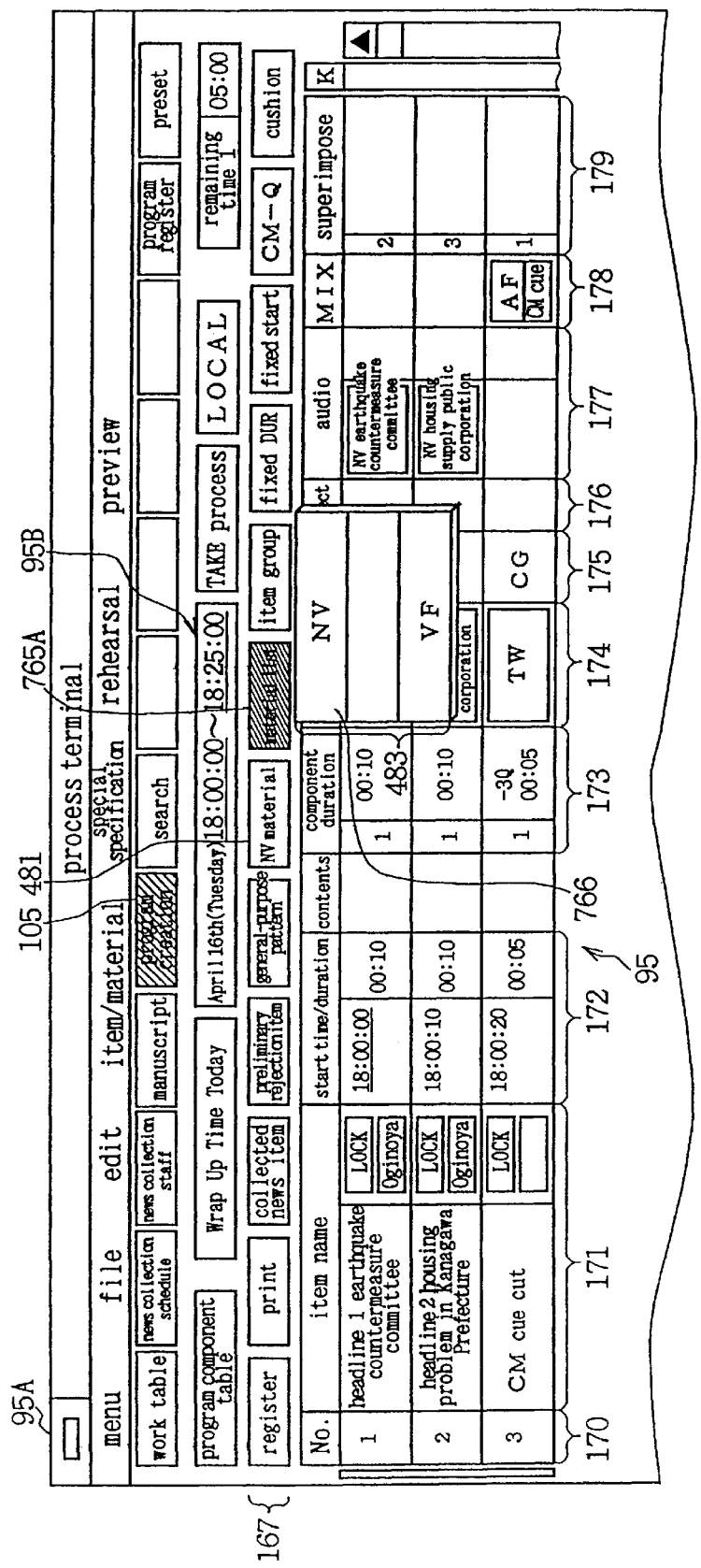
FIG. 76 is a diagram illustrating an example of a material selection popup displayed by selecting a material list button on a program component table.

As illustrated in FIG. 76, when a material list button 765A is selected in a variety of setting buttons 167 on the program component table, a material selection popup 765 is displayed. This material selection popup 765 is arranged to display a list of materials after selecting materials to be displayed as a material list depending upon whether each material is an NV material (video material), a textual material for superimposing, or a VF material. In the case of FIG. 76, when NV 766 indicative of a video material is selected, an NV material list 770 illustrated in FIG. 77 is displayed. This list 770 is displayed on the screen after the program component table on the screen is closed. Of course, the list 770 may be displayed in a popup style superimposed on the program component table.

The material list 770 is composed of a number display column 771A for displaying a number for each material; an item number/item name column 771B for displaying an item number and item name; a component number/material name column 771C for displaying a component number and a material name; a material information column 771D for displaying an OA scale, a progress situation of recording and so on for each material; and an LIB column 771E for indicating whether or not a material has been specified to be integrated.

Here, for specifying a desired material as a material to be integrated, when the LIB column 771E of the intended material is selected by a manipulation such as clicking with a manipulation means such as a mouse on the screen, "○" is displayed in the clicked LIB column 771E, thus indicating that the material corresponding to that line has been selected for integration. Also, when a manipulation means such as a mouse is clicked again on the LIB column 771E of a material having "○" displayed in the LIB column 771E, the displayed "○" is erased, thus indicating that the material is removed from candidates of integration. In this way, materials to be integrated are selected from the program component table, and the selected materials are displayed in the list 757 on the integration list creating screen 751.

Next, a sequence of manipulations on the screen for the integration will be described with reference to FIGS. 75 and 78–81.

Figure 78:
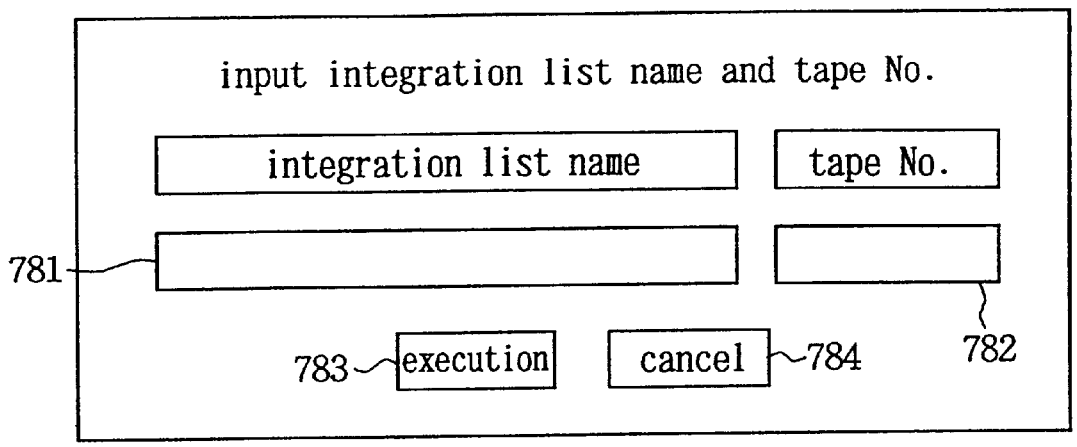
FIG. 78 is a diagram illustrating an example of a list creating popup for creating an integration list.

First, a tape for integration is loaded in a VTR of a library 28, and a predetermined position of the tape is set at the beginning of recording. Subsequently, a list creation button 755C on the integration list creating screen is selected by a manipulation such as clicking with a manipulation means such as a mouse. As the list creation button 755C is manipulated, a list creating popup 780 illustrated in FIG. 78 is displayed in a popup style superimposed on the integration list creating screen 751. Of course, the popup 789 only may be displayed after the list creating screen 751 is closed.

This list creating popup 780 comprises an integration list name field 781 for entering the name of an integration list; a tape number field 782 for entering the tape number of the integration tape; an execution button for executing information entered in the list creating popup; and a cancel button 784 for canceling entered information instead of entering. When the execution button is selected after entering an integration list name and a tape number on the screen, this information is registered in the DB server 7, and this popup display 780 is erased from the screen.

The list name entered in this popup is displayed in the integration list field 758 of the integration list creating screen.

As to the integration list display field 757 of the integration list creating screen 751, whether all materials in a program are displayed in the list display field 757; materials specified on a material list of a program component table are displayed in the list display field 757; or general-purpose materials or pool materials are displayed in the display field 757 has previously been determined by a system setting, as described above. FIG. 75 shows an example in which all materials in a program are intended for integration. When any of a program material button 755E, Pool Material 755F and General-Purpose Material 755G is selected on the list creating screen 751, a list of selected materials is displayed in the material list display field 756. Then, insertion of a material into the list displayed in the integration list display field 757 is carried out by selecting a material to be added on this material list display field 756 displayed in an upper portion of the screen and manipulating an insertion button in the variety of buttons 765 by a selecting manipulation such as clicking, thereby displaying the selected material in the list display field 757 as specified to be a candidate for integration. Similarly, when a pool material is to be added to the integration list, the pool material button 755G is selected to display a list of pool materials in the material list 756, from which a material to be integrated is selected, and the insertion button is clicked to insert the additional material into the integration list.

For deleting a material from the integration list, a material to be deleted is selected from the list display field 757, and the delete button is selected in the variety of buttons 765, with the result that the material is deleted from the list and therefore is removed from candidates for the integration.

The integration is executed in an order displayed in the list display field 757, so that if the order of execution is to be changed, a material to be moved is selected, a move button is selected in the variety of buttons, and a number displayed in the number column of the destination is inputted, causing the material to move. When the order is changed, numbers of materials subsequent to the moved one are also shifted. Alternatively, a material originally located at the destination may be moved to the position at which the moved material has resided.

Figure 79:
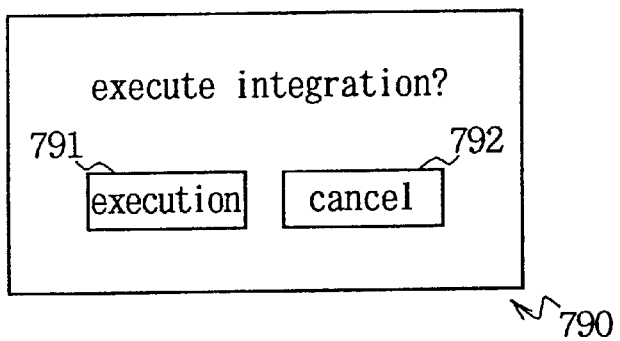
FIG. 79 is a diagram illustrating an example of an integration executing popup display for executing an integration operation.
Figure 80:
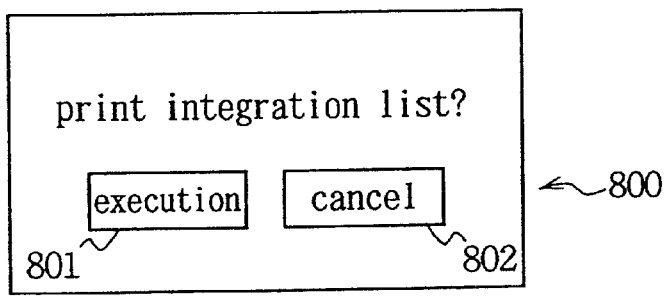
FIG. 80 is a diagram illustrating an example of a popup displayed for executing printing of a created integration list.

After operations involved in additional insertion and deletion of materials, and a change of the execution order have been completed, the integration is actually executed. In this event, as the execution button in the variety of button 765 is selected on the integration list creating screen, an integration execution popup illustrated in FIG. 79 is displayed.

The integration execution popup 790 is a screen for confirming whether or not the integration is actually executed. When an execution button 791 is selected on the screen, the integration is carried out. Generally, the execution of the integration operation is set to automatically start when a program ends. Stated another way, the execution button 791 for executing the integration operation is a button for setting the integration to be automatically executed after the program has been broadcast. Of course, with this execution button 791, the integration operation is immediately executed at the time the preparation therefor is completed, provided that the program has ended.

When the execution button 791 is selected here, a printing execution popup 800 is displayed. When an execution button 801 is selected here, the integration list created on the integration list creating screen is automatically printed after the integration operation has been executed.

On the other hand, if a cancel button 802 is selected, the integration list is not printed although the integration operation is executed.

The on-air server 22 enters a standby state for the integration operation. Once the integration operation is ready, materials to be integrated are automatically transferred from the on-air server 22, and the VTR of the library 28 records the transferred materials on a cassette tape in accordance with the format shown in FIG. 74.

Once all materials registered in the integration list have been integrated, the transmission of materials from the on-air server 22, and the recording of the materials by the VTR are stopped automatically. Then, the integration column displayed in a recording screen or a transmission screen is changed from "Not" indicating that an associated material has not been integrated to "Integrated".

If the execution of the integration is stopped in course of the execution of the integration, a stop button in the variety of buttons 765 may be selected on the integration list creating screen to stop the execution. After the integration of a certain material is stopped, the integration of another material can be executed.

The integration list registered in the integration list display field 757 is automatically erased after the lapse of a predetermined days.

Figure 81:
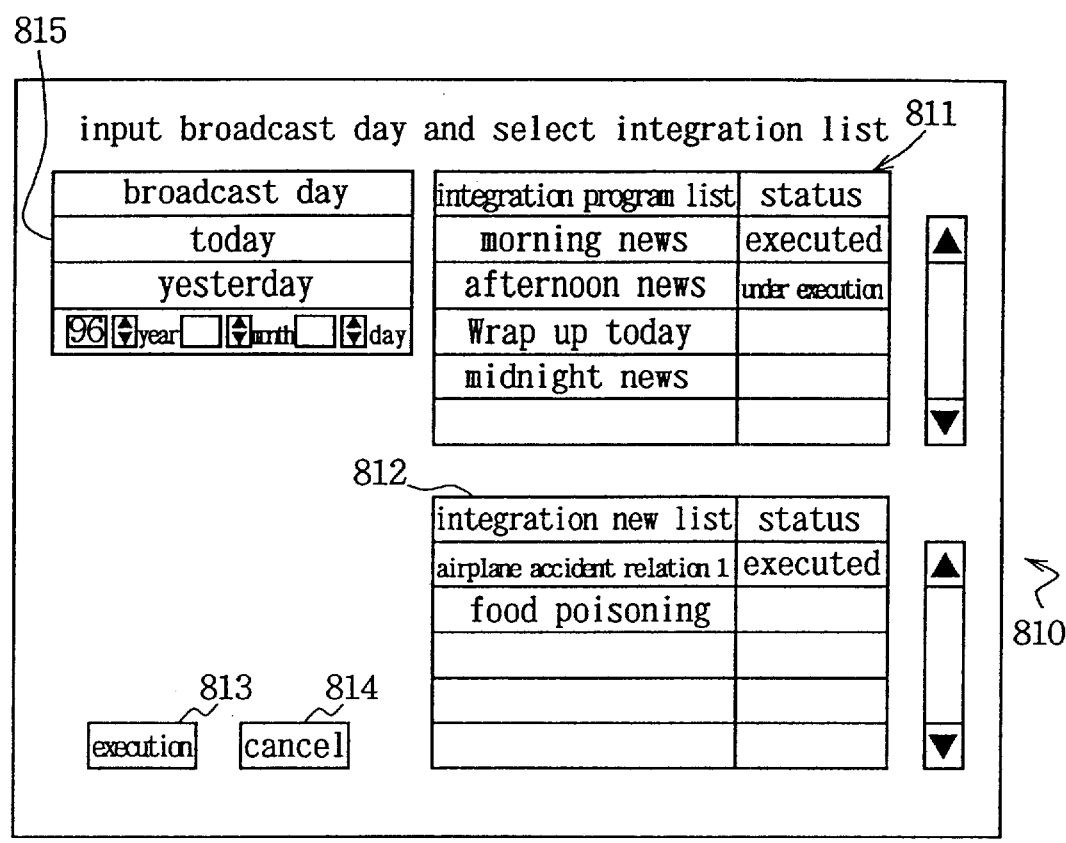
FIG. 81 is a diagram illustrating an example of an integration list displayed in a popup style.

When Display List 755D is selected on the integration list creating screen illustrated in FIG. 75, a list display popup 810 illustrated in FIG. 81 is displayed. The list display popup 810 comprises a date input field 815 for displaying a broadcasting date for displaying a program contained in the integration list; an integrated program list field 811 for displaying a list of programs to be integrated on the day inputted in the date input field; and a newly integrated program list 812 for displaying a list of newly registered programs to be integrated. The integrated program list field 811 and the newly integrated program list 812 display each program and a situation of the integration of programs on the respective new integration lists. When a broadcasting date and a list name, or a new list name is selected from the respective fields and an execution button 813 is selected, an integration list, not shown, is displayed in a lower portion of the screen, providing an integration list of a specified program on a date specified on the on-air server management terminal 25.

Described next is procedures involved in the processing for automatically creating an integration list and the processing for automatically executing the integration list.

Figure 82:
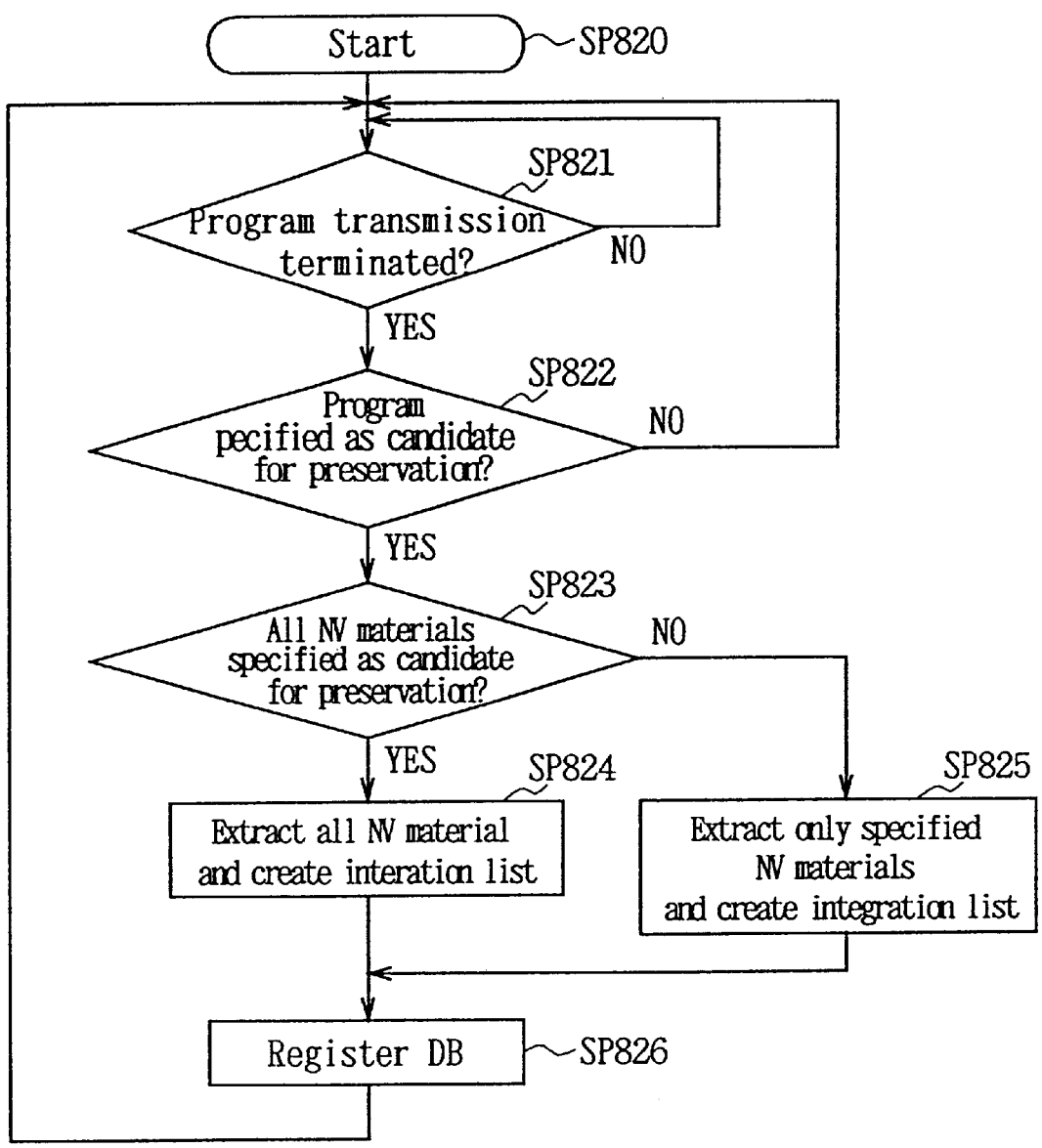
FIG. 82 is a diagram illustrating an example of a flow chart representing a processing procedure for automatically creating an integration list.

FIG. 82 illustrates a flow chart representing a processing procedure involved in the processing for automatically creating an integration list. This processing is described below.

When the processing for automatically creating an integration list is started (step SP820), the processing proceeds to step SP821 where it is determined whether or not the transmission of a program has ended. If the transmission of the program is not performed, the integration operation is not executed, so that the processing is repetitively executed until the transmission ends at this step SP821 (when YES).

When the transmission of the program has ended, the processing proceeds to step SP822 where it is determined whether or not the program has been specified for integration. If materials of the program to be integrated are displayed in the list display field 757 of the integration list creating screen 751, it is confirmed that this program has been specified for integration. If not displayed (when NO), the integration is not executed, so that the processing again proceeds to step SP821:

When the program has been specified for integration (when YES), the processing proceeds to step SP823 where it is determined whether or not all materials in the program are to be integrated. This determination is made by checking whether materials displayed in the material display field 756 are identical to materials displayed in the list display field 757 on the integration list creating screen.

If all materials are to be integrated (when YES), all the materials are extracted, the list displayed in the list display field 757 is created as an integration list, and information indicated in the list is registered in the DB server 7 (step SP826).

On the other hand, if all materials have not been specified for integration at step SP824 (when NO), the processing proceeds to step SP825 where specified materials are only extracted. Specifically, materials displayed in the list display field 757 are collected in an integration list, and information thereon is registered in the DB server (step SP826). Then, the processing again proceeds to step SP821.

Since the integration list is automatically created, an increased efficiency is expected for the creation of the list in the integration operation. In addition, since a tape number is recorded in the list, this facilitates a search of the integration tape.

Figure 83:
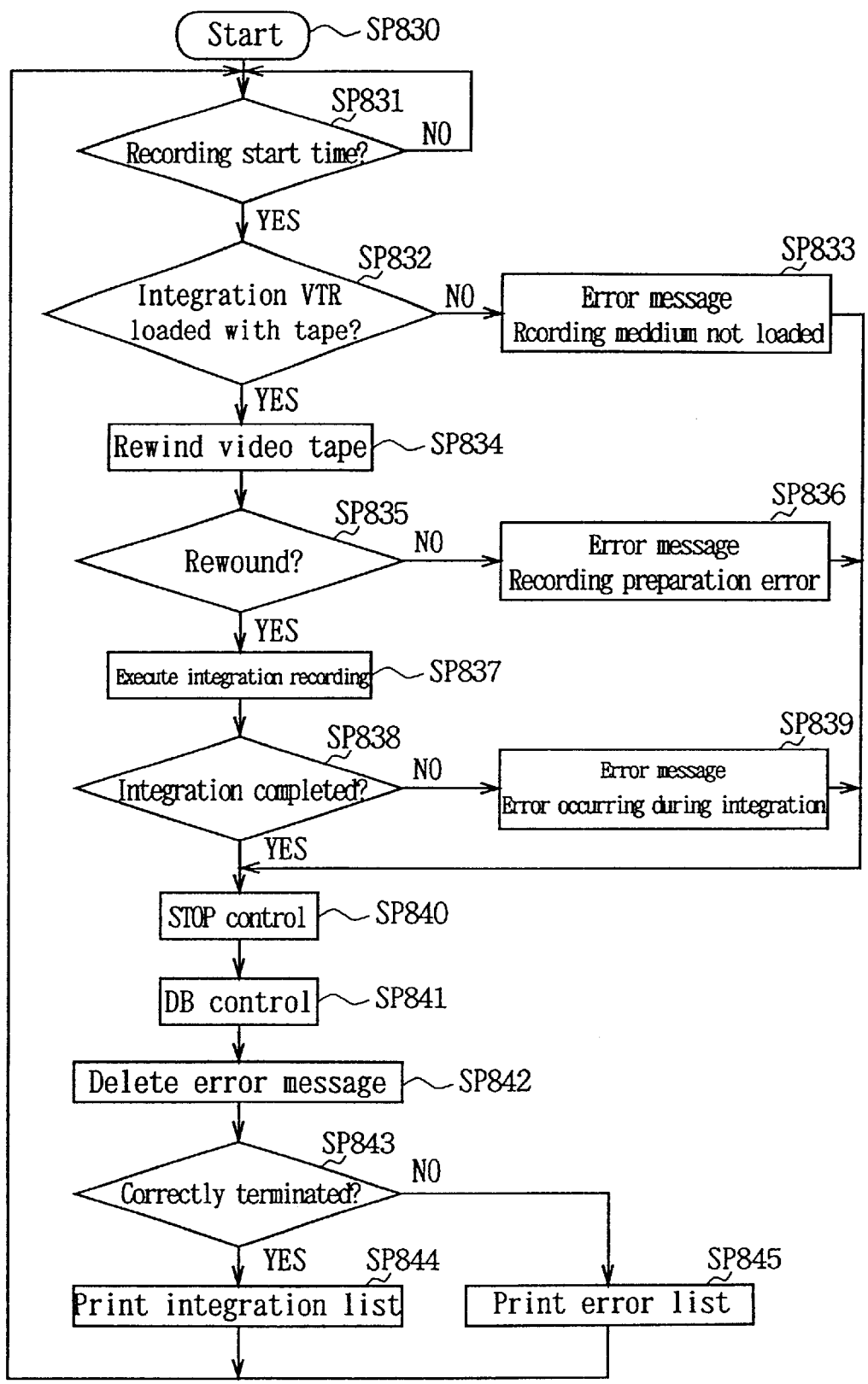
FIG. 83 is a diagram illustrating an example of a flow chart representing a processing procedure for automatically executing an integration operation.

Next, the processing for automatically executing the integration will be described with reference to FIG. 83.

When this automatic execution processing is started (step SP830), the processing proceeds to step SP831 where it is determined whether or not a recording start time is reached. Since the recording on an integration tape is started at a time previously determined by a system setting, this can be determined by comparing that time with the current time. This step is repetitively executed until the recording start time is reached.

When the record starting time is reached (when YES), the processing proceeds to step SP832 where it is determined whether or not the integration VTR is loaded with a tape. If the VTR is not loaded with any tape (when NO), the processing proceeds to step SP833 where an error message "Recording Medium Is Not Loaded" is displayed on the integration list creating screen displayed on the on-air server management terminal 25. Then, the processing proceeds to step SP840 where the on-air server 22 is controlled to stop transferring materials.

On the other hand, if the VTR is loaded with a tape at step SP832, the tape is rewound such that the recording is started from a predetermined position.

Next, it is determined whether or not the rewinding is completed (step SP835). If the rewinding is not completed (when NO), the processing proceeds to step SP836 where an error message "Recording Preparation Error" is displayed. Then, the processing proceeds to step SP840 where the on-air server 22 is controlled to stop transferring materials.

On the other hand, if the rewinding is completed at step SP835 (when YES), the integration recording is executed, followed by the processing proceeding to step SP838.

At step SP838, it is determined whether or not the integration has all been completed. If not completed (when NO), an error message "Error Occurring During Integration" is displayed. Then, the processing proceeds to step SP840.

On the other hand, if the integration is completed at step SP838 (when YES), the processing proceeds to step SP840.

At step SP840, the on-air server 22 is controlled to stop transferring materials for the integration for the on-air server 22. Next, the processing proceeds to step SP841 where information indicating that the integration has been executed is registered in the DB server 7.

Then, the processing proceeds to step SP842, where an error message, if displayed on the screen, is erased, and proceeds to step SP843.

At step SP843, it is determined whether or not the integration recording has been normally performed. If not normally performed (when NO), an integration list is automatically printed (step SP844), and the processing again proceeds to step SP831.

On the other hand, if not normally terminated at step SP843 (when NO), an error list is printed, and the processing again proceeds to step SP831.

As described above, the automatic execution of the integration operation significantly improves the efficiency of the integration operation.

Specifically, a work time required for the integration is largely reduced, so that the saved time can be spent for other operations.

INDUSTRIAL AVAILABILITY

The present invention can be utilized in a broadcasting station, for example, when a news program is produced and transmitted.

What is claimed is:

1. A computer apparatus for creating a program and sequentially transmitting the program based on a program progress table, comprising:

means for providing production schedule information;

program production support means for creating production information based upon said provided production schedule information, said production information including a schedule for creating said program and program component information indicative of each of a plurality of components that are to be selectively included in a program;

material creation managing means for receiving from an external source and recording in a storage means materials that are selectively included in each of said plurality of components, and for editing the recorded materials to form each of said plurality of said components in the program; and transmission equipment controlling means for creating said program progress table based upon said production information and for transmitting each of the components included in the program in accordance with said program progress table;

said program production supporting means, said transmission equipment controlling means, said material creation managing means, said storing means, and said transmission means being interconnected through a network.

2. The program production and transmission apparatus of claim 1, wherein said program production supporting means further creates a news collection schedule table indicating a schedule for collecting news and materials for each of said plurality of said components in the program.

3. The program production and transmission apparatus of claim 1, wherein said program production supporting means further creates a work schedule table indicating a work schedule for staff assigned to collect materials for each of said plurality of said components in the program.

4. The program production and transmission apparatus of claim 1, wherein said program production supporting means further creates an on-air manuscript which is transmitted along with the program.

5. The program production and transmission apparatus of claim 1, wherein said material creation managing means further includes recording means for recording received materials on a tape cassette or magnetic, optical or electronic storage device.

6. The program production and transmission apparatus of claim 1, further comprising computer graphics means connected to said network for applying computer graphics to said materials during editing.

7. A computerized method for creating a program and sequentially transmitting the program based on a program progress table, comprising the steps of:

providing production schedule information;

creating production information based upon said provided production schedule information, said production information including a schedule for creating said program and program component information indicative of each of a plurality of components that are to be selectively included in a program;

receiving from an external source and recording materials in a storage means that are selectively included in each of said plurality of components;

editing the recorded materials to form each of said plurality of said components in the program;

creating said program progress table based upon said production information; and transmitting each of the components in the program in accordance with said program progress table.

* * * * *